(12) United States Patent
Iwasaki et al.

(10) Patent No.: US 8,730,600 B2
(45) Date of Patent: May 20, 2014

(54) LENS BARREL

(75) Inventors: Tetsuya Iwasaki, Kawasaki (JP);
Terunori Koyama, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/702,734

(22) PCT Filed: Jun. 6, 2011

(86) PCT No.: PCT/JP2011/063423
§ 371 (c)(1),
(2), (4) Date: Dec. 7, 2012

(87) PCT Pub. No.: WO2011/155618
PCT Pub. Date: Dec. 15, 2011

(65) Prior Publication Data
US 2013/0088791 A1    Apr. 11, 2013

(30) Foreign Application Priority Data

Jun. 7, 2010  (JP) ................................. 2010-129984
Apr. 15, 2011 (JP) ................................. 2011-091180

(51) Int. Cl.
*G02B 7/02*    (2006.01)
(52) U.S. Cl.
USPC ....................................................... 359/827
(58) Field of Classification Search
USPC ....................................................... 359/827
See application file for complete search history.

(56) References Cited

U.S. PATENT DOCUMENTS

| | | | |
|---|---|---|---|
| 7,551,376 B2 | 6/2009 | Koyama | |
| 7,855,746 B2 | 12/2010 | Iwasaki | |
| 7,864,241 B2 | 1/2011 | Iwasaki | |
| 7,872,683 B2 | 1/2011 | Iwasaki | |
| 7,969,662 B2 | 6/2011 | Iwasaki | |
| 8,284,289 B2 | 10/2012 | Iwasaki | |

(Continued)

FOREIGN PATENT DOCUMENTS

| | | |
|---|---|---|
| GB | 2 458 223 A | 9/2009 |
| JP | 2003-315861 | 11/2003 |

(Continued)

OTHER PUBLICATIONS

International Search Report Issued Jul. 12, 2011 in PCT/JP2011/063423 Filed Jun. 6, 2011.

(Continued)

*Primary Examiner* — James Jones
(74) *Attorney, Agent, or Firm* — Oblon, Spivak, McClelland, Maier & Neustadt, L.L.P.

(57) ABSTRACT

A lens barrel includes a plurality of lens groups including a retractable lens group, a plurality of lens retaining frames to respectively retain the plurality of lens groups, a movable lens barrel to retain the plurality of lens retaining frames therein, and a lens retaining frame driving device to drive the lens retaining frames via the movable lens barrel. The lens retaining frames, the movable lens barrel and the lens retaining frame driving device move the plurality of lens groups between a collapsed state and a photographing state. The retractable lens retaining frame is movable between a position on a photographing axis and a position inside a housing located outside an inside diameter position of the movable lens barrel in the collapsed state by moving in a direction inclined relative to the photographing axis and moving in a direction orthogonal to the photographing axis.

14 Claims, 62 Drawing Sheets

(56) References Cited

U.S. PATENT DOCUMENTS

| | | |
|---|---|---|
| 2003/0156832 A1 | 8/2003 | Nomura et al. |
| 2004/0130803 A1 | 7/2004 | Iwasaki |
| 2004/0141736 A1 | 7/2004 | Nomura |
| 2004/0228626 A1 | 11/2004 | Endo et al. |
| 2005/0185297 A1 | 8/2005 | Omiya et al. |
| 2005/0207748 A1 | 9/2005 | Ishizuka et al. |
| 2006/0018654 A1 | 1/2006 | Nuno et al. |
| 2006/0209192 A1 | 9/2006 | Shinohara et al. |
| 2008/0007847 A1 | 1/2008 | Koyama |
| 2008/0291556 A1 | 11/2008 | Koyama |
| 2009/0046156 A1 | 2/2009 | Iwasaki |
| 2009/0046198 A1 | 2/2009 | Iwasaki |
| 2009/0066829 A1 | 3/2009 | Iwasaki |
| 2010/0020412 A1 | 1/2010 | Iwasaki |
| 2010/0046089 A1 | 2/2010 | Iwasaki |
| 2010/0046098 A1 | 2/2010 | Iwasaki |
| 2010/0053780 A1 | 3/2010 | Iwasaki |
| 2010/0103307 A1 | 4/2010 | Iwasaki |
| 2010/0157440 A1 | 6/2010 | Iwasaki |
| 2010/0247092 A1 | 9/2010 | Koyama |
| 2011/0102911 A1* | 5/2011 | Iwasaki .................. 359/704 |

FOREIGN PATENT DOCUMENTS

| | | |
|---|---|---|
| JP | 2004-233924 | 8/2004 |
| JP | 2004-361921 | 12/2004 |
| JP | 2005-266345 | 9/2005 |
| JP | 2005-284247 | 10/2005 |
| JP | 2006-065268 | 3/2006 |
| JP | 2006-072004 | 3/2006 |
| JP | 2006-243605 | 9/2006 |
| JP | 2006-243606 | 9/2006 |
| JP | 2008-090201 | 4/2008 |
| JP | 2008-170650 | 7/2008 |
| JP | 2008-233575 | 10/2008 |
| JP | 2008-292869 | 12/2008 |
| WO | WO 2006/095884 A1 | 9/2006 |

OTHER PUBLICATIONS

Extended Search Report issued Mar. 20, 2013 in European Application No. 11792575.0.

* cited by examiner

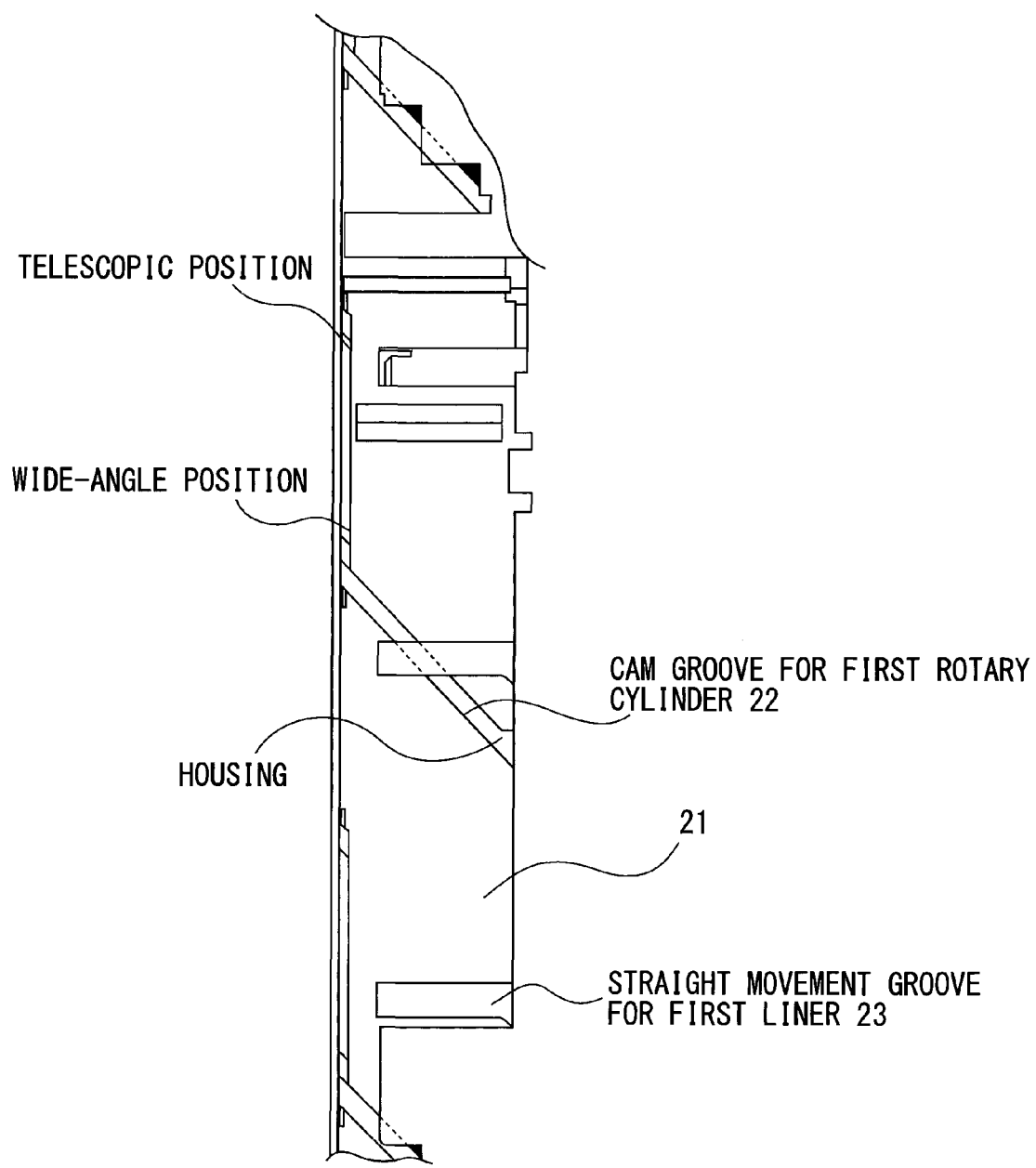

LENS BARREL

CROSS REFERENCE TO RELATED APPLICATIONS

The present application is based on and claims priority from Japanese Application Numbers 2010-129984, filed on Jun. 7, 2010 and 2011-091180, filed on Apr. 15, 2011, the disclosure of which is hereby incorporated by reference herein in its entirety.

TECHNICAL FIELD

The present invention relates to a lens barrel configured to collapse a lens group in one mode and to use the lens group advanced to a predetermined position in another mode, or more specifically, to a lens barrel suitable for a zoom lens capable of changing a focal distance by moving multiple lens groups relative to each other on a photographing optical axis.

BACKGROUND ART

Imaging apparatuses such as digital still cameras and digital video cameras (hereinafter, collectively referred to as "digital camera") are facing strong demands for improvements in imaging performance and portability. To meet these demand, some of imaging apparatuses are configured to, when shooting, extend lens groups in a photographing optical system from a camera casing while positioning the lens groups at distances necessary for the shooting from an image pickup device, and when not shooting, to retract at least one of the lens groups from a photographing optical axis and to collapse the lens groups in the camera casing with the distances between the lens groups and the image pickup device minimized to be less than a minimum distance required for shooting. Such an imaging apparatus has a smaller dimension in the photographing optical axis direction (hereinafter also referred to as a thickness dimension) when a lens barrel is in a collapsed state with a movable lens barrel stored, and is therefore suitable for carrying (see Japanese Patent Application Publication No. 2003-315861).

However, in this technique, the lens groups are retracted from the photographing optical axis to positions practically located inside a maximum outside diameter of a fixed cylinder in a camera body. For this reason, even though it is possible to reduce the thickness dimension with the movable lens barrel stored, the outside diameter of the fixed cylinder is increased instead. This causes a problem that the camera body (imaging apparatus) is increased in size when viewed from the front (object side).

To address this, there has already been known a lens barrel configured to retain at least one of retractable lens groups with a retractable lens retaining frame for retracting the lens group to the outside of an inside diameter of a movable lens barrel (see Japanese Patent Application Publication No. 2006-243605). As compared to the conventional configuration to retract the lens groups to the inside of the fixed cylinder, this lens barrel can neither cause an increase in the outside diameter of the movable lens barrel nor cause increases in the distances between the lens groups in the collapsed state.

In the conventional lens barrel described above, the entire thickness dimension (dimension in the photographing optical axis direction) thereof also depends on the thickness dimension of the outside of the fixed cylinder. Hence it is desirable to minimize the thickness dimension of the outside as well. In the above-described lens barrel, the positions of the lens groups on the photographing optical axis are appropriately set with respect to the image pickup device which captures a subject image formed by a photographing optical system. Accordingly, one reference end of the thickness dimension is defined by a base member where the image pickup device is mounted. Meanwhile, in the lens barrel described above, retractable lens housing is provided in a position outside the fixed cylinder to which the retractable lens retaining frame is moved along a plane orthogonal to the photographing optical axis. Accordingly, the other reference end of the thickness dimension is defined by a subject side end of the retractable lens housing viewed in the photographing optical axis direction. Here, when the retractable lens retaining frame is on the photographing optical axis, the image pickup device or, in some cases, a member in the photographing optical system, which is located closer to an image plane than the retractable lens retaining frame is, is interposed between the retractable lens retaining frame and the base member. Accordingly, if the lens barrel is configured to move the retractable lens retaining frame along the plane orthogonal to the photographing optical axis, the retractable lens housing inevitably has a space, as large as the thickness dimension of the interposed member, between the base member and the retractable lens retaining frame. For this reason, the above-described conventional lens barrel fails to effectively use the space between the rear end of the retractable lens retaining frame and the base member in the retractable lens housing, and there is still room for reducing the thickness dimension of the retractable lens housing.

SUMMARY OF THE INVENTION

The present invention has been made in view of the aforementioned circumstances. An object of an embodiment of the present invention is to provide a lens barrel which has a simple configuration achieving reduction in a thickness dimension of a retractable lens housing provided outside an inside diameter of a movable lens barrel.

A lens barrel according to an embodiment of the present invention includes: a plurality of lens groups including at least one retractable lens group, a plurality of lens retaining frames configured to respectively retrain the plurality of lens groups, a movable lens barrel configured to retain the plurality of lens retaining frames therein, and a lens retaining frame driving device configured to drive the lens retaining frames via the movable lens barrel. The lens retaining frames, the movable lens barrel and the lens retaining frame driving device being configured to move the plurality of lens groups between a collapsed state, in which the plurality of lens groups are stored with at least part of the plurality of lens groups collapsed, and a photographing state in which at least part of the plurality of lens groups is positioned at an object side. The plurality of lens retaining frames includes a retractable lens retaining frame configured to movably retain the at least one retractable lens group so as to position the plurality of lens groups on a single photographing optical axis in the photographing state and to retract the at least one retractable lens group to a retractable lens housing located outside an inside diameter position of the movable lens barrel in the collapsed state, and the retractable lens retaining frame is movable between a position on the photographing optical axis and a position inside the retractable lens housing at least by moving in a direction inclined relative to the photographing optical axis and moving in a direction orthogonal to the photographing optical axis.

BRIEF DESCRIPTION OF THE DRAWINGS

FIG. 9A shows the lens barrel 10 in a telescopic position mode (photographing state P) with the lens groups projected and the collapsed stored state D (also simply referred to as a collapsed state) with the lens groups collapsed and stored, and FIG. 9B shows the lens barrel 10 in a wide-angle position mode (photographing state P) with the lens groups projected.

FIG. 13A is a development view developing and schematically showing cam grooves and key grooves formed on a fixed cylinder portion of a fixation frame while omitting illustration of helicoids.

FIG. 17A shows that imaging lenses are collapsed and stored inside a body of the camera 100, and FIG. 17B shows that the imaging lenses is projected from the body of the camera 100.

FIG. 20A is a perspective view schematically showing a configuration of a principal part of the fourth lens retaining frame and a drive operating system thereof and FIG. 2013 is a perspective view omitting part of the configuration and viewed from a different angle.

DESCRIPTION OF THE PREFERRED EMBODIMENTS

Figure 1:
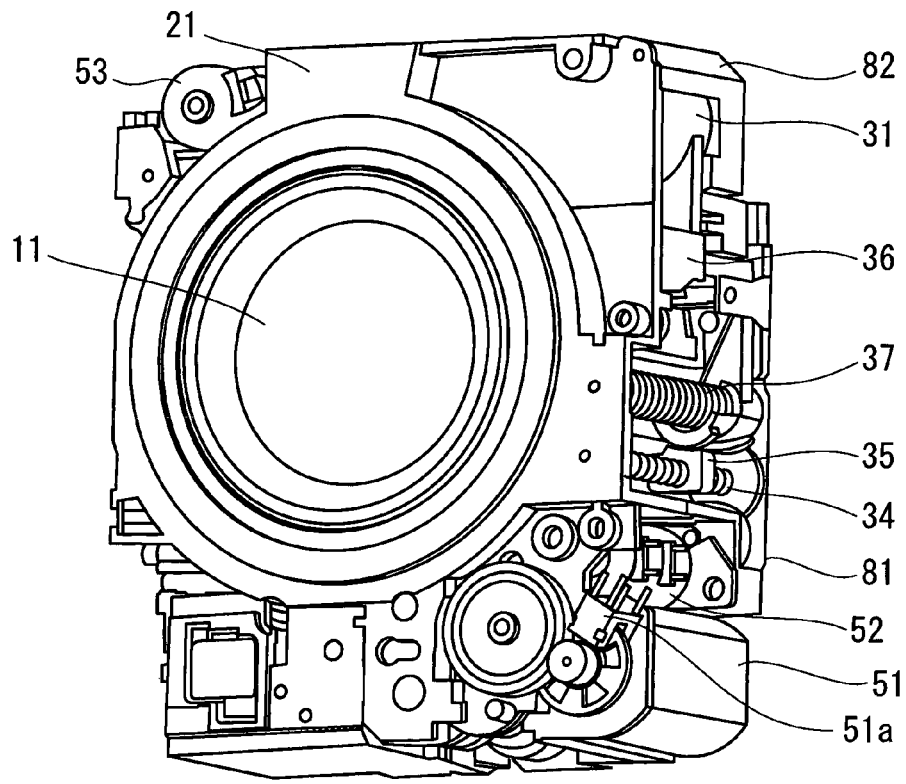
FIG. 1 is a perspective view showing that a configuration of a lens barrel 10 portion in a collapsed stored state D where lens groups are collapsed and stored is viewed from an object side.

Hereinafter, embodiments of an imaging apparatus according to an embodiment of the present invention will be described with reference to the accompanying drawings.

First Embodiment

A lens barrel 10 of a first embodiment representing an example of a lens barrel according to an embodiment of the present invention will be described with reference to FIGS. 1 to 21. Note that FIGS. 1 to 16B and 20 show a configuration of a principal part of an optical system device including the lens barrel 10 according to an embodiment of the present invention and various operational states thereof.

In FIGS. 1 to 16B and 20, an optical system device provided with the lens barrel 10 includes a first lens group 11, a second lens group 12, a third lens group 13, a fourth lens group 14, a shutter-diaphragm unit 15, a solid-state image sensing device 16, a first lens retaining frame 17, a cover glass 18, a low-pass filter 19, a fixation frame 21, a first rotary cylinder 22, a first liner 23, a second rotary cylinder 24, a second liner 25, a cam cylinder 26, a straight moving cylinder 27, a third lens retaining frame 31, a third group main guide shaft 32, a third group sub-guide shaft 33, a third group lead screw 34, a third group female screw member 35, a collision preventing piece 36, a compression torsion spring 37, a third group photointerrupter 38 (see FIG. 16A), a fourth lens retaining frame 41, a fourth group sub-guide shaft 42, a fourth group spring 43 (see FIGS. 7 and 8), a fourth group main guide shaft 44, a fourth group lead screw 45, a fourth group female screw member 46, a fourth group photointerrupter 47, a zoom motor 51 (see FIG. 1), a third group motor 52, a fourth group motor 53, a barrier control piece 61, a lens barrier 62, a barrier drive system 63, a gear 71, a gear 72, a gear 73, a gear 74, a retainer plate 81, and a lens barrel base 82. Here, the zoom motor 51 functions as lens retaining frame driving means for driving a movable lens retaining frame together with a spline gear and the like. Meanwhile, the first rotary cylinder 22, the first liner 23, the second rotary cylinder 24, the second liner 25, the cam cylinder 26, and the straight moving cylinder 27 collectively function as the movable lens retaining frame.

Figure 9A:
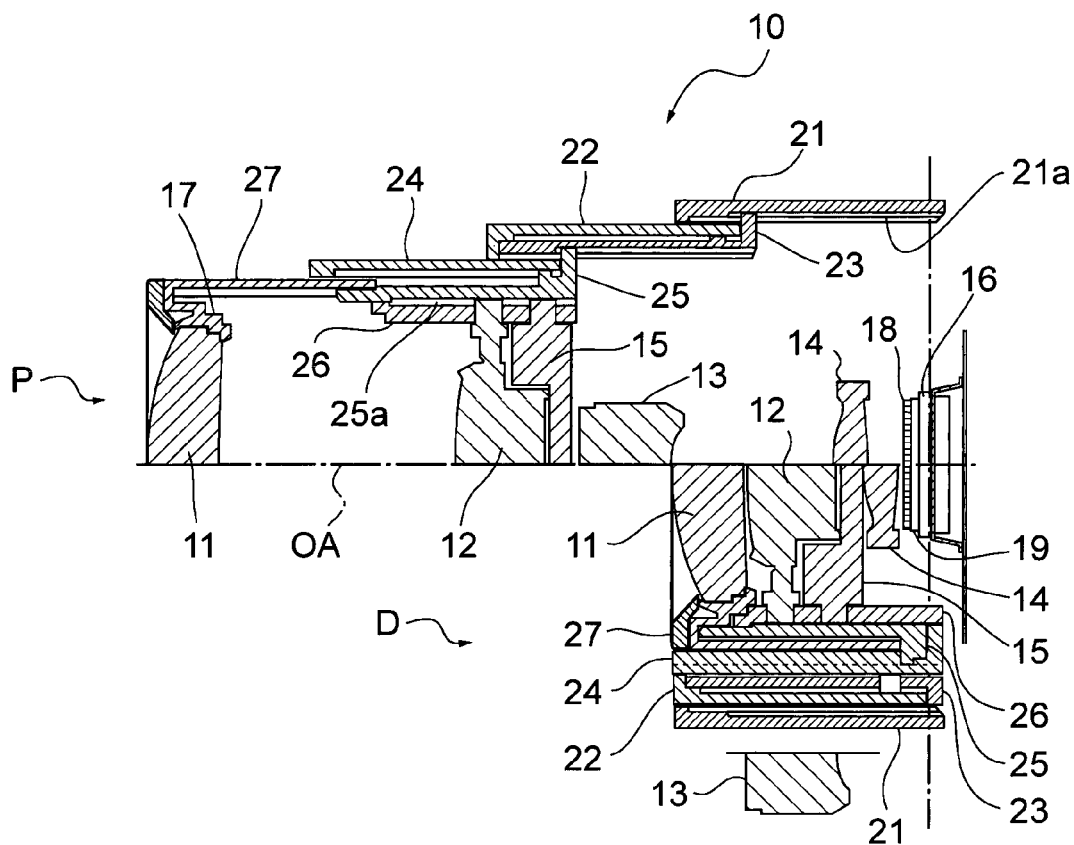
FIGS. 9A and 9B are longitudinal sectional views of a principle part of the lens groups, the lens retaining frame and the lens barrel 10.
Figure 9B:
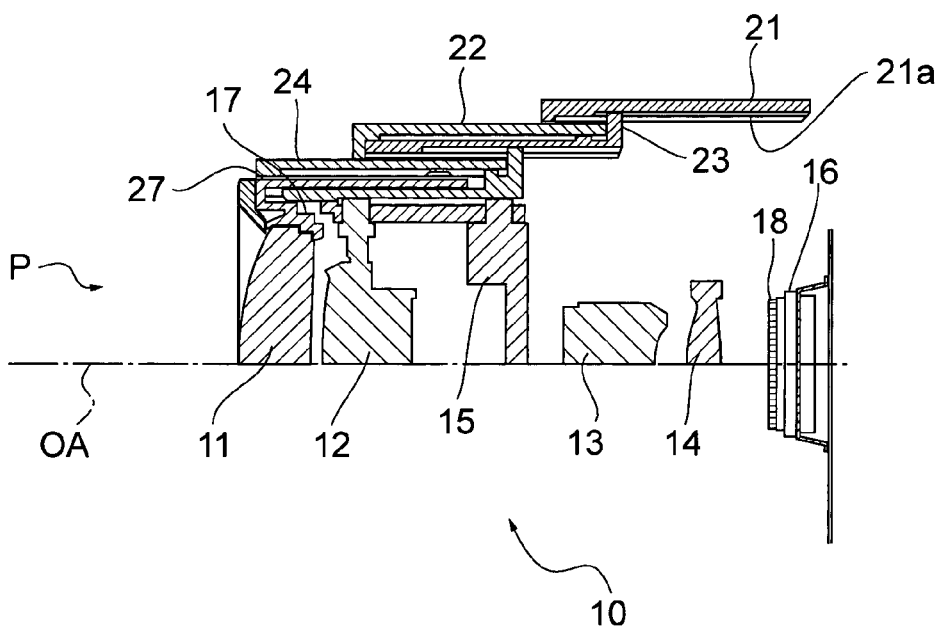

A photographing state P will be described with reference to FIGS. 9A and 9B. The first lens group 11, the second lens group 12, the third lens group 13, and the fourth lens group 14 are arranged in this order from a side of an object as a photographic subject. Moreover, the shutter-diaphragm unit 15 is inserted between the second lens group 12 and the third lens group 13 while the solid-state image sensing device 16 formed by using a CCD (charge coupled device) as an image pickup device and other components is located at an imaging plane side of the fourth lens group 14. The first lens group 11, the second lens group 12, the third lens group 13, the fourth lens group 14, and the shutter-diaphragm unit 15 collectively function as a photographing optical system to form a subject image on a light receiving surface (an input surface) of the solid-state image sensing device 16. The first lens group 11 to the fourth lens group 14 collectively constitute a focal distance variable zoom lens. The first group lens 11 includes one or more lenses. This first lens group 11 is fixed to and retained by the straight moving cylinder 27 by way of the first lens retaining frame 17 integrally retaining these lenses. This first lens group 11 includes a lens (an object lens) located closest to the object among the multiple lenses.

The second lens group 12 includes one or more lenses. For this second lens group 12, cam followers formed on a second lens retaining frame (which is not clearly illustrated) which integrally retains these lenses are inserted to cam grooves for the second lens group 12 on the cam cylinder 26 shown in FIG. 11 and are engaged with straight movement grooves 25a on the second liner 25. Hence the second lens group 12 is supported by the cam cylinder 26 and the second liner 25. Cam followers integrally formed on the shutter-diaphragm unit 15 are inserted to cam grooves for the shutter-diaphragm unit 15 on the cam cylinder 26 shown in FIG. 11 and are engaged with the straight movement grooves 25a on the second liner 25. Hence the shutter-diaphragm unit 15 is supported by the cam cylinder 26 and the second liner 25.

Figure 12:
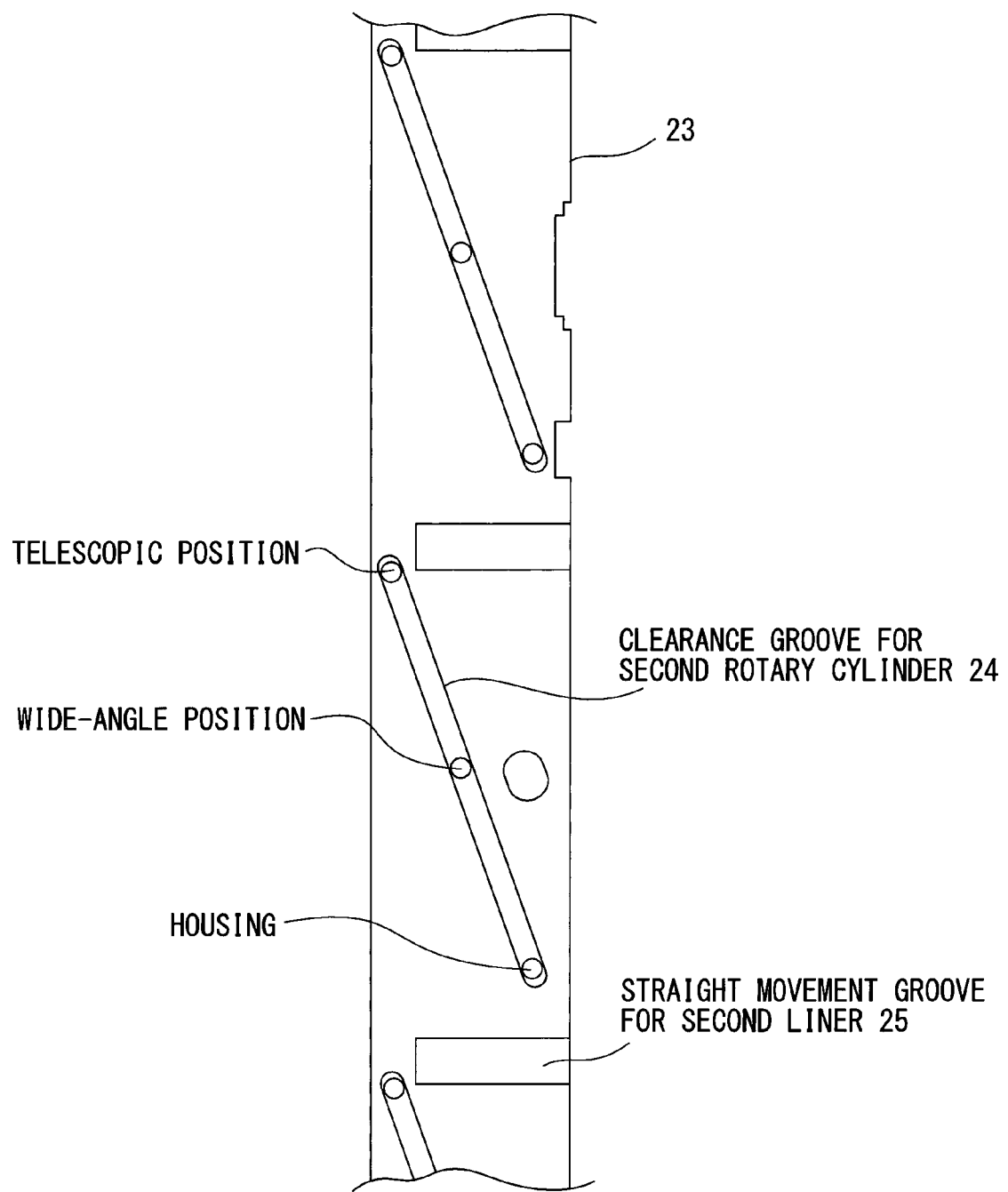
FIG. 12 is a development view developing and schematically showing cam grooves and key grooves formed on a first liner while omitting illustration of helicoids.
Figure 13B:
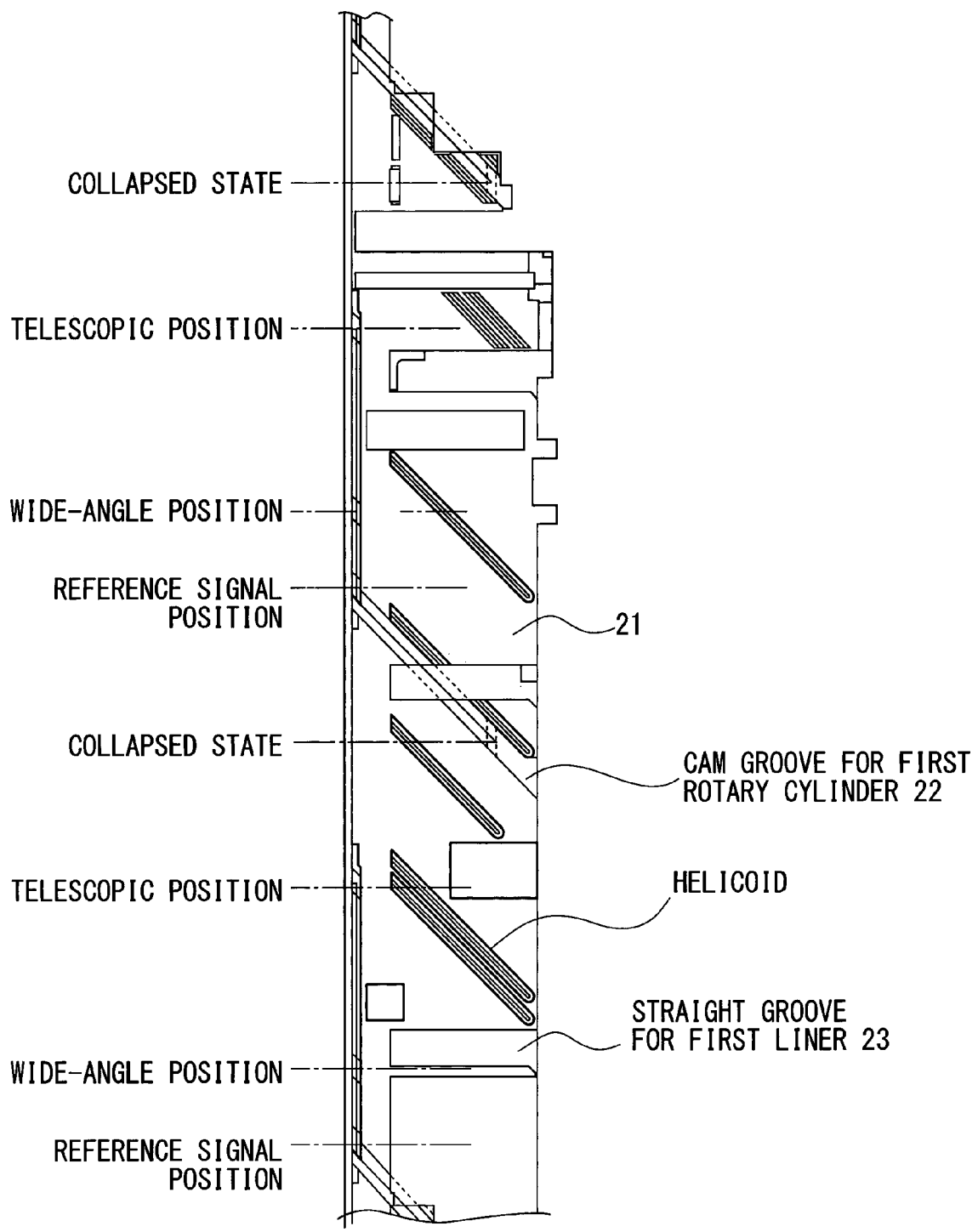
FIG. 13B is a detailed view including the helicoids.
Figure 13C:
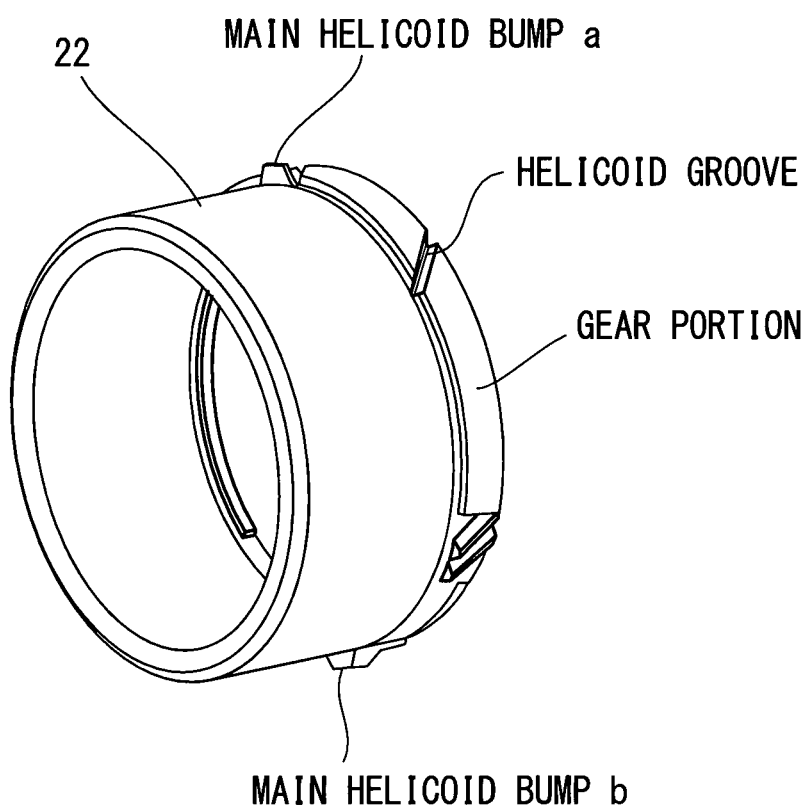
FIG. 13C is a perspective view of a first rotary lens barrel to be engaged with the helicoids.

The fixation frame 21 includes a fixed cylinder portion 21a of a cylindrical shape which is located inside. As shown in FIGS. 13A and 13B, straight movement grooves along an axial direction and cam grooves are formed on an inner surface of this fixed cylinder portion 21a. As shown in FIG. 13C, helicoidal cam followers formed on an outer peripheral surface at a base end of the first rotary cylinder 22 are engaged with the helicoidal cam grooves. Key portions formed in a protruding manner on an outer periphery at a base end of the first liner 23 are engaged with the straight movement grooves on the fixed cylinder portion 21a of the fixation frame 21. A guide groove along an orthogonal plane to an optical axis is formed on an inner surface of the first rotary cylinder 22 and a follower (or a key) being a straight movement guide member provided in a protruding manner on an outer peripheral surface in the vicinity of a base end of the first liner 23 is engaged therewith. Straight grooves along an optical axis direction and helicoids are formed on an inner surface of the first liner 23. Moreover, clearance grooves for allowing insertion of cam followers formed in a protruding manner on an outer peripheral surface in the vicinity of a base end of the second rotary cylinder 24 are formed on the first liner 23 (see FIG. 12).

Helicoids are formed on the outer peripheral surface at the base end of the second rotary cylinder 24. These helicoids are threadably engaged with helicoids formed on an inner periphery of the first liner 23. Meanwhile, the cam followers are provided in a protruding manner on the outer peripheral surface in the vicinity of the base end of the second rotary cylinder 24 and these cam followers are engaged with the straight grooves provided on the inner periphery of the first rotary cylinder 22 through the clearance grooves (liner) for the cam followers on the first liner 23. Key portions provided in a protruding manner on an outer periphery at a base end of the second liner 25 are engaged with the straight grooves (see FIG. 12) formed on the inner periphery of the first liner 23. A guide groove (see FIG. 10) along the orthogonal plane to the optical axis is formed on an inner surface of the second rotary cylinder 24. This guide groove is engaged with a follower (or a key) being a straight movement guide member, which is provided in a protruding manner on an outer peripheral surface of the second liner. By employing this configuration, the second liner 25 and the second rotary cylinder 24 are movable integrally in the optical axis direction and performing a relative rotational movement around the optical axis.

The cam cylinder 26 is fitted into an inner periphery of the second liner 25. This cam cylinder 26 is configured to rotate integrally with the second rotary cylinder 24 by allowing a locking protrusion provided in a protruding manner on an outer periphery at a base end of the cam cylinder 26 to be engaged with and fastened to the base end of the second rotary cylinder 24. A guide groove along the orthogonal plane to the optical axis is formed on an inner surface of the second liner

25. A follower (or a key) being a straight movement guide member provided in a protruding manner on an outer peripheral surface (on a front side) of the cam cylinder 26 is engaged with this guide groove. By employing this configuration, the cam cylinder 26 and the second liner 25 are movable integrally in the optical axis direction and performing a relative rotational movement around the optical axis.

A base end side of the straight moving cylinder 27 is inserted between the second liner 25 and the second rotary cylinder 24. Cam followers are formed in a protruding manner on an outer surface in the vicinity of the base end of this straight moving cylinder 27, and the cam followers are engaged with cam grooves (see FIG. 10) formed on the inner peripheral surface of the second rotary cylinder 24. Meanwhile, straight movement grooves are formed along an axial direction on an inner peripheral surface of the straight moving cylinder 27 and the key portions on the outer peripheral surface of the second liner 25 are engaged with the straight movement grooves. A gear portion is formed on the outer periphery at the base end of the first rotary cylinder 22 (see FIG. 13C). This first rotary cylinder 22 is rotated by a driving force of the zoom motor 51 transmitted when needed through a gear threadably engaged with the gear portion. In this way, the first lens group 11, the second lens group 12, and the shutter-diaphragm 15 perform a predetermined zooming action.

Figure 10:
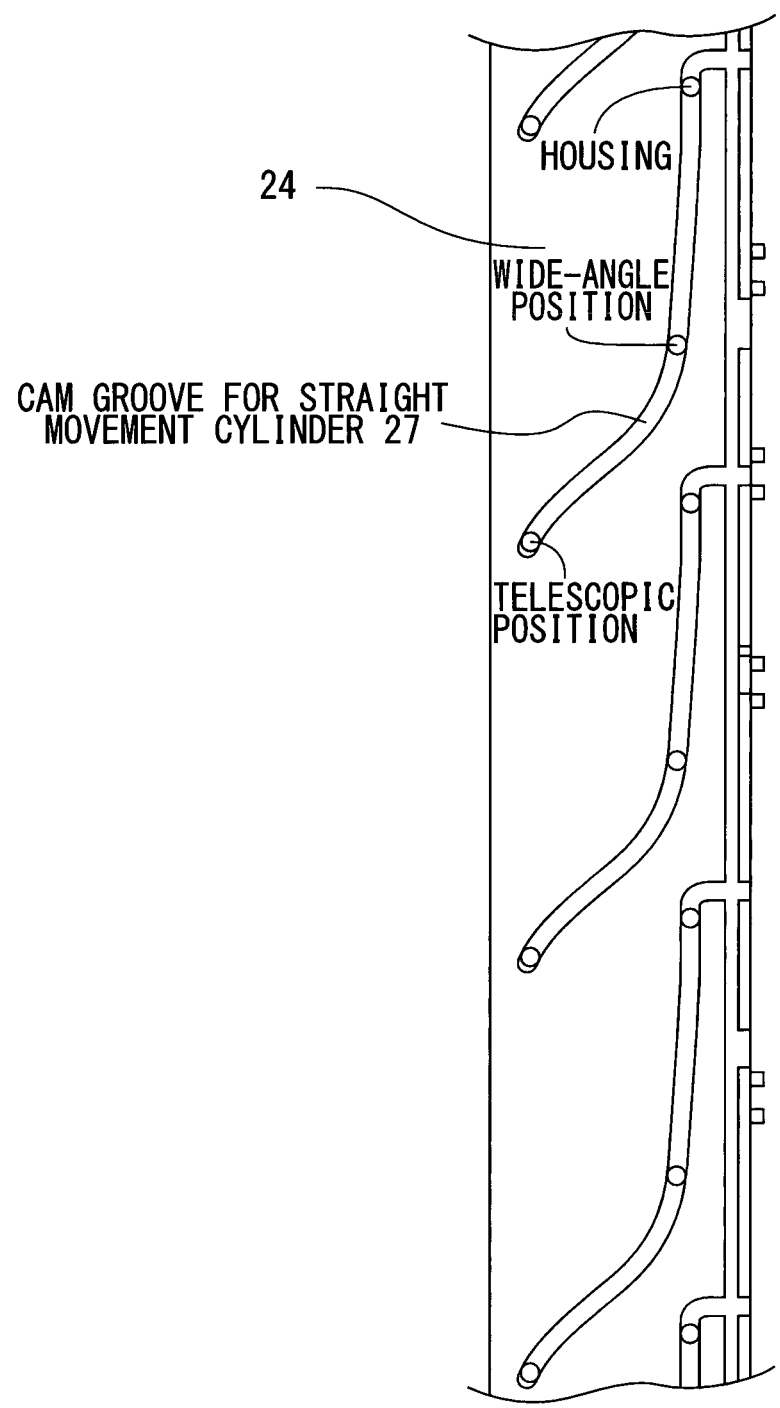
FIG. 10 is a development view developing and schematically showing shapes of cam grooves formed on a second rotary cylinder.
Figure 11:
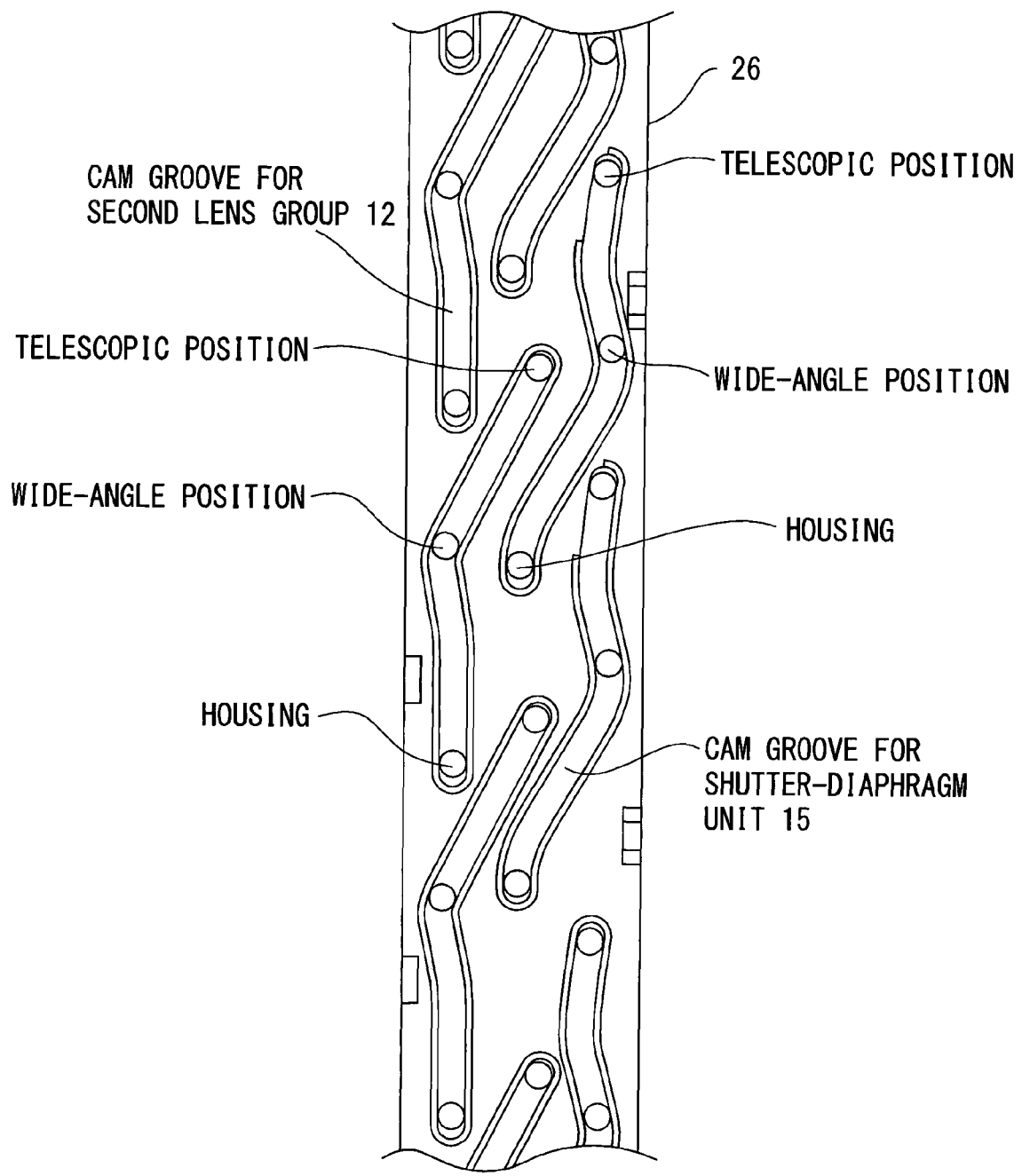
FIG. 11 is a development view developing and schematically showing shapes of cam grooves formed on a cam cylinder.

Note that the cam grooves on the second rotary cylinder 24 to be engaged with the cam followers on the straight moving cylinder 27 are shown in FIG. 10. The cam grooves on the cam cylinder 26 to be engaged with the cam followers on the lens retaining frame for the second lens group 12 and the cam grooves on the cam cylinder 26 to be engaged with the cam followers on the shutter-diaphragm unit 15 are shown in FIG. 11. The clearance grooves on the first liner 23 for the cam followers on the second rotary cylinder 24 and the straight grooves on the first liner 23 to be engaged with the key portions on the second liner 25 are shown in FIG. 12. Moreover, FIGS. 13A and 13B show the fixed cylinder portion 21a on which the straight movement grooves of the fixation frame 21 to be engaged with the key portions on the first liner 23 and the cam grooves on the fixation frame 21 to be engaged with the cam followers on the first rotary cylinder 22 are formed.

Specifically, according to the above-described configuration, the first rotary cylinder 22 is not simply engaged threadably with the fixation frame 21 by use of the helicoids but is engaged by use of the helicoidal cam grooves (FIGS. 13A and 13B). Hence the first rotary cylinder 22 is completely extended to a maximum extended position by driving from a stored state to a wide-angle position. Thereafter, since subject side ends of the cam grooves are formed parallel to an end face of the fixation frame as shown in FIGS. 13A and 13B, the first rotary cylinder 22 is rotated in a constant position at a drive from the wide-angle position to a telescopic position without moving in a direction of a photographing optical axis (photographing optical path). For this reason, when the first rotary cylinder moves from a collapsed state to the wide-angle position, the first rotary cylinder 22 is firstly extended toward a subject while performing rotation, and reaches the maximum extended position. When this first rotary cylinder 22 reaches the maximum extended position, a zoom position reference signal is generated by a zoom position detector (not shown) placed on the fixation frame 21, which is formed of a photoreflector, a photointerrupter, a leaf switch or the like.

Accordingly, if this zoom position reference signal is generated, it is presumable that the first rotary cylinder 22 reaches the maximum extended position. Hence a retractable lens retaining frame or namely the third lens retaining frame 31 can start an advancing action in the photographing optical axis (photographing optical path) direction. That is to say, a space for inserting the third lens retaining frame 31 onto the photographing optical axis (photographing optical path) is ensured in advance at an early stage of the extending action by completely extending the first rotary cylinder 22 and the first liner 23 constituting the lens barrel located close to the fixation frame 21. The zoom position reference signal is generated immediately after the first rotary cylinder 22 reaches the maximum extended position and the third lens retaining frame 31 starts the advancing action soon after the space for insertion is ensured. Accordingly, it is possible to minimize a time period for switching from the collapsed state to the wide-angle state when power is turned on, for example.

The third lens group 13 is retained by the third lens retaining frame 31. One end (third lens retaining portion 93 to be described later) of the third lens retaining frame 31 retains the third lens group 13 while another end (third lens retaining frame rotation base 95 to be described later) is inserted rotatably and slidably into the third group main guide shaft 32. This third group main guide shaft 32 is provided substantially parallel to an optical axis of the third lens group 13 and configured to extend between the retainer plate 81 formed on the lens barrel base 82 and the fixation frame 21 (see FIG. 14A and the like). This retainer plate 81 is provided on the lens barrel base 82 so as to form substantially the same surface as the lens barrel base 82. Hence the retainer plate 81 and the lens barrel base 82 collectively constitute a base member on which the solid-state image sensing device 16 is provided.

Figure 7:
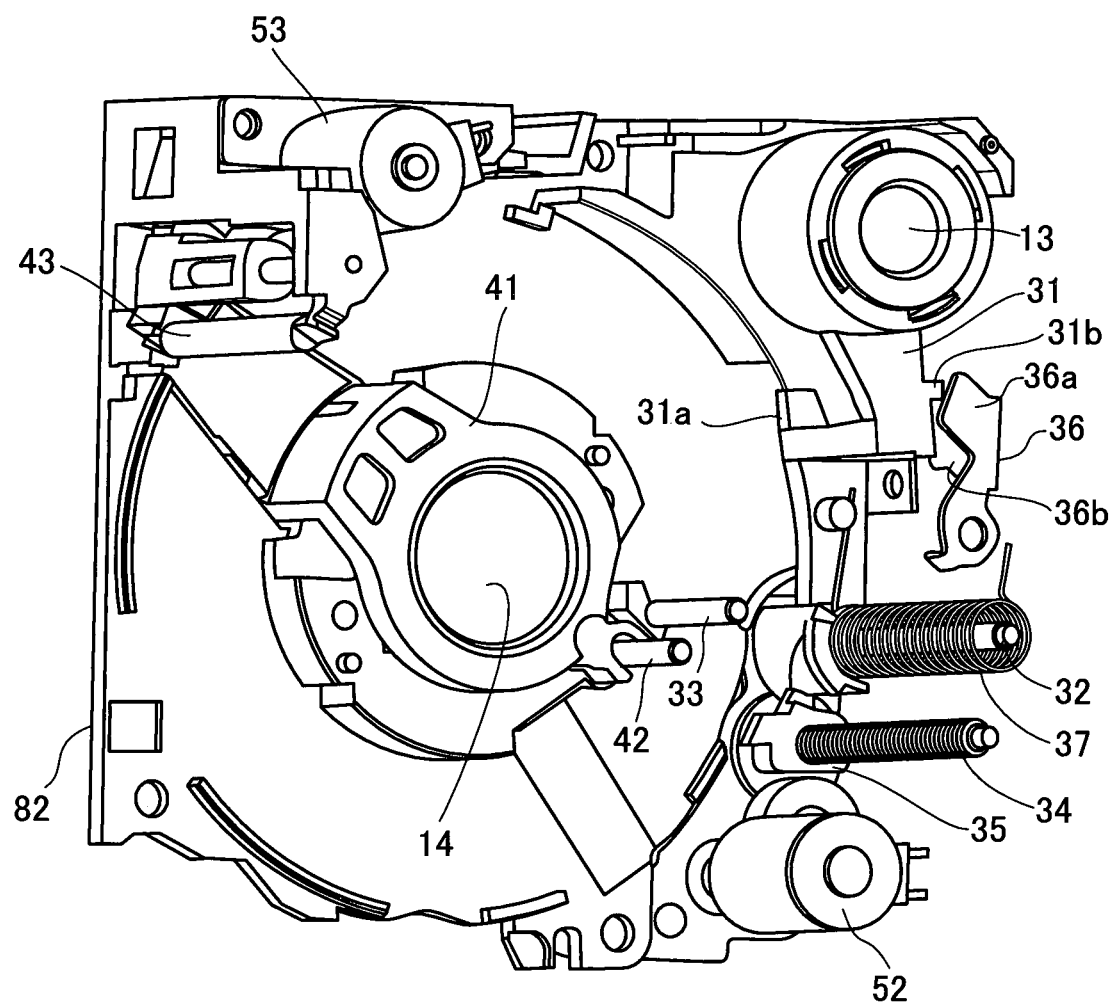
FIG. 7 is a perspective view for explaining operations of a third lens retaining frame for retaining a third lens group and of a collision preventing piece, and shows that a layout configuration of the third lens retaining frame, the collision preventing piece, and a fourth lens retaining frame portion in the collapsed stored state D of the lens group is viewed from the object side.
Figure 8:
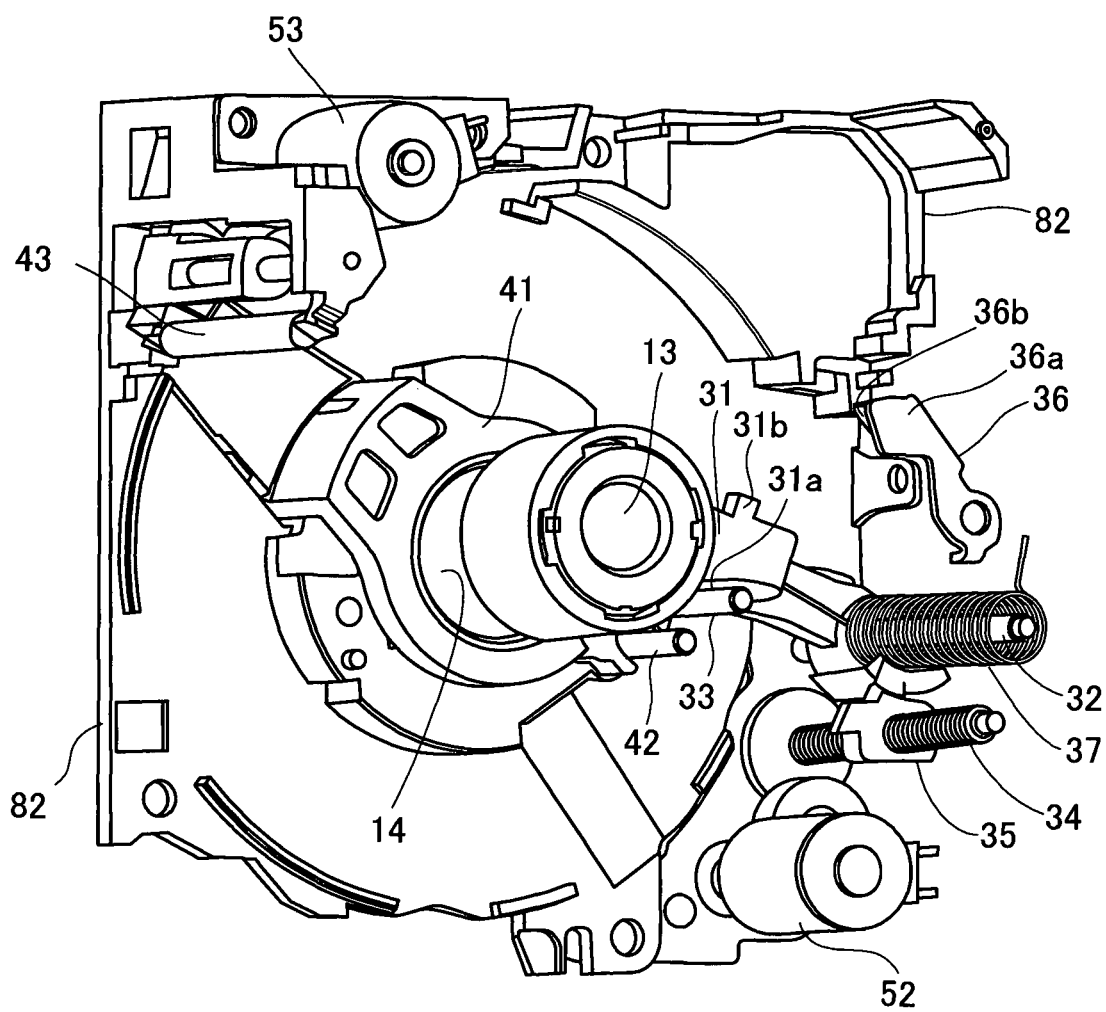
FIG. 8 is a perspective view for explaining the operations of the third lens retaining frame for retaining the third lens group and of the collision preventing piece, and shows that the layout configuration of the third lens retaining frame, the collision preventing piece, and the fourth lens retaining frame portion in the photographing state P with the lens groups projected is viewed from the object side.

The third lens retaining frame 31 is rotated pivotally around the third group main guide shaft 32 between a photographing position (photographing state P) where the third lens group 13 is inserted onto an photographing optical axis OA in the photographing state P as shown in FIG. 8 and a storage position (collapsed stored state D) in which the third lens group 13 in the collapsed stored state D is retracted to the outside of the fixed cylinder portion 21a of the fixation frame 21 as shown in FIG. 7. When the third lens retaining frame 31 is located in the storage position, i.e., a retracted position retracted from the photographing optical axis OA, a housing position outside the fixed cylinder portion 21a but inside the fixation frame 21 is a retractable lens housing 21b (see FIG. 16A). This retractable lens housing 21b (housing space thereof) is communicated with the inside of the fixed cylinder portion 21a through a cutout opening 21c (see FIGS. 16A, 32, and the like) formed on the fixed cylinder portion 21a.

A crank-shaped bent portion is formed between a rotating axis side of the third lens retaining frame 31 and the third lens group 13 (third lens retaining frame arm portion 94 to be described later) in order to change positions in a direction parallel to the main guide shaft between the rotating shaft side and a supporting portion side of the third lens group 13. A stopper 31a (see FIG. 15) is formed so as to protrude from the bent portion substantially in a direction orthogonal to the main guide shaft. When this stopper 31a is in contact with the third group sub-guide shaft 33, the stopper 31a establishes a positional relationship in which the third lens retaining frame 31 is located in the photographing position (photographing state P) to bring the third lens group 13 onto the photographing optical axis OA. The third group sub-guide shaft 33 is a bar made of a metal material which is provided on the lens barrel base 82 and configured to extend in the photographing optical axis OA direction. Meanwhile, a light shielding piece 31b (see FIG. 15) is provided in a protruding manner in a position on the third lens retaining frame 31 close to the third lens group 13 so as to protrude in a rotating direction and from the photographing optical axis OA toward the retractable lens housing 21b. This light shielding piece 31b establishes a positional relationship of shielding the third group photointerrupter 38 shown in FIG. 16A from light when the third lens retaining frame 31 is located in the storage position. Hence it is possible to detect and confirm that the third lens retaining frame 31 is located in the storage position.

In terms of an optical performance, the third lens group 13 in a telescopic mode is located in a position closer to the subject in order to lengthen a focal distance on the telescopic side. However, a movable amount of the third lens retaining frame 31 is determined by a restriction due to a length in the photographing optical axis OA direction (thickness dimension) of the lens barrel 10 in the collapsed state. The telescopic side focal position can be increased as much as possible to by locating the position for allowing the third lens retaining frame 31 to retain the lenses closest to the subject side. However, if the position in the direction of the photographing optical axis OA of the stopper 31a is set substantially to the same position as the third lens group 13, the third group sub-guide shaft 33 needs to be longer whereby the lens barrel 10 in the collapsed state needs to be larger. For this reason, it is necessary to locate the stopper 31a as close as possible to the lens barrel base 82 side (on a focal position (imaging plane) side) where the solid-state image sensing device 16 is provided. Therefore, the third lens retaining frame 31 is formed into the shape provided with the crank-shaped bent portion (third lens retaining frame arm portion 94 to be described later). Here, the third lens retaining frame 31 may be made of two components. In this case, one of the components is a member provided with the crank-shaped bent portion while the other component is a member configured to retain the third lens group 13. These two components are fixed to each other and move integrally.

Figure 14A:
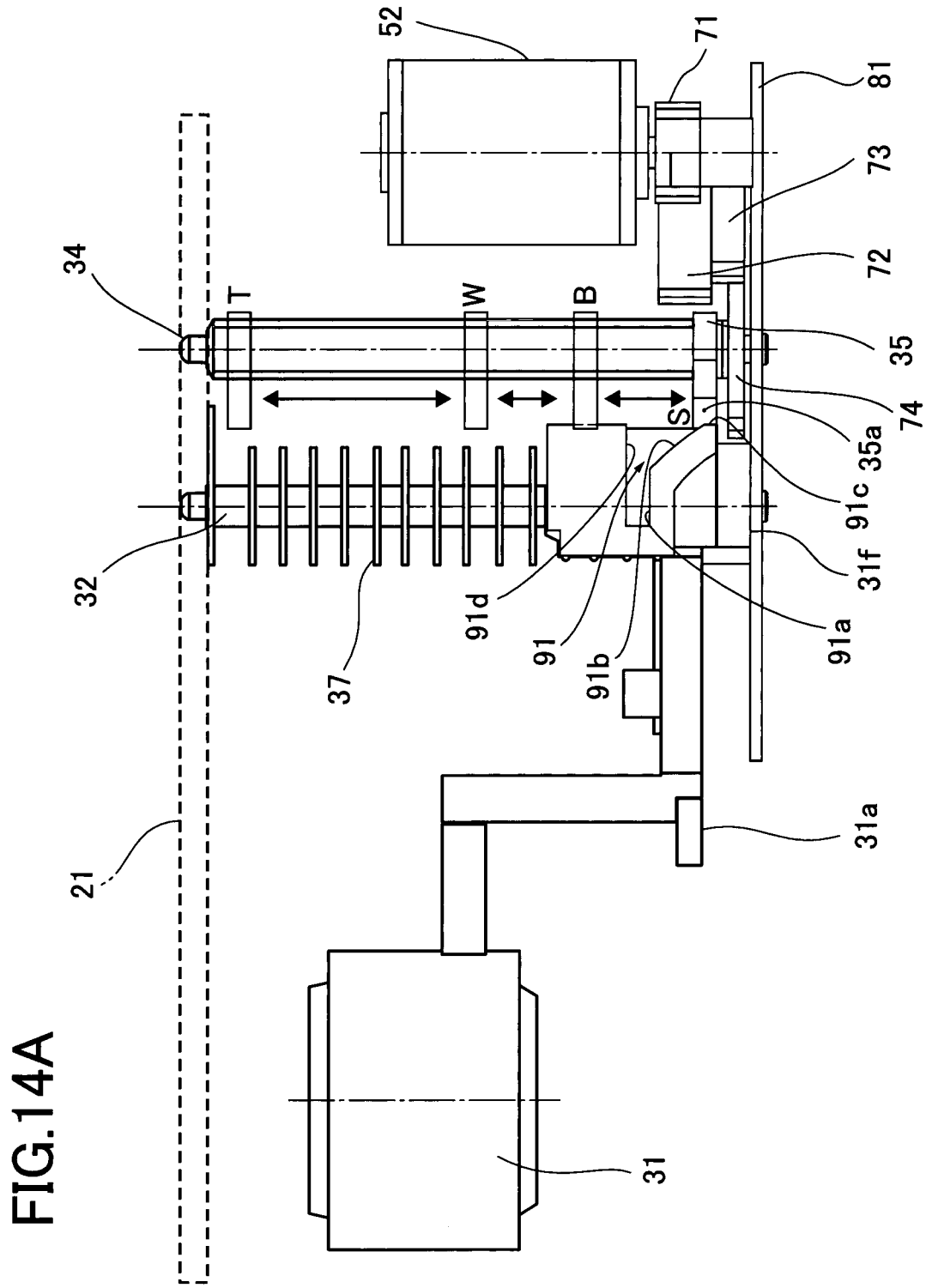
FIG. 14A is a side view showing a configuration of the third lens retaining frame and a drive operating system thereof.
Figure 14B:
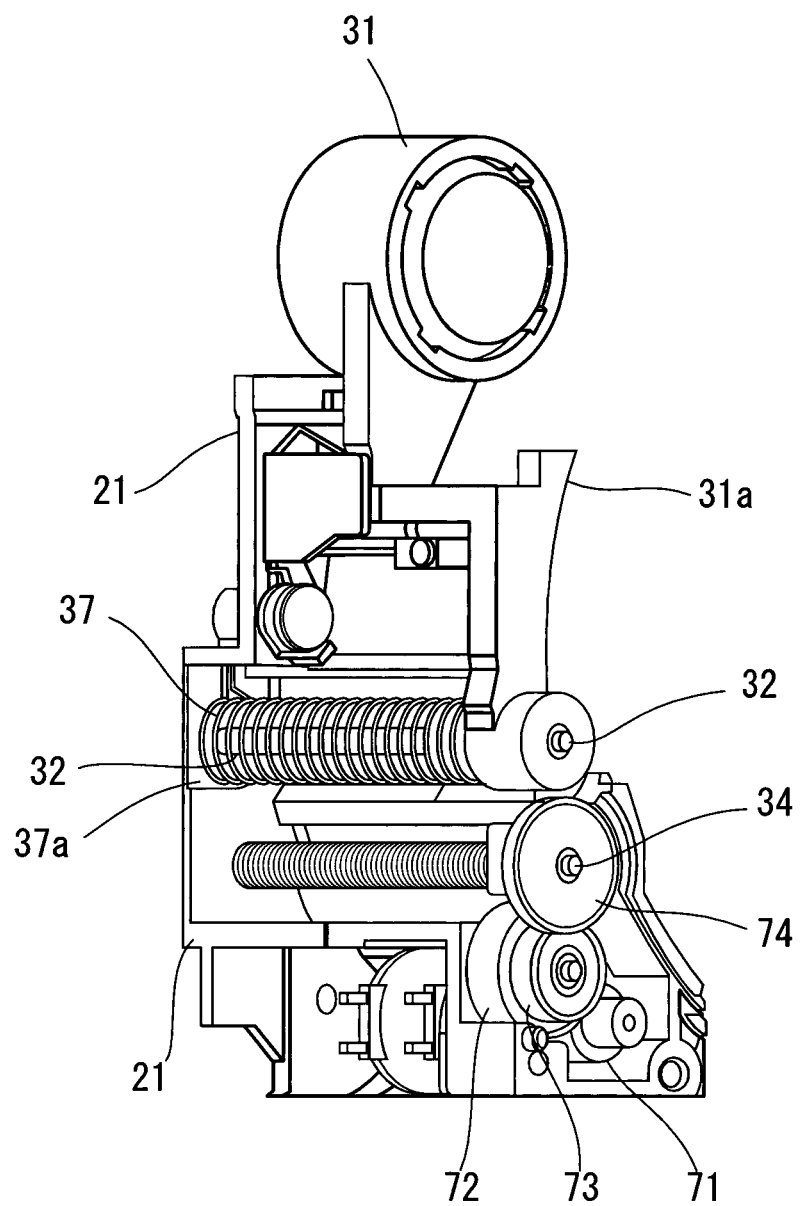
FIG. 14B is a perspective view of the third lens retaining frame and the drive operating system shown in FIG. 14B.
Figure 15:
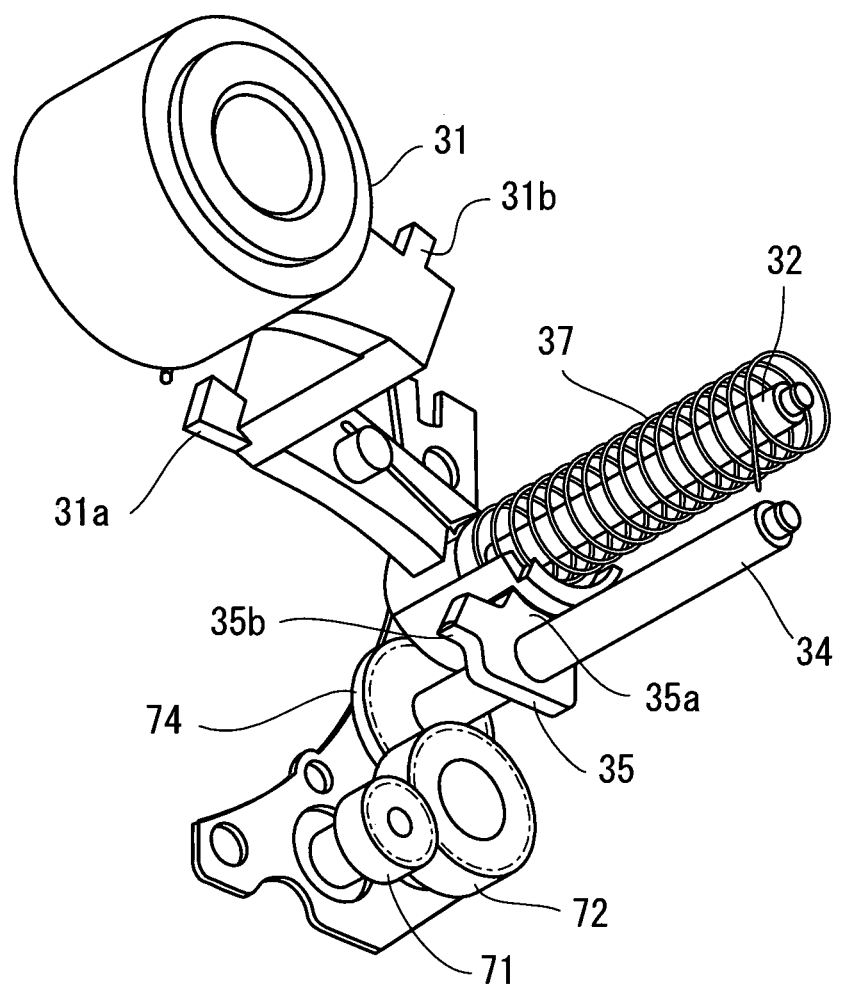
FIG. 15 is a perspective view schematically showing the configuration of the third lens retaining frame and the drive operating system thereof.

As shown in FIGS. 14A and 14B, the third group female screw member 35 threadably engaged with the third group lead screw 34 is located closest to the imaging plane side (to the solid-state image sensing device 16) when the third lens retaining frame 31 is in the state of being located in the retracted position (collapsed stored state D). Moreover, in this state, the compression torsion spring 37 is charged at the maximum by an action of the cam structures to be described later, and constantly applies a moment in a counterclockwise direction (direction to enter the photographing optical axis OA) viewed from a front face of the lens barrel to the third lens retaining frame. The portion (third lens retaining frame rotation base 95 to be described later) of the third lens retaining frame 31 supported by the third group main guide shaft 32 and the retainer plate 81 are provided with cam structures, which are configured to convert a movement of the third group female screw member 35 in the photographing optical axis OA direction into an advance and retreat movement of the third lens retaining frame 31 and into a straight movement thereof along the third group main guide shaft 32.

When the third group motor 52 in this state is rotated clockwise (clockwise when viewed from the front face of the lens barrel) in FIG. 14B, the third group lead screw 34 is rotated clockwise by way of a gear mechanism including the gears 71 to 74, whereby the third group female screw member 35 moves toward the subject in the photographing optical axis OA. At this time, the third lens retaining frame 31 is constantly receiving a rotation bias in the counterclockwise direction by the moment force from the compression torsion spring 37 as described later. Accordingly, a contact portion 35a of the third group female screw member 35 comes into contact with and is engaged with a stepped portion 91 of the third lens retaining frame 31. When this third group female screw member 35 moves to a predetermined position on the subject side, the light shielding piece 31b of the third lens retaining frame 31 moves away from the third group photointerrupter 38 (see FIG. 16A) serving as a third group position detection device. Therefore, a reference signal from L (low level) to H (high level) is generated from the third group photointerrupter 38. The third lens group 13 undergoes positional control by pulse counts based on the reference signal from the third photointerrupter 38.

Figure 16A:
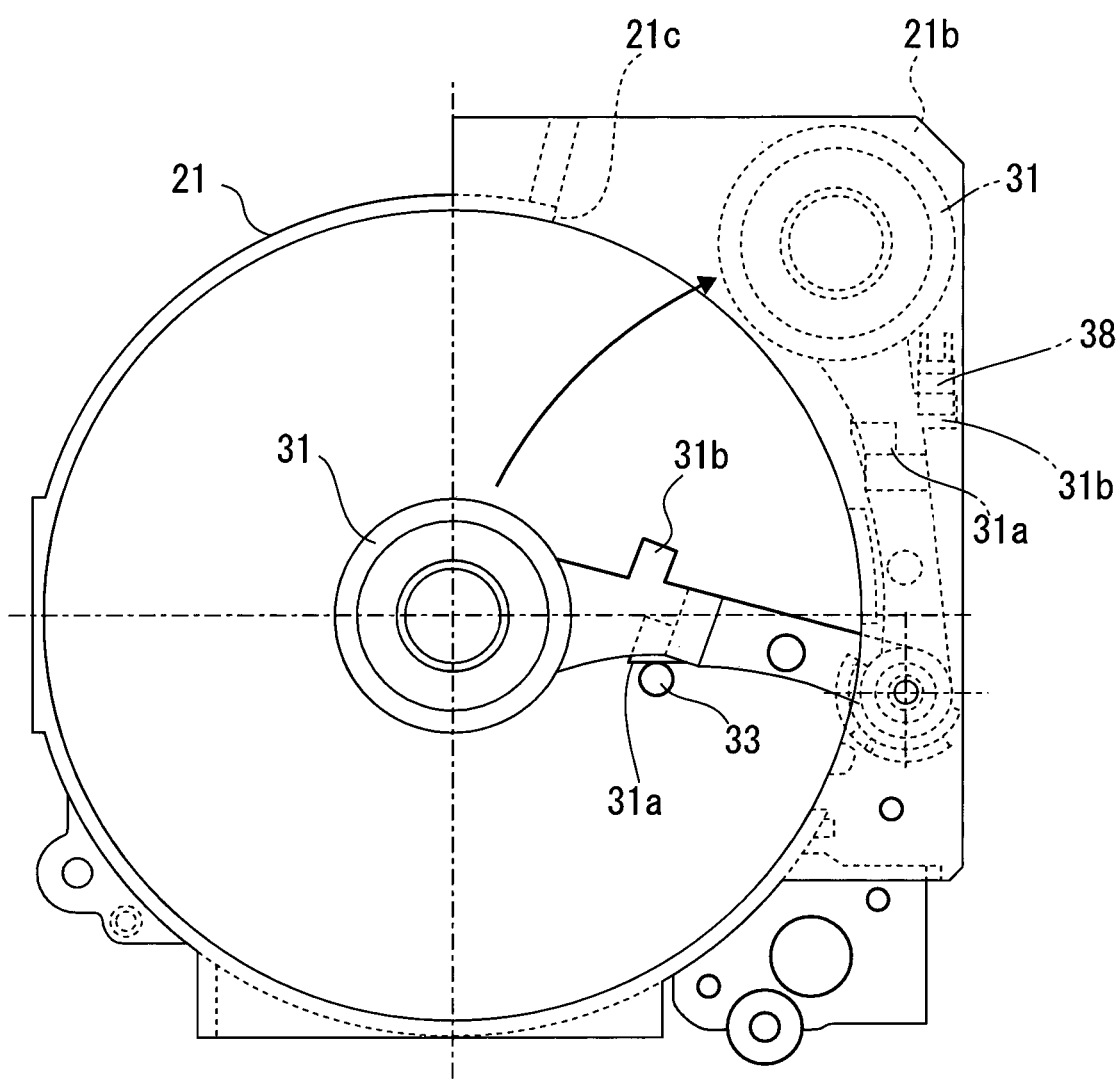
FIG. 16A is a front view for explaining an operation of the third lens retaining frame, and shows that the third lens retaining frame portion is viewed from the imaging plane side.
Figure 16B:
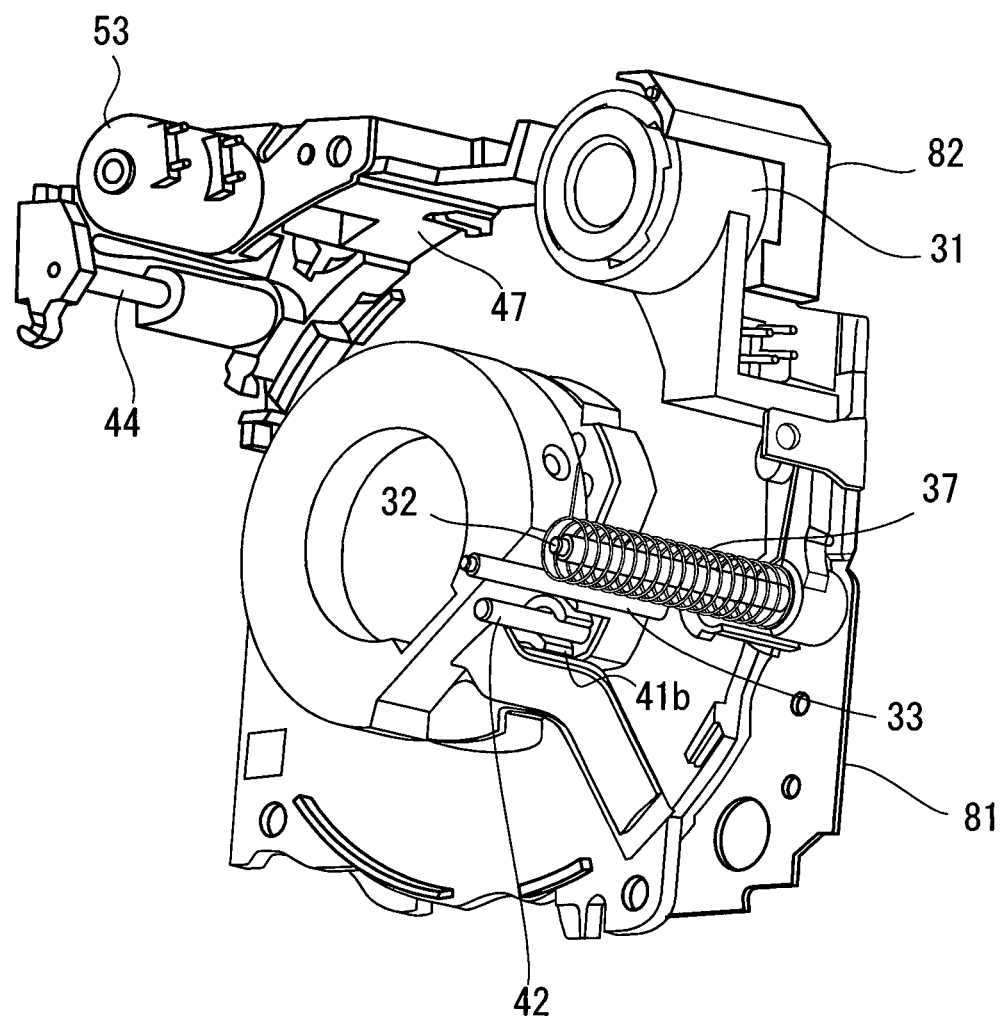
FIG. 16B is a perspective view mainly showing a shutter portion.

When the third group female screw member 35 in this state is moved to a position B (retraction start position) shown in FIG. 14A, the third lens retaining frame 31 is further rotated counterclockwise and the stopper 31a comes into contact with the third group sub-guide shaft 33 as shown in FIGS. 8 and 16A, whereby the third lens retaining frame 31 is positioned in a predefined position on the photographing optical axis OA. In this way, the advancing action of the third lens group 13 in the photographing optical axis OA direction is completed. This third lens retaining frame 31 receives a constant bias (hereinafter also referred to as a rotation bias) in the rotating direction from the storage position toward the position on the photographing optical axis OA (photographing position) and also receives a constant bias (hereinafter also referred to as a straight movement bias) in a direction from the object side toward the retainer plate 81 on the imaging plane side on the third group main guide shaft 32 (backward direction) by the compression torsion spring 37 disposed around the third group main guide shaft 32.

Here, as shown in FIG. 14B, a portion of the fixation frame 21 to be pressed by the compression torsion spring 37 is provided with a step 37a so as to form the vicinity of a region to be in contact with the compression torsion spring 37 into a pit as illustrated therein and thereby to regulate the position of the compression torsion spring 37 in this region. Specifically, the center position of the compression torsion spring 37 is avoided from substantial deviation from the center of the third group main guide shaft 32.

Next, when the third group female screw member 35 moves to the telescopic position (position T in FIG. 14A) via the wide-angle position (position W in FIG. 14A), the contact portion 35a of the third group female screw member 35 presses a front engagement surface 91d toward the subject (object) as described later. Hence the third lens retaining frame 31 can move toward the subject (object) to the wide-angle position along the photographing optical axis OA.

Meanwhile, the third group female screw member 35 is constantly pressed toward the imaging plane along the photographing optical axis OA direction by the compression torsion spring 37 as described previously. For this reason, a gap (slip) generated between the third group lead screw 34 or the third group female screw member 35 and the retainer plate 81 is always gathered toward the imaging plane side. In this way, the third lens retaining frame 31 can ensure position accuracy in terms of the photographing optical axis OA direction.

The third group female screw member 35 is a threadably engageable member to be threadably engaged with the third group lead screw 34 arranged substantially parallel to the photographing optical axis OA and to be movable on the third group lead screw 34 along the photographing optical axis OA. The third group female screw member 35 includes the above-described contact portion 35a and a rotation stopper protrusion 35b (see FIG. 15). The contact portion 35a is capable of coining into contact with on any of a rear engagement surface 91a, a cam surface 91b, a side engagement surface 91c, and the front engagement surface 91d inside the stepped portion 91 of the third lens retaining frame 31 to be described later. The rotation stopper protrusion 35b is fitted into and allowed to slide on a guide groove (not shown) parallel to the photographing optical axis OA direction, which is formed on the fixed cylinder portion 21a of the fixation frame 21. The rotation stopper protrusion 35b functions as a rotation stopper which prevents the third group female screw member 35 from being rotated in conjunction with rotation of the third group lead screw 34. Specifically, since the rotation of the third group female screw member 35 is blocked by the rotation stopper protrusion 35b which is fitted into the guide groove on the fixation frame 21, the third group female screw member 35 moves back and forth on the third group lead screw 34 along the photographing optical axis OA by way of the rotation of the third group lead screw 34.

As shown in FIG. 14A, while the third group female screw member 35 moves from the telescopic position T to the retraction start position B via the wide-angle position W by reverse rotation (rotation in the counterclockwise direction) of the third group lead screw 34, an upper surface of the contact portion 35a of the third group female screw member 35 serving as a contact engagement surface is in contact with the front engagement surface 91d of the stepped portion 91 of the third lens retaining frame 31 by way of the straight movement bias toward the image plane in the photographing optical axis OA direction from the compression torsion spring 37. Accordingly, the third lens retaining frame 31 gradually moves from the object side to the imaging plane side. At this time, the third lens retaining frame 31 is receiving the rotation biasing force from the compression torsion spring 37 toward the position on the photographing optical axis OA. Therefore, the third lens retaining frame 31 maintains the position on the photographing optical axis OA which is regulated by the third group sub-guide shaft 33.

Meanwhile, when the third group female screw member 35 further moves from the position B in FIG. 14A toward the imaging plane side (on the left side in the drawing), the third lens retaining frame 31 is rotated clockwise against the biasing force in the counterclockwise direction from the compression torsion spring 37 by the action of the cam structures as described later, whereby a retracting action takes place. Accordingly, the third lens retaining frame 31 is rotated from the position on the photographing optical axis OA to a storage position S. The storage position S of the third lens retaining frame 31 is a position shifted toward the imaging plane side by an amount equivalent to a predetermined number of pulse counts after the third group photointerrupter 38 generates a storage reference signal switched from H to L. After the third lens retaining frame 31 moves to the storage position S, the first lens group 11, the second lens group 12, and the shutter-diaphragm unit 15 are permitted to move to storage positions. This storage position S is a retracted position to which the third lens group 13 is retracted from the photographing optical axis OA by the rotation of the third lens retaining frame 31.

In the storage action of this example, the fourth lens retaining frame 41 firstly moves to a storage position before the third lens retaining frame 31 moves to the storage position. A first storage position of the fourth lens retaining frame 41 is a position shifted toward the imaging plane side by an amount equivalent to a predetermined number of pulse counts after a fourth group reference detector (not shown) generates a storage reference signal switched from H to L. After completion of the storage action of the fourth lens retaining frame 41, the storage action of the third lens retaining frame 31 is permitted.

Specifically, the storage action of the third lens retaining frame 31 is completed by moving the third group female screw member 35 toward the imaging plane side in the amount equivalent to the predetermined number of pulse counts since generation of the storage reference signal shifting from H to L by the third group photointerrupter 38 (see FIG. 16A). After completing this storage action, the first rotary cylinder 22 is set back or alternatively, components located inside the first rotary cylinder 22 and the first liner 23, i.e., those located in front of base end surfaces of the above-mentioned constituents are set back to a position immediately short of contacting the third lens retaining frame 31. This action is carried out after completion of the storage action of the third lens retaining frame 31 because it is hence possible to set back the first rotary cylinder 22 and the like safely without causing an interference with the third lens retaining frame 31. In the first embodiment provided with the zoom motor 51 formed by using a typical DC (direct-current) motor, the positions of the first rotary cylinder 22 and others are set based on counts of drive pulses generated by a zoom count detector formed of a pinion gear having an encoder shape directly fixed to an output shaft of the zoom motor 51 and a photointerrupter 51a (see FIG. 1), for example, which is disposed in the vicinity of the pinion gear. Here, the first embodiment uses the DC motor as a driving source for moving the first rotary cylinder 22 and achieves detection of a driving position thereof by using the detector formed of the encoder and the photointerrupter. However, it is obvious that similar functions can also be achieved by replacing these entire constituents with a pulse motor.

Figure 2:
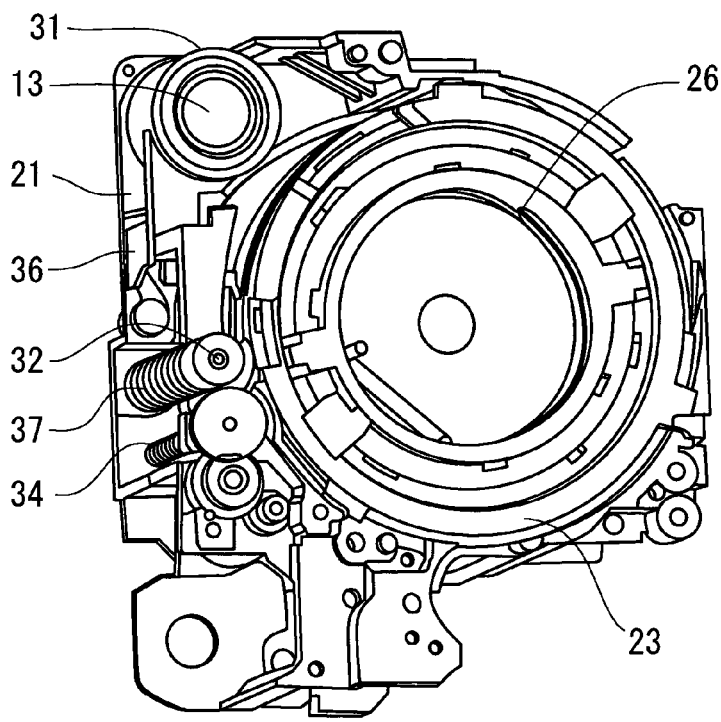
FIG. 2 is a perspective view showing that a configuration of a principal part in the state of FIG. 1 is viewed from an imaging plane side.

Incidentally, as shown in FIGS. 2, 7, 8, and the like, the collision preventing piece 36 is rotatably supported by the fixation frame 21 in the vicinity of the third group main guide shaft 32 and is provided with an engagement protrusion 36b which is engageable with the third lens retaining frame 31. This collision preventing piece 36 is constantly biased in the rotating direction by biasing means such as a spring so as to cause a locking protrusion 36a in the vicinity of a rotating end to protrude toward the photographing optical axis OA. The rotation biasing force applied to the collision preventing piece 36 by this biasing means is set smaller than the rotation biasing force to direct the third lens retaining frame 31 to the retracting position. For this reason, the collision preventing piece 36 is pushed by the third lens retaining frame 31 engaged with the engagement protrusion 36b when the third lens retaining frame 31 is located in the storage position and is therefore deflected outward from the third lens retaining frame 31 (see FIGS. 2, 7, and the like). Meanwhile, when the third lens retaining frame 31 is rotated and moved to the position on the photographing optical axis OA, the engagement protrusion 36b is disengaged from the third lens retaining frame 31, whereby the collision preventing piece 36 is rotated by the biasing force from the above-described biasing means in the direction so as to cause the locking protrusion 36a to protrude toward the photographing optical axis OA and to cause the locking protrusion 36a to protrude from the inner surface of the fixed cylinder portion 21a (see FIG. 9) of the fixation frame 21 (see FIG. 8). At this time, all of the first rotary cylinder, the first liner 23, the second rotary cylinder 24, the second liner 25, the cam cylinder 26, and the straight moving cylinder 27 are located closer to the object than a position of protrusion of the locking protrusion 36a. Accordingly, the locking protrusion 36a protrudes inward from the first rotary cylinder 22 and an outer peripheral edge at a base end of the first liner 23 (see FIGS. 5, 6, 8, and the like).

By employing the above-described configuration, even in an attempt to rotate and move the first rotary cylinder 22 manually and forcibly toward the storage position, the collision preventing piece 36 (locking protrusion 36a) firstly contacts the first rotary cylinder 22. Accordingly, it is not possible to move the base end of the first rotary cylinder 22 close to the imaging plane then the position of the collision preventing piece 36 in terms of the photographing optical axis OA direction. Hence it is possible to avoid contact with the third lens retaining frame 31. Therefore, it is possible to achieve prevention of destruction, damages, and the like of the third lens retaining frame 31 attributable to a strong external force. This first rotary cylinder 22 can move to the storage position for the first time after the third lens retaining frame 31 completes the movement to the storage position normally.

Therefore, if a large pressure is applied to a tip end of the lens barrel due to falling or the like in the photographing state P when part of the lens barrel 10 (part of the movable lens barrel) is protruding, the locking protrusion 36a of the collision preventing piece 36 is engaged with the first rotary cylinder 22 and the first liner 23 so as to block additional retraction of the first rotary cylinder 22 and the first liner 23 (as well as the second rotary cylinder 24, the second liner 25, the cam cylinder 26, and the straight moving cylinder 27) toward the third lens group 13. Hence it is possible to prevent damages and the like of the third lens retaining frame 31 and the third lens group 13.

The third group lead screw 34 is rotated in both of forward and reverse directions by the third group motor 52. The rotation of the third group motor 52 is transmitted sequentially to the gear 71, the gear 72, the gear 73, the gear 74, and finally to the third group lead screw 34.

Next, a configuration to drive the fourth lens group 14 will be described. In addition to FIGS. 7 and 8, the configuration will be described with reference to FIGS. 20A and 20B which are perspective views mainly showing a fourth group driving system.

Figure 20A:
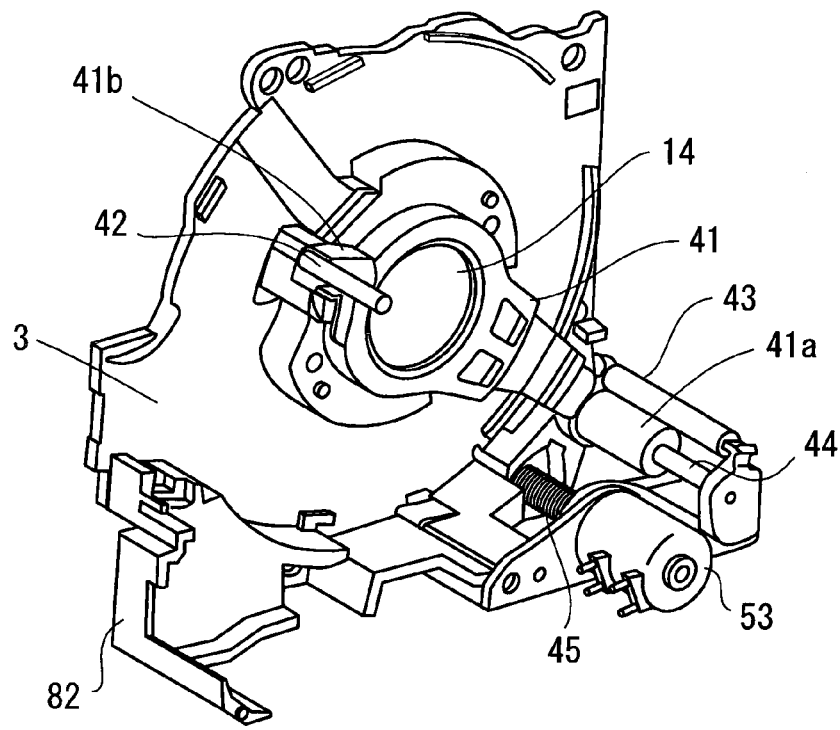
FIGS. 20A and 20B are explanatory views for explaining a configuration of a fourth lens retaining frame.
Figure 20B:
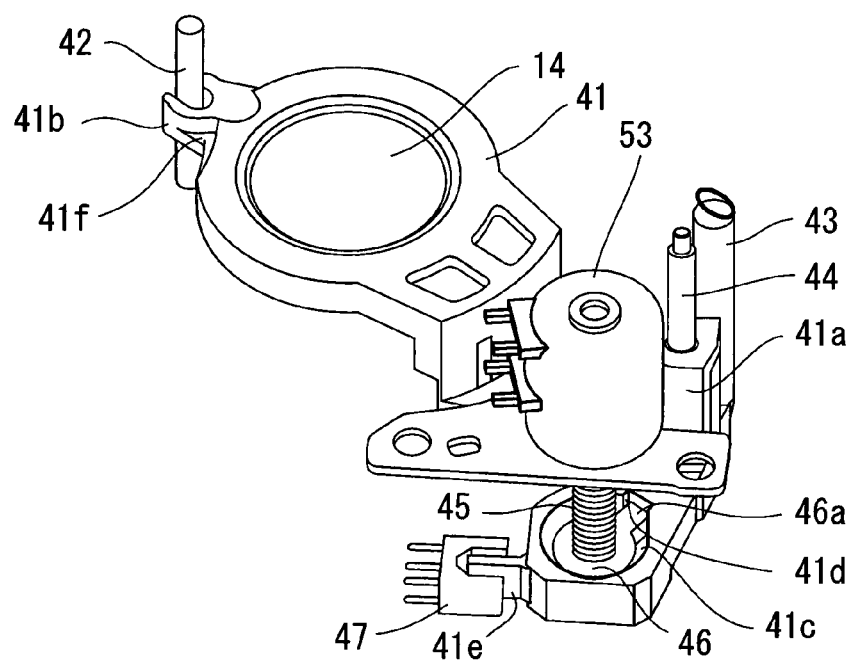

In the first embodiment, the fourth lens group 14 is used for focusing, or namely as a focusing lens configured to perform focusing. As shown in FIGS. 20A and 20B, this fourth lens group 14 is retained by the fourth lens retaining frame 41. The fourth lens retaining frame 41 includes a sleeve portion 41a and a rotation stopper portion 41b. The sleeve portion 41a is engaged with the fourth group main guide shaft 44 which is fixed to the lens barrel base 82 and is disposed parallel to the photographing optical axis OA. The rotation stopper portion 41b is engaged with the fourth group sub-guide shaft 42 which is disposed parallel to the photographing optical axis OA and is fixed to the lens barrel base 82 so as to regulate rotation of the fourth lens retaining frame 41. By employing this configuration, the fourth lens retaining frame 41 is freely movable along the fourth group main guide shaft 44, i.e., along the photographing optical axis OA. In the first embodiment, the fourth group motor 53 formed of a stepping motor is provided as a driving source for driving the fourth lens retaining frame 41. The fourth group lead screw 45 is formed on an output shaft of this fourth group motor 53. The fourth group female screw member 46 provided with a female screw is threadably engaged with this fourth group lead screw 45. This fourth group female screw member 46 is a threadably engageable member movable on the fourth group lead screw 45 along the photographing optical axis OA.

The fourth lens retaining frame 41 is provided with a space for inserting the fourth group female screw member 46. This space includes an engagement portion 41c which is located on the image plane side and is a perpendicular plane to the photographing optical axis OA to be engaged with the fourth group female screw member 46. The fourth lens retaining frame 41 inserted to this space is constantly biased toward the subject side by the fourth group spring 43, and always is in contact and engaged with the fourth group female screw member 46. The fourth group female screw member 46 includes a protrusion 46a which protrudes in a radial direction. This protrusion 46a is engaged with a hole 41d provided on one side of the space on the fourth lens retaining frame 41 for inserting the fourth group female screw member 46, thereby functioning as the rotation stopper for the fourth group female screw member 46.

By employing this configuration, the fourth group lead screw 45 is rotated with rotation of the fourth group motor 53, whereby the fourth group female screw member 46 moves back and forth in an extending direction of the fourth group lead screw 45, or namely in the photographing optical axis OA direction. The fourth lens retaining frame 41 is engaged with the fourth group female screw member 46, and therefore moves along the photographing optical axis OA following the movement of this fourth group female screw member 46. Here, the fourth group lead screw 45 is formed on the output shaft of the fourth group motor 53. Instead, it is also possible to form the fourth group motor 53 and the fourth group lead screw 45 separately and to connect these constituents to each other by using a gear or the like so as to transmit the rotation and to rotate the fourth group lead screw 45.

A light shielding piece 41e for shielding light on an optical path of the fourth group photointerrupter 47 provided on the lens barrel base 82 is formed on the fourth lens retaining frame 41. Hence it is possible to shield or transmit the light on the optical path of the fourth group photointerrupter 47 by moving the fourth lens retaining frame 41 to a predetermined position. In this case, a moment of switching from a light-shielded state to a light-transmitted state due to the movement of the fourth lens retaining frame 41 is recognized as a reference position and pulse waves equivalent to an arbitrary number of pulses are applied starting from that position. Hence it is possible to rotate the fourth group motor 53 and thereby to move the fourth lens retaining frame 41 to a desired position.

Here, a recessed portion 41f for escaping from the light shielding piece 31b for the photointerrupter of the third lens retaining frame 31 in the photographing optical axis OA direction and thereby avoiding an interference therewith is formed on an outer peripheral edge of the fourth lens retaining frame 41. In this way, it is possible to increase an amount of movement of the fourth lens retaining frame 41 and thereby to ensure a wide photographing distance range which is focusable. Moreover, as described previously, the engagement structure between the fourth lens retaining frame 41 and the fourth group female screw member 46 includes the backlash in the photographing optical axis OA direction. However, the fourth lens retaining frame 41 can accurately control the position in the photographing optical axis OA direction of the fourth lens by constantly biasing the fourth lens retaining frame 41 toward the subject side using the fourth group spring 43.

The storage positions of the first rotary cylinder 22, the first liner 23, the first lens group 11, the second lens group 12, and the shutter-diaphragm unit 15 are controlled based on the zoom position reference signal generated by the zoom position detector placed on the fixation frame 21, which is formed of the photoreflector or the like. Specifically, after generation of a change from H to L in the zoom position reference signal, these constituents are moved to the imaging plane side in the amounts equivalent to the predetermined number of counts of drive pulses generated by the pinion gear functioning as the encoder and the zoom count detector disposed in the vicinity thereof. In this way, it is possible to complete the storage action. At the time of storage, the fourth lens retaining frame 41 is located in the first storage position as described previously. As the first rotary cylinder 22 moves to the storage position, the base end surface of either the first rotary cylinder 22 or the first liner 23 comes into contact with the fourth lens retaining frame 41 so as to press the fourth lens retaining frame 41, and eventually moves the fourth lens retaining frame 41 to a second storage position. By this operation, even if there is a fluctuation in a fitting position in the photographing optical axis OA direction of the fourth group photointerrupter 47, it is still possible to move the fourth lens retaining frame 41 accurately to the storage position without requiring complicated adjustment or the like. This operation is achievable because a length dimension in the photographing optical axis OA direction of an engagement space provided on the fourth lens retaining frame 41 is greater than a thickness dimension of the fourth group female screw member 46.

The zoom motor 51 for moving the first lens group 11, the second lens group 12, and the shutter-diaphragm unit 15 is formed of a DC motor in this case. Meanwhile, the third group motor 52 for driving the third lens group 13 and the a fourth group motor 53 for driving the fourth lens group 14 are generally formed of pulse motors and are driven in cooperation with each other in a software fashion, for example. In this way, it is possible to achieve an appropriate zooming action mainly by use of the first to third lens groups 11 to 13, for example, and an appropriate focusing action mainly by use of the fourth lens group 14, for example.

Figure 21:
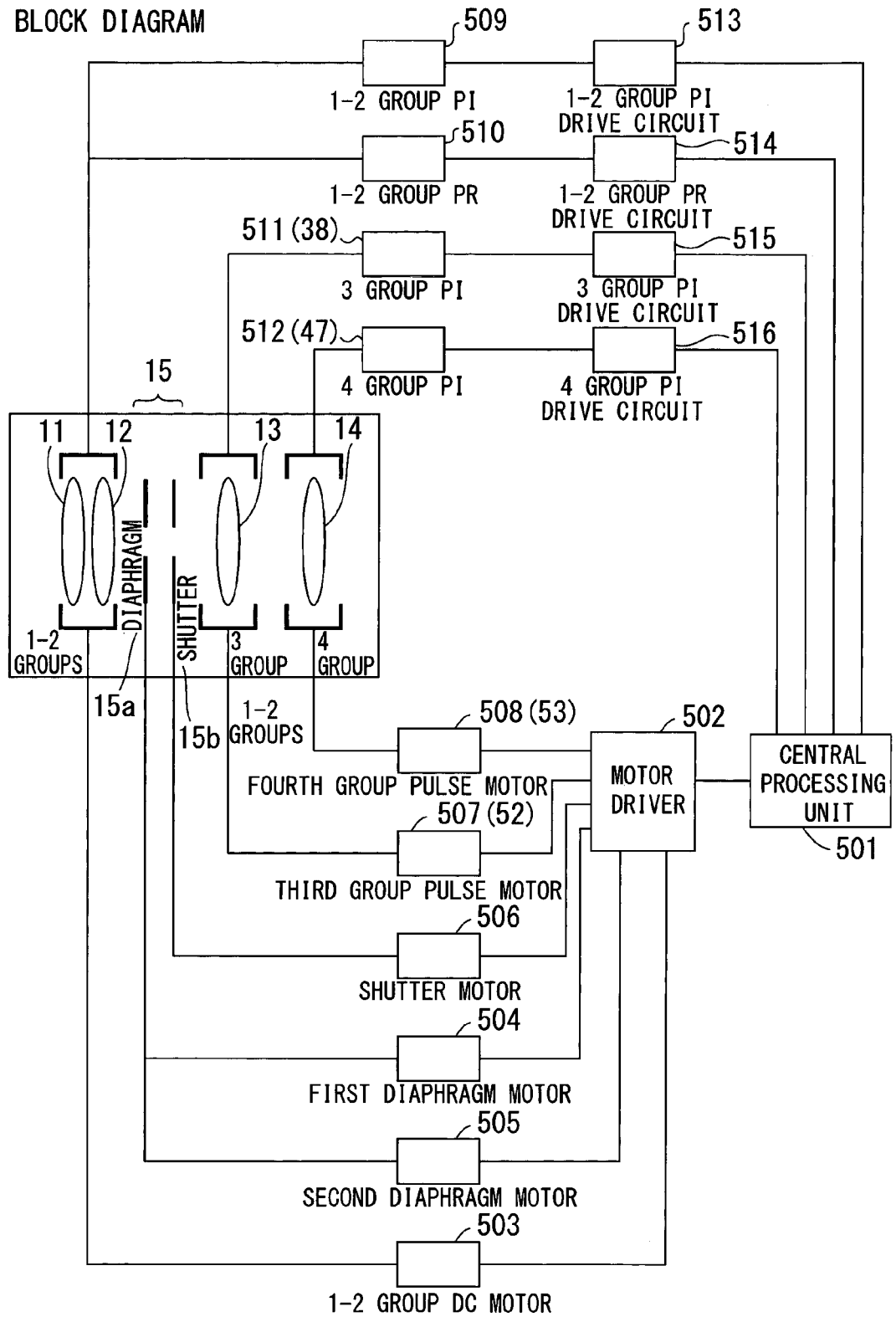
FIG. 21 is a block diagram schematically showing a configuration of a drive control system.

Here, the lens groups constituting this lens barrel 10 are under the drive control of a drive control system shown in FIG. 21. FIG. 21 is a block diagram schematically showing a configuration of the drive control system.

The drive control system in FIG. 21 includes a central processing unit 501, a motor driver 502, a first-second group DC motor 503, a first diaphragm motor 504, a second diaphragm motor 505, a shutter motor 506, a third group pulse motor 507, a fourth group pulse motor 508, a first-second group photointerrupter 509, a first-second group photoreflector 510, a third group photointerrupter 511, a fourth group photointerrupter 512, a first-second group photointerrupter drive circuit 513, a first-second group photoreflector drive circuit 514, a third group photointerrupter drive circuit 515, and a fourth group photointerrupter drive circuit 516.

The central processing unit 501 issues instructions to the motor driver 502 concerning initial settings of the motor driver 502, selection of the drive motors, settings of drive voltages, driving directions, and so forth. The motor driver 502 controls motor systems including the first-second group DC motor 503, the first diaphragm motor 504, the second diaphragm motor 505, the shutter motor 506, the third group pulse motor 507, the fourth group pulse motor 508, and the like in accordance with the instructions from the central processing unit 501. The first-second group DC motor 503 drives the first lens group 11 and the second lens group 12. Usually, the first lens group 11 and the second lens group 12 are driven independently of each other by way of cam structures reacting to the a driving force of the first-second group DC motor 503. The first diaphragm motor 504 and the second diaphragm motor 505 drive a diaphragm in the shutter-diaphragm unit 15. The shutter motor 506 drives a shutter in the shutter-diaphragm unit 15. The third group pulse motor 507 drives the third lens group 13. The fourth group pulse motor 508 drives the fourth lens group 14.

Meanwhile, the central processing unit 501 performs drive power supply to the first-second group photointerrupter 509, the first-second group photoreflector 510, the third group photointerrupter 511, and the fourth group photointerrupter 512 serving as the position detection devices through the first-second group photointerrupter drive circuit 513, the first-second group photoreflector drive circuit 514, the third group photointerrupter drive circuit 515, and the fourth group photointerrupter drive circuit 516, and acquires positional information signals detected by the first-second group photointerrupter 509, the first-second group photoreflector 510, the third group photointerrupter 511, and the fourth group photointerrupter 512. The first-second group photointerrupter drive circuit 513, the first-second group photoreflector drive circuit 514, the third group photointerrupter drive circuit 515, and the fourth group photointerrupter drive circuit 516 further have functions to properly control light projection currents and output signal levels of the first-second group photointerrupter 509, the first-second group photoreflector 510, the third group photointerrupter 511, and the fourth group photointerrupter 512, respectively. The motor driver 502 receives the instructions from the central processing unit 501, executes the instructions, sets designated voltages to the motors selected from the first-second group DC motor 503, the first diaphragm motor 504, the second diaphragm motor 505, the shutter motor 506, the third group pulse motor 507, and the fourth group pulse motor 508, and performs drive control based on drive instruction timing.

As shown in FIG. 9, the solid-state image sensing device 16 such as the CCD (charge coupled device) solid-image sensing device is disposed behind the fourth lens group 14, i.e., on the far side from the object (subject). As described previously, a subject image is formed on the input surface (light receiving surface) of this solid-state image sensing device 16 by way of the photographing optical system. The cover glass 18 and the low-pass filter 19 are provided on the input surface side of the solid-state image sensing device 16. Moreover, various optical filters and other optical elements are provided on the input surface side of the solid-state image sensing device 16 as appropriate.

Figure 3:
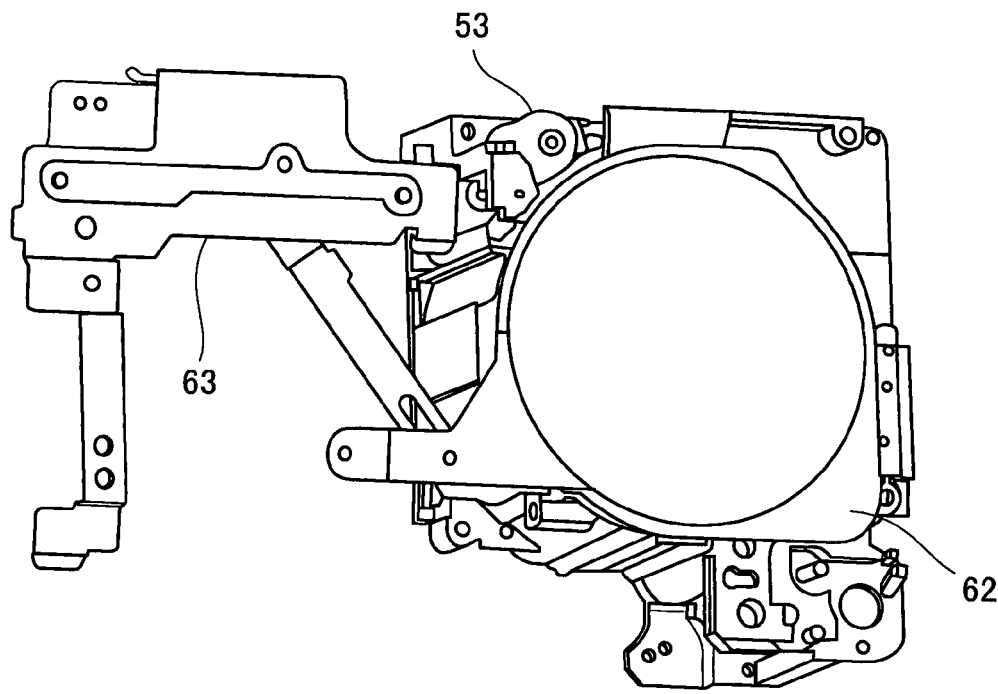
FIG. 3 is a perspective view showing that a configuration of an optical system device including a lens barrier and the lens barrel 10 in the collapsed stored state D where the lens barrier is closed is viewed from the object side.
Figure 4:
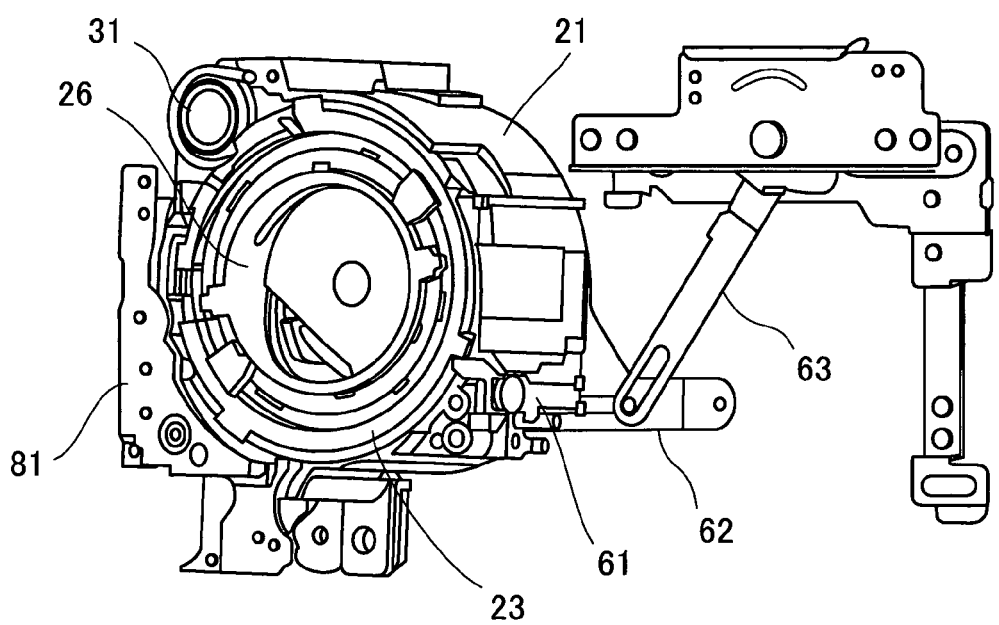
FIG. 4 is a perspective view showing that a configuration of a principal part in the state of FIG. 3 is viewed from the imaging plane side.
Figure 5:
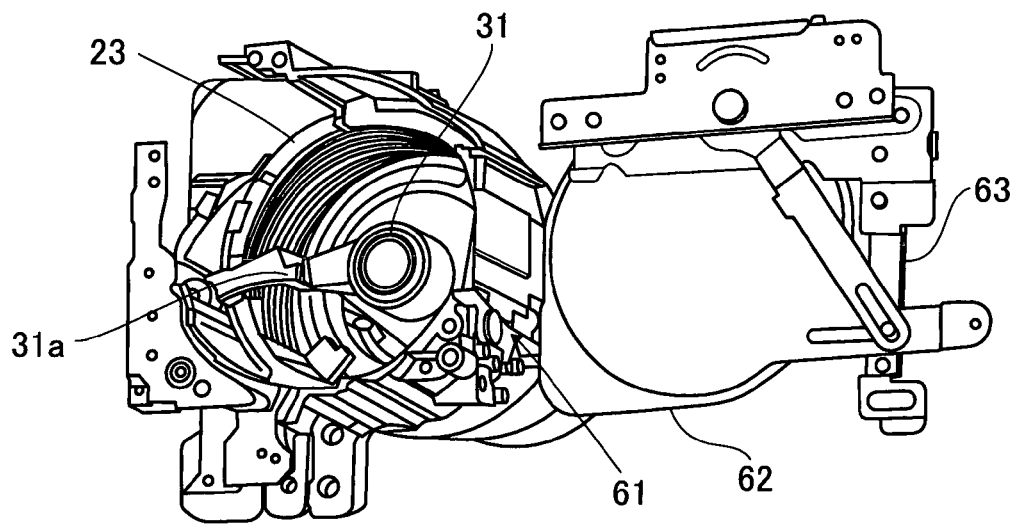
FIG. 5 is a perspective view showing that a configuration of a principal part of the lens barrel 10 and the lens barrier in the process of closing the opened lens barrier in a photographing state P with the lens groups projected is viewed from the imaging plane side.
Figure 6:
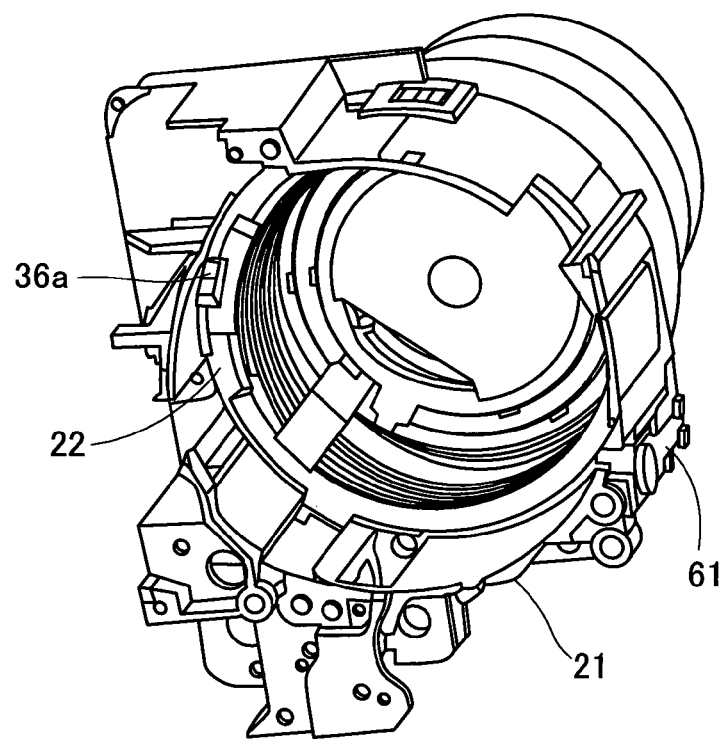
FIG. 6 is a perspective view showing that the configuration of the principal part of the lens barrel 10 portion in the photographing state P with the lens groups projected is viewed from the imaging plane side.

The lens barrier 62 shown in FIGS. 3 to 5 covers the object side of the first lens group 11 and protects the lens group from defacement and damages in the collapsed stored state D. The lens barrier 62 is driven back and forth in the direction orthogonal to the photographing optical axis OA by the barrier drive system 63. FIGS. 3 and 4 show the lens barrier 62 in a closed state while FIG. 5 shows the lens barrier 62 in an almost completely open state. The barrier drive system 63 drives the lens barrier 62 between a closed position (see FIGS. 3 and 4) and an open position (position further from the photographing optical axis OA than the position in FIG. 5) by an operation of a barrier operating unit 301 (see FIG. 17A). This barrier drive system 63 deflects and biases the lens barrier 62 in a closing direction in the closed position or in an opening direction in the open position.

Thus, when the lens barrier 62 in the closed state is operated in the opening direction, the lens barrier 62 transitions semi-automatically to the open state after passing a predetermined position. On the other hand, in the process of closing the lens barrier 62 in the open state, the lens barrier 62 transitions semi-automatically to the closed state after passing a predetermined position (which does not necessarily need be the same position as the aforementioned predetermined position for opening the lens barrier 62, or rather, a smoother operation is expected by providing a certain hysteresis property).

The barrier control piece 61 is provided at a side of the fixation frame 21 closer to the opened position of the lens barrier 62, is slidable in the direction along the photographing optical axis OA and is biased toward the object side by a spring and the like as appropriate. In the collapsed stored state D, an engagement portion of this barrier control piece 61 that is formed in a bent manner is engaged with the base end surfaces of the first rotary cylinder 22 and the first liner 23 and is deflected to the imaging plane side against the biasing force without contacting the lens barrier 62. In the photographing state P, the lens barrier 62 is completely detached from all the lens groups, the retaining frames thereof, and the like. In this state, the barrier control piece 61 is deflected to the object side by the biasing force as the engagement portion is disengaged, whereby a barrier blocking portion at a tip protrudes to a traveling path of the lens barrier 62.

In an attempt to transition from this state to the collapsed stored state D, the lens barrier 62 may hit against the lens barrel 10 if the lens barrier 62 is abruptly operated. However, the barrier blocking portion at the tip of the barrier control piece 61 which crosses the traveling path of the lens barrier 62 blocks entry of the lens barrier 62 into the lens barrel 10. In the collapsed stored state D where all the lens groups are stored, the base end surfaces of the first rotary cylinder 22 and the first liner 23 are engaged with the engagement portion formed in the bent manner on the barrier control piece 61 so as to deflect the barrier control piece 61 to the imaging plane side against the biasing force. Hence the lens barrier 62 is able to move to a front part of the lens barrel 10 and is set properly in the closed position. In this way, it is possible to prevent the interference between the lens barrier 62 and the lens barrel 10 effectively.

The lens barrel has been described above based on the example of the configuration to cause the third lens group 13 to be retracted from the photographing optical axis OA. In the case of the configuration of this first embodiment, it is possible to effectively reduce a lens barrel projection size at the time of retraction by defining the lens group having the smallest outside diameter as the retractable lens group to be retracted outside the photographing optical axis OA. Moreover, by defining the lens group which sticks to the imaging surface as much as possible at the time of expansion as the retractable lens group, it is possible to shorten the driving mechanism (at least one of the length of the main shaft and the length of the lead screw) for the retractable lens group, and thereby to reduce the thickness of the lens barrel, i.e., to reduce the thickness dimension of the lens barrel viewed in the photographing optical axis OA direction. Moreover, by defining the lens group located behind the shutter also having the function of the diaphragm and closest to the shutter as the retractable lens group, it is possible to define the lens group having the smallest outside diameter and sticking to the imaging plane as much as possible as the retractable lens group. This retractable lens group is easily retractable because it is not necessary to consider the interference with the shutter blocking the plane of the lens barrel orthogonal to the photographing optical axis OA and to avoid the location of the shutter.

In this case, an overall lens structure includes the four lens groups, namely, the first lens group having positive magnifying power, the second lens group having negative magnifying power, the third group lens having positive magnifying power, and the fourth lens group having positive magnifying power. This lens structure is configured to change the magnitude by at least changing an interval between the first lens group and the second lens group, an interval between the second lens group and the third lens group, and an interval between the third lens group and the fourth lens group, and to perform focusing by correcting the position of the imaging plane to an image forming surface by moving the fourth lens group. The shutter also having the diaphragm function is located in front of the third lens group. By configuring the overall lens structure using the four lens groups and defining the third lens group as the retractable lens group, it is possible to define the lens group which sticks to the imaging surface as much as possible and has the smallest outside diameter as the retractable lens group and thereby to realize the lens barrel having a small lens barrel projection size and a thin profile. Moreover, by defining the third lens group out of the four lens groups configured to achieve 4-power magnification or higher as the retractable lens group, it is possible to provide the lens barrel 10 with the reduced lens barrel size (projection size and the thickness) while achieving the high-power magnification. Alternatively, the overall lens structure may include three lens groups, namely, the first lens group having positive magnifying power, the second lens group having negative magnifying power, and the third lens group having positive magnifying power while defining the third lens group as the retractable lens group. Each of the lens groups may include at least one lens. In this context, the lens group means one or more lenses that move integrally. Therefore, each of the lens group may include just one lens.

Figure 17A:
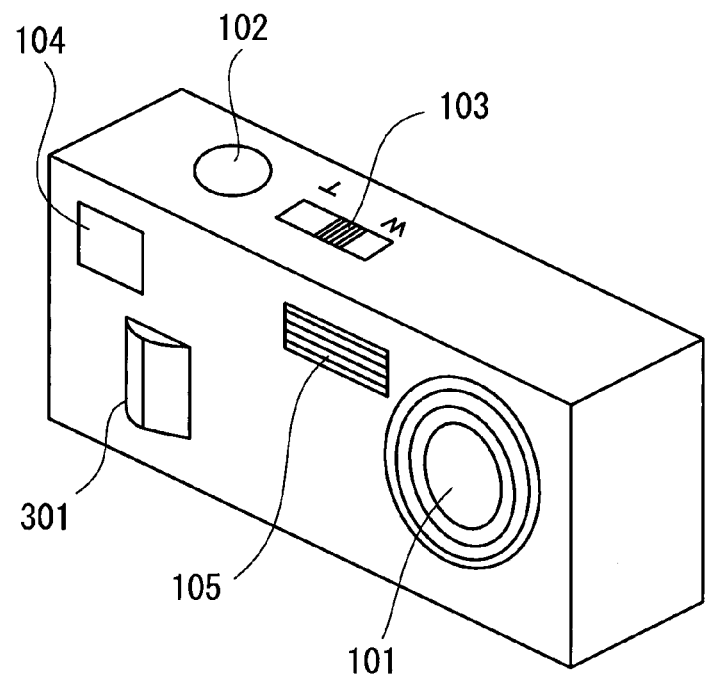
FIGS. 17A and 17B are perspective views schematically showing an exterior configuration of a camera 100 employing the lens barrel 10 according to an embodiment of the present invention.
Figure 17B:
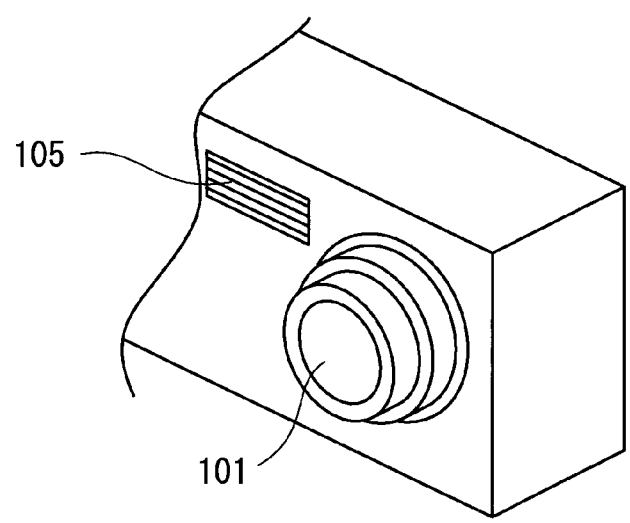
Figure 18:
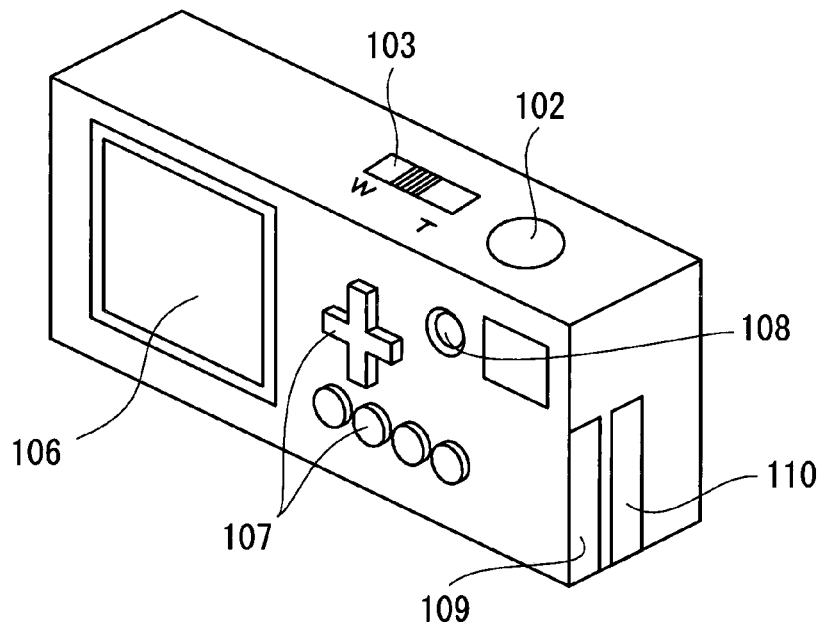
FIG. 18 is a perspective view schematically showing that the external configuration of the camera 100 of FIGS. 17A and 17B is viewed from a photographer side.
Figure 19:
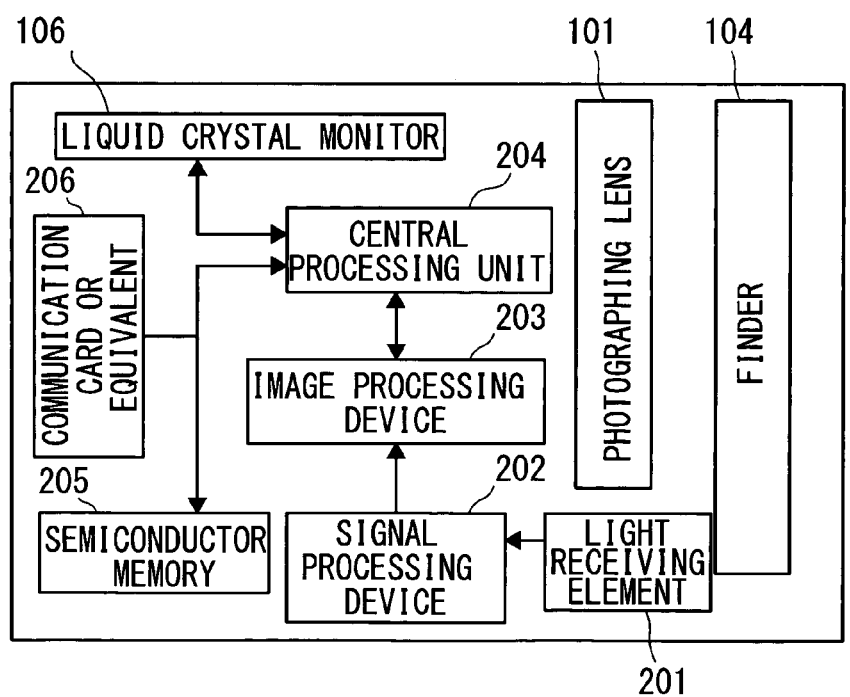
FIG. 19 is a block diagram schematically showing a functional configuration of the camera 100 of FIGS. 17A and 17B.

Next, an example of constructing a camera (imaging apparatus) 100 by employing an optical system device inclusive of the above-described lens barrel 10 of the embodiment to a photographing optical system will be described with reference to FIGS. 17A to 19. FIGS. 17A and 17B are perspective views showing external appearance of the camera 100 which are viewed from a front side, i.e., the object side or the subject side. FIG. 18 is a perspective view showing the external appearance of the camera 100 which is viewed from a back side or a photographer side. FIG. 19 is a block diagram showing a functional configuration of the camera 100. Although the camera 100 is used for describing the example herein, products incorporating camera functions into so-called portable information terminal devices including PDAs (personal digital assistants), cellular telephones, and the like are being released in recent years.

Many of these portable information terminal devices may have slightly different external appearance but include virtually identical functions and configurations to those of the camera 100. Hence, the optical system device inclusive of the lens barrel 10 according to an embodiment of the present invention can be applied to any of these portable information terminal devices. Similarly, the optical system device inclusive of the lens barrel 10 according to an embodiment of the present invention can also be applied to an image input device.

As shown in FIGS. 17A to 18, the camera 100 includes a photographing lens 101, a shutter button 102, a zoom lever 103, a finder 104, a flash lamp 105, a liquid crystal monitor 106, operating buttons 107, a power switch 108, a memory card slot 109, a communication card slot 110, a barrier operating unit 301, and the like. In addition, as shown in FIG. 19, the camera 100 also includes a light receiving element 201, a signal processing device 202, an image processing device 203, a central processing unit (CPU) 204, a semiconductor memory 205, a communication card 206, and so forth. Although it is not clearly illustrated in the drawings, these constituents are operated by receiving power supply from a battery serving as a driving power source.

The camera 100 includes the photographing lens 101 and the light receiving element 201 serving as an area sensor formed of a CCD (charge coupled device) photographing element or the like. The camera 100 is configured to form an image of an object targeted for photographing, i.e., an image of a photographic subject, by the photographing lens 101 constituting the photographing optical system and to read the formed image by using the light receiving element 201. The photographing lens 101 applies the optical system device inclusive of the lens barrel 10 according to an embodiment of the present invention as described above in the first embodiment. To be more precise, the optical system device is formed by use of the lenses and the like which are the optical elements constituting the lens barrel 10 (meanwhile the light receiving element 201 is formed by using the solid-state image sensing device 16 (see FIG. 9), for example). The lens barrel 10 includes a mechanism configured to retain all the lenses and the like and to be at least capable of moving and operating the lens groups independently. Usually, the photographing lens 101 to be embedded in the camera 100 is incorporated in the form of the optical system device as described above.

An output from the light receiving element 201 is processed by the signal processing device 202, which is controlled by the central processing unit 204, and is converted into digital image information. The image information digitalized by the signal processing device 202 is processed in given image processing conducted by the image processing device 203 to be also controlled by the central processing unit 204, and is then stored in the semiconductor memory 205 such as a non-volatile memory. In this case, the semiconductor memory 205 may be a memory card inserted to the memory card slot 109 or may be a semiconductor memory embedded in a body of the camera 100 (camera body). The liquid crystal monitor 106 is able to display an image which is about to be photographed or to display images stored in the semiconductor memory 205. Moreover, it is possible to transmit the images stored in the semiconductor memory 205 to the outside through the communication card 206 inserted to the communication card slot 110, for example. Here, the aforementioned central processing unit 501 shown in FIG. 21 for performing the drive control of all the lenses may also be included in the central processing unit 204. Alternatively, it is possible to construct the central processing unit 501 by using another microprocessor configured to coordinate with the central processing unit 204.

The photographing lens 101 is in the collapsed state as shown in FIG. 17A when carrying the camera 100, and the photographing lens 101 is buried in the body of the camera 100 while the lens barrier 62 is closed in this state. The power is turned on when a user operates the barrier operating unit 301 to open the lens barrier 62. Then, the lens barrel 10 is extended as shown in FIG. 17B. Then, the lens barrel 10 protrudes from the body of the camera 100 to establish the photographing state P. At this time, the optical systems of all the groups constituting the zoom lens are arranged in the wide-angle positions inside the lens barrel of the photographing lens 101, for example. Layouts of the optical systems of the respective groups are changed by operating the zoom lever 103. In this way, it is possible to perform an operation to change the magnification to a telephotographic end.

Meanwhile, an optical system of the finder 104 is preferably configured to change the magnification in conjunction with a change in a field angle of the photographing lens 101.

In many cases, a focusing operation is achieved by half pressing the shutter button 102. The focusing operation with the zoom lens according to the first embodiment can be executed mainly by moving the fourth lens group 14. A photographing operation is then achieved by fully pressing the shutter button 102 and the above-described processing takes place thereafter.

The operating button 107 are operated in a predetermined manner in order to display the images stored in the semiconductor memory 205 on the liquid crystal monitor 106 or to transmit the images to the outside through the communication card 206 and the like. The semiconductor memory 205, the communication card 206, and the like are used by inserting those cards respectively to dedicated or universal slots as represented by the memory card slot 109 and the communication card slot 110, for example.

Here, when the photographing lens 101 is in the collapsed state, the third lens group 13 retracts from the photographing optical axis OA and is housed in parallel to the first lens group 11 and the second lens group 12. It is thus possible to achieve further thin profiling of the camera 100.

Usually, a finder mechanism is usually located on an upper side of the lens barrel unit in order to facilitate operations of the camera 100. Meanwhile, if the lens barrel 10 includes a zoom magnification change mechanism, then the finder mechanism also requires a zoom magnification change mechanism. Accordingly, it is desirable to locate a driving source (DC motor, a pulse motors or the like) for achieving a zoom magnification change operation and a transmission mechanisms (such as a gear connection mechanism) for transmitting the driving force thereof very close to the finder mechanism. For example, when the finder mechanism is disposed on an upper left side of the lens barrel 10, the driving source for changing the magnification and the transmission mechanism may be disposed on an upper right side of the lens barrel 10. In this way, it is possible to utilize a limited space effectively. In the state where the retractable lens retaining frame (third lens retaining frame 31 in the first embodiment) is retracted, the retractable lens retaining frame is naturally disposed below the lens barrel 10 as determined by the remaining space (either on a lower right side or a lower left side of the lens barrel 10). In this embodiment, a space for the retractable lens retaining frame is located on the lower right side of the lens barrel 10. Meanwhile, the driving source and the drive mechanism for driving the focusing lens group are disposed on the lower left side of the lens barrel 10. In this way, it is possible to downsize the lens barrel 10 by effectively utilizing the four corners, namely, the upper left side, the upper right side, the lower right side, and the lower left side of the lens barrel 10 typically formed into a circular shape.

Figure 22:
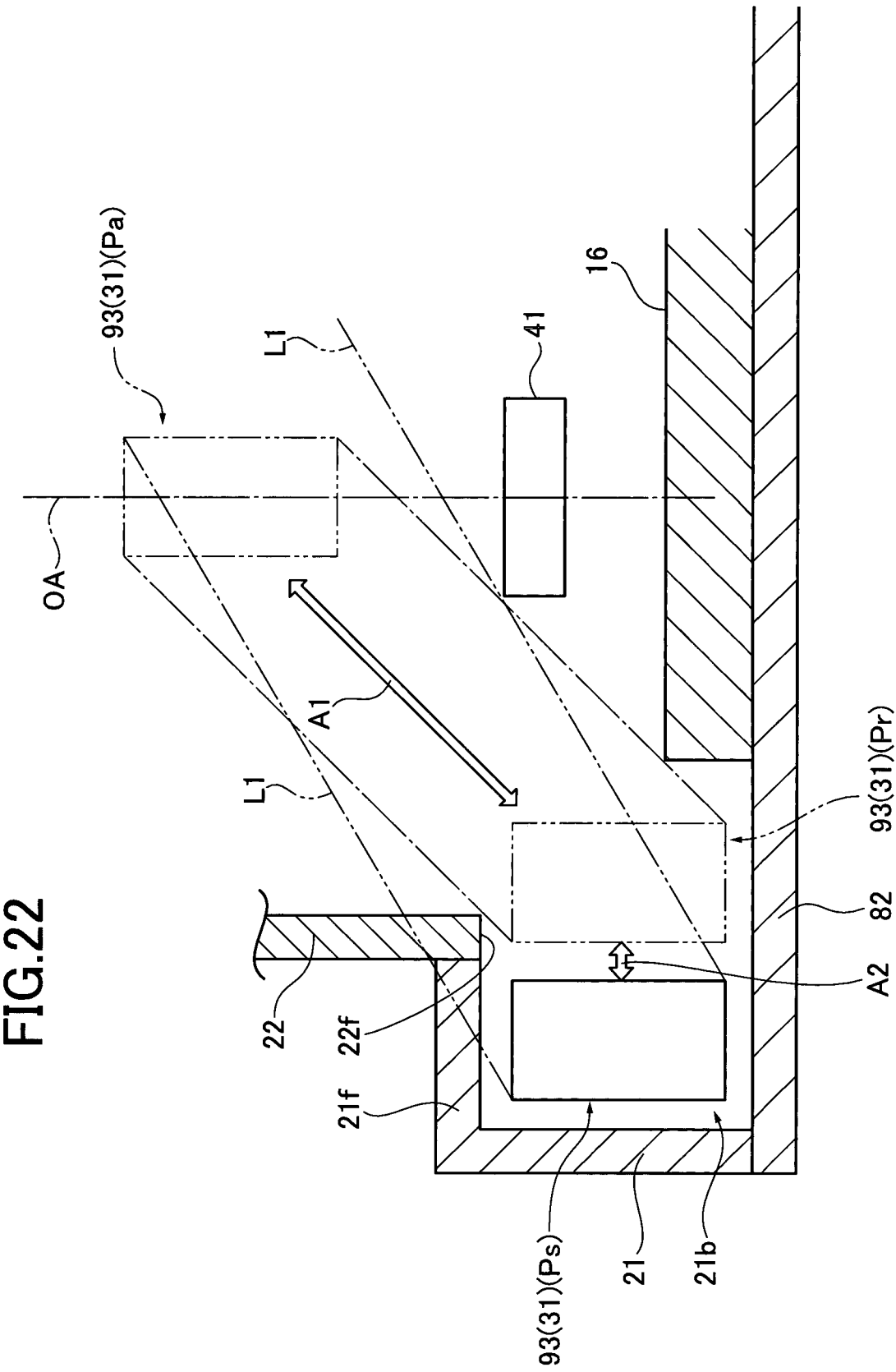
FIG. 22 is a schematic explanatory view showing a movement of a third lens retaining frame 31 in the lens barrel 10 according to a first embodiment.
Figure 30:
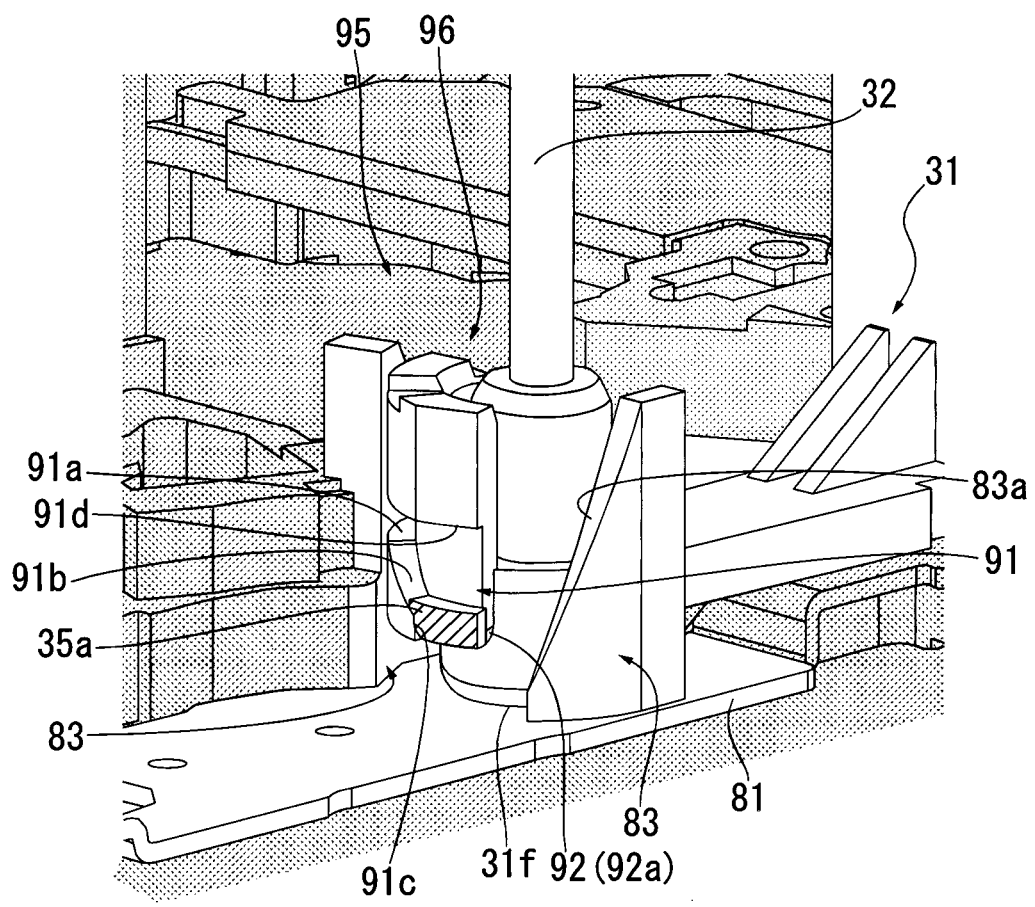
FIG. 30 is a perspective view similar to FIGS. 24 to 29, and shows a state after FIG. 29 in the process of retracting the third lens retaining frame 31.
Figure 31:
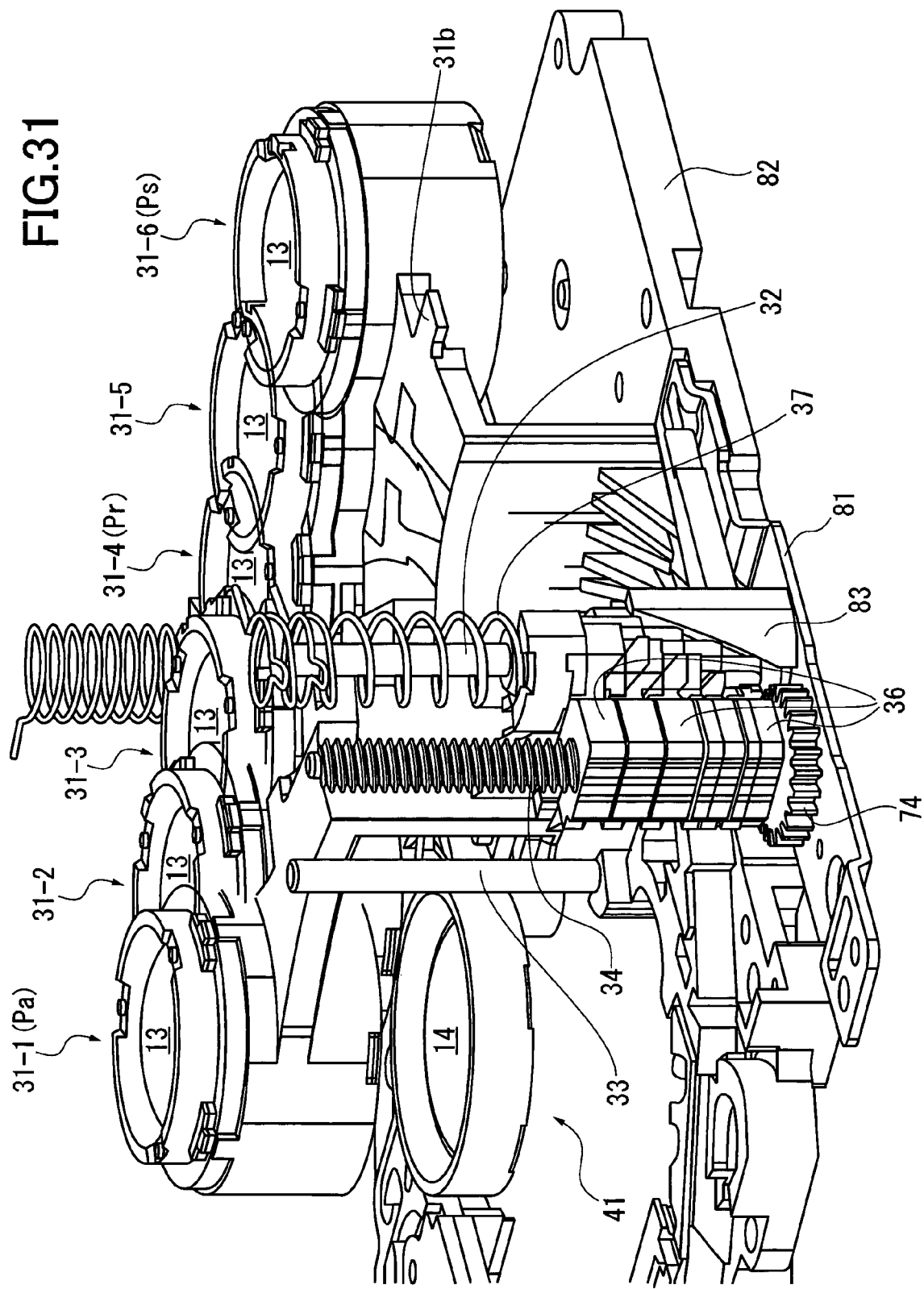
FIG. 31 is a schematic perspective view showing a movement of the third lens retaining frame 31 on a lens barrel base 82 (retainer plate 81).
Figure 32:
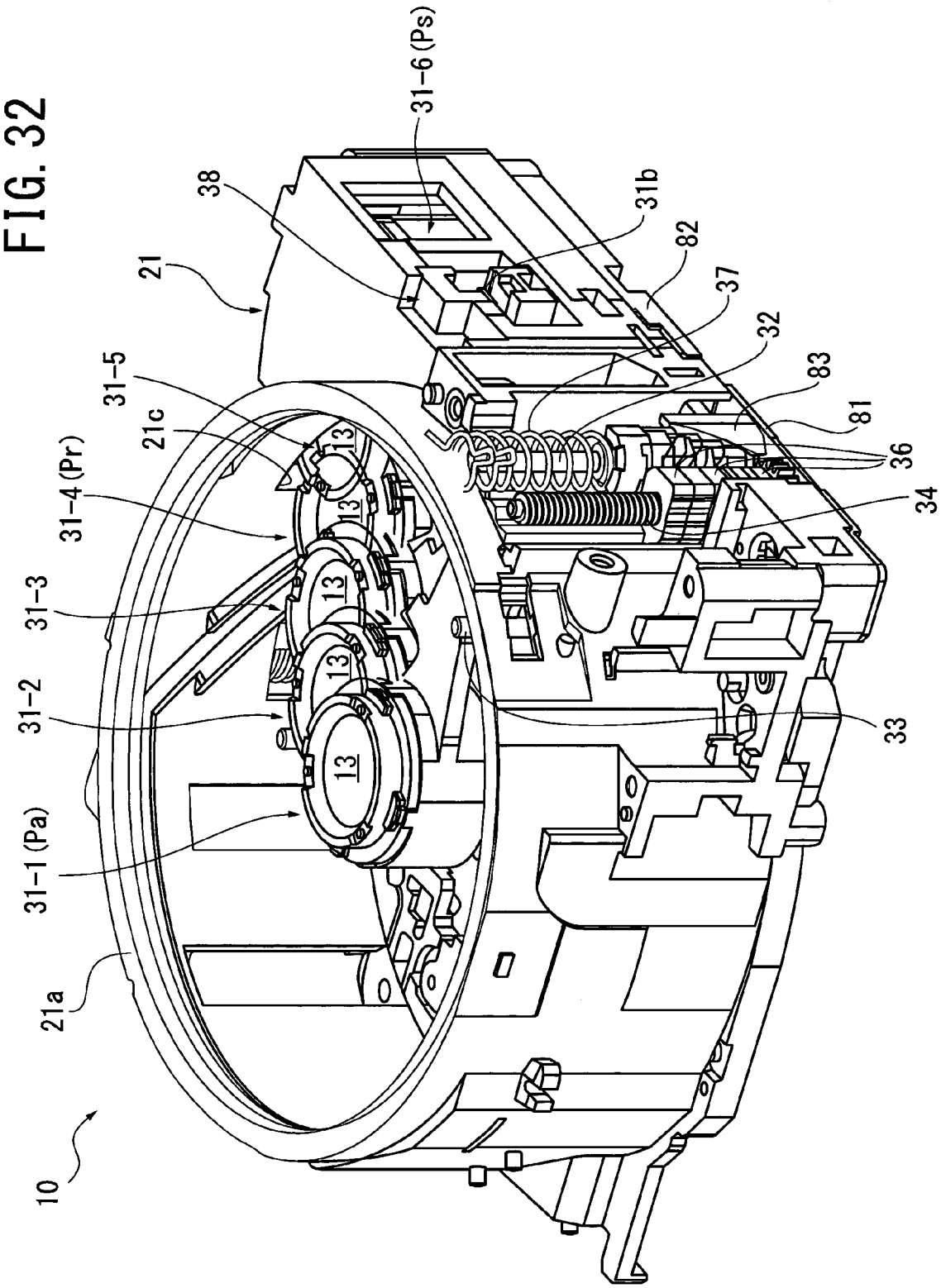
FIG. 32 is a schematic perspective view showing a movement of the third lens retaining frame 31 inside a fixation frame 21 (fixed cylinder portion 21a).

Next, characteristic features of the first embodiment will be described with reference to FIGS. 22 to 32. It is to be noted that FIG. 22 is merely an explanatory view for explaining a concept of an embodiment of the present invention and therefore does not agree perfectly with positional relationships as seen in the configuration (FIGS. 23 to 32) to be described later as a concrete example. In the meantime, FIGS. 24 to 30 are enlarged perspective views schematically showing the surroundings of the stepped portion 91 of the third lens retaining frame rotation base 95 of the third lens retaining frame 31 for explaining actions of the stepped portion 91 and the third group female screw member 35 (contact portion 35a). In order to facilitate understanding of the actions, these drawings illustrate only the contact portion 35a in terms of the third group female screw member 35 configured to move in a front-back direction in tandem with a linear movement in the front-back direction. Furthermore, FIG. 31 is a schematic perspective view showing a movement of the third lens retaining frame 31 on the lens barrel base 82 (retainer plate 81) and FIG. 32 is a schematic perspective view showing a movement of the third lens retaining frame 31 inside the fixation frame 21 (fixed cylinder portion 21a). FIGS. 31 and 32 depict the third lens retaining frame 31 in the states shown in FIGS. 25 to 30 in a superposed manner and the third lens retaining frames 31 in FIGS. 25 to 31 are assigned reference numerals 31-1 to 31-6, respectively. Moreover, in order to facilitate understanding, illustration of the compression torsion spring 88 is omitted and the constituents other than the third lens retaining frame 31 and the cam mechanisms are masked in FIGS. 25 to 30.

In the lens barrel 10 of the first embodiment, the third lens retaining frame 31 functioning as the retractable lens retaining frame is moved in a manner different from those in the related art. Accordingly, the cam structures to achieve such movement also have different configurations from the conventional ones. Hereinafter, a concept of the manner of the movement of the third lens retaining frame 31 will be described to begin with.

As shown in FIG. 22, according to the lens barrel 10 of this embodiment, a housing position of the third lens retaining frame 31 as the retractable lens retaining frame is set as close as possible to the lens barrel base 82 (to the focal position (imaging plane)) where the solid-state image sensing device 16 is provided so as to reduce the thickness dimension (length dimension in the photographing optical axis OA direction) of the retractable lens housing 21b that functions as the retractable lens housing located inside the fixation frame 21 and outside the fixed cylinder portion 21a. In other words, in the lens barrel 10, the space located in the direction orthogonal to the photographing optical axis OA relative to the fourth lens group 14 and the solid-state image sensing device 16 is utilized as the space for housing the third lens group 13 (third lens retaining portion 93) serving as the retractable lens. Therefore, in the lens barrel 10 according to an embodiment of the present invention, it is possible to locate the retractable lens retaining frame in the stored state close to the base member in an amount equivalent to a length dimension obtained by adding the length dimension corresponding to the thickness dimension of the member (fourth lens retaining frame 41) located closer to the imaging plane than the retractable lens retaining frame (third lens retaining frame 31) in the photographing optical system to the length dimension corresponding to the thickness dimension of the solid-state image sensing device 16 at the maximum when viewed in the photographing optical axis OA direction.

In the lens barrel 10, the third lens retaining frame 31 is moved between a position (hereinafter also referred to as an on-axis position Pa) on the photographing optical axis OA and a position (hereinafter also referred to as a retracted position Ps) housed inside the retractable lens housing 21b. For hosing the third lens retaining frame 31 in the retracted position Ps, the movement of the third lens retaining frame 31 includes at least a movement in a direction inclined relative to the photographing optical axis OA direction and a movement in the direction orthogonal to the photographing optical axis OA.

In the first embodiment, when the third lens retaining frame 31 is directed from the on-axis position Pa to the retracted position Ps, the third lens retaining frame 31 is firstly moved in the direction inclined relative to the photographing optical axis OA direction so as to approach the lens barrel base 82 (see an arrow A1), and is then moved in the direction orthogonal to the photographing optical axis OA so as to enter the retractable lens housing 21b (see an arrow A2). In order to facilitate understanding, FIG. 22 schematically shows a movement of the portion (third lens retaining portion 93 to be described later which is configured to retain the third lens group 13 in the first embodiment) in the retractable lens retaining frame (third lens retaining frame 31 in the first embodiment).

The retractable lens retaining frame is moved as described above due to the following reason. In the lens barrel 10 (photographing optical system thereof), if the third lens retaining frame 31 is located in the on-axis position Pa, then the fourth lens retaining frame 41 and the solid-state image sensing device 16 to be located on the photographing optical axis OA are present on the lens barrel base 82 side (imaging plane side) of the third lens retaining frame 31. Meanwhile, in the lens barrel 10 (photographing optical system thereof), the retractable lens housing 21b is formed outside the movable lens barrel (inside the fixation frame 21 and outside the fixed cylinder portion 21a). Accordingly, if the third lens retaining frame 31 is housed in the retractable lens housing 21b and is located in the retracted position Ps, either a position or a lower end 22f (an end on the imaging plane side) of the first rotary cylinder 22 in the extended state located in the outermost position of the movable cylinder or a front wall portion 21f of the fixation frame 21 for forming a front side wall surface of the retractable lens housing 21b is present on the subject side of the third lens retaining frame 31. For this reason, the movement of the third lens retaining frame 31 between the on-axis position Pa and the retracted position Ps may incur an interference of a lower end portion of the third lens retaining frame 31 with any of the fourth lens retaining frame 41 and the solid-state image sensing device 16, and may also incur an interference of an upper end portion of the third lens retaining frame 31 with any of the lower end 22f of the first rotary cylinder 22 and the front wall portion 21f of the fixation frame 21.

Here, in light of suppression the size dimension (thickness dimension) in the photographing optical axis OA direction of the lens barrel 10, it is appropriate to set the thickness dimension of the retractable lens housing 21b (housing space thereof) equal to the smallest height dimension that enables to house the third lens retaining frame 31 being the retractable lens retaining frame. However, as described above, the upper end portion and the lower end portion of the third lens retaining frame 31 serving as the retractable lens retaining frame may incur interferences in the course of the movement between the on-axis position Pa and the retracted position Ps. Nevertheless, if the thickness dimension of the retractable lens housing is further reduced, then it is not possible to move the third lens retaining frame 31 serving as the retractable lens retaining frame between the on-axis position Pa and the retracted position Ps. Here, a conceivable solution is to move the third lens retaining frame 31 (in a zigzag manner) so as to trace the contours of the fourth lens retaining frame 41 and the solid-state image sensing device 16 located on the lens barrel base 82 side (imaging plane side). However, such a complicated movement may lead to complication of the cam structures in order to convert the movement of the third group female screw member 35 in the photographing optical axis OA direction into the back and forth movement of the third lens retaining frame 31 and the straight movement along the third group main guide shaft 32. In addition, the complicated movement causes an increase in time required for the movement between the on-axis position Pa and the retracted position Ps.

For this reason, in the lens barrel 10 of the first embodiment, the third lens retaining frame 31 located on the on-axis position Pa is moved toward the lens barrel base 88 in the direction inclined relative to the photographing optical axis OA direction (see the arrow A1) to pass through a space between the lower side (imaging plane side) constituents of the fourth lens retaining frame 41 and the solid-state image sensing device 16, and the upper side (subject side) constituents of the first rotary cylinder 22 and the fixation frame 21 without interfering with any of these constituents. Hence, the third lens retaining frame 31 is retracted downward (to the imaging plane side) toward the lens barrel base 82. A position where the third lens retaining frame 31 is set back in the photographing optical axis OA direction as a result of this movement in the inclined direction (see the arrow A1) will be hereinafter also referred to as a set-back position Pr. Thereafter, the third lens retaining frame 31 located in the set-back position Pr is moved in the direction orthogonal to the photographing optical axis OA (see the arrow A2). In this way, the third lens retaining frame 31 is allowed to enter the retractable lens housing 21b while being kept close to the lens barrel base 82 viewed in the photographing optical axis OA direction, and then to move to the retracted position Ps. As described above, according to the lens barrel 10 of this embodiment, the third lens retaining frame 31 is firstly moved from the on-axis position Pa to the set-back position Pr in the inclined direction (see the arrow A1), and is then moved from the set-back position Pr to the retracted position Ps in the orthogonal direction (see the arrow A2). In this way, the third lens retaining frame 31 can be housed in the retractable lens housing 21b while being close to the lens barrel base 82 without interfering with the other constituents of the photographing optical system.

Here, the movement of the third lens retaining frame 31 located in the retracted position Ps onto the photographing optical axis OA might be attempted only by means of the straight movement. However, if the third lens retaining frame 31 is moved while preventing the interference with the fourth lens retaining frame 41 and the solid-state image sensing device 16, for example, then the upper end portion interferes with the first rotary cylinder 22 (lower end 22f) and the fixation frame 21 (front wall portion 210 as indicated with a chain double-dotted line L1. In order to prevent the interference, it is necessary to displace the first rotary cylinder 22 and the fixation frame 21 either above or sideways outside the trajectory (see the chain double-dotted line L1) drawn by the upper end portion when moving the third lens retaining frame 31. Accordingly, the increase in the thickness dimension of the retractable lens housing 21b or an increase in a diametrical dimension of the fixed cylinder portion 21a (movable lens barrel (first rotary cylinder 22)) is incurred.

On the other hand, according to the lens barrel 10 of the first embodiment, the third lens retaining frame 31 is moved in the inclined direction (see the arrow A1) from the on-axis position Pa to the set-back position Pr and is then moved in the orthogonal direction (see the arrow A2) from the set-back position Pr to the retracted position Ps. In this way, it is possible to house the third lens retaining frame 31 into the retractable lens housing 21b in the state of being close to the lens barrel base 82 without interfering with the other members of the photographing optical system and without causing the increase in the thickness dimension of the retractable lens housing 21b or the increase in the diametrical dimension of the fixed cylinder portion 21a.

In this lens barrel 10, the third lens retaining frame 31 is connected to the third group female screw member 35 by using the cam structures which are configured to enable execution of the movement of the third lens retaining frame 31 from the on-axis position Pa to the set-back position Pr and the movement from the set-back position Pr to the retracted position Ps. As for the cam structures in the lens barrel 10 of the first embodiment, the third group female screw member 35 is provided with the contact portion 35a serving as a cam pin (see FIG. 15 and the like) while the third lens retaining frame (third lens retaining frame rotation base 95 to be described later) is provided with the stepped portion 91 serving as the cam groove and with a beveled portion 92 for a cam surface on the retaining frame side (see FIG. 23 and the like). Moreover, the retainer plate 81 (lens barrel base 82) for supporting the third group main guide shaft 32 is provided with curved protrusions 83 (see FIG. 24 and the like) for cam surfaces on the base side.

Figure 23:
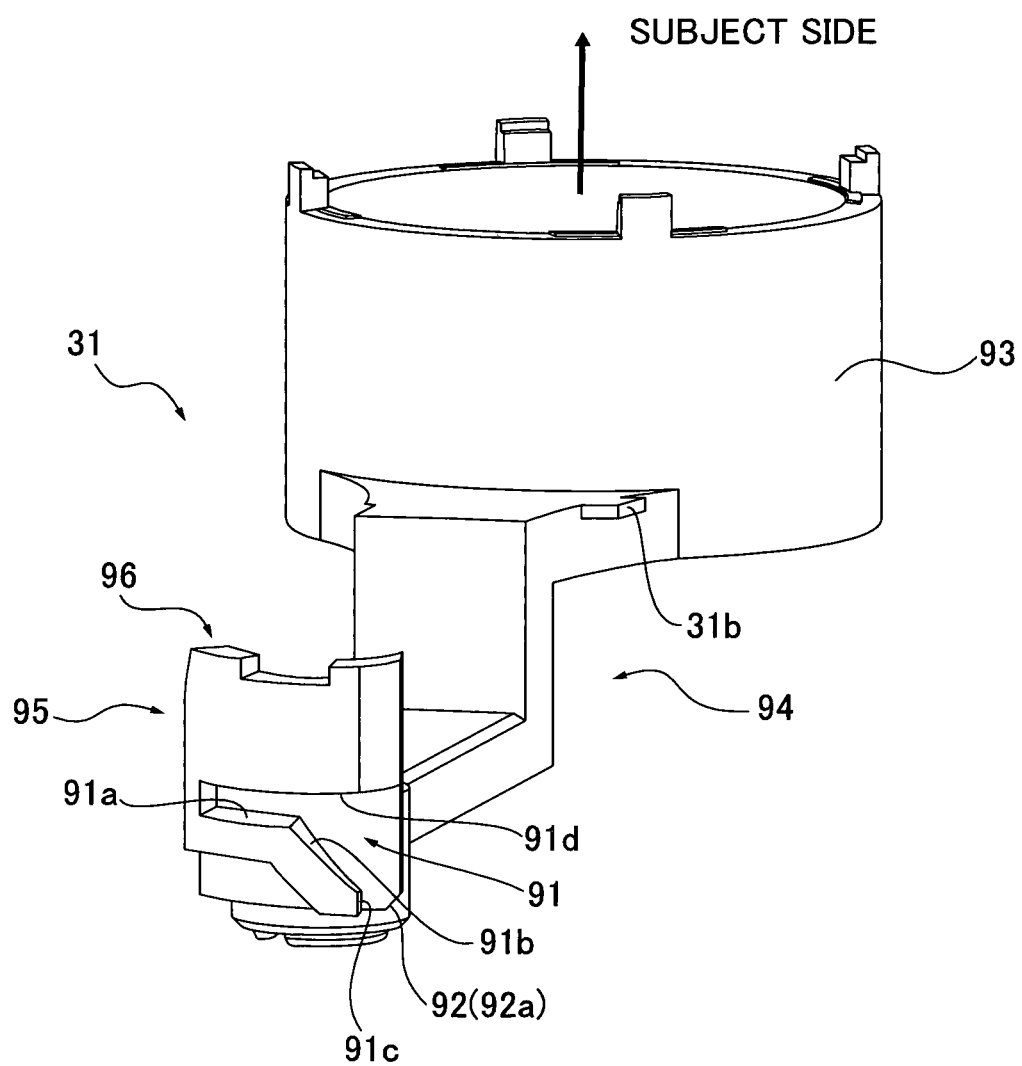
FIG. 23 is a schematic perspective view for explaining a configuration of the third lens retaining frame 31.

As shown in FIG. 23, the third lens retaining frame 31 which is provided with this stepped portion 91 and the beveled portion 92 also includes the third lens retaining portion 93, the third lens retaining frame arm portion 94, and the third lens retaining frame rotation base 95.

The third lens retaining portion 93 is located on one end side of the third lens retaining frame 31 and is capable of retaining the third lens group 13. This third lens retaining portion 93 is a frame member which exhibits a cylindrical shape as a whole. One end side of the third lens retaining frame arm portion 94 is connected to this third lens retaining portion 93.

The third lens retaining frame arm portion 94 links the third lens retaining portion 93 with the third lens retaining frame rotation base 95, thereby constituting an arm portion in the third lens retaining frame 31. This third lens retaining frame arm portion 94 forms a crack-shaped bent portion as a whole in which an intermediate position extends in a parallel direction to the third group main guide shaft 32. The third lens retaining frame rotation base 95 is connected to another end thereof.

The third lens retaining frame rotation base 95 exhibits a cylindrical shape as a whole, and is supported by the third group main guide shaft 32 so as to be rotatable and to be movable in the photographing optical axis OA direction (see FIGS. 7 and 8). As described previously, this third lens retaining frame rotation base 95 is constantly and rotationally biased in the rotating direction from the stored position (collapsed stored state D) toward the photographing position (photographing state P) on the photographing optical axis OA by the compression torsion spring 37 (see FIG. 16A). Moreover, the third lens retaining frame rotation base 95 is constantly and straightforwardly biased on the third group main guide shaft 32 in the direction from the object side toward the retainer plate 81 on the imaging plane side (to the left side in FIG. 14A when viewed from front). The rotationally biased direction in terms of this third lens retaining frame rotation base 95 is indicated with an arrow A3 in FIG. 24. In this way, the compression torsion spring 37 functions as cylindrical body biasing means for applying the biasing force to the third lens retaining frame rotation base 95 serving as a rotating cylindrical body that constitutes a rotation base of the third lens retaining frame 31 serving as the retractable lens retaining frame.

This third lens retaining frame rotation base 95 is provided with a curved wall portion 96 in a cylindrical shape, which is formed by curving a plate member around an axis line of the third group main guide shaft 32 as the center (see FIG. 16 and the like). This curved wall portion 96 is provided with the stepped portion 91 recessed from an outer peripheral surface of the cylinder. This stepped portion 91 is provided with the rear engagement surface 91a, the cam surface 91b and the side engagement surface 91c on its base end side (imaging plane side), and the front engagement surface 91d on its subject side. The engagement surface 91a is a flat surface substantially perpendicularly intersecting the photographing optical axis OA, the cam surface 91b is in a cam slope shape connected to a right end of the engagement surface 91a, and the side engagement surface 91c is connected to a lower end thereof the cam surface 91b extends in the photographing optical axis OA direction. The front engagement surface 91d is a flat surface substantially perpendicularly intersecting the photographing optical axis OA. In the first embodiment, the right side of the stepped portion 91 in FIG. 23 viewed from front is opened in order to facilitate an assembly work.

Moreover, the curved wall portion 96 is provided with a pair of beveled portions 92 (one of which is not shown). These two beveled portions 92 are formed by cutting corners on the lower end of the curved wall portions 96. Hence the beveled portions 92 define flat retaining frame side inclined surfaces 92a serving as retaining frame side cam surfaces. The respective retaining frame side inclined surfaces 92a of both of the beveled portions 92 are able to come into contact with on base side inclined surfaces 83a to be described below, which are defined by the curved protrusions 83, as the third lens retaining frame 31 moves along the third group main guide shaft 32 (see FIG. 24). Specifically, the retaining frame side inclines surfaces 92a of both of the beveled portions 92 are respectively opposed to the base side inclined surfaces 83a of the curved protrusions 83 in the photographing optical axis OA direction when the third lens retaining frame 31 is located between the wide-angle position W and the retraction start position B (see FIG. 14A).

Figure 24:
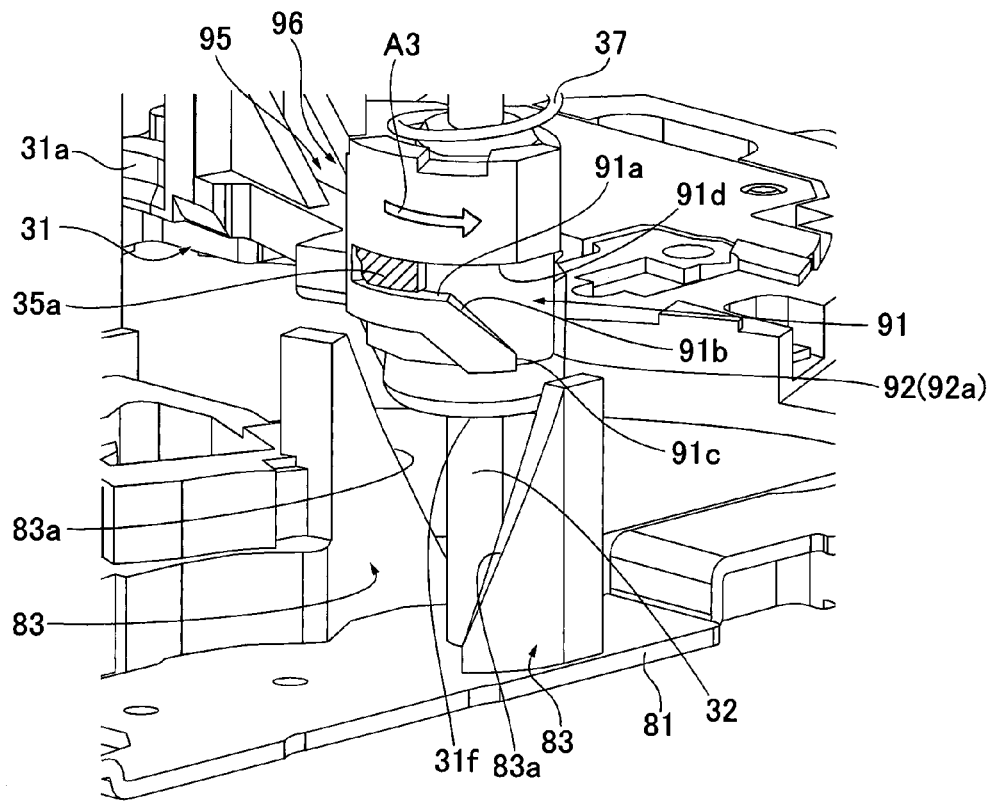
FIG. 24 is a schematic enlarged perspective view for explaining an operation of a cam mechanism of the third lens retaining frame 31 and shows a stepped portion 91 of a third lens retaining frame rotation base 95 of the third lens retaining frame 31 and its surroundings.
Figure 25:
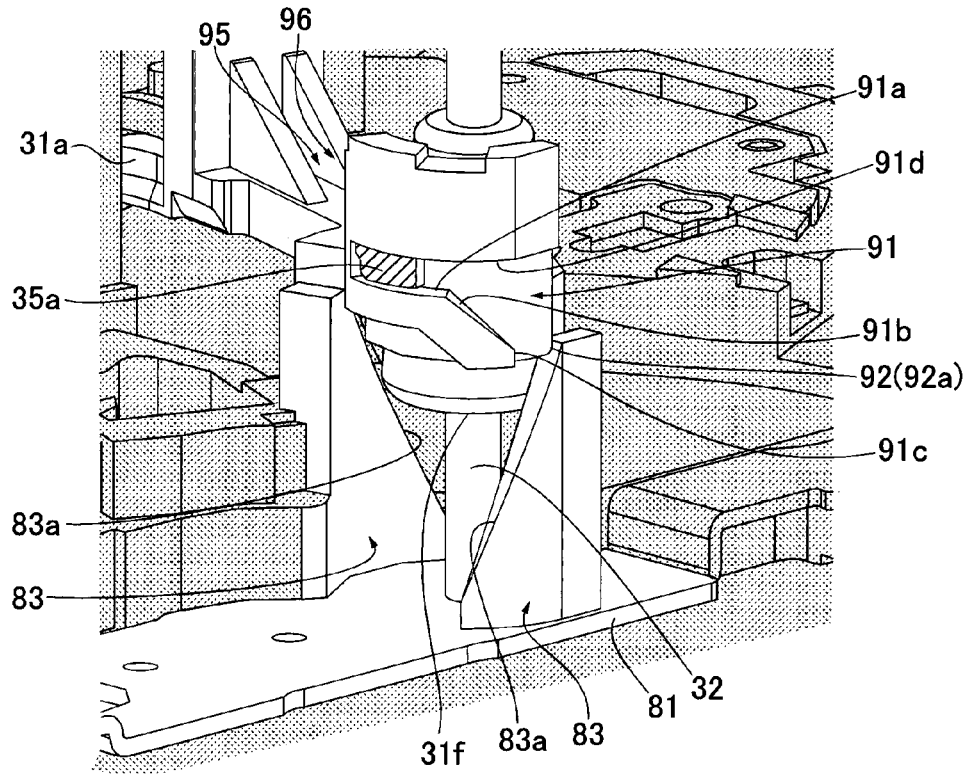
FIG. 25 is a perspective view similar to FIG. 24, and shows a state after FIG. 24 in the process of retracting the third lens retaining frame 31.

As shown in FIG. 24, the curved protrusions 83 are provided so as to protrude from the retainer plate 81 which serves as the base member configured to support the base end of the third group main guide shaft 32. These curved protrusions 83 exhibit the cylindrical shape which is formed by curving the plate member around the axis line of the third group main guide shaft 32 as the center, and are provided as the pair provided with an interval with the third group main guide shaft 32 and disposed around the axis line thereof. Both of the curved protrusions 83 are cut out in the direction inclined relative to the photographing optical axis OA as a whole, and the flat surfaces thus cut define the base side inclined surfaces 83a serving as the cam surfaces. These base side inclined surfaces 83a contain a radial direction of a rotating axis of the third lens retaining frame 31, and are also inclined relative to the direction of the rotating axis (direction of extension of the third group main guide shaft 32 (photographing optical axis OA direction)) so as to set back to a negative side in the rotationally biased direction (see the arrow A3) as the base side inclined surfaces 83a come closer to the retainer plate 81.

Next, actions when the third lens retaining frame 31 in the lens barrel 10 is rotated between the photographing position (photographing state P) where the third lens group 13 is inserted to the photographing optical axis OA and the stored position (collapsed stored state D) where the third lens group 13 is housed into the retractable lens housing 21b will be described with reference to FIGS. 14A, 22, and FIGS. 24 to 32.

As described previously, the third lens retaining frame rotation base 95 is rotated upon receipt of the pressing force from the third group female screw member 35a which is moved straight in the photographing optical axis OA direction (front-back direction) due to the sliding action between the stepped portion 91 provided on the outer peripheral surface of the third lens retaining frame rotation base 95 and the contact portion 35a of the third group female screw member 35 accepted by the stepped portion 91. Accordingly, the stepped portion 91 functions as the cam groove while the contact portion 35a the third group female screw member 35 functions as the cam pin.

The third lens retaining frame rotation base 95 is moved vertically along the third group main guide shaft 32 or is rotated around the third group main guide shaft 32 by the contact portion 35a of the third group female screw member 35, which serves as the cam pin configured to be moved in the front-back direction inside the stepped portion 91 serving as the cam groove. An action of the third lens retaining frame rotation base 95 relative to the position of the contact portion 35a inside the stepped portion 91 being the cam groove in this case will now be explained.

As described previously, the third group lead screw 34 is rotated clockwise via the gear mechanism formed of the gears 71 to 74 by rotating the third group motor 52 in the counterclockwise direction in FIG. 14 (in the clockwise direction when viewed from the front side of the lens barrel). Accordingly, the third group female screw member 35 moves from the storage position S to the subject side on the third group lead screw 34 along the photographing optical axis OA direction, and reaches the telescopic position T (see FIG. 14A) via the wide-angle position W. On the other hand, by rotating the third group motor 52 in the clockwise direction, the third group female screw member 35 moves from the telescopic position T to the imaging plane side on the third group lead screw 34 along the photographing optical axis OA direction, and reaches the storage position S via the wide-angle position W. In the lens barrel 10, by moving the third group female screw member 35 on the third group lead screw 34 as described above, the third lens group 13 (third lens retaining portion 93) is moved between the storage position (retracted position Ps (collapsed stored state D)) in the retractable lens housing 21b and the photographing position (on-axis position Pa (photographing state P)) on the photographing optical axis OA, and is also moved to an arbitrary position on the photographing optical axis OA.

When the third group female screw member 35 is moved in front of the retraction start position B (on the object side and on an upper side when viewed from front) (see FIG. 14A), the contact portion 35a comes into contact with the front engagement surface 91d as shown in FIG. 24. At this time, since the third lens retaining frame rotation base 95 is rotationally biased in the direction of the arrow A3 by the compression torsion spring 37, the contact portion 35a (an upper surface thereof) is in contact with the front engagement surface 91d at an end on the left side in the drawing. In this state, the stopper 31a of the third lens retaining frame 31 is in contact with the third group sub-guide shaft 33 owing to the rotational bias (see the arrow A3) whereby the third group female screw member 35 is located on the photographing optical axis OA (see FIG. 8 and the like). In this state, if the third group female screw member 35 is moved further forward (on the subject side) (to the wide-angle position W or the telescopic position T, for example (see FIG. 14A)), the contact portion 35a (upper surface thereof) presses the front engagement surface 91d forward so as to push up the third lens retaining frame rotation base 95 forward. Accordingly, the third lens group 13 is moved toward the subject (object) side appropriately on the photographing optical axis OA.

When the third group female screw member 35 is moved to the rear of the retraction start position B (on the imaging plane side and on a lower side when viewed from front) (see FIG. 14A), the third lens retaining frame rotation base 95 (third lens retaining frame 31) approaches the retainer plate 81 in accordance with the height position of the contact portion 35a (third group female screw member 35) in contact with the front engagement surface 91d. Upon retraction to a predetermined height position, the retaining frame side inclined surfaces 92a of the beveled portions 92 come into contact with upper ends of the base side inclined surfaces 83a of the curved protrusions 83 provided on the retainer plate 81.

Figure 26:
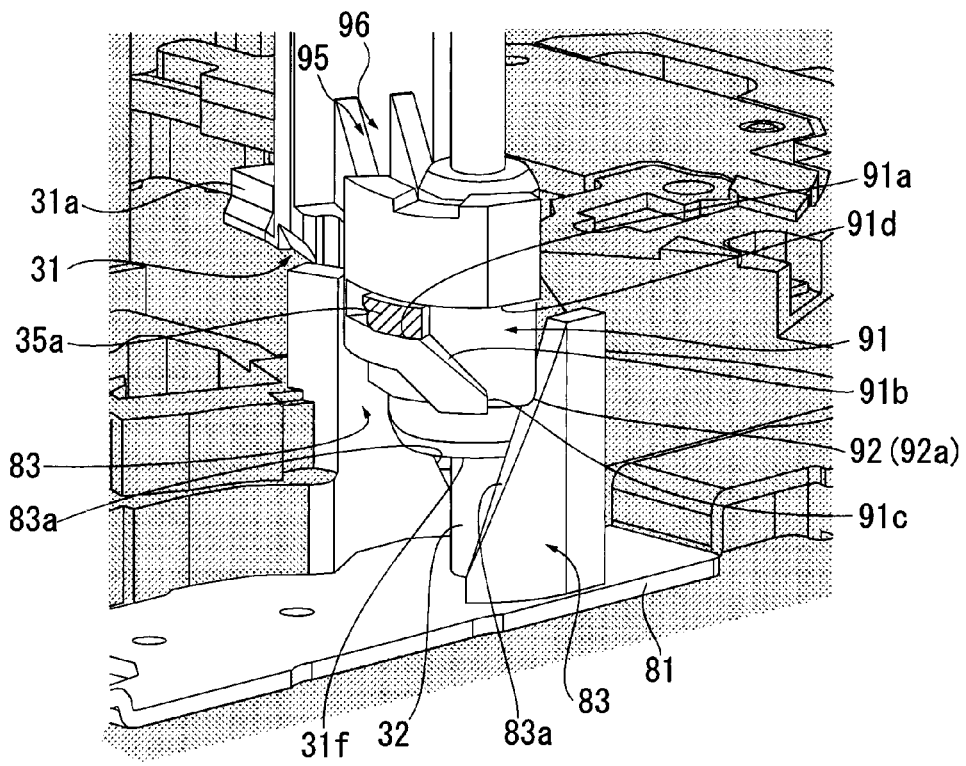
FIG. 26 is a perspective view similar to FIGS. 24 and 25, and shows a state after FIG. 25 in the process of retracting the third lens retaining frame 31.
Figure 27:
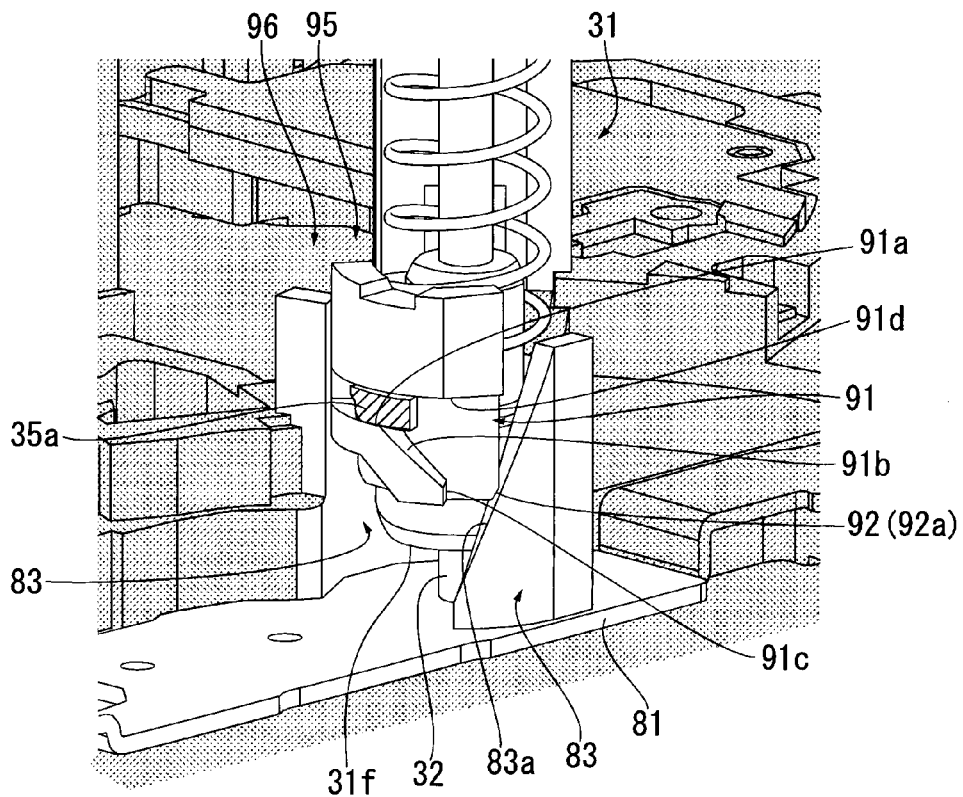
FIG. 27 is a perspective view similar to FIGS. 24 to 26, and shows a state after FIG. 26 in the process of retracting the third lens retaining frame 31.
Figure 28:
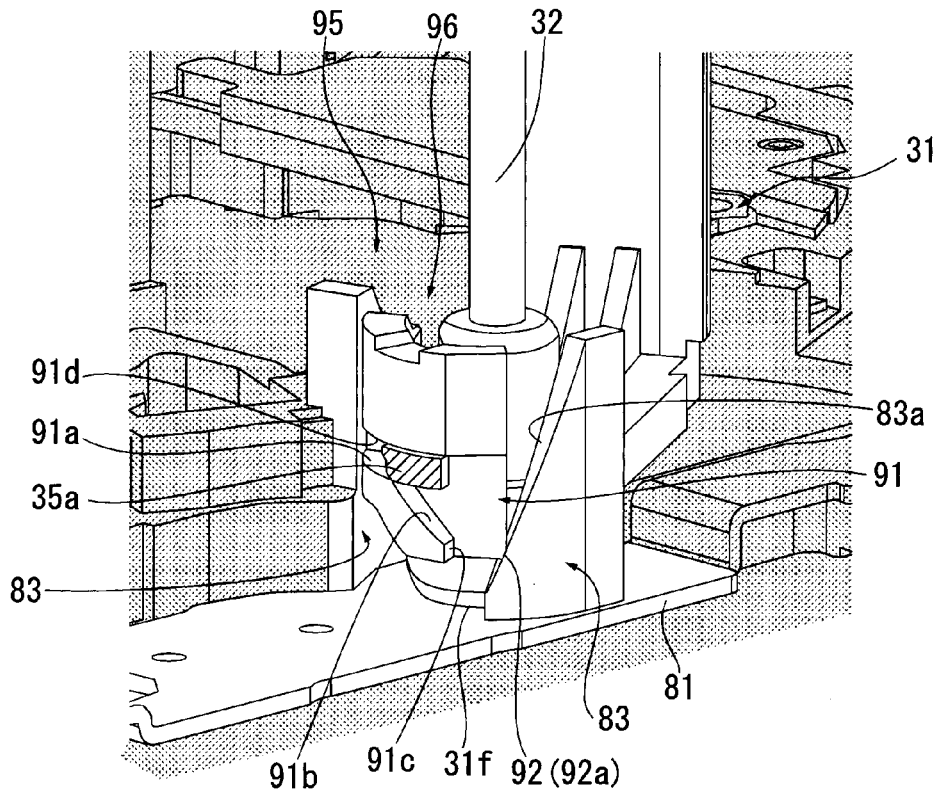
FIG. 28 is a perspective view similar to FIGS. 24 to 27, and shows a state after FIG. 27 in the process of retracting the third lens retaining frame 31.

When the third group female screw member 35 is moved further backward from this position (to the imaging plane side), the upper surface of the contact portion 35a is detached from the front engagement surface 91d. Instead, a lower surface of the contact portion 35a comes into contact with the rear engagement surface 91a so as to press (push down) the rear engagement surface 91a (see FIG. 26). When the rear engagement surface 91a is pushed down due to the backward movement of this contact portion 35a, the third lens retaining frame rotation base 95 is rotated against the rotational biasing force and is pushed down so as to correspond to the height position of the contact portion 35a as shown in the order of FIG. 26, FIG. 27, and FIG. 28 attributable to the pressing force and guiding actions of the base side inclined surfaces 83a of the curved protrusions 83 and the retaining frame side inclined surfaces 92a of the beveled portions 92. As the third lens retaining frame rotation base 95 are rotated and pushed down as described above, the third lens retaining frame 31 retracts the third lens group 13 from the position on the photographing optical axis OA toward the retracted position sequentially as indicated with reference numerals 31-1, 31-2, and 31-3 in FIGS. 31 and 32 along the photographing optical axis OA while rotating the third lens group 13 around the third group main guide shaft 32. Accordingly, when the base side inclined surface 83a is sliding on the retaining frame side inclined surface 92a by this contact portion 35a pushing down the rear engagement surface 91a, the third lens retaining frame 31 is moved obliquely backward (to the imaging plane side) in the photographing optical axis OA direction and thereby moved from the on-axis position Pa to the set-back position Pr in the inclined direction (see the arrow A1 in FIG. 22). At this time, the third lens retaining frame rotation base 95 is rotated. Accordingly, the position of the contact portion 35a in the stepped portion 91 moves (slides) from an end on a left side in the drawings (see FIGS. 25 and 26) on the rear engagement surface 91a to an end on a right side in the drawing (see FIG. 28) thereon.

Figure 29:
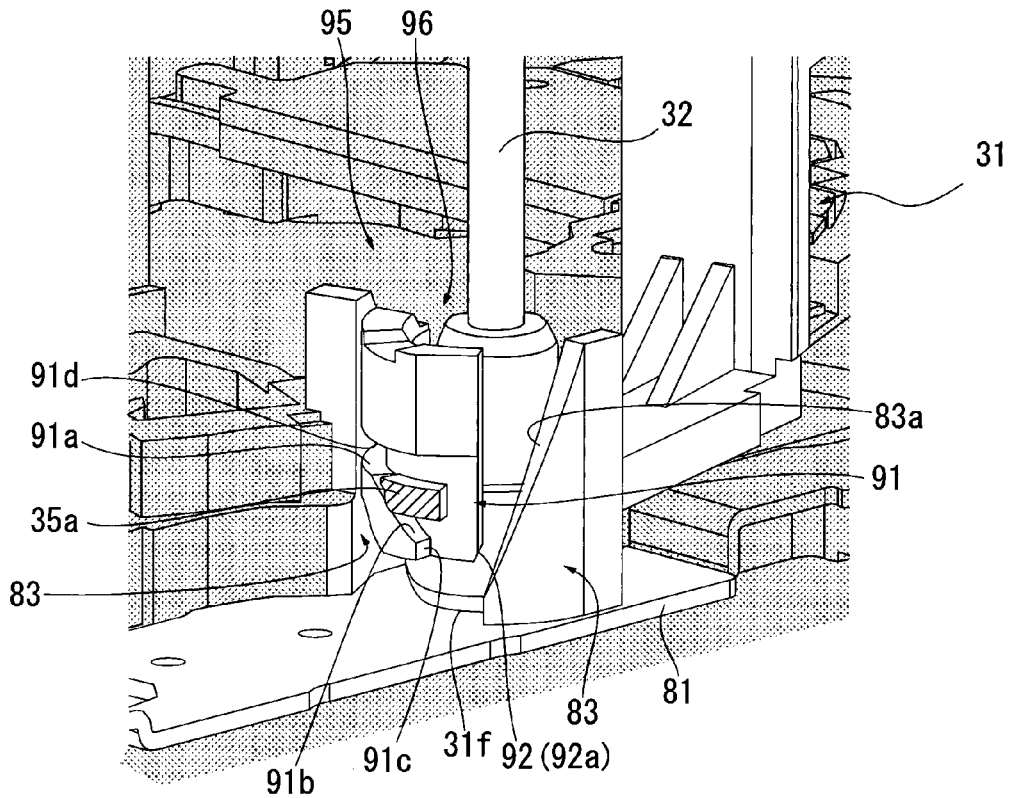
FIG. 29 is a perspective view similar to FIGS. 24 to 28, and shows a state after FIG. 28 in the process of retracting the third lens retaining frame 31.

When the third group female screw member 35 is moved backward (to the imaging plane side) from this position, the contact position of the contact portion 35a in the stepped portion transitions from the rear engagement surface 91a to the cam surface 91b (see FIGS. 28 and 29). The contact portion 35a starts pressing the cam surface 91b backward as the third group female screw member 35 is moved backward (to the imaging plane side) from this position. At this time, the third lens retaining frame rotation base 95 is not pushed down because a base end surface 31f of the third lens retaining frame 31 (third lens retaining frame rotation base 95) comes into contact with the retainer plate 81. For this reason, when the contact portion 35a presses the cam surface 91b backward, the third lens retaining frame rotation base 95 is rotated against the rotational biasing force in the position contacting the retainer plate 81 so as to correspond to the height positions of the contact portion 35a as shown in the order of FIGS. 28, 29, and 30 by the pressing force and guiding actions of the contact portion 35a and the cam surface 91b. Hence the retaining frame side inclined surfaces 92a of the beveled portions 92 are detached from the base side inclined surfaces 83a of the curved protrusions 83 (see FIG. 29).

When the third group female screw member 35 is moved backward (to the imaging plane side) from this position to the storage position S (see FIG. 14A), the contact position of the contact portion 35a in the stepped portion 91 transitions from the cam surface 91b to the side engagement surface 91c (see FIGS. 29 and 30). When the third group female screw member 35 is retracted to the position where this contact portion 35a comes into contact with the side engagement surface 91c, the contact portion 35a (side surface thereof) comes into contact with the side engagement surface 91c so as to press (to be engaged with) each other as the third lens retaining frame rotation base 95 is rotationally biased (see the arrow A3 in FIG. 24), thereby fixing a rotational posture of the third lens retaining frame rotation base 95. When the third lens retaining frame rotation base 95 is rotated as shown in the order of from FIGS. 28 to 30, the third lens retaining frame 31 rotates the third lens group 13 that the third lens retaining frame 31 is retaining around the third group main guide shaft 32 toward the retracted position as sequentially indicated with reference numerals 31-4, 31-5, and 31-6 in FIGS. 31 and 32. Accordingly, while this contact portion 35a is pressing and sliding on the cam surface 91b, the third lens retaining frame 31 is moved in the direction orthogonal to the photographing optical axis OA and then is moved from the set-back position Pr to the retracted position Ps in the orthogonal direction (see the arrow A2 in FIG. 22). Meanwhile, while the contact portion 35a is being engaged with the side engagement surface 91c, the third lens retaining frame 31 is located in the retracted position Ps (storage position) in the collapsed stored state D.

As described above, according to the lens barrel 10 of the first embodiment, the retractable lens housing 21b is designed to have a minimum requisite thickness dimension in order to house the third lens group 13 serving as the retractable lens in the state close to the lens barrel base 82, and this retractable lens housing 21b is provided inside the fixation frame 21 and outside the fixed cylinder portion 21a. Hence it is possible to set the thickness dimension on the outside smaller than the fixed cylinder portion 21a of the fixation frame 21. This is because a position on the photographing optical axis OA of the photographing optical system (lens groups and the like) with respect to the solid-state image sensing device 16 is appropriately set in the lens barrel 10, whereby one reference end of the thickness dimension is defined by the base member (retainer plate 81 and the lens barrel base 82) where the solid-state image sensing device 16 is provided. In other words, it is possible to utilize the space located in the direction orthogonal to the photographing optical axis OA relative to the fourth lens group 14 and the solid-state image sensing device 16 as the space for housing the third lens group 13 (third lens retaining portion 93) being the retractable lens. Hence it is possible to reduce the thickness dimension on the outside smaller than the fixed cylinder portion 21a of the fixation frame 21. Here, when the lens barrel 10 is applied to a camera, for example, it is possible to reduce impression of the thickness in a design perspective even if there is in fact a slightly large thickness dimension concerning the portion of the lens barrel where the photographing optical system is provided. Nevertheless, the thickness dimension on the outside of the fixation cylinder may cause an increase in the thickness dimension of a body of the camera or may cause design restriction around of the lens barrel. Hence reduction in the thickness dimension of the retractable lens housing 21b can significantly contribute to downsizing and improve design freedom as well.

Moreover, according to the lens barrel 10 of the first embodiment, the third lens retaining frame 31 being the retractable lens retaining frame is configured to move the third lens group 13 (third lens retaining portion 93) being the retractable lens from the on-axis position Pa to the set-back position Pr in the inclined direction (arrow A1) and then to move the third lens group 13 from the set-back position Pr to the retracted position Ps in the orthogonal direction (arrow A2). Therefore, it is possible to house the third lens group 13 (third lens retaining portion 93) into the retractable lens housing 21b having the minimum requisite thickness dimension so as to house the third lens group 13 in the state close to the lens barrel base 82 without causing any interferences with other members of the photographing optical system. In other words, by employing the configuration to move the third lens group 13 in the inclined direction and then in the orthogonal direction, it is possible to reduce the thickness dimension of the retractable lens housing 21b. Particularly, the thickness dimension based on the base member (lens barrel base 82) is increased when the solid-state image sensing device 16 is provided movably in the direction orthogonal to the photographing optical axis OA on the base member (lens barrel base 82) by way of an image stabilization mechanism of a photographing element drive type. In this case, the above-described movements can contribute significantly to reduction in the thickness dimension of the retractable lens housing 21b.

Furthermore, the lens barrel 10 of the first embodiment is configured to be able to control the height position in the photographing optical axis OA direction of the contact portion 35a of the third group female screw member 35. Moreover, the cam structures configured to connect the third lens retaining frame 31 to the third group female screw member 35 are formed by providing the third lens retaining frame 31 with the stepped portion 91 and the beveled portions 92 while providing the retainer plate 81 with the curved protrusions 83. Therefore, it is possible to move the third lens group 13 (third lens retaining portion 93) serving as the retractable lens from the on-axis position Pa to the set-back position Pr in the inclined direction and from the set-back position Pr to the retracted position Ps in the orthogonal direction by using the simple configuration.

In the lens barrel 10 of the first embodiment, the retractable lens housing 21b is provided inside the fixation frame 21 and outside the fixed cylinder portion 21a, or in other words, outside the movable lens barrel. Hence it is possible to reduce the outside diameter of the fixed cylinder portion 21a.

In the lens barrel 10 of the first embodiment, the curved protrusions 83 (base side inclined surfaces 83a) for moving the third lens group 13 (third lens retaining portion 93) being the retractable lens in the inclined direction are configured to be able to surround the third lens retaining frame rotation base 95 inserted to the third group main guide shaft 32. Hence it is possible to increase the degree of freedom of setting the amount of movement in the photographing optical axis OA direction associated with the movement in the inclined direction. This configuration enables to increase the degree of freedom of setting the retraction start position of the third lens group 13 (third lens retaining portion 93) being the retractable lens from the photographing optical axis OA. Hence it is possible to improve the design freedom of the photographing optical system.

In the lens barrel 10 of the first embodiment, the on-axis position Pa being the retraction start position of the third lens group 13 (third lens retaining portion 93) serving as the retractable lens is set closer to the imaging plane side than the lowest end position (closest position to the imaging surface side) in the photographing state P where the third lens retaining frame 31 (third lens group 13) is located on the photographing optical axis OA. Therefore, it is possible to move the third lens group 13 (third lens retaining portion 93) being the retractable lens from the on-axis position Pa to the set-back position Pr in the inclined direction and then from the set-back position Pr to the retracted position Ps in the orthogonal direction so as to house the third lens group 13 into the retractable lens housing 21b by using the cam structures having the simple configuration, and also to perform positional control on the photographing optical axis OA.

The lens barrel 10 according to the first embodiment is configured to move the third lens group 13 from the on-axis position Pa to the set-back position Pr in the inclined direction and then from the set-back position Pr to the retracted position Ps in the orthogonal direction so as to house the third lens group 13 into the retractable lens housing 21b. Therefore, it is possible to start retraction of the third lens group 13 (third lens retaining portion 93) being the retractable lens from the photographing optical axis OA in the position closer to the subject (object) than the retracted position Ps viewed in the photographing optical axis OA direction at the time of switching from the photographing state P to the collapsed stored state D.

In the lens barrel 10 of the first embodiment, when the third group female screw member 35 (contact portion 35a) is located in the storage position S, the retaining frame side inclined surfaces 92a serving as the retaining frame side cam surfaces are detached from the base side inclined surfaces 83a serving as the base side inclined surfaces, i.e., the contact is released. Hence it is possible to locate the height position of the third lens group 13 (third lens retaining portion 93) being the retractable lens inside the retractable lens housing 21b when viewed in the photographing optical axis OA direction to a preset position. This is due to the following reason. For example, assuming that the retaining frame side cam surfaces (retaining frame side inclined surfaces 92a) come into contact with the base side cam surfaces (base side inclined surfaces 83a) when the third group female screw member 35 is in the storage position S, the positions of contact between the retaining frame side cam surfaces and the base side cam surfaces may be displaced due to tolerances for respective components even if the third group female screw member 35 is in the storage position S. The retaining frame side cam surfaces and the base side cam surfaces are the inclined surfaces configured to move the third lens group 13 (third lens retaining portion 93) being the retractable lens to the retracted position Ps which is retracted from the on-axis position Pa to the imaging plane side when viewed in the photographing optical axis OA direction. Therefore, the displacement of the contact positions may affect the height position of the third lens group 13 (third lens retaining portion 93) being the retractable lens when viewed in the photographing optical axis OA direction. For this reason, by employing the configuration to release the contact between the retaining frame side inclined surfaces 92a serving as the retaining frame side cam surfaces and the base side inclined surfaces 83a serving as the base side cam surfaces when the third group female screw member 35 is located in the storage position S, it is possible to locate the height position of the third lens group 13 being the retractable lens inside the retractable lens housing 21b when viewed in the photographing optical axis OA direction to the preset position.

In the lens barrel 10 of the first embodiment, the third lens group 13 (third lens retaining portion 93) can be retracted into the retractable lens housing 21b while avoiding an interference with the fourth lens group 14 (fourth lens retaining frame 41) serving as the focusing lens located on the photographing optical axis OA. Hence it is possible to reduce the thickness dimension of the retractable lens housing 21b without changing the conventional configuration of the fourth lens group 14 (fourth lens retaining frame 41) enabled to move only on the photographing optical axis. As described above, since the change in the configuration of the fourth lens group 14 (fourth lens retaining frame 41) is not required, it is possible to reduce the thickness dimension of the retractable lens housing 211) and thereby to contribute to downsizing without damaging a conventional focus adjustment function.

Therefore, according to the lens barrel 10 of the first embodiment, it is possible to reduce the thickness dimension of the retractable lens housing 21b provided on the outside of the inside diameter of the movable lens barrel by employing the simple configuration.

Second Embodiment

Next, a lens barrel 10A according to a second embodiment of the present invention will be described with reference to FIGS. 33 to 43. This second embodiment represents an example of a third lens retaining frame 31A serving as a retractable lens, which has a different manner of movements from that of the lens barrel 10 of the first embodiment. Basic structures of the lens barrel 10A of this second embodiment are similar to those of the lens barrel 10 of the above-described first embodiment. Accordingly, the same constituents are denoted by the same reference numerals and detailed description thereof will be omitted. First, a concept of the manner of movements of the third lens retaining frame 31A will be described with reference to FIG. 33.

As similar to the lens barrel 10 of the first embodiment, the lens barrel 10A of the second embodiment is also configured to locate a housing position of the third lens retaining frame 31A serving as the retractable lens retaining frame as close as possible to the lens barrel base 82 side (to the focal position (imaging plane) side) where the solid-state image sensing device 16 is provided in order to reduce the thickness dimension (length dimension in the photographing optical axis OA direction) of the retractable lens housing 21b functioning as the retractable lens housing inside the fixation frame 21 and outside the fixed cylinder portion 21a. In other words, the space located in the direction orthogonal to the photographing optical axis OA relative to the fourth lens group 14 and the solid-state image sensing device 16 is utilized as the space for housing the third lens group 13 (third lens retaining portion 93) being the retractable lens.

Figure 33:
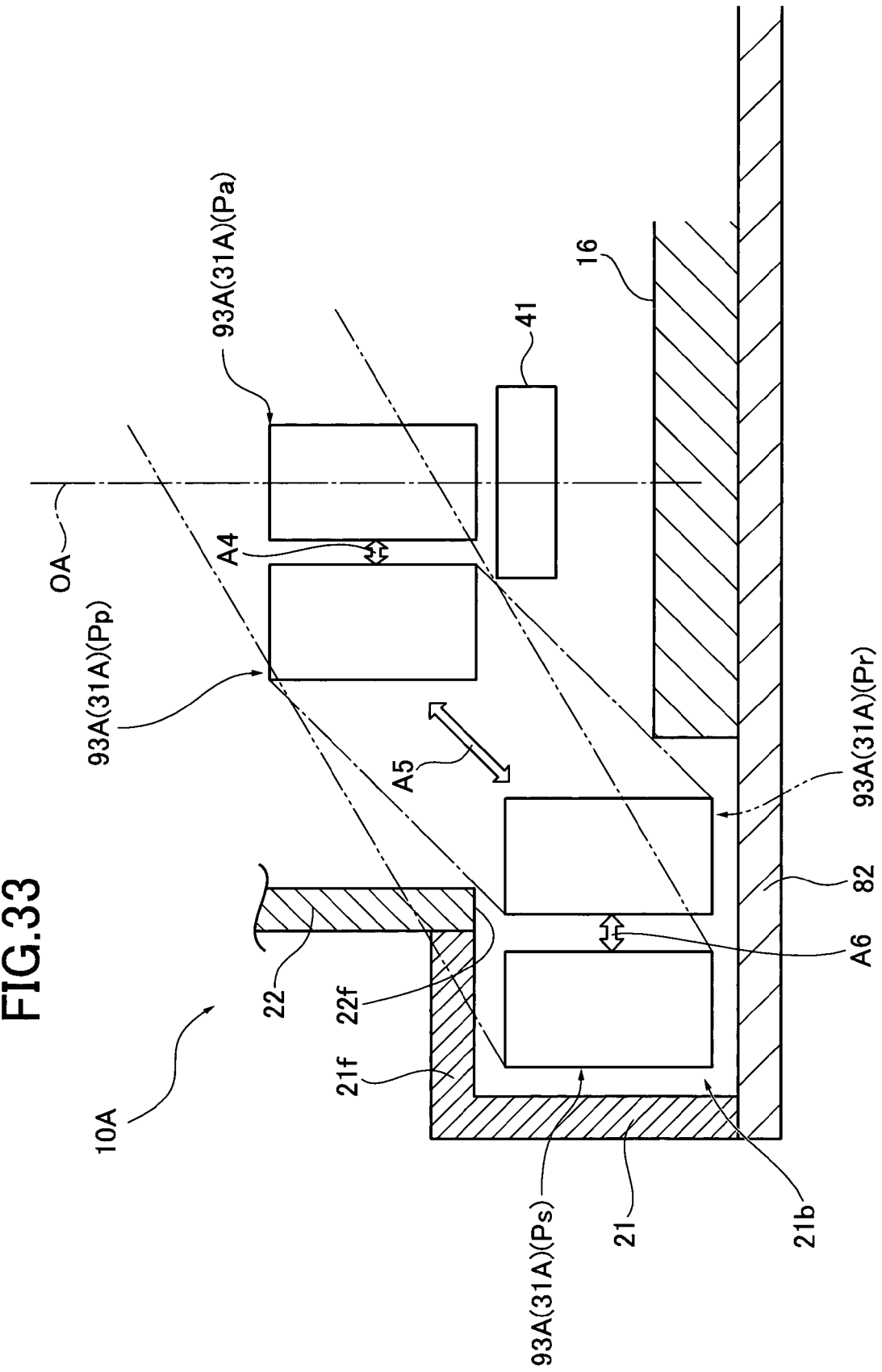
FIG. 33 is a schematic explanatory view similar to FIG. 22 showing a movement of a third lens retaining frame 31A in a lens barrel 10A according to a second embodiment.

As shown in FIG. 33, the lens barrel 10A of the second embodiment is configured to house the third lens retaining frame 31A in the preset housing position by firstly moving the third lens retaining frame 31A in the direction orthogonal to the photographing optical axis OA (see an arrow A4) from the on-axis position Pa to the retracted position Ps, then by moving it in the inclined direction to the photographing optical axis OA direction (see an arrow A5) toward the lens barrel base 82, and thereafter by moving it in the direction orthogonal to the photographing optical axis OA (see an arrow A6) to the inside of the retractable lens housing 21b. Specifically, in the lens barrel 10A, the third lens group 13 (third lens retaining portion 93A) is moved in the orthogonal direction (see the arrow A4) from the on-axis position Pa to an off-axis parallel position Pp, then moved in the inclined direction (see the arrow A5) from the off-axis parallel position Pp to the set-back position Pr, and then moved in the orthogonal direction (see the arrow A6) from the set-back position Pr to the retracted position Ps.

In the lens barrel 10A, in order to enable the above-described movements, the third lens retaining frame 31A (third lens retaining frame rotation base 95A thereof to be described later) is provided with a stepped portion 91A serving as a cam groove and beveled portions 92A for retained frame side cam surfaces (see FIG. 34 and the like), and the retainer plate 81 (lens barrel base 82) for supporting the third group main guide shaft 32 is provided with curved protrusions 83A (see FIG. 35 and the like) for base side cam surfaces, collectively as cam structures for connecting the third lens retaining frame 31A to the third group female screw member 35 (contact portion 35a).

Figure 34:
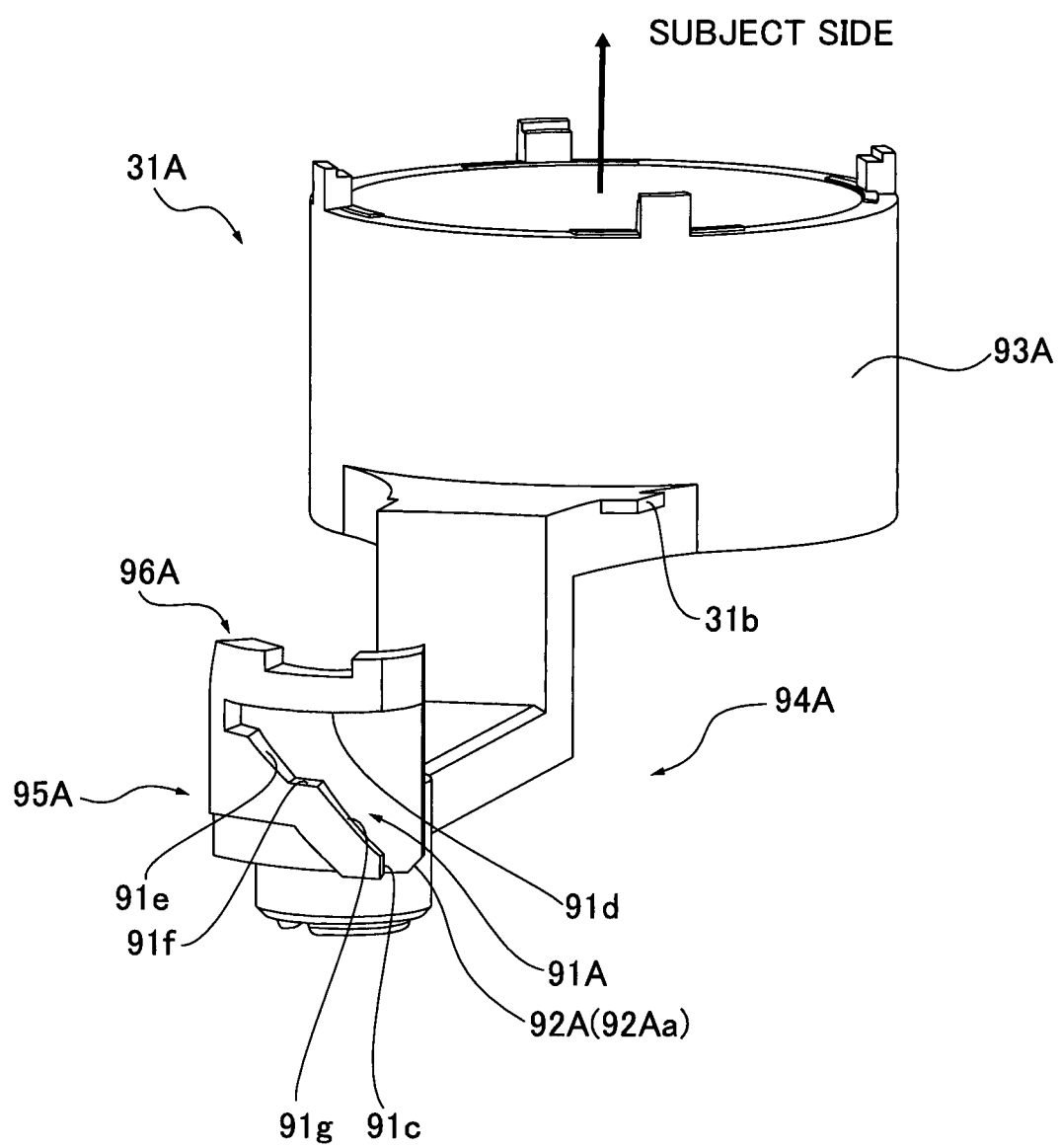
FIG. 34 is a schematic perspective view for explaining a configuration of the third lens retaining frame 31A.

The third lens retaining frame 31A has a similar configuration to that of the third lens retaining frame 31 except for the structures of the stepped portion 91A and the beveled portions 92A. As shown in FIG. 34, the stepped portion 91A is provided to be recessed from the outer peripheral surface of the cylinder of a curved wall portion 96A of the third lens retaining frame 31A. This stepped portion 91A is provided with a first cam surface 91e, a rear engagement surface 91f, a second cam surface 91g, and the side engagement surface 91c on its base end side (imaging plane side), and the front engagement surface 91d on its subject side. The first cam surface 91e is in a cam slope shape, the rear engagement surface 91f is a flat surface connected to a right end of the first cam surface 91e and substantially perpendicularly intersecting the photographing optical axis OA, the second cam surface 91g is in a cam slope shape connected to a right end of the rear engagement surface 91f, the side engagement surface 91c is connected to a lower end of the second cam surface 91g and extends in the photographing optical axis OA direction. The front engagement surface 91d is a flat surface substantially perpendicularly intersecting the photographing optical axis OA. In the second embodiment, the right side of the stepped portion 91A in FIG. 34 is viewed from front is opened in order to facilitate an assembly work.

Moreover, the curved wall portion 96A is provided with a pair of beveled portions 92A (one of which is not shown). These two beveled portions 92A are formed by cutting corners on the lower end of the curved wall portion 96A. Hence the beveled portions 92A define flat retaining frame side inclined surfaces 92Aa serving as the retaining frame side cam surfaces. The respective retaining frame side inclined surfaces 92Aa of both of the beveled portions 92A are configured to be able to come into contact with base side inclined surfaces 83Aa to be described below, which are defined by the curved protrusions 83A, as the third lens retaining frame 31A moves along the third group main guide shaft 32 rotated just by a predetermined angle around the third group main guide shaft 32 (see FIGS. 35 and 38). Specifically, the respective retaining frame side inclined surfaces 92Aa of both of the beveled portions 92A are opposed to the base side inclined surfaces 83Aa of the curved protrusions 83A from a viewpoint in the photographing optical axis OA direction when the third lens retaining frame 31A located between the retraction start position B and the storage position S (see FIG. 14A) is rotated just by the predetermined angle around the third group main guide shaft 32.

Figure 35:
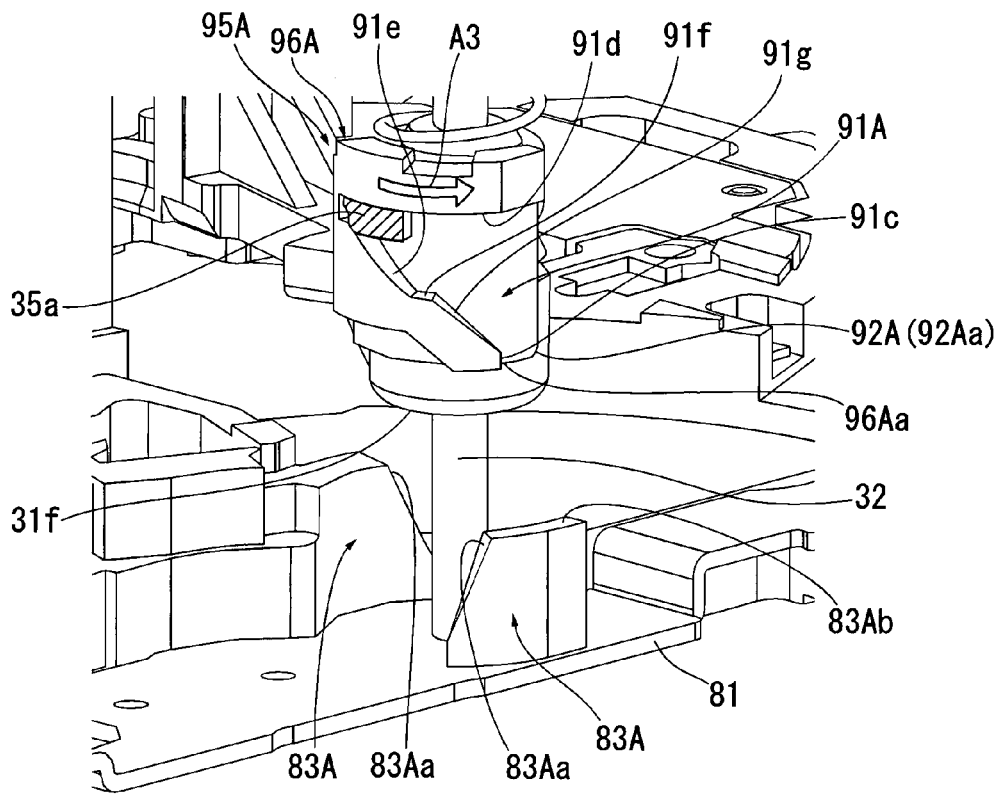
FIG. 35 is a schematic enlarged perspective view for explaining an operation of a cam mechanism of the third lens retaining frame 31A and shows a stepped portion 91A of a third lens retaining frame rotation base 95A of the third lens retaining frame 31A and its surroundings.

As shown in FIG. 35, the curved protrusions 83A are provided so as to protrude from the retainer plate 81 which serves as the base member configured to support the base end of the third group main guide shaft 32. These curved protrusions 83A exhibit the cylindrical shape which is formed by curving the plate member around the axis line of the third group main guide shaft 32 as the center, and are formed as the pair provided with an interval with the third group main guide shaft 32 and disposed around the axis line thereof so as to be able to surround the third lens retaining frame rotation base 95 inserted to the third group main guide shaft 32. As similar to the curved protrusions 83 of the first embodiment, both of the curved protrusions 83A define the base side inclined surfaces 83Aa serving as the cam surfaces by using the flat surfaces that are cut out. These base side inclined surfaces 83Aa contain the radial direction of the rotating axis of the third lens retaining frame 31A, and are also inclined relative to the direction of the rotating axis (direction of extension of the third group main guide shaft 32 (photographing optical axis OA direction)) so as to set back to the negative side in the rotationally biased direction (see the arrow A3) as the base side inclined surfaces 83A come closer to the retainer plate 81 on the imaging plane side. In addition, upper ends of the curved protrusions 83A define upper flat surfaces 83Ab which are orthogonal to the photographing optical axis OA.

Next, actions when the third lens retaining frame 31A in the lens barrel 10A is rotated between the photographing position (photographing state P) where the third lens group 13 is inserted onto the photographing optical axis OA and the storage position (collapsed stored state D) where the third lens group 13 is housed into the retractable lens housing 21b will be described with reference to FIGS. 33 and 35 to 43.

As similar to the first embodiment, the third lens retaining frame rotation base 95A is rotated upon receipt of the pressing force from the third group female screw member 35 which is moved straight in the photographing optical axis OA direction (front-back direction) due to the sliding action between the stepped portion 91A provided on the outer peripheral surface of the third lens retaining frame rotation base 95 and the contact portion 35a of the third group female screw member 35 accepted by the stepped portion 91A. Accordingly, the stepped portion 91A functions as the cam groove while the contact portion 35a of the third group female screw member 35 functions as the cam pin.

The third lens retaining frame rotation base 95A is moved vertically along the third group main guide shaft 32 or is rotated around the third group main guide shaft 32 by the contact portion 35a of the third group female screw member 35, which serves as the cam pin configured to be moved in the front-back direction inside the stepped portion 91A serving as the cam groove. An action of the third lens retaining frame rotation base 95A relative to the position of the contact portion 35a inside the stepped portion 91A being the cam groove in this case will now be explained.

As described previously, in the lens barrel 10A of the second embodiment, the third group female screw member 35 is moved on the third group lead screw 34 by rotation of the third group motor 52, thereby moving the third lens group 13 (third lens retaining portion 93A) between the storage position (retracted position Ps (collapsed stored state D)) in the retractable lens housing 21b and the photographing position (on-axis position Pa (photographing state P)) on the photographing optical axis OA.

When the third group female screw member 35 is moved in front of the retraction start position B (on the object side and on the upper side when viewed from front) (see FIG. 14A), the contact portion 35a comes into contact with the front engagement surface 91d as shown in FIG. 35. The action when this contact portion 35a comes into contact with the front engagement surface 91d, i.e., when the third group female screw member 35 is moved in front of the retraction start position B (to the subject side) is similar to the first embodiment.

When the third group female screw member 35 is moved behind the retraction start position B (on the imaging plane side and on the lower side when viewed from front) (see FIG. 14A), the third lens retaining frame rotation base 95A (third lens retaining frame 31A) approaches the retainer plate 81 in accordance with the height position of the contact portion 35a (third group female screw member 35) contacting the front engagement surface 91d. Upon retraction to a predetermined height position, a lower end surface 96Aa of the curved wall portion 96A comes into contact with the upper flat surfaces 83Ab of the curved protrusion 83A provided on the retainer plate 81.

Figure 36:
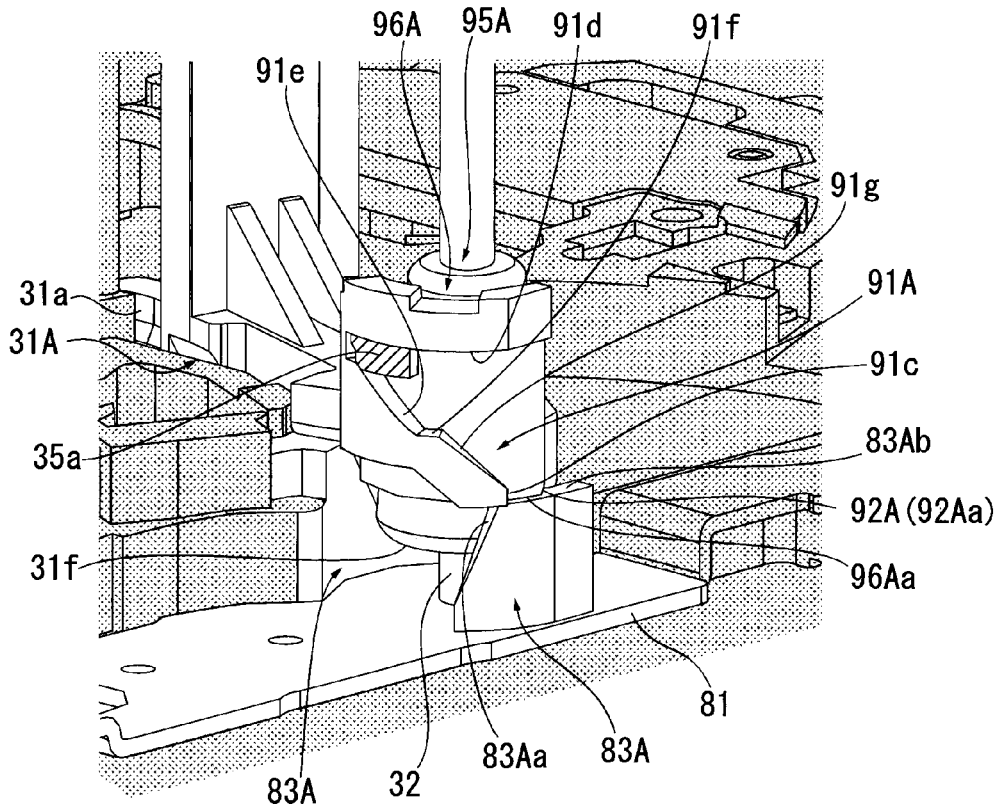
FIG. 36 is a perspective view similar to FIG. 35, and shows a state after FIG. 35 in the process of retracting the third lens retaining frame 31A.
Figure 37:
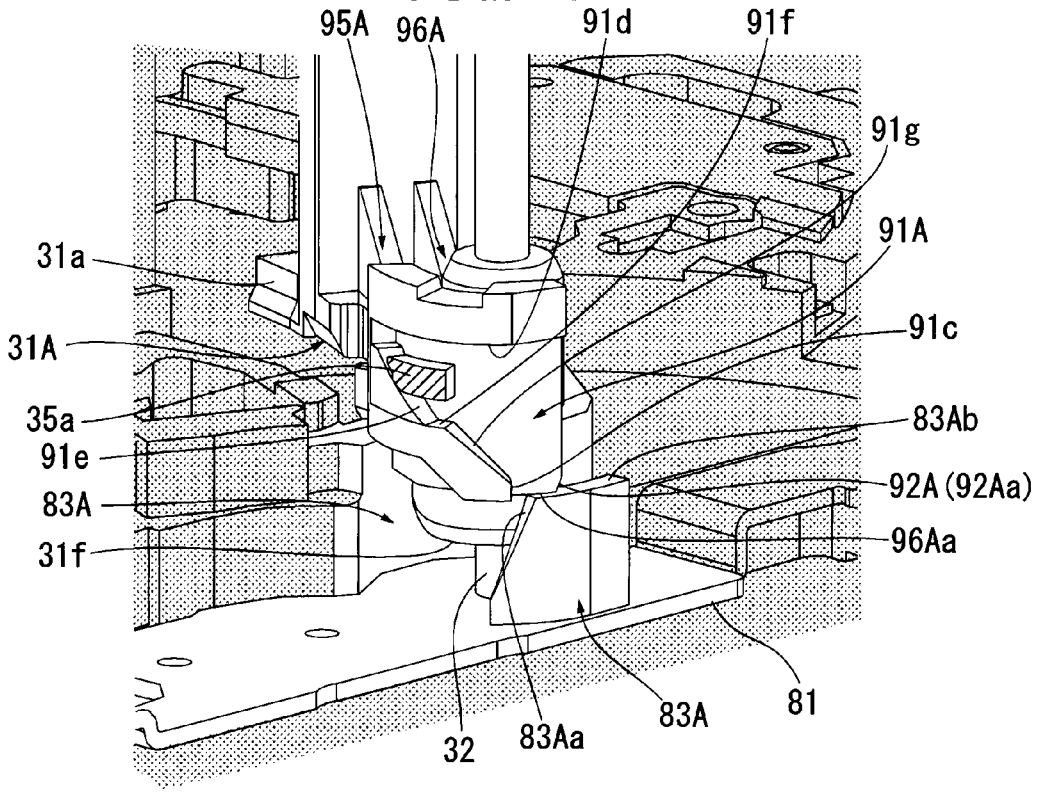
FIG. 37 is a perspective view similar to FIGS. 35 and 36, and shows a state after FIG. 36 in the process of retracting the third lens retaining frame 31A.
Figure 38:
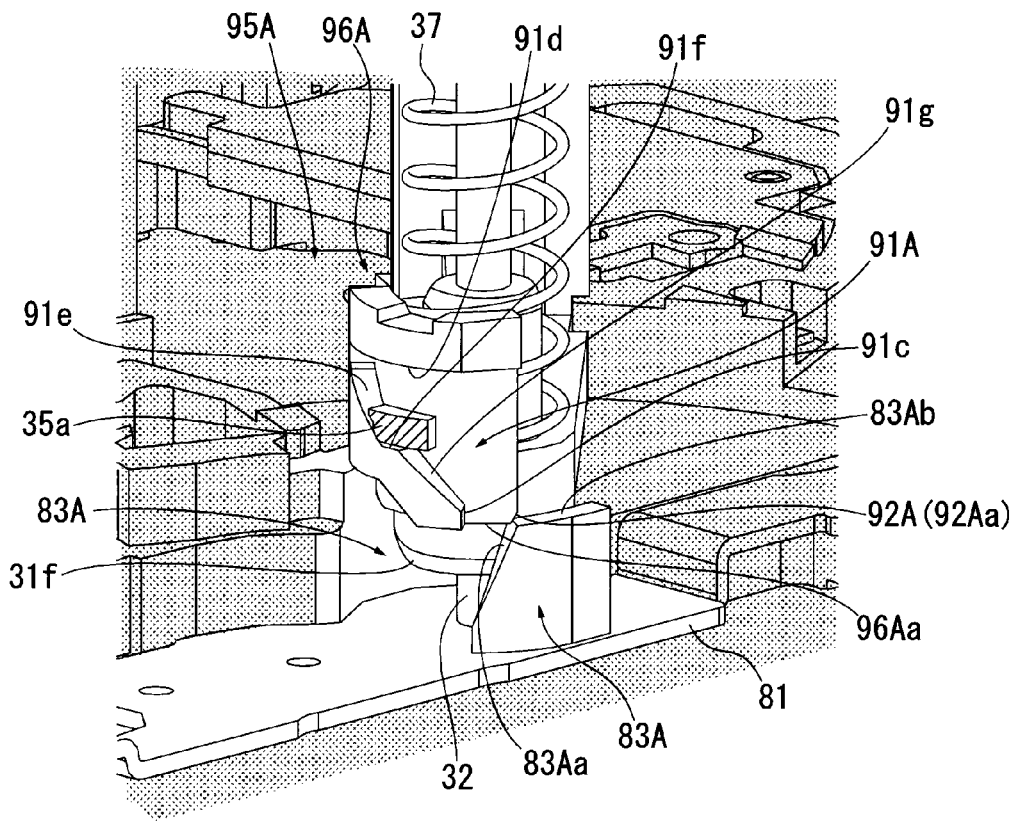
FIG. 38 is a perspective view similar to FIGS. 35 to 37, and shows a state after FIG. 37 in the process of retracting the third lens retaining frame 31A.

When the third group female screw member 35 is moved further backward from this position (to the imaging plane side), the upper surface of the contact portion 35a is detached from the front engagement surface 91d and the contact portion 35a comes into contact with the first cam surface 91e (see FIGS. 36 to 38). As the third group female screw member 35 is moved backward from this position (to the imaging plane side), the contact portion 35a presses the first cam surface 91e backward. At this time, the third lens retaining frame rotation base 95A is not pushed down because the lower end surface 96Aa of the curved wall portion 96A of the third lens retaining frame 31A (third lens retaining frame rotation base 95A) is in contact with the upper flat surface 83Ab of the curved protrusion 83A. For this reason, when the contact portion 35a presses the first cam surface 91e backward, the lower end surface 96Aa of the curved wall portion 96A is rotated against the rotational biasing force (see the arrow A3 in FIG. 35) in the position contacting the upper flat surface 83Ab of the curved protrusion 83A so as to correspond to the height position of the contact portion 35a as shown in the order of FIGS. 36, 37, and 38 attributable to the pressing force and guiding actions of the contact portion 35a and the first cam surface 91e. In the meantime, the lower end surface 96Aa slides on the upper flat surface 83Ab. When the third lens retaining frame rotation base 95A is rotated as shown in the order of from FIGS. 36 to 38, the third lens retaining frame 31A rotates the third lens group 13 retained by the third lens retaining frame 31A from the position on the photographing optical axis OA around the third group main guide shaft 32 sequentially as indicated with reference numerals 31A-1, 31A-2, and 31A-3 in FIGS. 42 and 43. Accordingly, while this contact portion 35a is pressing and sliding on the first cam surface 91e, the third lens retaining frame 31A is moved in the direction orthogonal to the photographing optical axis OA from the on-axis position Pa to the off-axis parallel position Pp in the orthogonal direction (see the arrow A4 in FIG. 33).

Figure 39:
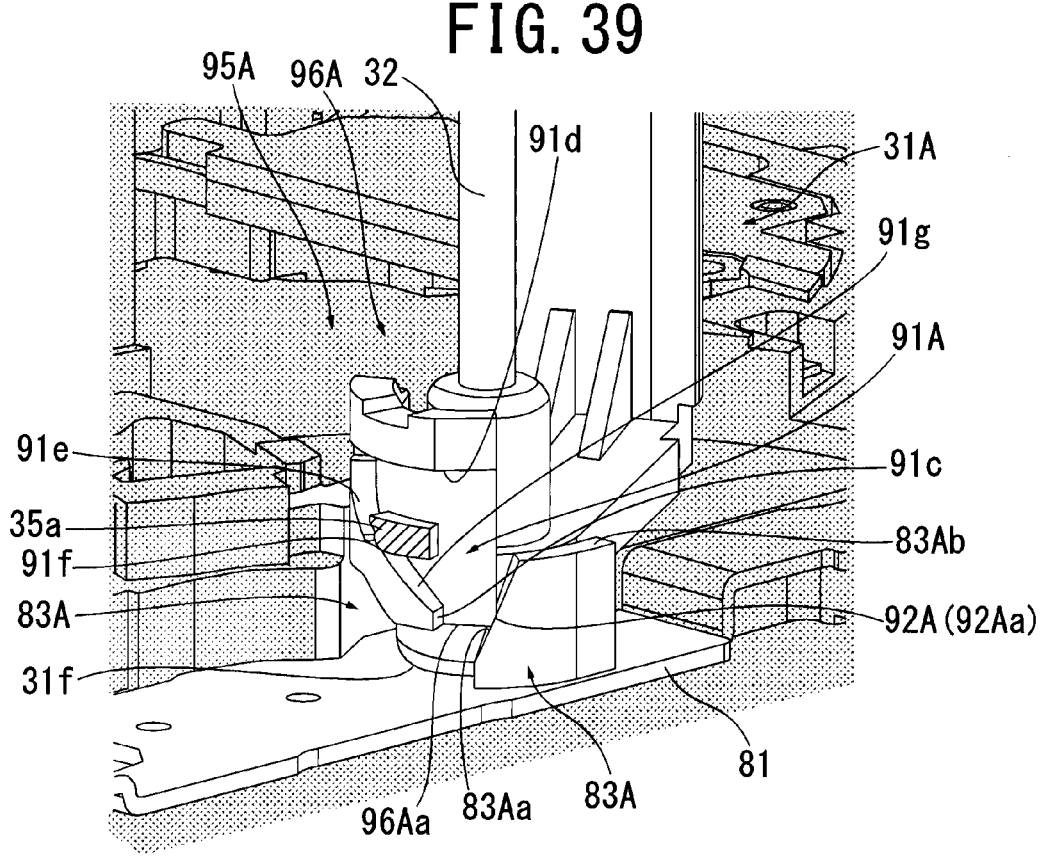
FIG. 39 is a perspective view similar to FIGS. 35 to 38, and shows a state after FIG. 38 in the process of retracting the third lens retaining frame 31A.

When the third group female screw member 35 is moved further backward from this position (to the imaging plane side), the curved wall portion 96A transitions from the state of contact between the lower end surface 96Aa and the upper flat surface 83Ab to a state of contact between the retained frame side inclined surfaces 92Aa of the beveled portions 92A and the base side inclined surfaces 83Aa of the curved protrusions 83A (see FIGS. 38 and 39) due to rotation of the third lens retaining frame rotation base 95 relative to the curved protrusions 83A. As the third group female screw member 35 is moved further backward from this position (to the imaging plane side), the position of contact of the contact portion 35a inside the stepped portion 91A transitions from the first cam surface 91e to the rear engagement surface 91f whereby the contact portion 35a presses (pushes down) the rear engagement surface 91f (see FIG. 39). When the rear engagement surface 91f is pushed down by the backward movement of this contact portion 35a, the third lens retaining frame rotation base 95A is rotated against the rotational biasing force and is pushed down so as to correspond to the height position of the contact portion 35a as shown in the order of FIGS. 38 and 39 attributable to the pressing force and guiding actions of the retaining frame side inclined surfaces 92Aa of the beveled portions 92A and the base side inclined surfaces 83Aa of the curved protrusions 83A. When the third lens retaining frame rotation base 95A is rotated and pushed down as described above, the third lens retaining frame 31A rotates the third lens group 13 around the third group main guide shaft 32 toward the retracted position and retracts the third lens group 13 along the photographing optical axis OA sequentially as indicated with reference numerals 31A-3 and 31A-4 in FIGS. 42 and 43. Accordingly, while the base side inclined surfaces 83Aa are sliding on the retaining frame side inclined surfaces 92Aa as this contact portion 35a is pushing the rear engagement surface 91f down, the third lens retaining frame 31A is moved obliquely backward (to the imaging plane side) from the off-axis parallel position Pp to the set-back position Pr in the inclined direction (see the arrow A5 in FIG. 33). At this time, since the third lens retaining frame rotation base 95A is rotated, the position of the contact portion 35a inside the stepped portion 91A moves (slides) from an end on the left side in the drawing to an end on the right side in the drawing on the rear engagement surface 91f (se FIG. 39).

Figure 40:
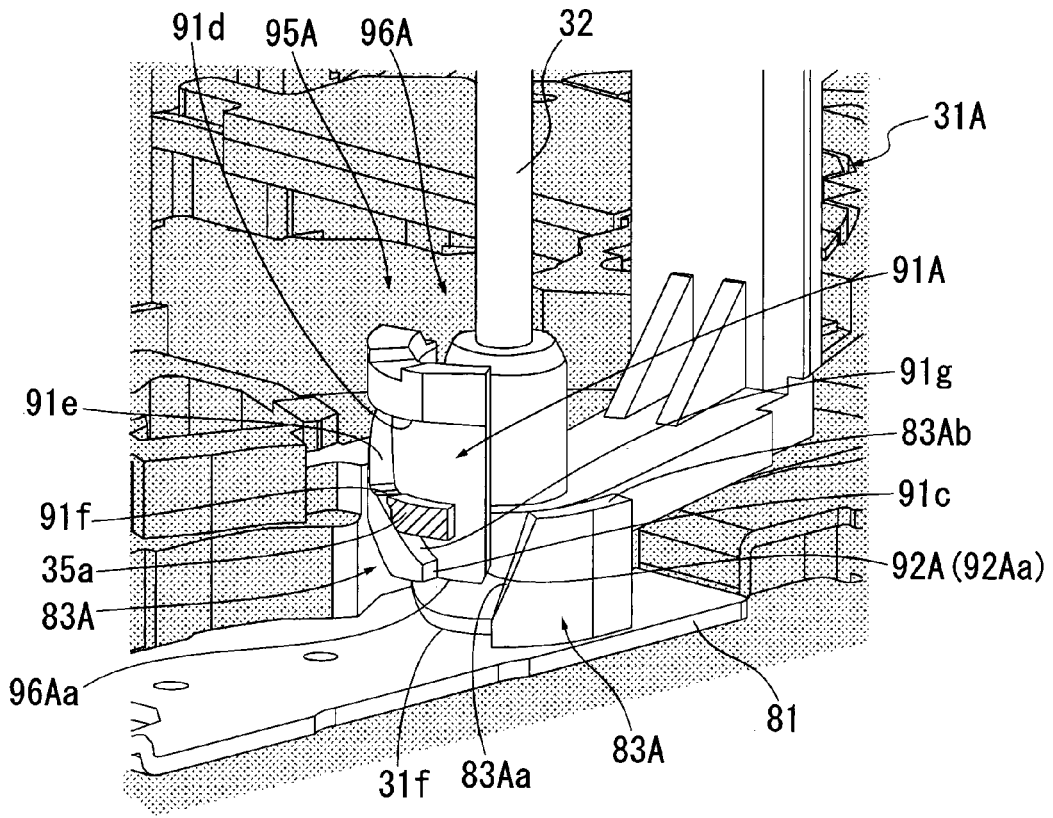
FIG. 40 is a perspective view similar to FIGS. 35 to 39, and shows a state after FIG. 39 in the process of retracting the third lens retaining frame 31A.

When the third group female screw member 35 is moved further backward from this position (to the imaging plane side), the position of contact of the contact portion 35a transitions from the rear engagement surface 91f to the second cam surface 91g inside the stepped portion 91A (see FIGS. 39 and 40). As the third group female screw member 35 is retracted to a position where this contact portion 35a comes into contact with an upper end of the second cam surface 91g, the base end surface 31f of the third lens retaining frame 31A (third lens retaining frame rotation base 95A) comes into contact with the retainer plate 81 (see FIGS. 39 and 40). When the third group female member 35 is moved backward from this position (to the imaging plane side), the contact portion 35a presses the second cam surface 91g backward. At this time, the third lens retaining frame rotation base 95A is not pushed down because the base end surface 31f of the third lens retaining frame 31A (third lens retaining frame rotation base 95A) is in contact with the retainer plate 81. For this reason, when the contact portion 35a presses the second cam surface 91e backward, the third lens retaining frame rotation base 95A is rotated against the rotational biasing force in the position contacting the retainer plate 81 so as to correspond to the height position of the contact portion 35a as shown in the order of FIGS. 39 and 40 attributable to the pressing force and guiding actions of the contact portion 35a and the second cam surface 91g. Hence the retaining frame side inclined surfaces 92Aa of the beveled portions 92A are detached from the base side inclined surfaces 83Aa of the curved protrusions 83A (see FIG. 40).

Figure 41:
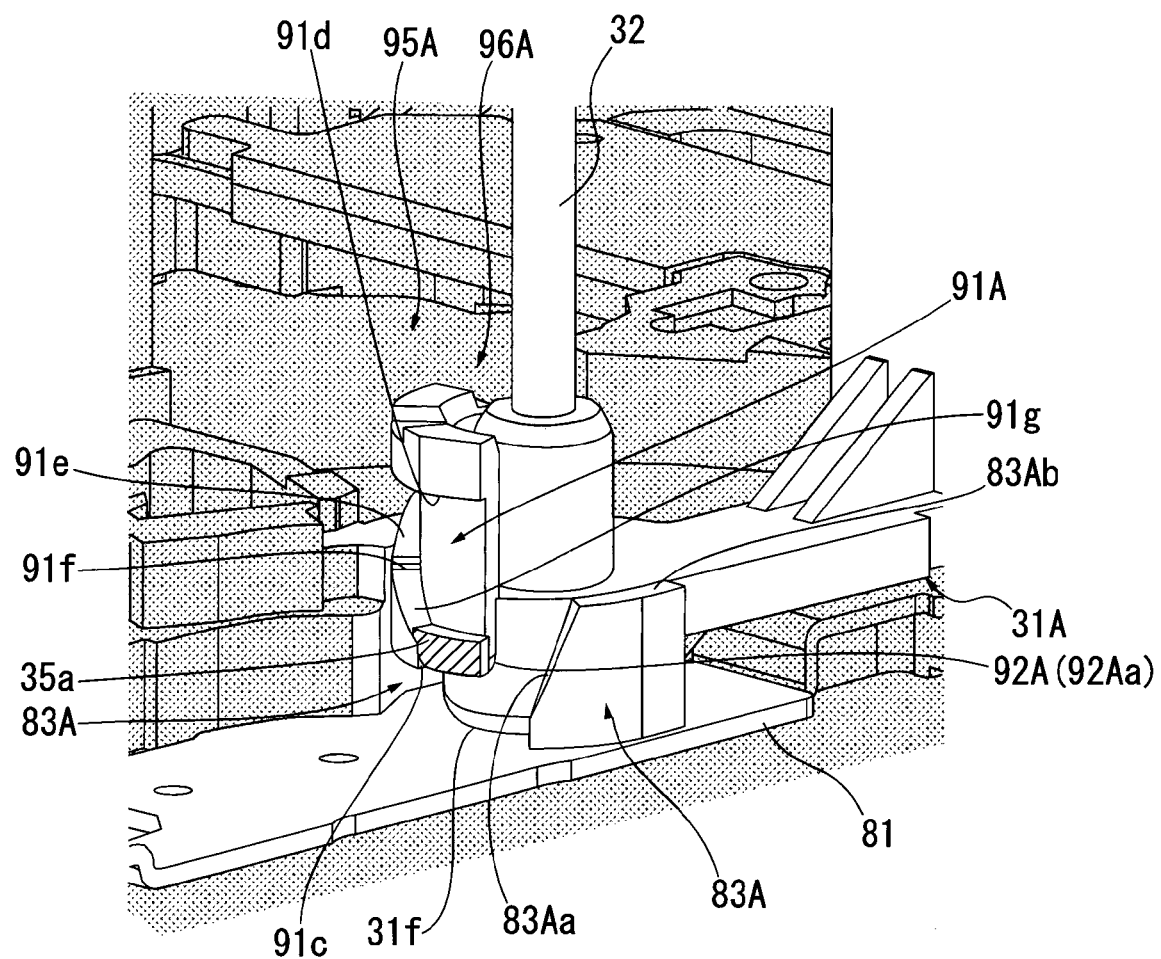
FIG. 41 is a perspective view similar to FIGS. 35 to 40, and shows a state after FIG. 40 in the process of retracting the third lens retaining frame 31A.
Figure 42:
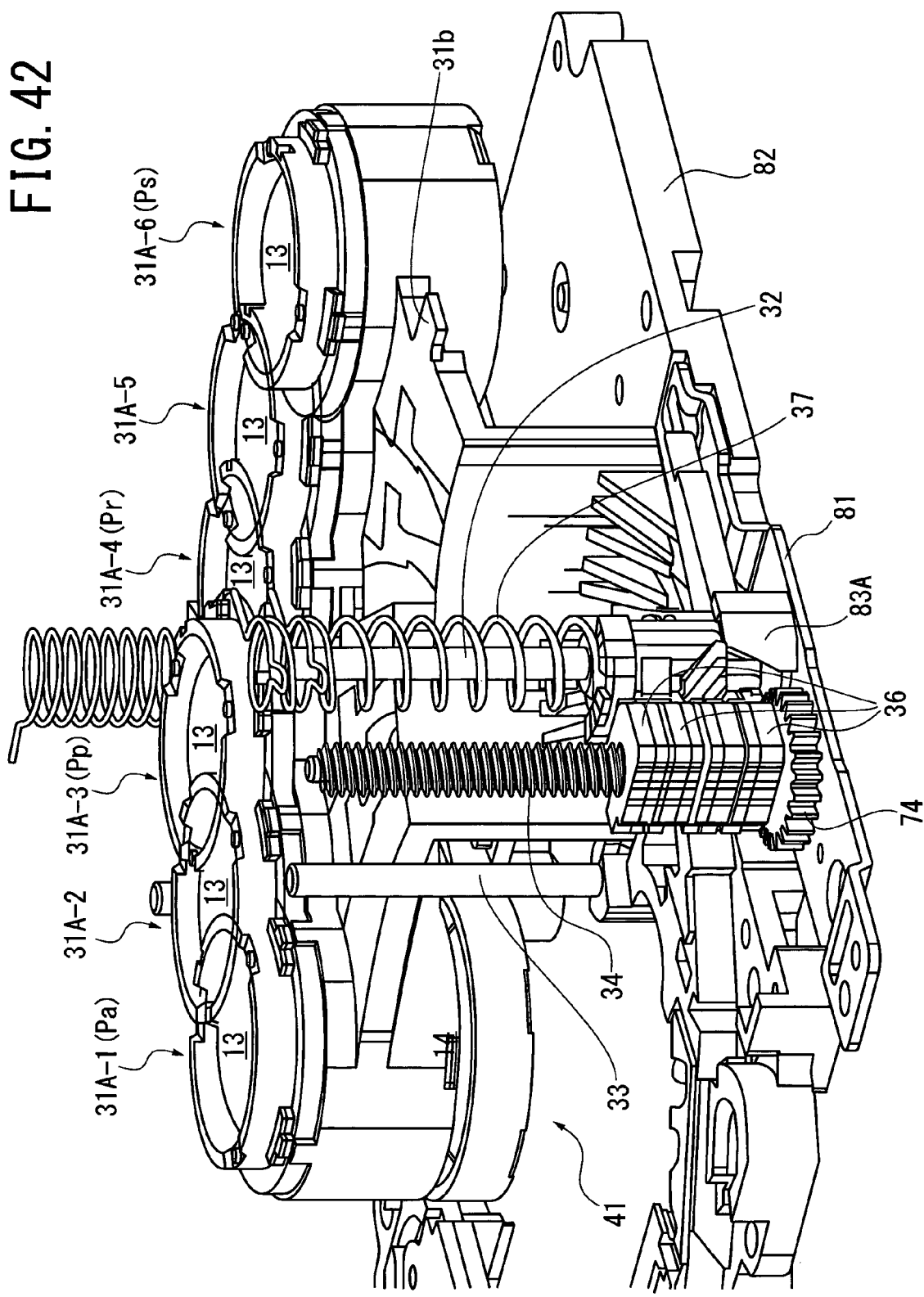
FIG. 42 is a schematic perspective view showing a movement of the third lens retaining frame 31A on the lens barrel base 82 (retainer plate 81).
Figure 43:
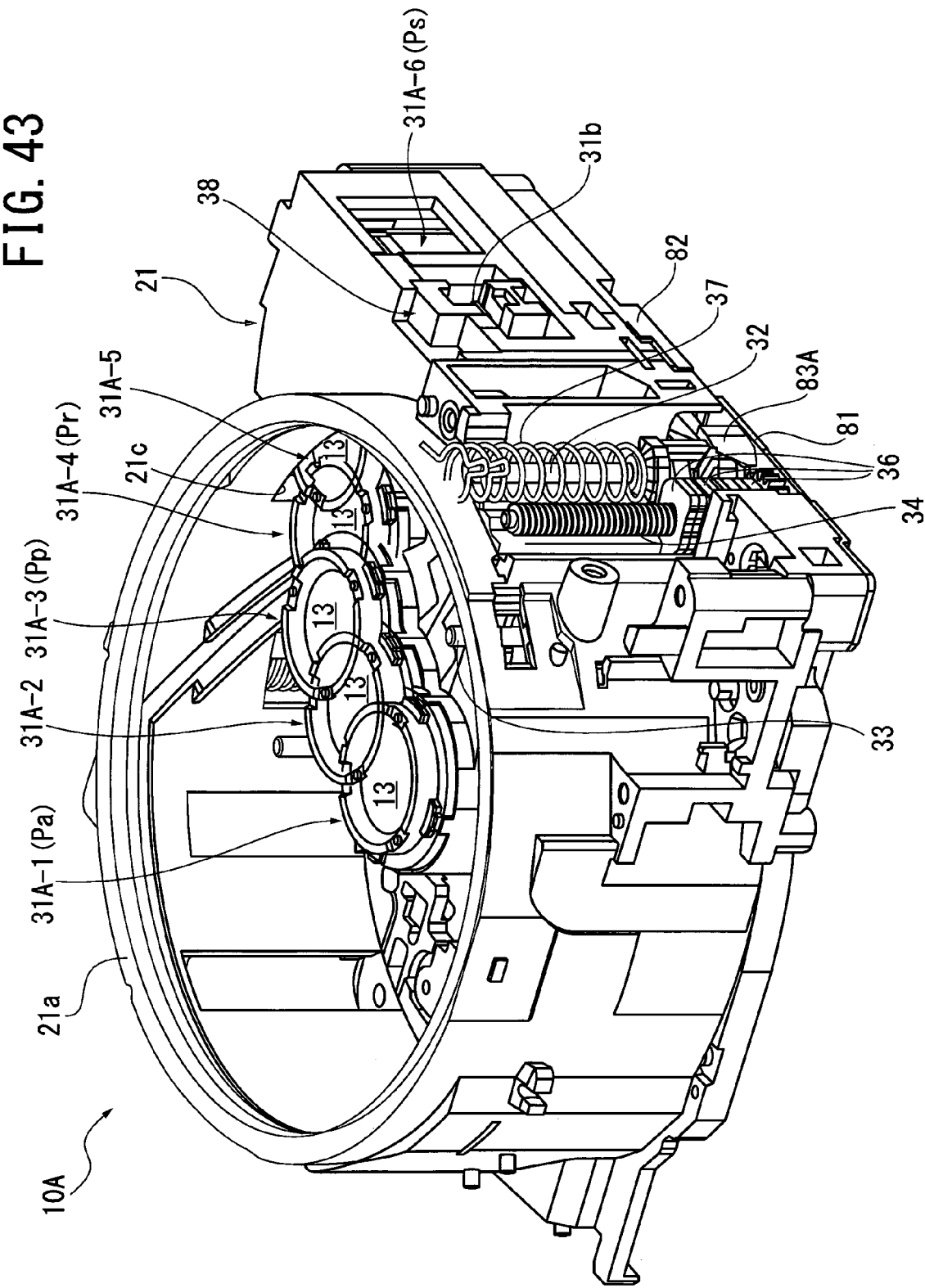
FIG. 43 is a schematic perspective view showing a movement of the third lens retaining frame 31A inside the fixation frame 21 (fixed cylinder portion 21a).

When the third group female screw member 35 is moved backward from this position (to the imaging plane side) and is located in the storage position S (see FIG. 14A), the position of contact of the contact portion 35a transitions from the second cam surface 91g to the side engagement surface 91c inside the stepped portion 91A (see FIGS. 40 and 41). As the third group female screw member 35 is retracted to a position where this contact portion 35a comes into contact with the side engagement surface 91c, the contact portion 35a (side surface thereof) conies into contact with the side engagement surface 91c so as to press (be engaged with) each other because the third lens retaining frame rotation base 95A is rotationally biased (see the arrow A3 in FIG. 35). Hence the rotational posture of the third lens retaining frame rotation base 95A is fixed. As sequentially indicated with reference numerals 31A-4, 31A-5, and 31A-6 in FIGS. 42 and 43, the third lens retaining frame 31A rotates the third lens group 13 retained by the third lens retaining frame 31A around the third group main guide shaft 32 toward the retracted position. For this reason, when this contact portion 35a is pressing and sliding on the second cam surface 91g, the third lens retaining frame 31A is moved in the direction orthogonal to the photographing optical axis OA from the set-back position Pr to the retracted position Ps in the orthogonal direction (see the arrow A5 in FIG. 33). When the contact portion 35a is engaged with the side engagement surface 91c, the third lens retaining frame 31A is located in the retracted position Ps (storage position) to establish the collapsed stored state D.

The lens barrel 10A of the second embodiment basically includes the similar configuration to the lens barrel 10 of the first embodiment. Therefore, the lens barrel 10A is basically able to achieve similar effects to those of the first embodiment.

Specifically, according to the lens barrel 10A of the second embodiment, the retractable lens housing 21b is designed to have the minimum requisite thickness dimension in order to house the third lens group 13 (third lens retaining portion 93A) serving as the retractable lens in the state close to the lens barrel base 82, and this retractable lens housing 21b is provided inside the fixation frame 21 and outside the fixed cylinder portion 21a. Hence it is possible to set the thickness dimension on the outside smaller than the fixed cylinder portion 21a of the fixation frame 21. In other words, it is possible to utilize the space located in the direction orthogonal to the photographing optical axis OA relative to the fourth lens group 14 and the solid-state image sensing device 16 as the space for housing the third lens group 13 (third lens retaining portion 93A) being the retractable lens. Hence it is possible to reduce the thickness dimension on the outside smaller than the fixed cylinder portion 21a of the fixation cylinder 21.

Moreover, according to the lens barrel 10A of the second embodiment, the third lens retaining frame 31A being the retractable lens retaining frame is configured to locate the third lens group 13 (third lens retaining portion 93A) being the retractable lens in the off-axis parallel position Pp by the movement in the orthogonal direction (arrow A4) from the on-axis position Pa, then to locate the third lens group 13 in the set-back position Pr by the movement in the inclined direction (arrow A5) from the off-axis parallel position Pp, and then to locate the third lens group 13 in the retracted position Ps by the movement in the orthogonal direction (arrow A6) from the set-back position Pr. Therefore, it is possible to house the third lens group 13 (third lens retaining portion 93A) into the retractable lens housing 21b having the minimum requisite thickness dimension so as to house the third lens group 13 in the state close to the lens barrel base 82 without causing any interferences with other members of the photographing optical system. In other words, by employing the configuration to move the third lens group 13 in the orthogonal direction, then in the inclined direction, and then in the orthogonal direction, it is possible to reduce the thickness dimension of the retractable lens housing 21b. Particularly, the thickness dimension based on the base member (lens barrel base 82) is increased when the solid-state image sensing device 16 is provided movably in the direction orthogonal to the photographing optical axis OA on the base member (lens barrel base 82) by way of the image stabilization mechanism of the photographing element drive type. In this case, the above-described movements can contribute significantly to reduction in the thickness dimension of the retractable lens housing 21b.

Furthermore, the lens barrel 10A of the second embodiment is configured to be able to control the height position in the photographing optical axis OA direction of the contact portion 35a of the third group female screw member 35. Moreover, the cam structures configured to connect the third lens retaining frame 31A to the third group female screw member 35 are formed by providing the third lens retaining frame 31A with the stepped portion 91A and the beveled portions 92A while providing the retainer plate 81 with the curved protrusions 83A (see FIG. 24 and the like). Therefore, it is possible to move the third lens group 13 (third lens retaining portion 93A) serving as the retractable lens from the on-axis position Pa to the off-axis parallel position Pp in the orthogonal direction, then from the off-axis parallel position Pp to the set-back position Pr in the inclined direction, and then from the set-back position Pr to the retracted position Ps in the orthogonal direction by using the simple configuration.

In the lens barrel 10A of the second embodiment, the retractable lens housing 21b is provided inside the fixation frame 21 and outside the fixed cylinder portion 21a, or in other words, outside the movable lens barrel. Hence it is possible to reduce the outside diameter of the fixed cylinder portion 21a.

In the lens barrel 10A of the second embodiment, the curved protrusions 83A (base side inclined surfaces 83Aa) for moving the third lens group 13 (third lens retaining portion 93A) being the retractable lens in the inclined direction are configured to be able to surround the third lens retaining frame rotation base 95 inserted to the third group main guide shaft 32. Hence it is possible to increase the degree of freedom of setting the amount of movement in the photographing optical axis OA direction associated with the movement in the inclined direction. This configuration enables to increase the degree of freedom of setting the retraction start position of the third lens group 13 (third lens retaining portion 93A) being the retractable lens from the photographing optical axis OA. Hence it is possible to improve the design freedom of the photographing optical system.

In the lens barrel 10A of the second embodiment, it is possible to define a position closer to the fourth lens group 14 on the photographing optical axis OA as the on-axis position Pa of the third lens group 13 as compared to the lens barrel 10 of the first embodiment. Therefore, it is possible to further improve the design freedom of the photographing optical system.

In the lens barrel 10A of the second embodiment, the on-axis position Pa being the retraction start position of the third lens group 13 (third lens retaining portion 93A) serving as the retractable lens is set closer to the imaging plane side than the lowest end position (closest position to the imaging surface side) in the photographing state P where the third lens retaining frame 31A (third lens group 13) is located on the photographing optical axis OA. Therefore, it is possible to move the third lens group 13 (third lens retaining portion 93A) being the retractable lens from the on-axis position Pa to the off-axis parallel position Pp in the orthogonal direction, then from the off-axis parallel position Pp to the set-back position Pr in the inclined direction, and then from the set-back position Pr to the retracted position Ps in the orthogonal direction so as to house the third lens group 13 into the retractable lens housing 21b by using the cam structures having the simple configuration, and also to perform the positional control on the photographing optical axis OA.

The lens barrel 10A according to the second embodiment is configured to move the third lens group 13 from the on-axis position Pa to the off-axis parallel position Pp in the orthogonal direction, then from the off-axis parallel position Pp to the set-back position Pr in the inclined direction, and then from the set-back position Pr to the retracted position Ps in the orthogonal direction so as to house the third lens group 13 into the retractable lens housing 21b. Therefore, it is possible to start retraction of the third lens group 13 (third lens retaining portion 93A) being the retractable lens from the photographing optical axis OA in the position closer to the subject (object) than the retracted position Ps viewed in the photographing optical axis OA direction at the time of switching from the photographing state P to the collapsed stored state D.

In the lens barrel 10A of the second embodiment, when the third group female screw member 35 (contact portion 35a) is located in the storage position S, the retaining frame side inclined surfaces 92Aa serving as the retaining frame side cam surfaces are detached from the base side inclined surfaces 83Aa serving as the base side inclined surfaces, i.e., the contact is released. Hence it is possible to locate the height position of the third lens group 13 (third lens retaining portion 93A) being the retractable lens inside the retractable lens housing 21b when viewed in the photographing optical axis OA direction to a preset position.

Therefore, according to the lens barrel 10A of the second embodiment, it is possible to reduce the thickness dimension of the retractable lens housing 21b provided on the outside of the inside diameter of the movable lens barrel by employing the simple configuration.

Third Embodiment

Next, a lens barrel 10B according to a third embodiment of the present invention will be described with reference to FIGS. 44 to 59. This third embodiment defines a third lens retaining frame 31B and a fourth lens retaining 41B as retractable lens retaining frames. Basic structures of the lens barrel 10B of this third embodiment are similar to those of the lens barrel 10 of the above-described first embodiment. Accordingly, the same constituents are denoted by the same reference numerals and detailed description thereof will be omitted.

Figure 44:
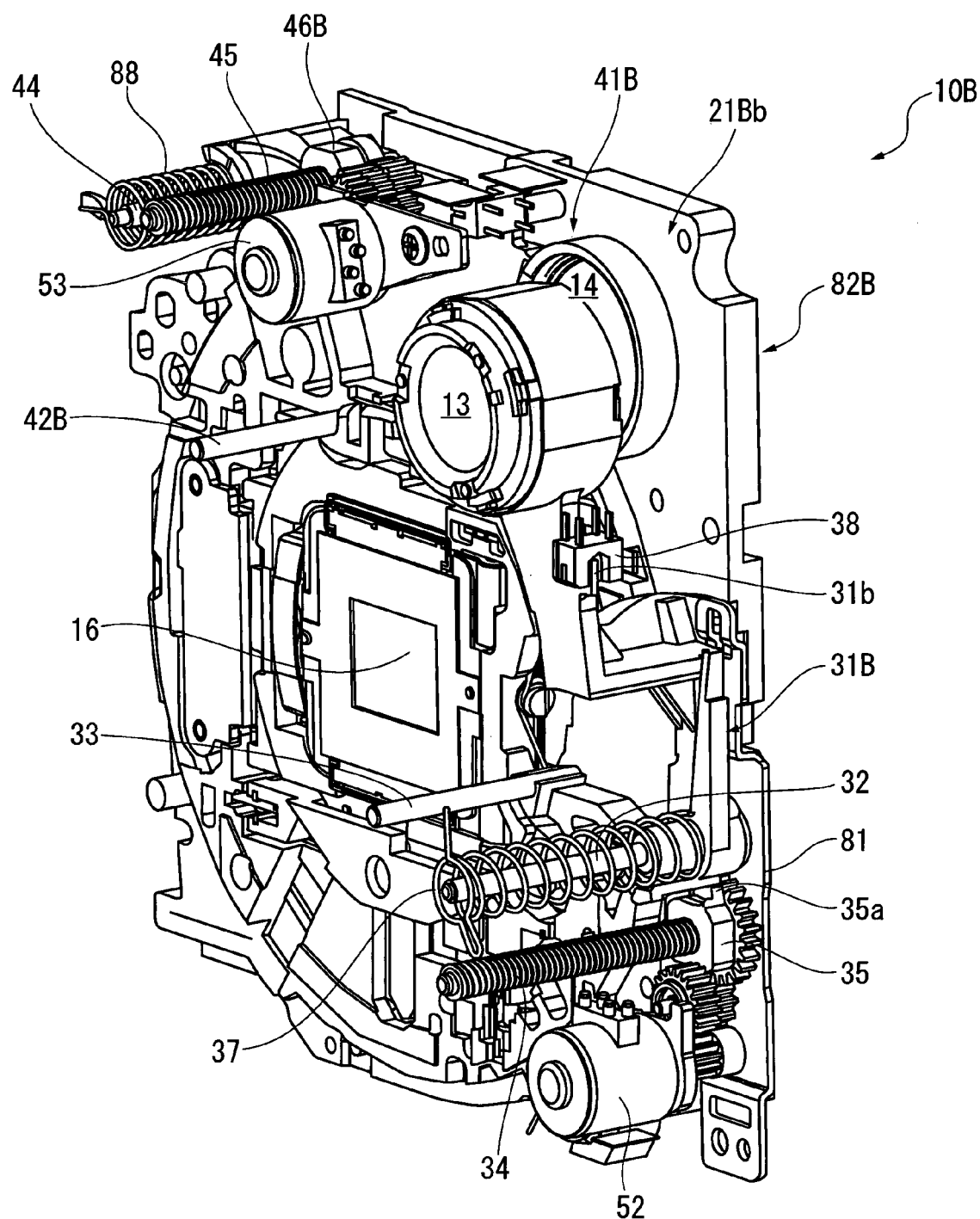
FIG. 44 is a explanatory view for explaining a configuration of a third lens retaining frame 31B and a fourth lens retaining frame 41B on a lens barrel base 82B of a lens barrel 10B according to a third embodiment, which is illustrated in the form of a schematic perspective view.
Figure 45:
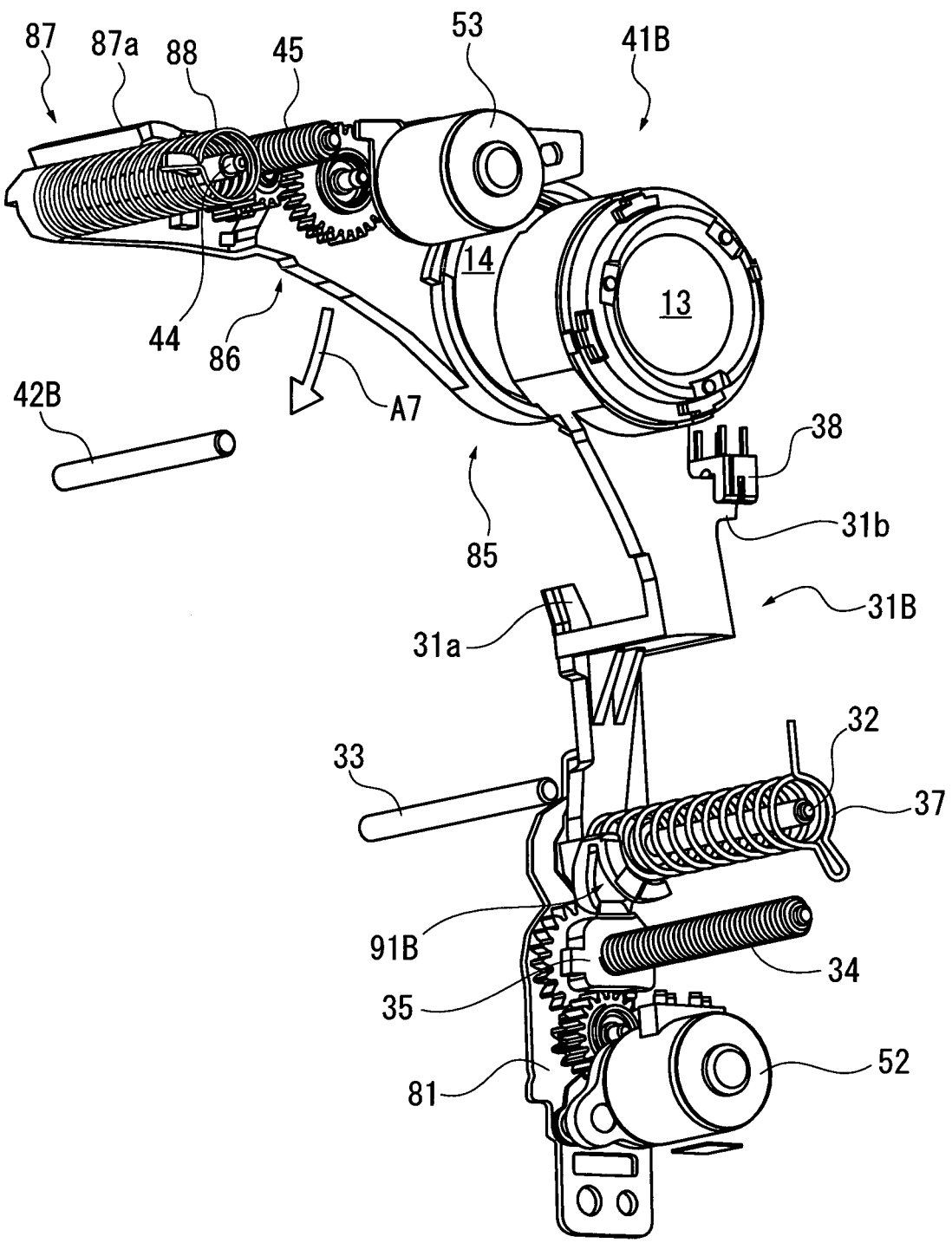
FIG. 45 is an explanatory view showing only the surroundings of the third lens retaining frame 31B and of the fourth lens retaining frame 41B.

First, outlines of configurations of the third lens retaining frame 31B and the fourth lens retaining frame 41B in the lens barrel 10B will be described. In this lens barrel 10B, as shown in FIGS. 44 and 45, the third lens retaining group 31B and the fourth lens group retaining frame 41B are used as the retractable lens retaining frames in order to use the third lens group 13 and the fourth lens group 14 as the retractable lens groups to be retracted from positions on the photographing optical axis OA to a position (retractable lens housing 21Bb) outside the movable lens barrel. As described later, the third lens retaining frame 31B has a similar configuration to the lens barrel 10 of the first embodiment except that the third lens retaining frame 31B includes different cam structures, which are configured to convert the movement of the third group female screw member 35 in the photographing optical axis OA direction into the back and forth movement of the third lens retaining frame 31B and the straight movement along the third group main guide shaft 32.

Figure 46:
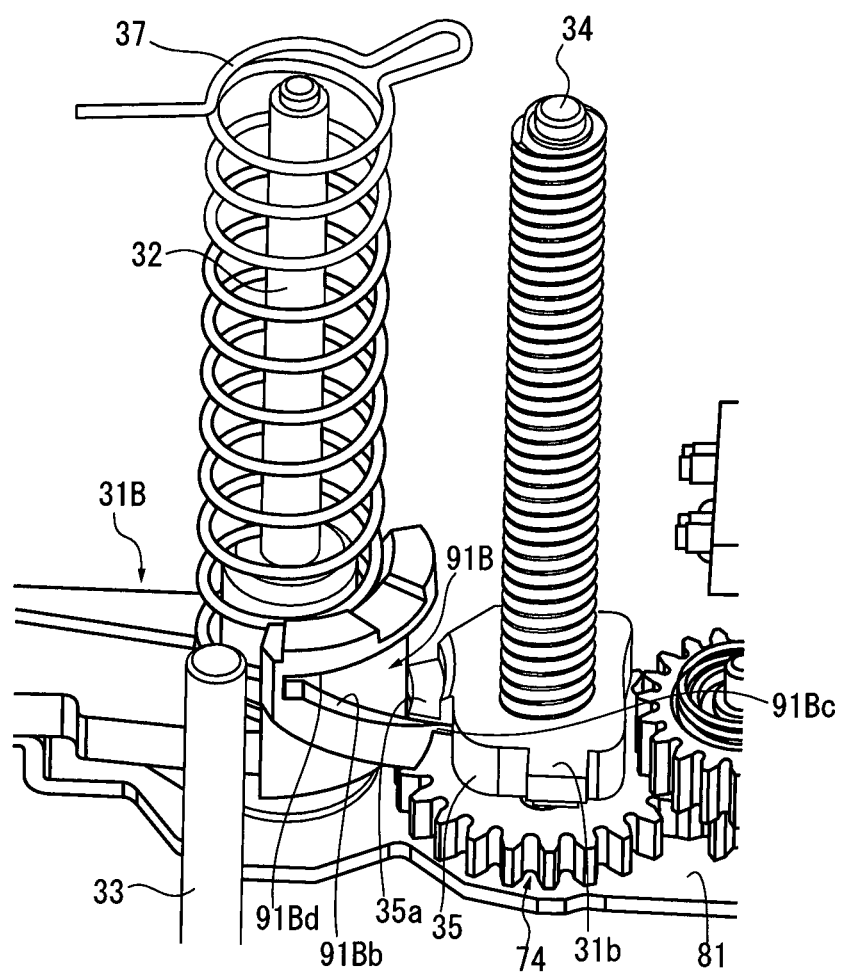
FIG. 46 is an explanatory view for explaining a cam mechanism for the third lens retaining frame 31B.

The cam structures in this third lens retaining frame 31B include the contact portion 35e of the third group female screw member 35 and a stepped portion 91B serving as the cam groove to be engaged therewith. That is to say, in comparison with the cam structures of the lens barrel 10 of the first embodiment, the cam structures of this embodiment do not include constituents corresponding to the beveled portions (see FIG. 23) of the third lent retaining frame 31 and constituents corresponding to the curved protrusions 83 (see FIG. 24) to be provided on the retainer plate 81 (lens barrel base 82B). As shown in FIGS. 45 and 46, this stepped portion 91B is recessed from a cylindrical outer peripheral surface of a curved wall portion 96B having a cylindrical shape. The stepped portion 91B is provided with a cam surface 91Bb and a side engagement surface 91Bc on its base end side (imaging plane side), and a front engagement surface 91Bd on its subject side. The cam surface 91Bb is in a cam slope shape, the side engagement surface 91Bc is connected to a lower end of the base end side (imaging plane side) and extends in the photographing optical axis OA direction, and the front engagement surface 91Bd is a flat surface substantially perpendicularly intersecting the photographing optical axis OA. In other words, the stepped portion 91B does not include the rear engagement surface 91a (see FIG. 23) constituting the flat surface substantially perpendicularly intersecting the photographing optical axis OA unlike the stepped portion 91 of the first embodiment. This third lens retaining frame 31B can locate the third lens group 13 retained by the third lens retaining frame 31B in an arbitrary position on the photographing optical axis OA by causing the contact portion 35a of the third group female screw member 35 to press the front engagement surface 9113d of the stepped portion 91B to the subject side (object side) against a straight bias. Meanwhile, a base end surface of the third lens retaining frame 31B comes into contact with the retainer plate 81 when the contact portion 35a of the third group female screw member 35 presses the cam surface 91Bb of the stepped portion 9113 backward (to the imaging plane side) against a rotation bias. Accordingly, this third lens retaining frame 31B can rotate the third lens group 13 retained by the third lens retaining frame 31B around the third group main guide shaft 32 and move between the photographing position on the photographing optical axis OA and the storage position inside the retractable lens housing 21Bb by guiding actions of the contact portion 35a and the cam surface 91Bb.

As shown in FIGS. 44 and 45, the fourth lens retaining frame 41B retains the fourth lens group 14 on one end (fourth lens retaining portion 85 to be described later) while another end thereof is rotatably and slidably inserted to the fourth group main guide shaft 44. This fourth group main guide shaft 44 is provided substantially parallel to an optical axis of the fourth lens group 14 so as to extend between the lens barrel base 82B and the fixation frame 21. As similar to the lens barrel base 82 of the first embodiment, this lens barrel base 82B constitutes the base member on which the solid-state image sensing device 16 is provided.

The fourth lens retaining frame 41B is rotated around the fourth group main guide shaft 44 between the photographing position (photographing state P) where the fourth lens group 14 is inserted onto the photographing optical axis OA in the photographing state P and the storage position (collapsed stored state D) inside the retractable lens housing 21Bb where the fourth lens group 14 in the collapsed stored state D is retracted from the fixed cylinder portion 21a of the fixation frame 21 to the outside. When this fourth lens retaining frame 41B comes into contact with a fourth group sub-guide shaft 42B, the fourth lens retaining frame 41B establishes a positional relationship where the fourth lens group 14 is located in the photographing position (photographing state P) on the photographing optical axis OA. The fourth group sub-guide shaft 4213 has a bar shape made of a metal material and is provided on the lens barrel base 82B so as to extend in the photographing optical axis OA direction.

Figure 47:
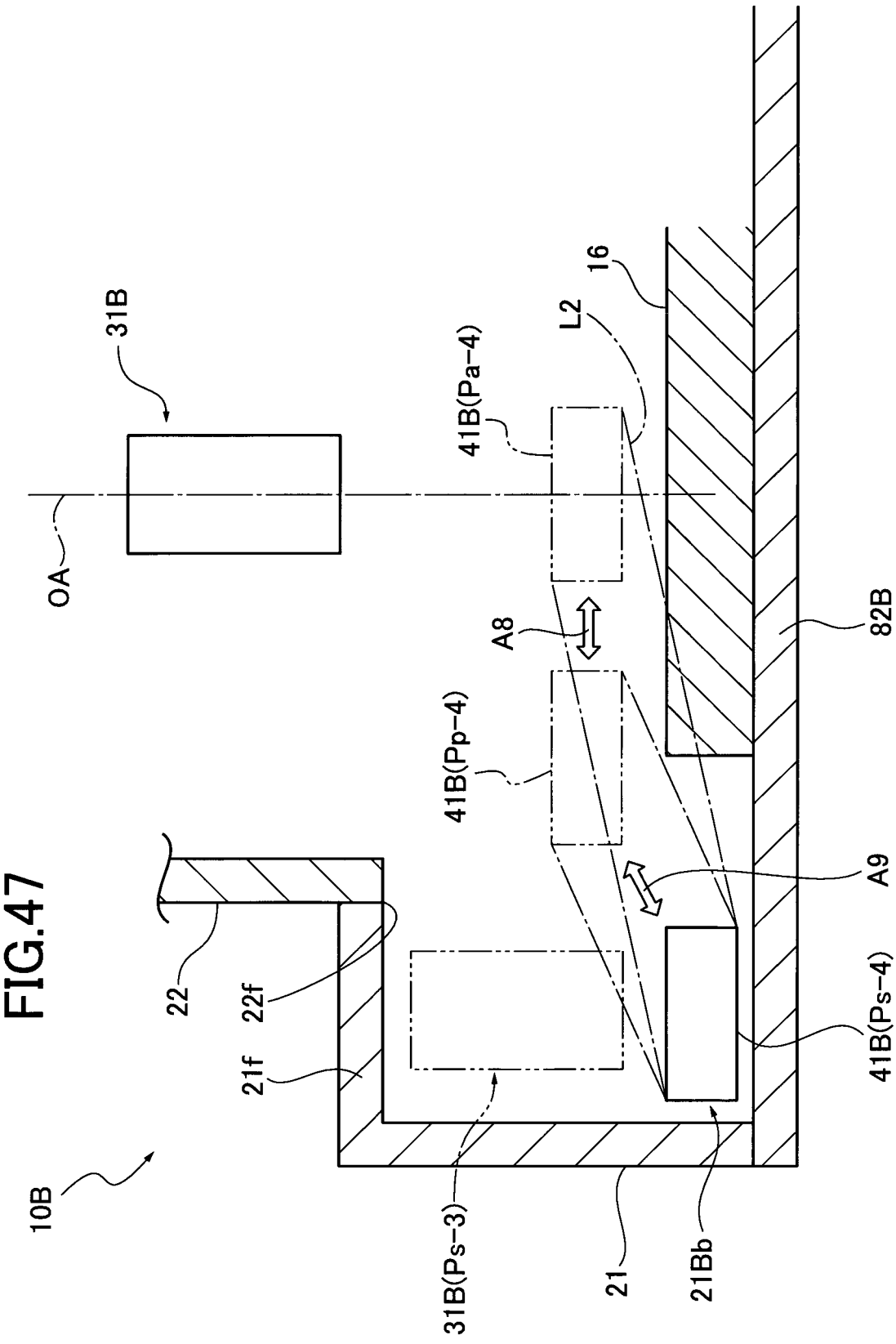
FIG. 47 is a schematic explanatory view similar to FIG. 22 and shows a movement of the fourth lens retaining frame 41B in the lens barrel 10B according to the third embodiment.
Figure 48:
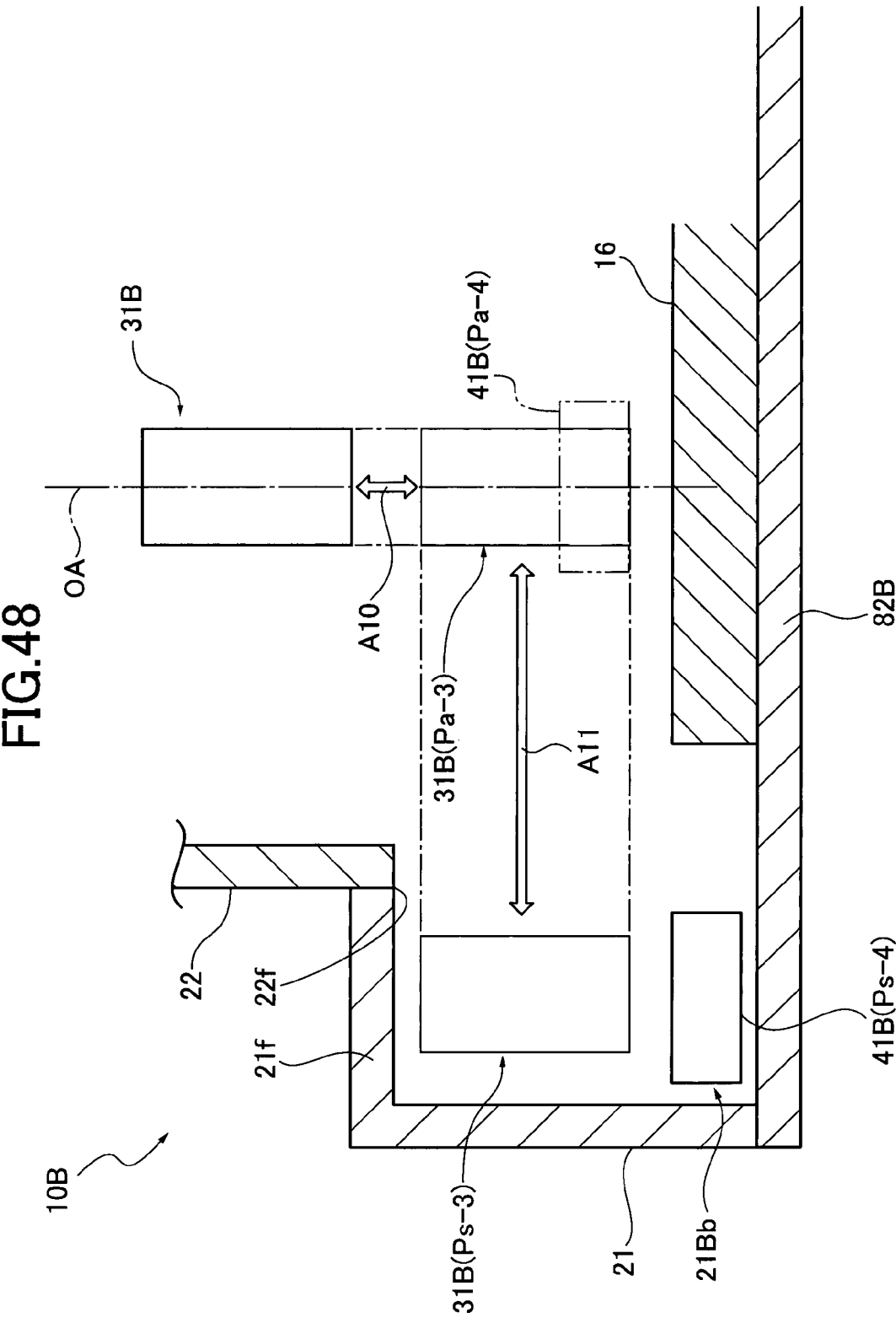
FIG. 48 is a schematic explanatory view similar to FIG. 22 and shows a movement of the third lens retaining frame 31B in the lens barrel 1013 after FIG. 47.
Figure 49:
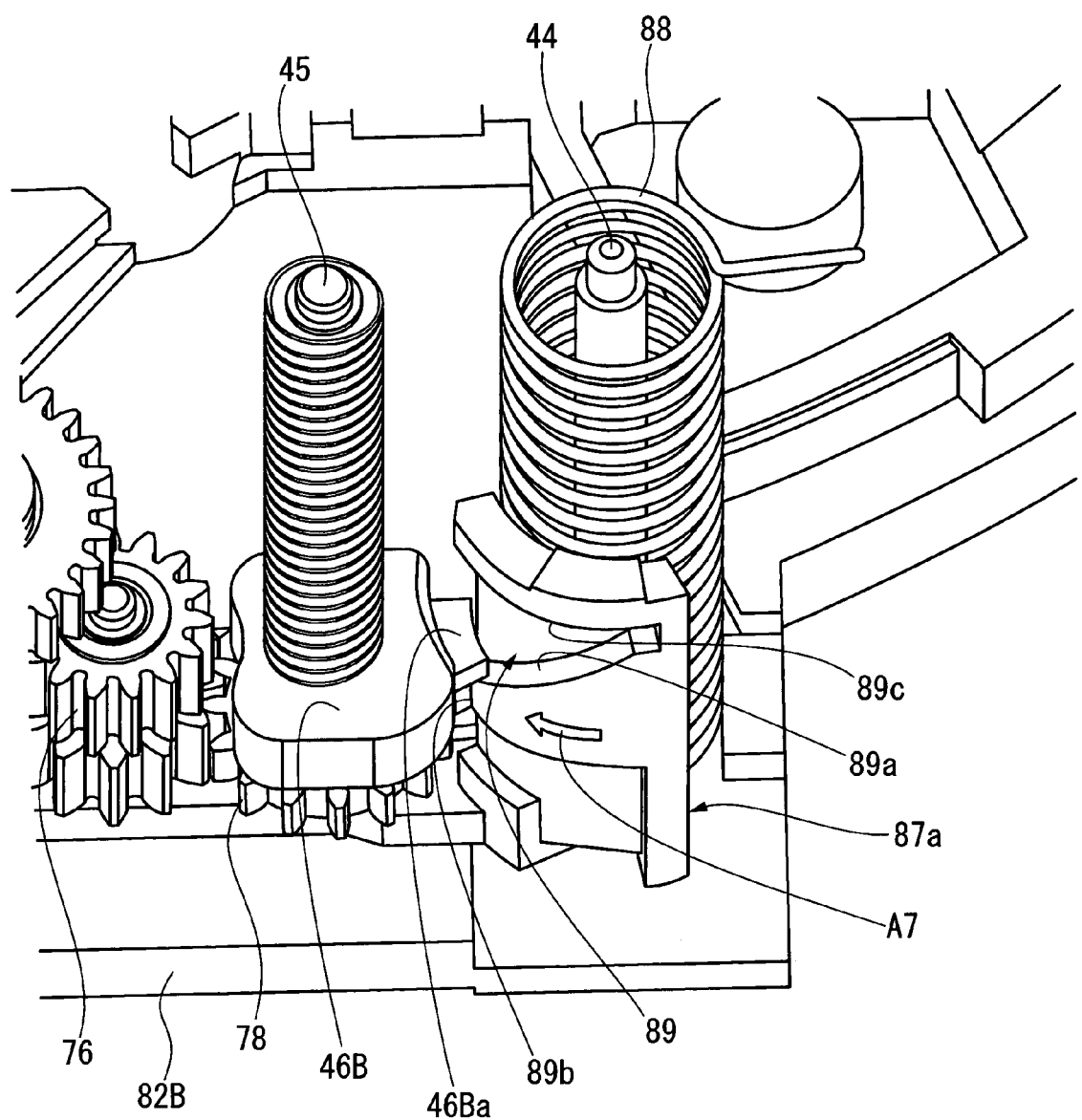
FIG. 49 is an explanatory view for explaining a cam mechanism for the fourth lens retaining frame 41B.

Next, characteristic features of the third embodiment will be described with reference to FIGS. 47 to 59. It is to be noted that FIG. 47 shows a movement of the fourth lens retaining frame 41B while FIG. 48 shows the movement of the third lens retaining frame 31B after the movement in FIG. 47. These FIGS. 47 and 48 are explanatory views for explaining a concept of an embodiment of the present invention as similar to FIG. 22 and therefore do not agree perfectly with positional relationships as seen in the configuration (FIGS. 49 to 59) to be described later as a concrete example. In the meantime, FIGS. 53 to 57 omit illustration of the compression torsion spring 88 in order to facilitate understanding.

In the lens barrel 10B of the third embodiment, the movements of the fourth lens retaining frame 41B and the third lens retaining frame 31B serving as the retractable lens retaining frames are different from those of the related art. Accordingly, the cam structures for achieving the movements are also different from those of the related art. First, the concept of the movements of the fourth lens retaining frame 41B and the third lens retaining frame 31B will be described.

As shown in FIG. 47, according to the lens barrel 10B of an embodiment of the present invention, housing positions of the third lens retaining frame 31B and the fourth lens retaining frame 41B as the retractable lens retaining frames inside the retractable lens housing 21Bb as close as possible to the lens barrel base 82B (to the focal position (imaging plane)) where the solid-state image sensing device 16 is provided so as to reduce the thickness dimension (length dimension in the photographing optical axis OA direction) of the retractable lens housing 21Bb that functions as the retractable lens housing located inside the fixation frame 21 and outside the fixed cylinder portion 21a. In other words, a space located in the direction orthogonal to the photographing optical axis OA relative to the solid-state image sensing device 16 is utilized as a space for housing the fourth lens group 14 (fourth lens retaining portion 85) serving as the retractable lens.

In the lens barrel 10B of the third embodiment, in order to enable housing of the third lens retaining frame 31B and the fourth lens regaining frame 41B into the preset housing positions, the fourth lens retaining frame 41B is firstly moved to a retracted position Ps-4 (see FIG. 47) and then the third lens retaining frame 31B is moved to a retracted position Ps-3 (see FIG. 48). In the course of these movements, when the fourth lens retaining frame 41B is directed from an on-axis position Pa-4 to the retracted position Ps-4 as shown in FIG. 47, the fourth lens retaining frame 41B firstly moves in the orthogonal direction (see an arrow A8) from the on-axis position Pa-4 to an off-axis parallel position Pp-4, and then moves in the inclined direction (see an arrow A9) from the off-axis parallel position Pp-4 to the retracted position Ps-4. Thereafter, as shown in FIG. 48, the third lens retaining frame 31B firstly moves to the imaging plane side along the photographing optical axis OA (see an arrow A10) to an on-axis position Pa-3 close to the solid-state image sensing device 16, and then moves in the orthogonal direction (see an arrow A11) from the on-axis position Pa-3 to the retracted position Ps-3.

In the third embodiment, the respective retractable lens retaining frames are moved as described above due to the following reason. As shown in FIG. 47, in the lens barrel 10B (photographing optical system thereof), if the fourth lens retaining frame 41B is located in the on-axis position Pa-4, then the solid-state image sensing device 16 to be located on the photographing optical axis OA is present on the lens barrel base 82B side (imaging plane side) of the fourth lens retaining frame 41B. However, since the retractable lens housing 21Bb is configured to house the third lens retaining frame 31B as well, there is no risk of an interference of an upper end of the fourth lens retaining frame 41B with any of the lower end 22f of the first rotary cylinder 22 and the front wall portion 21f of the fixation frame 21 during the movement of the fourth lens retaining frame 41B between the on-axis position Pa-4 and the retracted position Ps-4. For this reason, according to the lens barrel 10B of the third embodiment, it is possible to move the fourth lens retaining frame 41B by only considering avoidance of an interference of a lower end of the fourth lens retaining frame 41B with the solid-state image sensing device 16. In other words, even when the fourth lens retaining frame 41B is moved in the inclined direction to the retracted position Ps-4, such a movement does not cause an increase in the thickness dimension of the retractable lens housing 21Bb or an increase in the diametrical dimension of the fixed cylinder portion 21a (movable lens barrel (first rotary cylinder 22)). Accordingly, in the lens barrel 10B, the fourth lens retaining frame 41B located in the on-axis position Pa-4 is moved from the on-axis position Pa-4 in the direction orthogonal to the photographing optical axis OA (see the arrow A8), and is thereby moved to the off-axis parallel position Pp-4 where it is possible to avoid the interference with the solid-state image sensing device 16 on the lower side (imaging plane side) at the time of the movement in the inclined direction to the retracted position Ps-4. Thereafter, the fourth lens retaining frame 41B is moved from the off-axis parallel position Pp-4 in the inclined direction (see the arrow A9) relative to the photographing optical axis OA direction toward the lens barrel base 82B, and is thereby moved to the retracted position Ps-4 located close to the lens barrel base 82B inside the retractable lens housing 21Bb when viewed in the photographing optical axis OA direction. In this way, in the lens barrel 10B of the third embodiment, the fourth lens retaining frame 41B can be housed into the retractable lens housing 21Bb while being kept close to the lens barrel base 82B without interfering with the other members of the photographing optical system.

After this movement of the fourth lens retaining frame 41B, the movement of the third lens retaining frame 31B is carried out. Here, a moment after the movement of the fourth lens retaining frame 41B stated herein only needs to be a moment when it is surely possible to prevent the fourth lens retaining frame 41B and the third lens retaining frame from blocking the movement of the other. Therefore, the moment to start the movement of the third lens retaining frame 31B is not limited only to a moment after completion of the movement of the fourth lens retaining frame 41B.

As shown in FIG. 48, according to the lens barrel 10B (photographing optical system thereof), only the solid-state image sensing device 16 located on the photographing optical axis OA is present on the lens barrel base 82B (imaging plane) side of the third lens retaining frame 31B located on the photographing optical axis OA when the fourth lens retaining frame 41B is located in the retracted position Ps-4. In other words, after the fourth lens retaining frame 41B is retracted to the retracted position Ps-4, a space is defined in a position for the fourth lens retaining frame 41B (see the fourth lens retaining frame 41B (Pa-4) indicated with a chain double-dotted line) located in the on-axis position Pa-4 on the photographing optical axis OA. Therefore, in the lens barrel 10I3, the third lens retaining frame 31B is moved toward the imaging plane (see the arrow A10) along the photographing optical axis OA, and is thereby moved to the on-axis position Pa-3 where it is possible to avoid the interferences with the solid-state image sensing device 16 and the fourth lens retaining frame 41B located in the on-axis position Pa-9 when viewed in the photographing optical axis OA direction. Thereafter, the third lens retaining frame 31B is moved from the on-axis position Pa-3 in the direction orthogonal to the photographing optical axis (see the arrow A11), and is thereby moved to the retracted position Ps-3 close to the fourth lens retaining frame 41B inside the retractable lens housing 21Bb when viewed in the photographing optical axis OA direction. In this way, according to the lens barrel 10B of the third embodiment, the third lens retaining frame 31B can be housed into the retractable lens housing 21Bb while being kept close to the fourth lens retaining frame 41B located close to the lens barrel base 82B without interfering with the other members of the photographing optical system. Inside this retractable lens housing 21Bb, the fourth lens retaining frame 41Bb (fourth lens group 14) and the third lens retaining frame 31B (third lens group 13) are located on the same axis line parallel.

Here, the lower end interferes with the solid-state image sensing device 16 as indicated with a chain double-dotted line L2 in FIG. 47 in an attempt to move the fourth lens retaining frame 41B in the retracted position Ps-4 to the on-axis position Pa-4 on the photographing optical axis OA merely by the straight movement. To avoid the interference, it is necessary to displace the on-axis position Pa-4 to be defined as the retraction start position on the photographing optical axis OA of the fourth lens retaining frame 41B closer to the subject side. Hence there is a risk of causing reduction in the freedom of optical settings in the photographing optical system which may lead to degradation in the performances as a consequence. Here, it is possible to prevent reduction in the freedom of the optical settings in the photographing optical system by setting the on-axis position Pa-4 as the retraction start position closer to the subject than the lowest end position (position closest to the imaging plane) in the photographing state P where the fourth lens retaining frame 41B (fourth lens group 14) is located on the photographing optical axis OA. However, this arrangement may complicate the cam structures for moving the fourth lens retaining frame 41B.

On the other hand, according to the lens barrel 1013 of the third embodiment, the fourth lens retaining frame 41B is moved in the orthogonal direction (see the arrow A8 in FIG. 47) from the on-axis position Pa-4 to the off-axis parallel position Pp-4, then moved in the inclined direction (see the arrow A9) from the off-axis parallel position Pp-4 to the retracted position Ps-4, and then the third lens retaining frame 31B is located in the retracted position Ps-3 close to the fourth lens retaining frame 41B which is located in the retracted position Ps-4. In this way, the retractable lens retaining frames can be housed into the retractable lens housing 21Bb while being kept close to the lens barrel base 82B without interfering with the other members of the photographing optical system. Thus, there neither occurs an increase in the thickness dimension of the retractable lens housing 21Bb nor occurs an increase in the diametrical dimension of the fixed cylinder portion 21a (movable lens barrel (first rotary cylinder 22)).

In this lens barrel 10B, in order to enable the above-described movements, the fourth lens retaining frame 41B (fourth lens retaining frame rotation base 87 to be described later) is provided with a stepped portion 89 serving as a cam groove and a retaining frame side stepped engagement surface 55 (see FIG. 51 and the like), and the lens barrel base 82B for supporting the fourth group main guide shaft 44 is provided with a base side stepped engagement surface 56 (see FIG. 52 and the like), collectively as cam structures configured to connect the fourth lens retaining frame 41B to the fourth group female screw member 46 (contact portion 46a). Here, concerning the third lens retaining frame 31B, the movements can be achieved by the movement on the photographing optical axis OA and by the rotation around the third group main guide shaft 32 as described previously.

Figure 50:
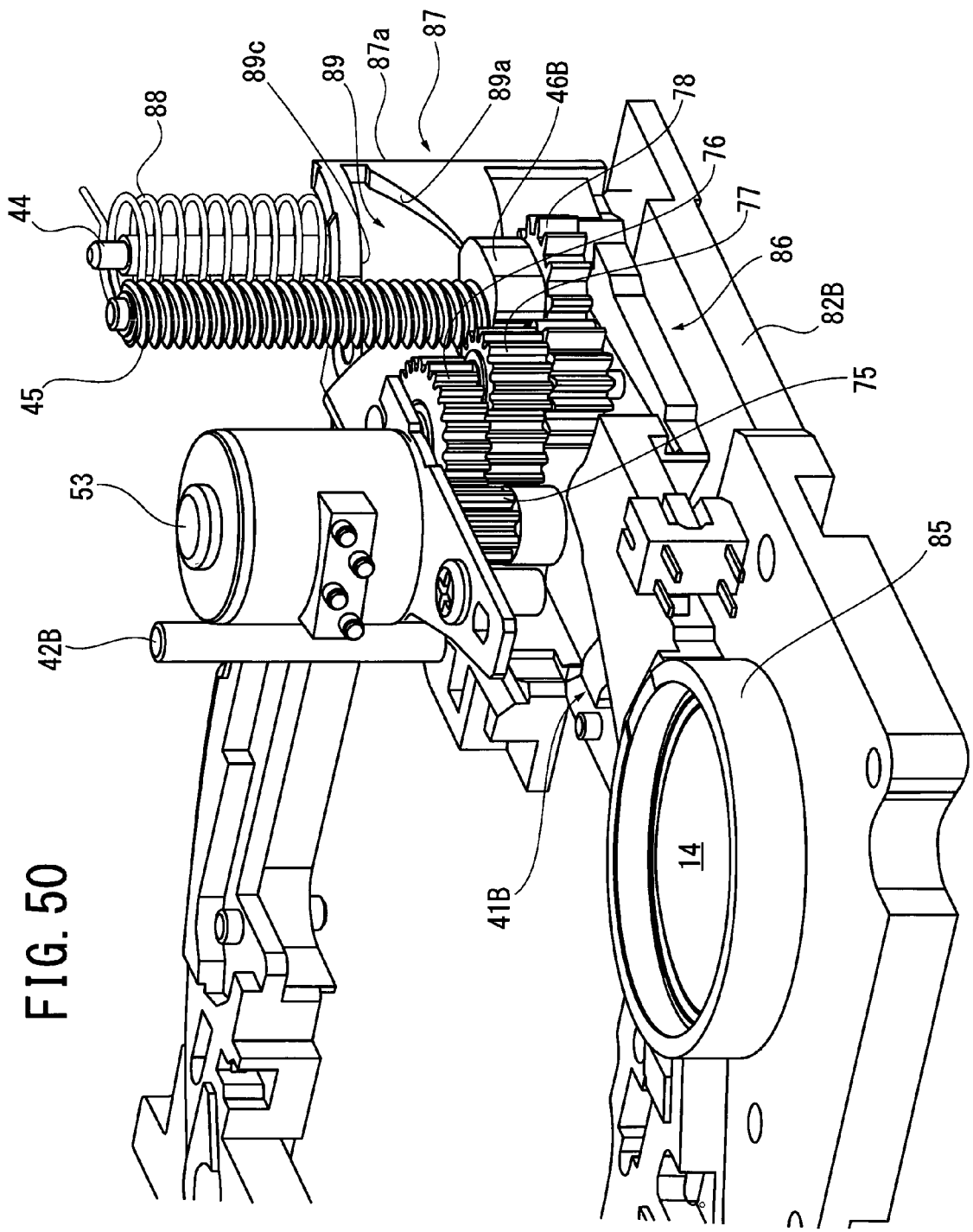
FIG. 50 is an explanatory view for explaining a configuration of the fourth lens retaining frame 41B on the lens barrel base 82B.
Figure 51:
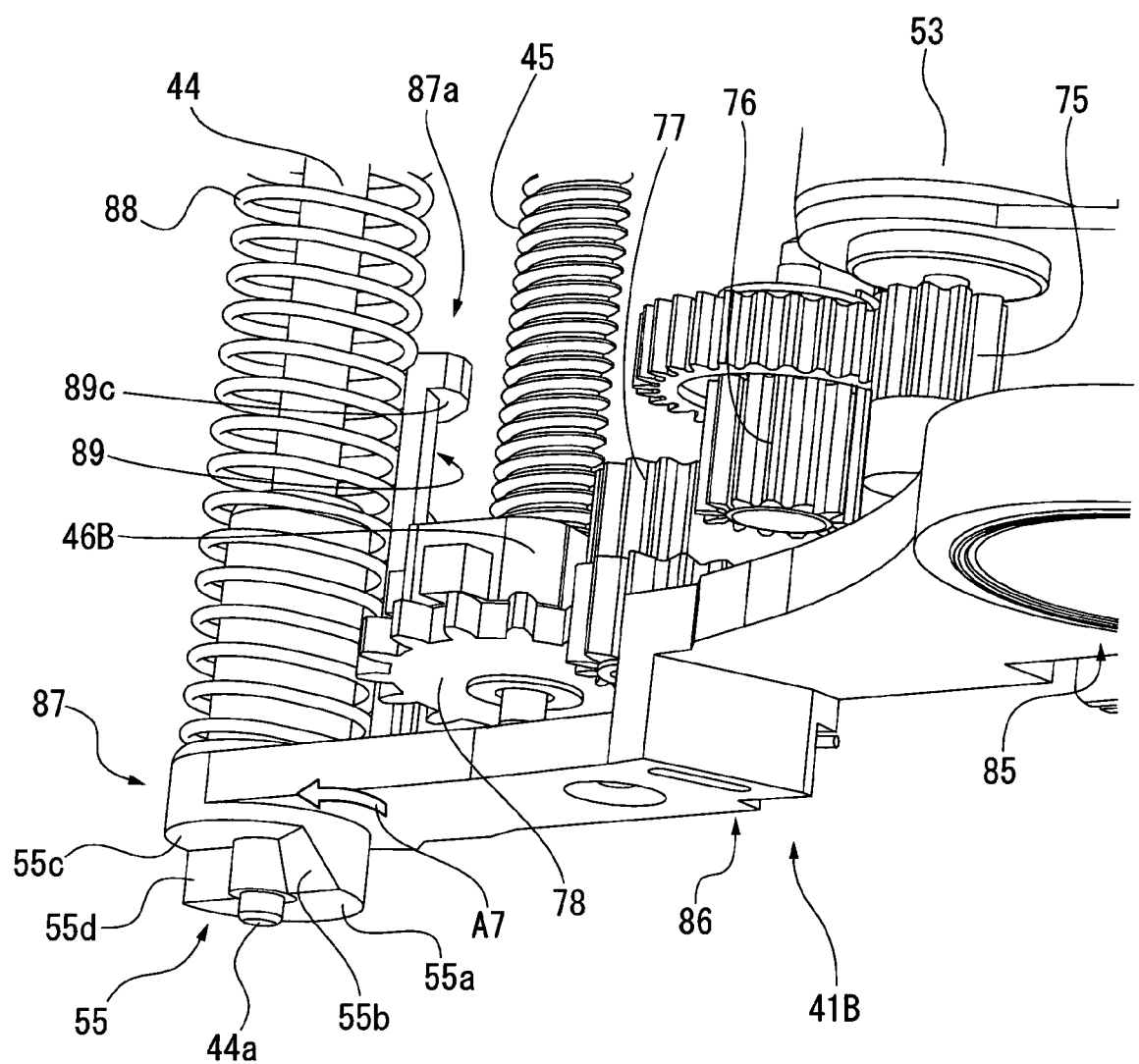
FIG. 51 is a schematic perspective view for explaining a configuration of a retaining frame side stepped engagement surface 55 of the fourth lens retaining frame 41B.

As shown in FIGS. 45, 50, 51, and the like, this fourth lens retaining frame 41B provided with the stepped portion 89 and the retaining frame side stepped engagement surface 55 includes the fourth lens retaining portion 85, a fourth lens retaining frame arm portion 86, and the fourth lens retaining frame rotation base 87.

The fourth lens retaining portion 85 is located on one end side of the fourth lens retaining frame 41B and is configured to be able to retain the fourth lens group 14. The fourth lens retaining portion 85 is a frame member having a cylindrical shape as a whole. One end side of the fourth lens retaining frame arm portion 86 is connected to this fourth lens retaining portion 85.

The fourth lens retaining frame arm portion 86 links the fourth lens retaining portion 85 with the fourth lens retaining frame rotation base 87, thereby constituting an arm portion in the fourth lens retaining frame 41B. This fourth lens retaining frame arm portion 86 forms a crack-shaped bent portion as a whole in which an intermediate position extends in a parallel direction to the fourth group main guide shaft 44. The fourth lens retaining frame rotation base 87 is connected to another end thereof.

The fourth lens retaining frame rotation base 87 exhibits a cylindrical shape as a whole, and is supported by the fourth group main guide shaft 44 so as to be rotatable and to be movable in the photographing optical axis OA direction (see FIGS. 44, 45, and the like). The fourth lens retaining frame rotation base 87 is constantly and rotationally biased in the rotating direction from the storage position (collapsed stored state D) toward the photographing position (photographing state P) on the photographing optical axis OA by the compression torsion spring 88. Moreover, the fourth lens retaining frame rotation base 87 is constantly and straightforwardly biased on the fourth group main guide shaft 44 in the direction from the object side toward the lens barrel base 82B on the imaging plane side (backward). The rotationally biased direction in terms of this fourth lens retaining frame rotation base 87 is indicated with an arrow A7 in FIGS. 49, 51, and the like. In this way, the compression torsion spring 88 functions as cylindrical body biasing means for applying the biasing force to the fourth lens retaining frame rotation base 87 serving as a rotating cylindrical body that constitutes a rotation base of the fourth lens retaining frame 41B serving as the retractable lens retaining frame.

This fourth lens retaining frame rotation base 87 is provided with a curved wall portion 87a in a cylindrical shape, which is formed by curving a plate member around an axis line of the fourth group main guide shaft 44 as the center. This curved wall portion 87a is provided with the stepped portion 89 recessed from an outer peripheral surface of the cylinder. This stepped portion 89 is provided with a cam surface 89a configured to define a cam slope shape on a base end side (imaging plane side), a side engagement surface 89b being connected to a lower end thereof and extending in the photographing optical axis OA direction, and a front engagement surface 89c that defines a flat surface on the subject side so as to substantially perpendicularly intersect the photographing optical axis OA. In the third embodiment, the left side of the stepped portion 89 when viewing FIG. 49 from front is opened in order to facilitate an assembly work.

Meanwhile, the retaining frame side stepped engagement surface 55 (see FIG. 51 and the like) is provided at a lower end of the fourth lens retaining frame rotation base 87. As shown in FIG. 51, this retaining frame side stepped engagement surface 55 includes a retaining frame side first flat surface 55a, a retaining frame side inclined surface 55b, a retaining frame side second flat surface 55c, and a retaining frame side orthogonal surface 55d, which are provided so as to surround the fourth group main guide shaft 44.

The retaining frame side first flat surface 55a is defined as the flat surface which is orthogonal to the photographing optical axis OA and is located closest to the imaging plane side. The retaining frame side inclined surface 55b is provided continuously with the retaining frame side first flat surface 55a. The retaining frame side inclined surface 55b contains a radial direction of a rotating axis of the fourth group main guide shaft 44, and is also inclined relative to the direction of the rotating axis (direction of extension of the fourth group main guide shaft 44 (photographing optical axis OA direction)) so as to be directed to a base of the fourth lens retaining frame arm portion 86 on the subject side when being directed to a positive side in the rotationally biased direction (see the arrow A7). The retaining frame side second flat surface 55c is provided continuously with the retaining frame side inclined surface 55b and is defined as the flat surface which is orthogonal to the photographing optical axis OA. Accordingly, the retaining frame side second flat surface 55c is located closer to the subject side than the retaining frame side first flat surface 55a. The retaining frame side orthogonal surface 55d is the flat surface parallel to the photographing optical axis OA and is configured to connect between the retaining frame side second flat surface 55c and the retaining frame side first flat surface 55a. This retaining frame side stepped engagement surface 55 (and the respective surfaces thereof) are configured to be able to contact the base side stepped engagement surface 56 (see FIG. 52 and the like) provided on the lens barrel base 82B.

Figure 52:
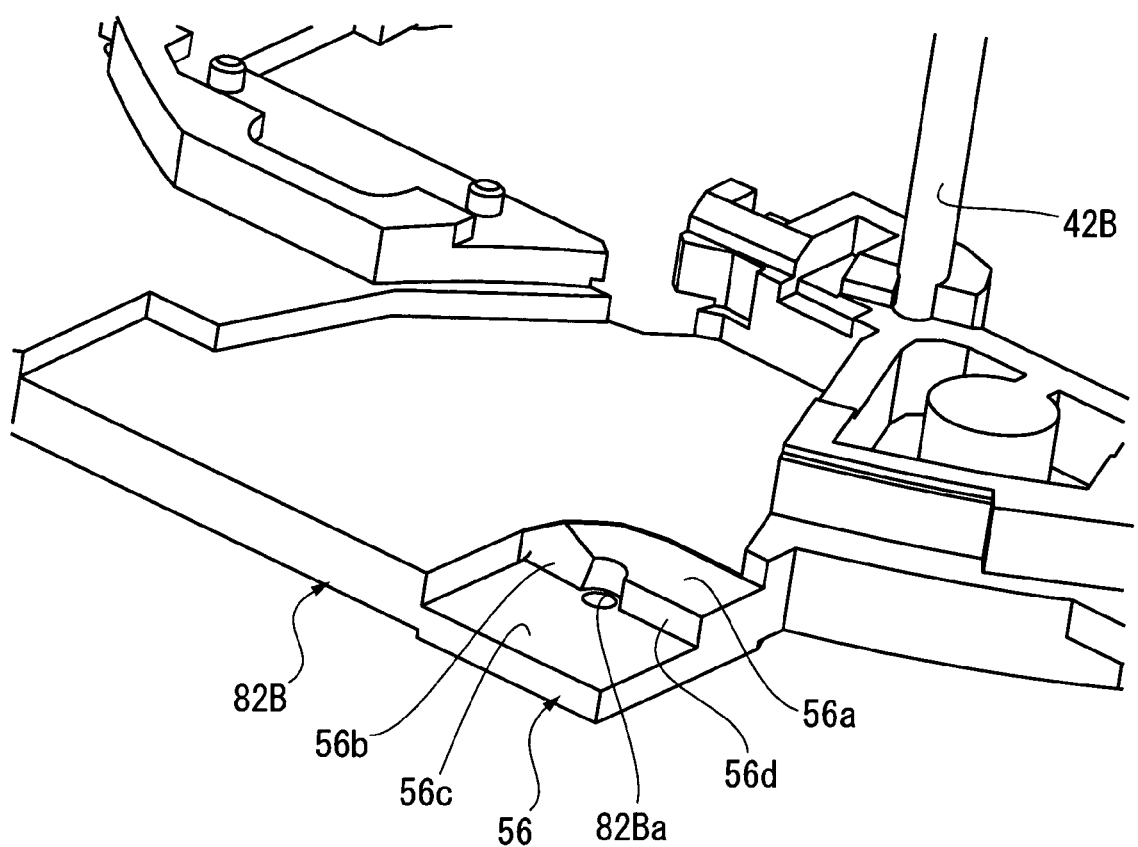
FIG. 52 is a schematic perspective view for explaining a configuration of a base side stepped engagement surface 56 of the lens barrel base 82B.

As shown in FIG. 52, the base side stepped engagement surface 56 includes a base side first flat surface 56a, a base side inclined surface 56b, a base side second flat surface 56c, and a base side orthogonal surface 56d, which are provided so as to surround an insertion hole 82Ba configured to pivotally support a lower end 44a (see FIG. 51) of the fourth group main guide shaft 44 provided on the lens barrel base 82B.

The base side first flat surface 56a is the flat surface which is orthogonal to the photographing optical axis OA and is located closest to the subject side. The base side inclined surface 56b is provided continuously with the base side first flat surface 56a. The base side inclined surface 56b contains the radial direction of the rotating axis of the fourth group main guide shaft 44, and is also inclined relative to the direction of the rotating axis (direction of extension of the fourth group main guide shaft 44 (photographing optical axis OA direction)) so as to be directed to the subject side when being directed to the positive side in the rotationally biased direction (see the arrow A7) to the fourth lens retaining frame rotation base 87 (fourth lens retaining frame 41B). The base side second flat surface 56c is provided continuously with the base side inclined surface 56b and is defined as the flat surface which is orthogonal to the photographing optical axis OA. Accordingly, the base side second flat surface 56c is located closer to the subject side than the base first flat surface 56a. The base side orthogonal surface 56d is the flat surface parallel to the photographing optical axis OA and is configured to connect between the base side second flat surface 56c and the base side first flat surface 56a.

This retaining frame side stepped engagement surface 55 (and the respective surfaces thereof) and the base side stepped engagement surface 56 (respective surfaces thereof) are configured to establish a positional relationship such that the retaining frame side first flat surface 55a and the base side first flat surface 56a are opposed to each other when viewed in the photographing optical axis OA direction in the photographing position (photographing state P) where the fourth lens retaining frame 41B comes into contact with the fourth group sub-guide shaft 42B and locates the fourth lens group 14 on the photographing optical axis OA.

Next, operations when the fourth lens retaining frame 41B in the lens barrel 10B is rotated between the photographing position (photographing state P) where the fourth lens group 14 is inserted onto the photographing optical axis OA and the storage position (collapsed stored state D) where the fourth lens group 14 is housed in the retractable lens housing 21Bb will be described with reference to FIGS. 47 to 59.

The fourth lens retaining frame rotation base 87 is rotated upon receipt of a pressing force from a fourth group female screw member 46B which is moved straight in the photographing optical axis OA direction (front-back direction) due to a sliding action between the stepped portion 89 provided on the outer peripheral surface of the fourth lens retaining frame rotation base 87 and a contact portion 46Ba of the fourth group female screw member 46B accepted by the stepped portion 89. Accordingly, the stepped portion 89 functions as the cam groove while the contact portion 46Ba of the fourth group female screw member 46B functions as the cam pin.

The fourth lens retaining frame rotation base 87 is moved vertically along the fourth group main guide shaft 44 or is rotated around the fourth group main guide shaft 44 by the contact portion 46Ba of the fourth group female screw member 46B, which serves as the cam pin configured to be moved in the front-back direction inside the stepped portion 87 serving as the cam groove. An action of the fourth lens retaining frame rotation base 87 relative to the position of the contact portion 46Ba inside the stepped portion 89 being the cam groove in this case will now be explained.

In the lens barrel 10B of the third embodiment, the fourth group motor 53 is rotated in the counterclockwise direction (in the clockwise direction when viewed from the front side of the lens barrel) whereby the force is transmitted to the fourth group lead screw 45 sequentially through a gear 75, a gear 76, a gear 77, and gear 78. Hence the fourth group lead screw 45 is rotated clockwise whereby the fourth group female screw member 46B moves from the storage position S toward the subject side on the fourth group lead screw 45 along the photographing optical axis OA and reaches the telescopic position T (similarly to the third group female screw member 35 shown in FIG. 14A) via the wide-angle position W. On the other hand, by rotating the fourth group motor 53 in the clockwise direction, the fourth group female screw member 46B moves from the telescopic position T to the imaging plane side on the fourth group lead screw 53 along the photographing optical axis OA direction, and reaches the storage position S via the wide-angle position W. In the lens barrel 10B, by moving the fourth group female screw member 46B on the fourth group lead screw 45 as described above, the fourth lens group 14 (fourth lens retaining portion 85) is moved between the storage position (retracted position Ps (collapsed stored state D)) in the retractable lens housing 21Bb and the photographing position (on-axis position Pa (photographing state P)) on the photographing optical axis OA.

Figure 53:
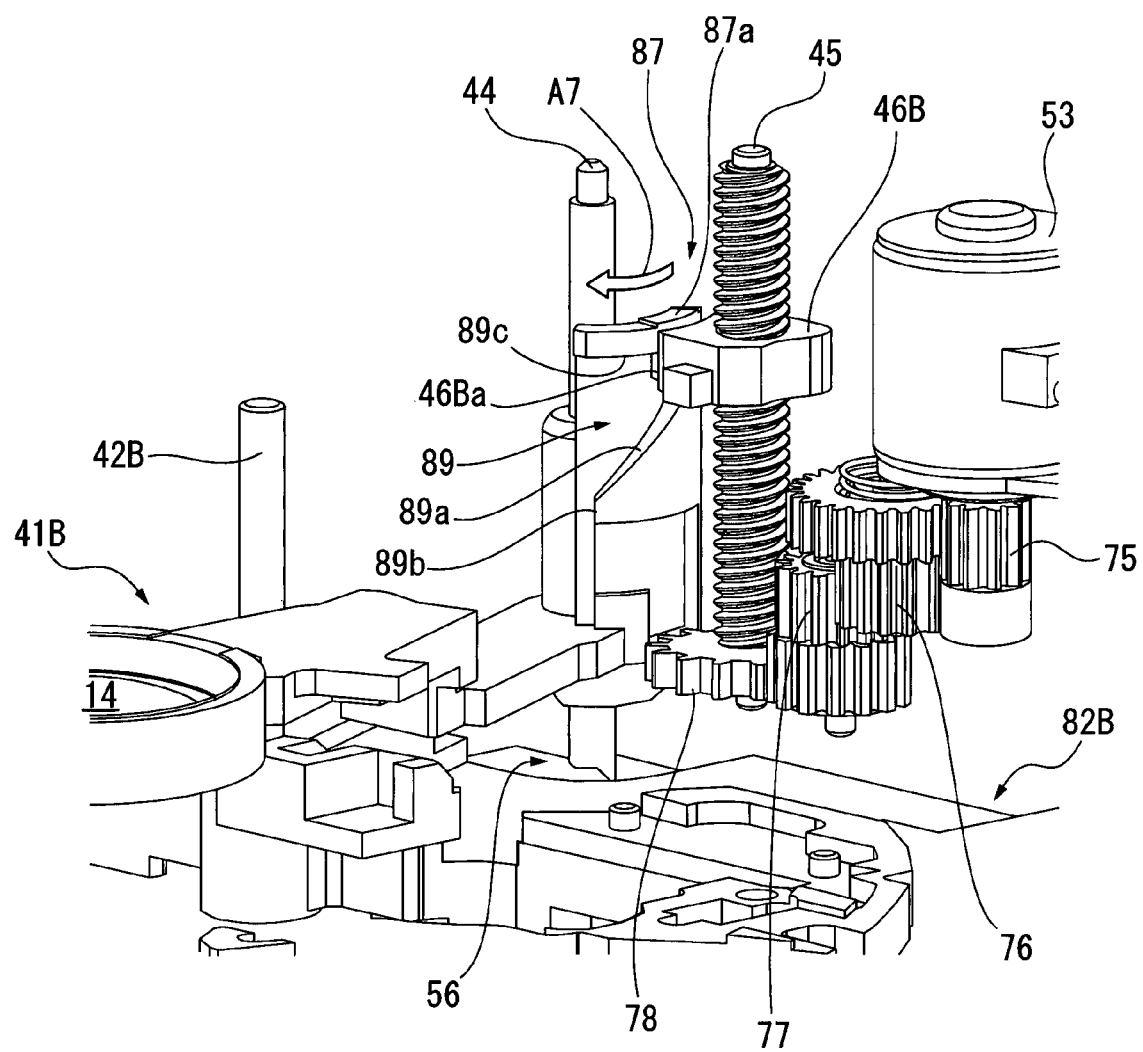
FIG. 53 is a schematic enlarged perspective view for explaining operations of a cam mechanism of the fourth lens retaining frame 41B, and shows a stepped portion 89 of a fourth lens retaining frame rotation base 87 of the fourth lens retaining frame 41B and its surroundings.

When the fourth group female screw member 46B is moved in front of the retraction start position B (on the object side and on the upper side when viewed from front) (see FIG. 14A), the contact portion 46Ba comes into contact with the front engagement surface 89c as shown in FIG. 53. At this time, since the fourth lens retaining frame rotation base 87 is rotationally biased in the direction of the arrow A7 by the compression torsion spring 88, the contact portion 46Ba (an upper surface thereof) is in contact with the front engagement surface 89c at an end on the right side in the drawing. In this state, the fourth lens retaining frame 41B is in contact with the fourth group sub-guide shaft 42B owing to the rotational bias (see the arrow A7) whereby the third lens group 13 is located on the photographing optical axis OA. In this state, if the fourth group female screw member 46B is moved further forward (on the subject side) (to the wide-angle position W or the telescopic position T, for example (see FIG. 14A)), the contact portion 46Ba (upper surface thereof) presses the front engagement surface 89c forward so as to push up the fourth lens retaining frame rotation base 87 forward. Accordingly, the fourth lens group 14 is moved toward the object side appropriately on the photographing optical axis OA.

Figure 54:
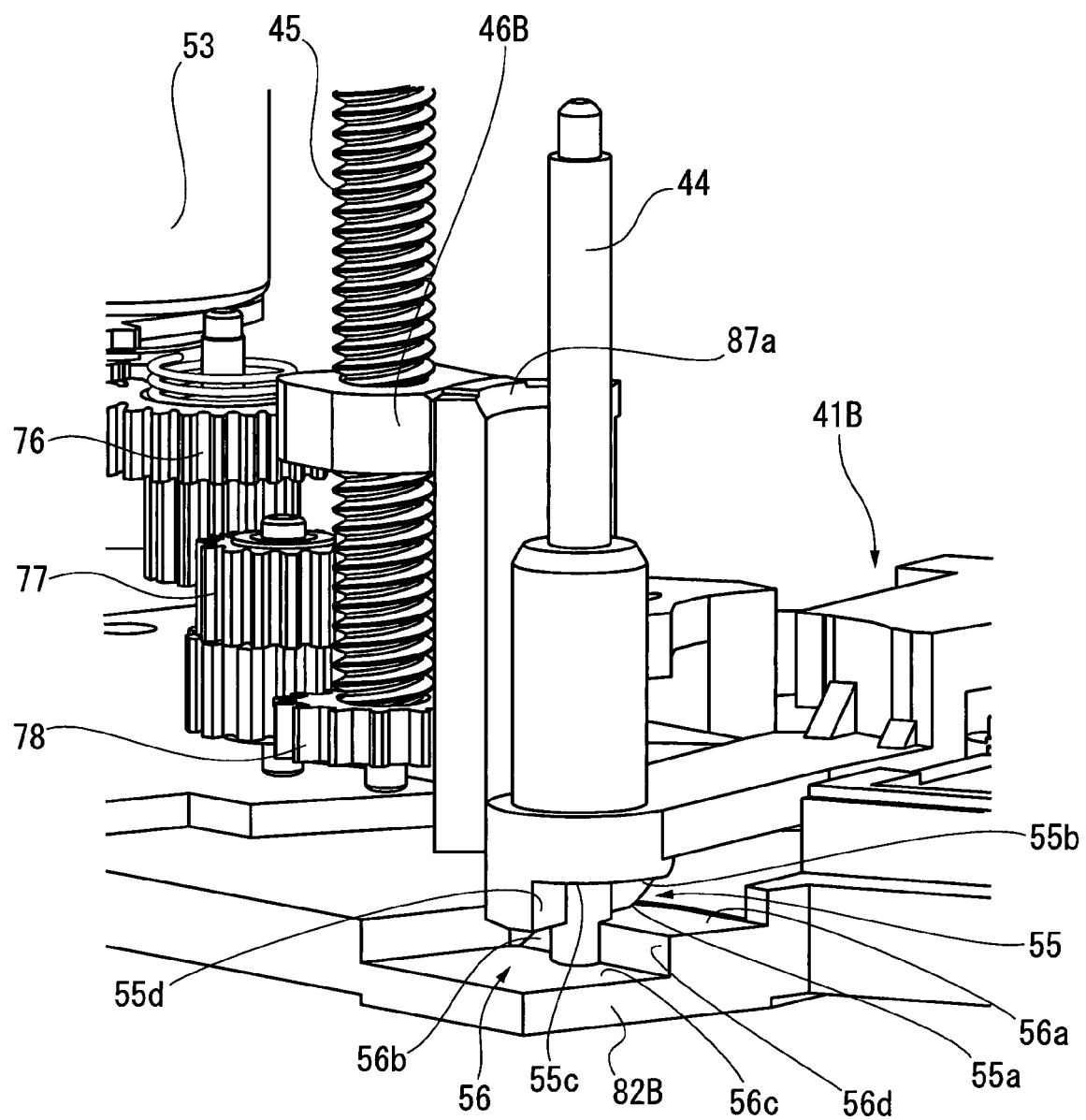
FIG. 54 is a schematic enlarged perspective view for explaining the operation of the cam mechanism of the fourth lens retaining frame 41B, and shows the stepped portion 89 of the fourth lens retaining frame rotation base 87 of the fourth lens retaining frame 41B and its surroundings, after FIG. 53 in the process of retracting the fourth lens retaining frame 41B.

When the fourth group female screw member 46B is moved to the rear of the retraction start position B (on the imaging plane side and on a lower side when viewed from front) (see FIG. 14A), the fourth lens retaining frame rotation base 87 (fourth lens retaining frame 41B) approaches the lens barrel base 82B in accordance with the height position of the contact portion 46Ba (fourth group female screw member 46B) contacting the front engagement surface 89c. Upon retraction to a predetermined height position, the retaining frame side first flat surface 55a of the retaining frame side stepped engagement surface 55 of the fourth lens retaining frame rotation base 87 comes into contact with the base side first flat surface 56a of the base side stepped engagement surface 56 of the lens barrel base 82B as shown in FIG. 54.

Figure 55:
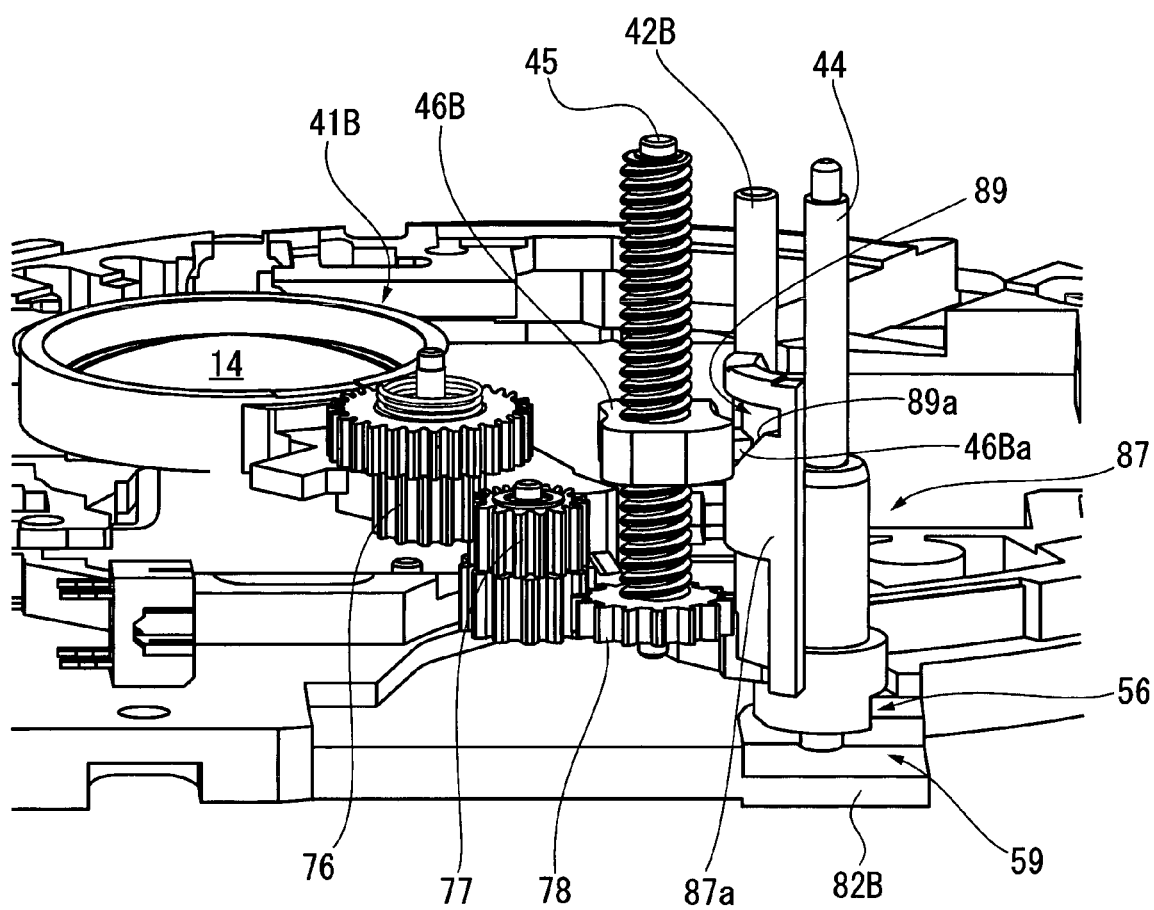
FIG. 55 is a schematic enlarged perspective view for explaining the operation of the cam mechanism of the fourth lens retaining frame 41B, and shows the stepped portion 89 of the fourth lens retaining frame rotation base 87 of the fourth lens retaining frame 41B and its surroundings after FIG. 54 in the process of retracting the fourth lens retaining frame 41B.
Figure 56:
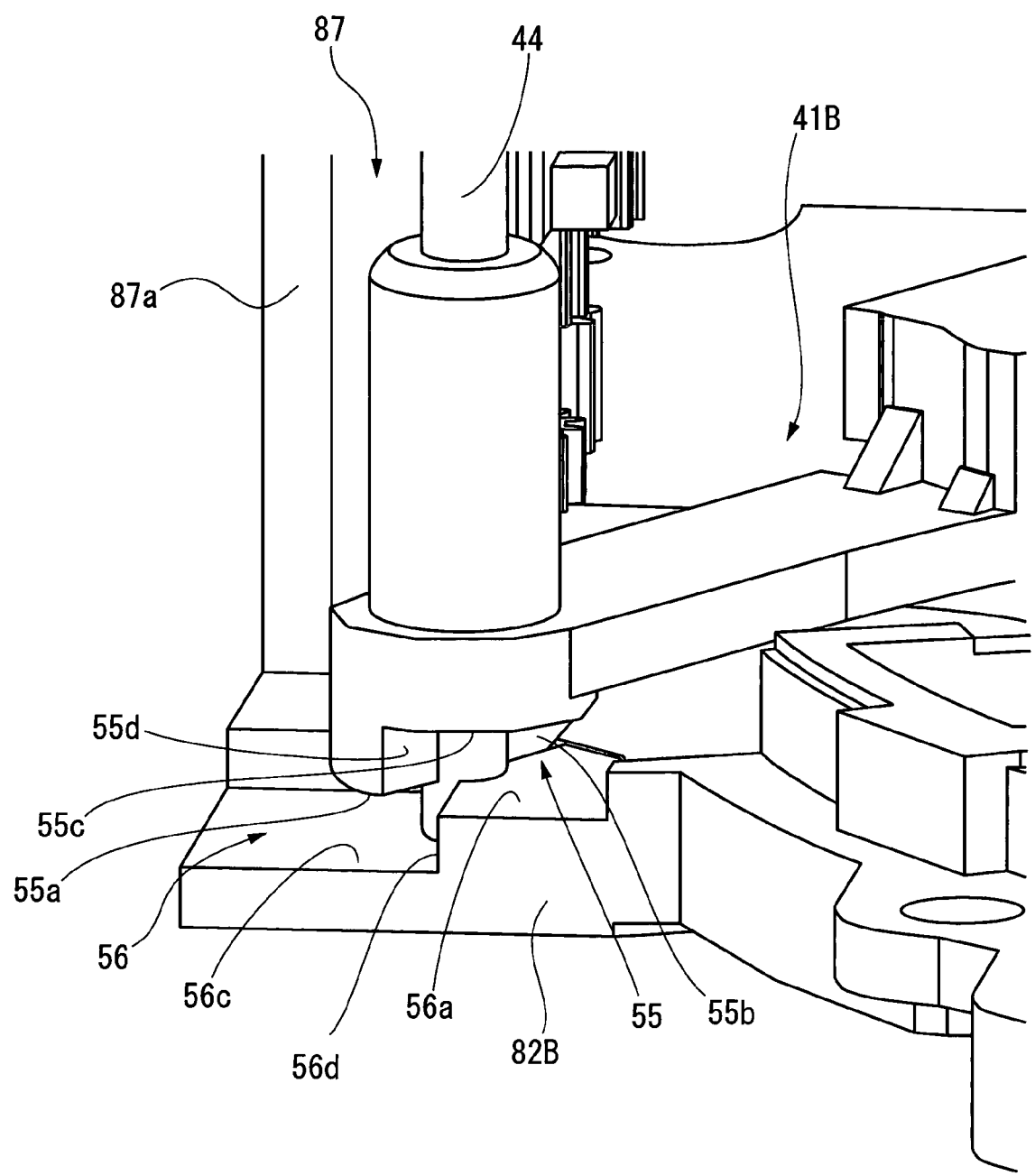
FIG. 56 is a schematic enlarged perspective view for explaining the operation of the cam mechanism of the fourth lens retaining frame 41B, and shows the stepped portion 89 of the fourth lens retaining frame rotation base 87 of the fourth lens retaining frame 41B and its surroundings after FIG. 55 in the process of retracting the fourth lens retaining frame 41B.

When the fourth group female screw member 46B is moved further backward from this position (to the imaging plane side), the upper surface of the contact portion 46Ba is detached from the front engagement surface 89c. Instead, a lower surface of the contact portion 46Ba comes into contact with the cam surface 89a (see FIG. 55). When the fourth group female screw member 46B is moved backward from this position (to the imaging plane side), the contact portions 46Ba presses the cam surface 89a backward. At this time, the fourth lens retaining frame rotation base 87 is not pushed down because the retaining frame side first flat surface 55a of the retaining frame side stepped engagement surface 55 of the fourth lens retaining frame 41B (fourth lens retaining frame rotation base 87) is in contact with the base side first flat surface 56a of the base side stepped engagement surface 56 of the lens barrel base 82B. For this reason, when the fourth lens retaining frame rotation base 87 is rotated, the fourth lens retaining frame rotation base 87 is rotated against the rotational biasing force in the position contacting the lens barrel base 82B so as to correspond to the height positions of the contact portion 46Ba as shown in the order of FIG. 55 and FIG. 56 by the pressing force and guiding actions of the contact portion 46Ba and the cam surface 89a. When the fourth lens retaining frame rotation base 87 is rotated as described above, the fourth lens retaining frame 41B rotates the fourth lens group 14 around the fourth group main guide shaft 44 from the position on the photographing optical axis OA. Accordingly, when this contact portion 46Ba is pressing and sliding on the cam surface 89a while the retaining frame side first flat surface 55a is sliding on the base side first flat surface 56a, the fourth lens retaining frame 41B is moved from the position on the photographing optical axis OA in the orthogonal direction and thereby moved from the on-axis position Pa-4 to the off-axis parallel position Pp-4 in the orthogonal direction (see the arrow A8 in FIG. 47).

Figure 57:
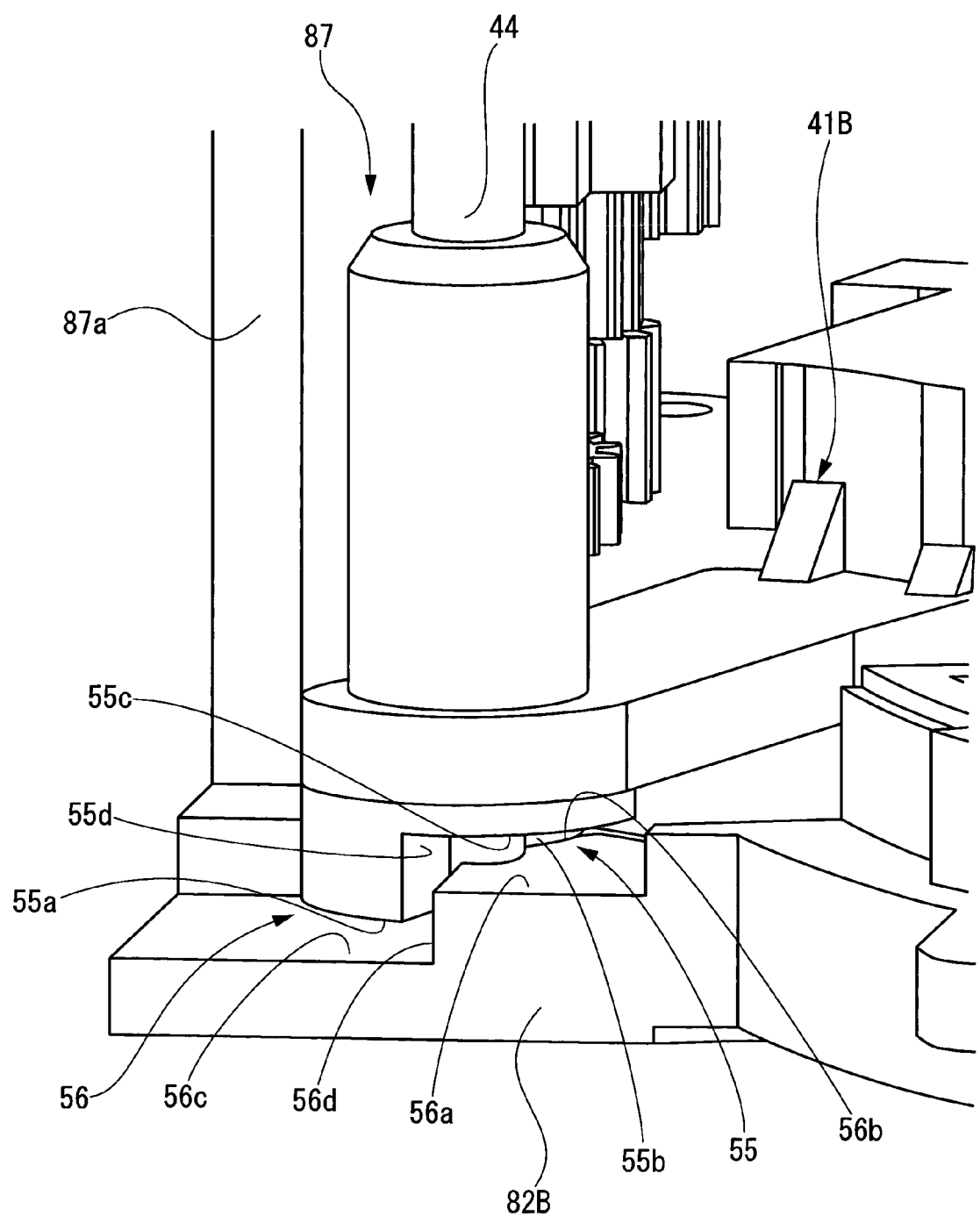
FIG. 57 is a schematic enlarged perspective view for explaining the operation of the cam mechanism of the fourth lens retaining frame 41B, and shows the stepped portion 89 of the fourth lens retaining frame rotation base 87 of the fourth lens retaining frame 41B and its surroundings after FIG. 56 in the process of retracting the fourth lens retaining frame 41B.
Figure 58:
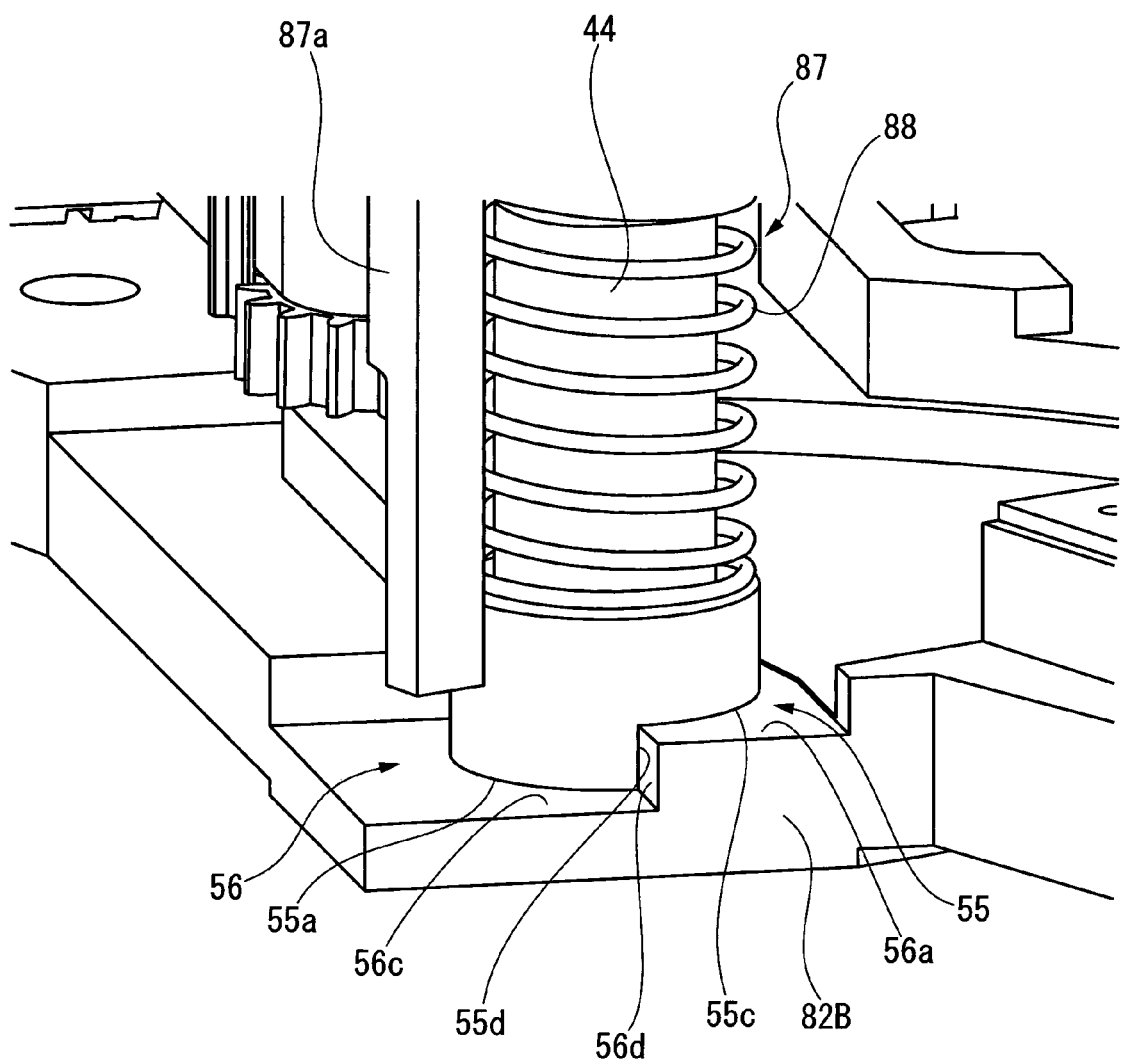
FIG. 58 is a schematic enlarged perspective view for explaining the operation of the cam mechanism of the fourth lens retaining frame 41B, and shows the stepped portion 89 of the fourth lens retaining frame rotation base 87 of the fourth lens retaining frame 41B and its surroundings after FIG. 57 in the process of retracting the fourth lens retaining frame 41B.

When the fourth group female screw member 46B is moved further backward from this state (to the imaging plane side), the fourth lens retaining frame rotation base 87 is rotated relative to the lens barrel base 82B whereby the positional relationship between the retaining frame side stepped engagement surface 55 and the base side stepped engagement surface 56 transitions from a state in which the retaining frame side first flat surface 55a is in contact with base side first flat surface 56a (see FIG. 56) to a state in which the retaining frame side inclined surface 55b is in contact with base side inclined surface 56b (see FIG. 57). When the fourth group female screw member 4613 is moved further backward from this state (to the imaging plane side), the contact portion 46Ba presses the cam surface 89a and the fourth lens retaining frame rotation base 87 backward by way of the cam surface 89a. As a consequence, the fourth lens retaining frame rotation base 87 is rotated and pushed down against the rotational biasing force so as to correspond to the height position of the contact portion 46Ba as shown in the order of FIGS. 56, 57, and 58 by the pressing force and the guiding actions of the contact portion 46Ba and the cam surface 89a as well as guiding actions of the retaining frame side inclined surface 55b and the base side inclined surface 56b. When the fourth lens retaining frame rotation base 87 is rotated and pushed down as described above, the fourth lens retaining frame 41B rotates the fourth lens group 14 around the fourth group main guide shaft 44 and retracts the fourth lens group 14 along the photographing optical axis OA. Accordingly, when this contact portion 46Ba is sliding on the cam surface 89a while the retaining frame side inclined surface 55b is sliding on the base side inclined surface 56b, the fourth lens retaining frame 41B is moved obliquely backward (to the imaging plane side)

relative to the photographing optical axis OA direction and thereby moved from the off-axis parallel position Pp-4 to the retracted position Ps-4 in the inclined direction (see the arrow A9 in FIG. 47). Accordingly, the retaining frame side inclined surface 55b of the retaining frame side stepped engagement surface 55 functions as the retaining frame side cam surface while the base side inclined surface 56b of the base side stepped engagement surface 56 functions as the base side cam surface.

Figure 59:
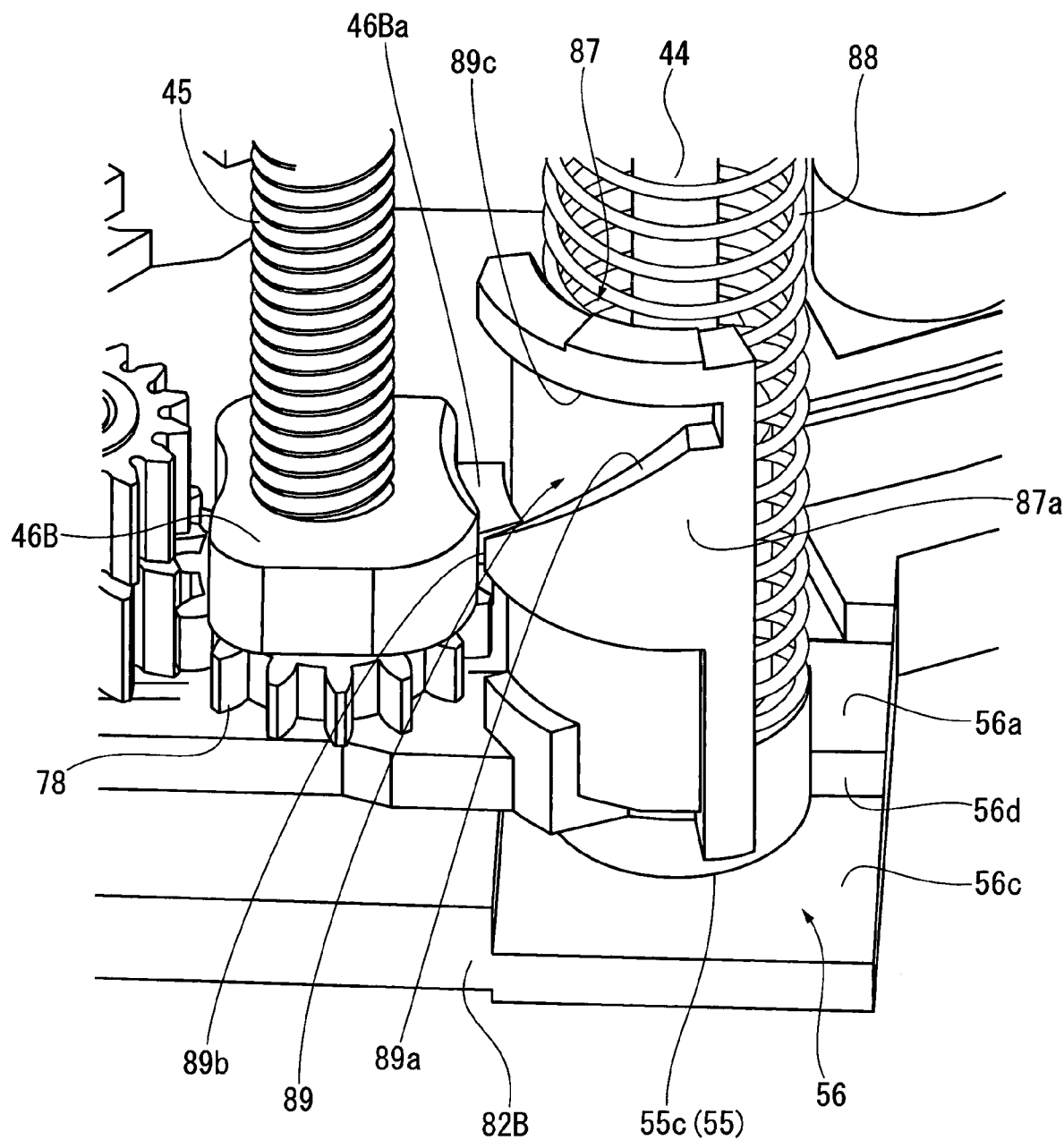
FIG. 59 is a schematic enlarged perspective view for explaining the operation of the cam mechanism of the fourth lens retaining frame 41B, and shows the stepped portion 89 of the fourth lens retaining frame rotation base 87 of the fourth lens retaining frame 41B and its surroundings after FIG. 58 in the process of retracting the fourth lens retaining frame 41B.

When the fourth group female screw member 46B is moved backward (to the imaging plane side) from this state to the storage position S, the contact position of the contact portion 46Ba in the stepped portion 89 is transitioned from the cam surface 89a to the side engagement surface 89b (see FIG. 59). Then, the contact portion 46Ba (side surface thereof) comes into contact with the side engagement surface 89b so as to press (to be engaged with) each other as the fourth lens retaining frame rotation base 87 is rotationally biased (see the arrow A7), thereby fixing a rotational posture of the fourth lens retaining frame rotation base 87. When the fourth group female screw member 46B is retracted to the position where this contact portion 46Ba comes into contact with the side engagement surface 89b, the fourth lens retaining frame rotation base 87 is rotated relative to the lens barrel base 82 whereby the positional relationship between the retaining frame side stepped engagement surface 55 and the base side stepped engagement surface 56 transitions from the state of bringing the retaining frame side inclined surface 55b into contact with base side inclined surface 56b (see FIG. 57) to a state of bringing the retaining frame side second flat surface 55c into contact with base side second flat surface 56c (see FIG. 58), and then the retaining frame side orthogonal surface 55d comes into contact with the base side orthogonal surface 56d (see FIG. 59). Accordingly, when the contact portion 46Ba (side surface thereof) comes into contact and engagement with the side engagement surface 89b to fix the rotational posture of the fourth lens retaining frame rotation base 87, the position in the photographing optical axis OA direction of the fourth lens retaining frame 41B is fixed to the height position where the retaining frame side second flat surface 55c of the retaining frame side stepped engagement surface 55 of the fourth lens retaining frame rotation base 87 comes into contact with the base side second flat surface 56c of the base side stepped engagement surface 56 of the lens barrel base 82B. As described above, in the state where the contact portion 46Ba (side surface thereof) is in contact and engagement with the side engagement surface 89b and the retaining frame side second flat surface 55c is in contact with the base side second flat surface 55c (see FIG. 58) and the retaining frame side orthogonal surface 55d is also in contact with the base side orthogonal surface 56d (see FIG. 59), the fourth lens retaining frame 41B is set to the collapsed stored state D where the fourth lens group 14 is located in the retracted position Ps-4 (storage position) (see FIG. 47).

In the lens barrel 10B of the third embodiment, the retractable lens housing 21Bb is designed to have the minimum requisite thickness dimension in order to house the fourth lens group 14 (fourth lens retaining portion 85) serving as the retractable lens located close to the lens barrel base 82B and to house the third lens group 13 (third lens retaining portion 93) in the position close to the fourth lens group in the photographing optical axis direction, and this retractable lens housing 21Bb is provided inside the fixation frame 21 and outside the fixed cylinder portion 21a. Hence it is possible to set the thickness dimension on the outside smaller than the fixed cylinder portion 21a of the fixation frame 21. In other words, it is possible to utilize the space located in the direction orthogonal to the photographing optical axis OA relative to the solid-state image sensing device 16 as the space for housing the fourth lens group 14 (fourth lens retaining portion 85) being the retractable lens. Hence it is possible to reduce the thickness dimension on the outside smaller than the fixed cylinder portion 21a of the fixation frame 21.

Moreover, according to the lens barrel 10B of the third embodiment, the fourth lens retaining frame 41B being the retractable lens retaining frame is configured to move the fourth lens group 14 (fourth lens retaining portion 85) being the retractable lens from the on-axis position Pa-4 to the off-axis parallel position Pp-4 in the orthogonal direction (arrow A8) and then to move the fourth lens group 14 from the off-axis parallel position Pp-4 to the retracted position Ps-4 in the inclined direction (arrow A9). Therefore, the fourth lens group 14 (fourth lens retaining portion 85) can be housed into the retractable lens housing 21Bb while being kept close to the lens barrel base 82B without causing any interferences with the other members of the photographing optical system. Particularly, the thickness dimension based on the base member (lens barrel base 82B) is increased when the solid-state image sensing device 16 is provided movably in the direction orthogonal to the photographing optical axis OA on the base member (lens barrel base 82B) by way of the image stabilization mechanism of the photographing element drive type. In this case, the above-described movements can contribute significantly to reduction in the thickness dimension of the retractable lens housing 21Bb.

Furthermore, the lens barrel 10B of the third embodiment is configured to move the fourth lens group 14 (fourth lens retaining portion 85) from the on-axis position Pa-4 to the retracted position Ps-4 by utilizing the space formed in the position inside the retractable lens housing 21Bb where the third lens retaining frame 31B is housed (see the third lens retaining frame 31B (Pa-3) indicated with a chain double-dotted line in FIG. 47). Accordingly, there is no risk of an interference of the upper end of the fourth lens retaining frame 41B with the lower end 22f of the first rotary cylinder 22 or the front wall portion 21f of the fixation frame 21 in the course of the movements. Hence, the fourth lens group 14 can be located in the retracted position Ps-4 without moving in the orthogonal direction after coming close to the lens barrel base 82B.

In the lens barrel 10B of the third embodiment, by locating the fourth lens retaining frame 41B in the retracted position Ps-4, the third lens retaining frame 31B is moved to the on-axis position Pa-3 where it is possible to avoid the interferences with the solid-state image sensing device 16 and the fourth lens retaining frame 41B located in the on-axis position Pa-4 when viewed from the photographing optical axis OA direction by utilizing the space as the position for the fourth lens retaining frame 41B (see the fourth lens retaining frame 41B (Pa-4) indicated with a chain double-dotted line) located on the on-axis position Pa-4 which is formed on the lens barrel base 82B (imaging plane) side of the third lens retaining frame 31B on the photographing optical axis OA. Therefore, it is possible to house the third lens group 13 and the fourth lens group 14 into the retractable lens housing 21Bb having the minimum requisite thickness dimension for housing the lens groups located close to the lens barrel base 82B by employing a simpler cam structure for the third lens retaining frame while avoiding any interferences with other members of the photographing optical system.

The lens barrel 10B of the third embodiment is configured to be able to control the height position in the photographing optical axis OA direction of the contact portion 46Ba of the fourth group female screw member 46B, to provide the fourth lens retaining frame 41B with the stepped portion 89 and the retaining frame side stepped engagement surface 55, and to provide the lens barrel base 82B with the base side stepped engagement surface 56, thereby forming the cam structures to connect the fourth lens retaining frame 41B to the fourth group female screw member 46B. Hence it is possible to move the fourth lens group 14 (fourth lens retaining portion 85) being the retractable lens in the orthogonal direction from the on-axis position Pa-4 to the off-axis parallel position Pp-4 and then to move the fourth lens group 14 from the off-axis parallel position Pp-4 to the retracted position Ps-4 by employing the simple configuration.

In the lens barrel 10B of the third embodiment, the retractable lens housing 21Bb is provided inside the fixation frame 21 and outside the fixed cylinder portion 21a, or in other words, is provided outside the movable lens barrel. Hence it is possible to reduce the outside diameter of the fixed cylinder portion 21a.

In the lens barrel 10B of the third embodiment, the retaining frame side stepped engagement surface 55 for moving the fourth lens group 14 (fourth lens retaining portion 85) being the retractable lens in the inclined direction is formed at the lower end of the fourth lens retaining frame 41B (fourth lens retaining frame rotation base 87). Moreover, the base side stepped engagement surface 56 is provided on the lens barrel base 82B and in the position opposed to the lower end of the fourth lens retaining frame rotation base 87. Hence it is possible to achieve the more compact and simpler configuration.

In the lens barrel 10B of the third embodiment, the position on the photographing optical axis OA which is closer to the solid-state image sensing device 16 can be defined as the on-axis position Pa4 for the fourth lens group 14. Hence it is possible to further improve the design freedom of the photographing optical system.

In the lens barrel 10B of the third embodiment, the on-axis position Pa-4 as the retraction start position for the fourth lens group 14 (fourth lens retaining portion 85) being the retractable lens is set to be located between the imaging plane and the lowest end position (position closest to the imaging plane side) in the photographing state P where the fourth lens retaining frame 41B is located on the photographing optical axis OA. Therefore, it is possible to move the fourth lens group 14 (fourth lens retaining portion 85) being the retractable lens from the on-axis position Pa-4 to the off-axis parallel position Pp-4 in the orthogonal direction, and then to move the fourth lens group 14 from the off-axis parallel position Pp-4 to the retracted position Ps-4 in the inclined direction so as to house the fourth lens group 14 into the retractable lens housing 21Bb by using the cam structures having the simple configuration, and also to perform the positional control on the photographing optical axis OA.

The lens barrel 10B according to the third embodiment is configured to move the fourth lens group 14 from the on-axis position Pa-4 to the off-axis parallel position Pp-4 in the orthogonal direction and then from the off-axis parallel position Pp-4 to the retracted position Ps-4 in the inclined direction so as to house the fourth lens group 14 into the retractable lens housing 21Bb. Therefore, it is possible to start retraction of the fourth lens group 14 (fourth lens retaining portion 85) being the retractable lens from the photographing optical axis OA in the position closer to the subject (object) than the retracted position Ps viewed in the photographing optical axis OA direction at the time of switching from the photographing state P to the collapsed stored state D.

The lens barrel 10B of the third embodiment can retract the third lens group 13 and the fourth lens group 14 into the retractable lens housing 21Bb. Hence it is possible to effectively reduce the thickness dimension of the lens barrel in the collapsed state.

Therefore, according to the lens barrel 10B of the third embodiment, it is possible to reduce the thickness dimension of the retractable lens housing 21Bb defined as the storage position for the third lens retaining frame 31B and the fourth lens retaining frame 41B and provided on the outside of the inner diameter of the movable lens barrel by using the simple configuration.

According to the third embodiment, when the fourth group female screw member 46B is retracted to the position where the contact portion 46Ba comes into contact with the side engagement surface 89b, the positional relationship between the retaining frame side stepped engagement surface 55 and the base side stepped engagement surface 56 transitions from the state where the retaining frame side inclined surface 55b serving as the retaining frame side cam surface is in contact with base side inclined surface 56b serving as the base side cam surface (see FIG. 56) to the state where the retaining frame side second flat surface 55c is in contact with the base side second flat surface 56c (see FIG. 58) so as to cause the retaining frame side orthogonal surface 55d to come into contact with base side orthogonal surface 56d (see FIG. 59). Instead, it is also possible to apply a positional relationship in which the retaining frame side second flat surface 55c comes into contact with the base side second flat surface 56c before the contact portion 46Ba comes into contact with the side engagement surface 89b while the retaining frame side orthogonal surface 55d comes into contact with the base side orthogonal surface 56d. By employing this configuration, the retaining frame side second flat surface 55c slides on the base side second flat surface 56c as the contact portion 46Ba presses the cam surface 89a backward. Hence it is possible to define the rotational posture of the fourth lens retaining frame 41B relative to the lens barrel base 82B in the position where the retaining frame side orthogonal surface 55d comes into contact with the base side orthogonal surface 56d. Accordingly, even when the relationship of the height position of the contact portion 46Ba (fourth group female screw member 46B) relative to the height position of the stepped portion 89 is displaced due to tolerances of the respective components, it is possible to define the height position viewed in the photographing optical axis OA direction inside the retractable lens housing 21Bb at the time of locating the fourth lens group 14 in the on-axis position Pa-4 as the preset position. In other words, it is possible to prevent the tolerances of the respective components from affecting the position in the photographic optical axis OA direction of the fourth lens group 14.

Fourth Embodiment

Next, a lens barrel 10C according to a fourth embodiment of the present invention will be described with reference to FIG. 60. As similar to the lens barrel 10A of the second embodiment, this fourth embodiment is set to use only a third lens retaining frame 31C as the retractable lens retaining frame and is configured to perform the same movements as the lens barrel 10A. The fourth embodiment is different from the lens barrel 10A of the second embodiment in that the cam structures for the fourth lens retaining frame 41B of the third embodiment are adopted as the cam structures for the third lens retaining frame 31C. Basic structures of the lens barrel 10C of this fourth embodiment are similar to those of the lens barrel 10A of the above-described second embodiment.

Accordingly, the same constituents are denoted by the same reference numerals and detailed description thereof will be omitted.

Figure 60:
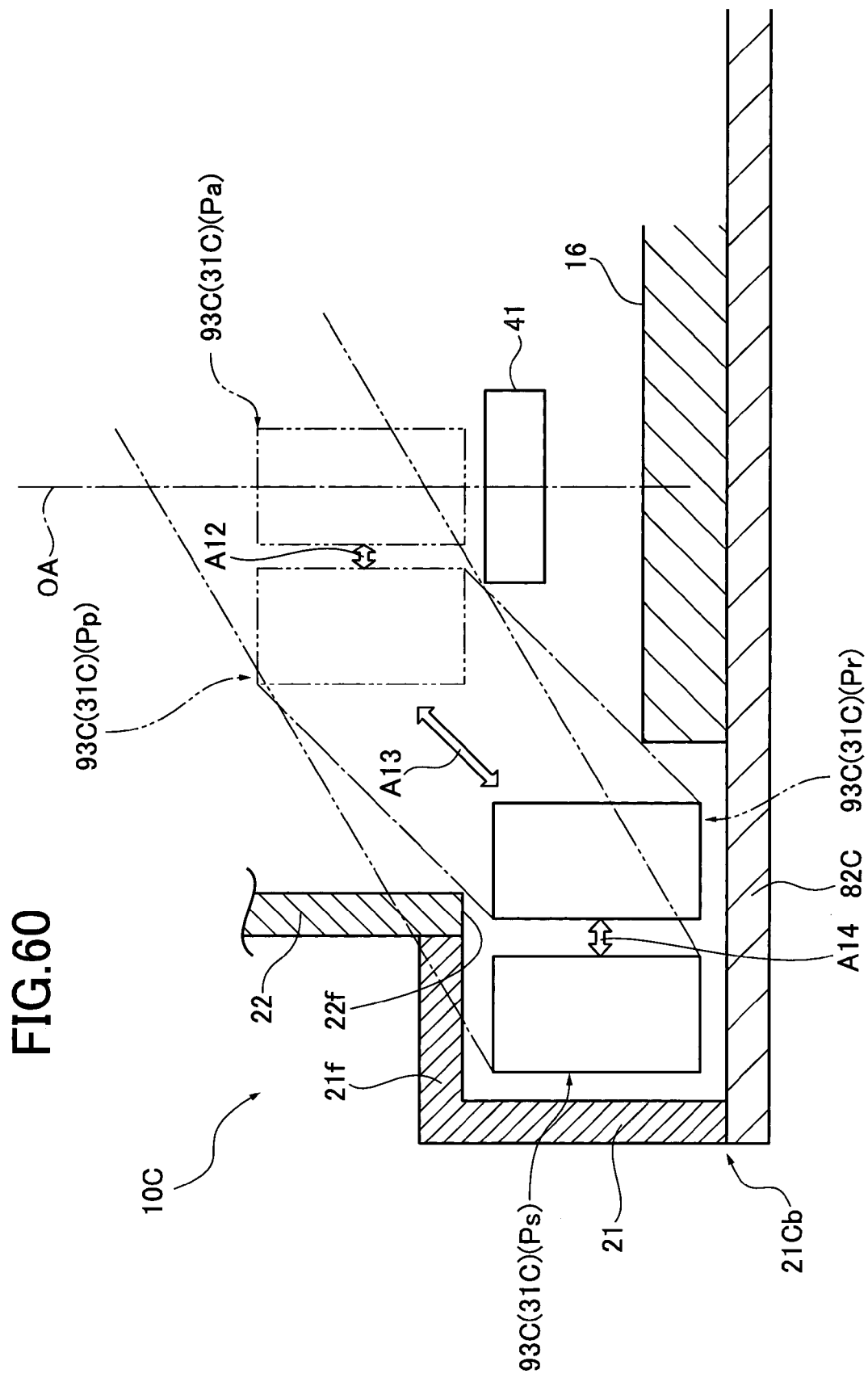
FIG. 60 is a schematic explanatory view similar to FIG. 22 showing a movement of a third lens retaining frame 31C in a lens barrel 10C according to a fourth embodiment.

As shown in FIG. 60, according to the third lens retaining frame 31C of the lens barrel 10C, a third lens retaining portion 93C configured to retain the third lens group 13 is moved from the on-axis position Pa in the orthogonal direction (see an arrow A12) to the off-axis parallel position Pp, then is moved from the off-axis parallel position Pp in the inclined direction (see an arrow A13) to the set-back position Pr, and is then moved from the set-back position Pr in the orthogonal direction (see an arrow A14) to the retracted position Ps.

Although illustration is omitted herein, as the cam structures for this third lens retaining frame 31C, a stepped portion (corresponding to the stepped portion 89 of the third embodiment) serving as the cam groove and a retaining frame side stepped engagement surface (corresponding to the retaining frame side stepped engagement surface 55 of the third embodiment) are provided on the third lens retaining frame 31C. Moreover, a base side stepped engagement surface (corresponding to the base side stepped engagement surface 56 of the third embodiment is provided on the retainer plate 81 (see FIG. 14A and the like) for supporting the third group main guide shaft 32.

Operations when the third lens retaining frame 31C in this lens barrel 10C is rotated between the photographing position (photographing state P) where the third lens group 13 is inserted onto the photographing optical axis OA and the storage position (collapsed stored state D) where the third lens group 13 is housed in a retractable lens housing 21Cb are also similar to the operations in the case of the fourth lens group 14 of the third embodiment.

Specifically, when the third group female screw member 35 (see FIG. 14A and the like) is moved backward (to the imaging plane side) and the contact portion 35a (see FIG. 14A and the like) is pressing and sliding on the cam surface of the stepped portion while a retaining frame side first flat surface (corresponding to the retaining frame side first flat surface 55a of the third embodiment) of the retaining frame side stepped engagement surface is sliding on a base side first flat surface (corresponding to the base side first flat surface 56a of the third embodiment) of the base side stepped engagement surface, the third lens retaining frame 31C is moved from the position on the photographing optical axis OA in the orthogonal direction thereto, and thereby moved from the on-axis position Pa to the off-axis parallel position Pp in the orthogonal direction (see the arrow A12 in FIG. 60).

When the third group female screw member 35 is moved further backward from this state (to the imaging plane side) and the contact portion 35a (see FIG. 14A and the like) is sliding on the cam surface of the stepped portion while a retaining frame side inclined surface (corresponding to the retaining frame side inclined surface 55b of the third embodiment) of the retaining frame side stepped engagement surface is sliding on a base side inclined surface (corresponding to the base side inclined surface 56b of the third embodiment) of the base side stepped engagement surface, the third lens retaining frame 31C is moved backward (to the imaging plane side) obliquely to the photographing optical axis OA direction and thereby moved from the off-axis parallel position Pp to the set-back position Pr (see the arrow A13 in FIG. 60).

When the third group female screw member 35 is moved further backward from this state (to the imaging plane side) and the contact portion 35a (see FIG. 14A and the like) is sliding on the cam surface of the stepped portion while a retaining frame side second flat surface (corresponding to the retaining frame side second flat surface 55c of the third embodiment) of the retaining frame side stepped engagement surface is sliding on a base side second flat surface (corresponding to the base side second flat surface 56c of the third embodiment) of the base side stepped engagement surface, the third lens retaining frame 31C is moved in the direction orthogonal to the photographing optical axis OA and thereby moved from the set-back position Pr to the retracted position Ps in the orthogonal direction (see the arrow A14 in FIG. 60). Meanwhile, as a retaining frame side orthogonal surface (corresponding to the retaining frame side orthogonal surface 55d of the third embodiment) of the retaining frame side stepped engagement surface comes into contact with a base side orthogonal surface (corresponding to the base side orthogonal surface 56d of the third embodiment) of the base side stepped engagement surface, the third lens retaining frame 31C is set to the collapsed stored state D where the third lens group 13 is located in the retracted position Ps (storage position).

In the lens barrel 10C of the fourth embodiment, the retractable lens housing 21Cb is designed to have the minimum requisite thickness dimension in order to house the third lens group 13 (third lens retaining portion 93C) serving as the retractable lens located close to the lens barrel base 82C, and this retractable lens housing 21Cb is provided inside the fixation frame 21 and outside the fixed cylinder portion 21a. Hence it is possible to set the thickness dimension on the outside smaller than the fixed cylinder portion 21a of the fixation frame 21. In other words, it is possible to utilize the space located in the direction orthogonal to the photographing optical axis OA relative to the fourth lens group 14 and the solid-state image sensing device 16 as the space for housing the third lens group 13 (third lens retaining portion 93C) being the retractable lens. Hence it is possible to reduce the thickness dimension on the outside smaller than the fixed cylinder portion 21a of the fixation frame 21.

Moreover, according to the lens barrel 10C of the fourth embodiment, the third lens retaining frame 31C being the retractable lens retaining frame is configured to locate the third lens group 13 (third lens retaining portion 93C) being the retractable lens in the off-axis parallel position Pp by the movement in the orthogonal direction (arrow A12) from the on-axis position Pa, then to locate the third lens group 13 in the set-back position Pr by the movement in the inclined direction (arrow A13), and then to locate the third lens group 13 in the retracted position Ps by the movement in the orthogonal direction (arrow A14). Therefore, it is possible to house the third lens group 13 (third lens retaining portion 93C) into the retractable lens housing 21Cb located close to the lens barrel base 82C without causing any interferences with other members of the photographing optical system. Particularly, the thickness dimension based on the base member (lens barrel base 82C) is increased when the solid-state image sensing device 16 is provided movably in the direction orthogonal to the photographing optical axis OA on the base member (lens barrel base 82C) by way of the image stabilization mechanism of the photographing element drive type. In this case, the above-described movements can contribute significantly to reduction in the thickness dimension of the retractable lens housing 21Cb.

Furthermore, the lens barrel 10C of the fourth embodiment is configured to be able to control the height position in the photographing optical axis OA direction of the contact portion 35a (see FIG. 14A and the like) of the third group female screw member 35. Moreover, the cam structures configured to connect the third lens retaining frame 31C to the third group female screw member 35 are formed by providing the third lens retaining frame 31C with the stepped portion and the retained frame side stepped engagement surface while providing the lens barrel base 82C with the base side stepped engagement surface. Therefore, it is possible to move the third lens group 13 (third lens retaining portion 93C) serving as the retractable lens from the on-axis position Pa to the off-axis parallel position Pp in the orthogonal direction, then from the off-axis parallel position Pp to the set-back position Pr in the inclined direction, and then from the set-back position Pr to the retracted position Ps in the orthogonal direction by using the simple configuration.

In the lens barrel 10C of the fourth embodiment, the retractable lens housing 21Cb is provided inside the fixation frame 21 and outside the fixed cylinder portion 21a, or in other words, outside the movable lens barrel. Hence it is possible to reduce the outside diameter of the fixed cylinder portion 21a.

In the lens barrel 10C of the fourth embodiment, the retaining frame side stepped engagement surface for moving the third lens group 13 (third lens retaining portion 93C) being the retractable lens in the inclined direction is formed at the lower end of the third lens retaining frame 31C (third lens retaining portion 93C). Moreover, the base side stepped engagement surface is provided on the lens barrel base 82C and in the position opposed to the lower end of the third lens retaining portion 93C. Hence it is possible to achieve the more compact and simpler configuration.

In the lens barrel 10CB of the third embodiment, the position on the photographing optical axis OA which is closer to the fourth lens group 14 can be defined as the on-axis position Pa for the third lens group 13. Hence it is possible to further improve the design freedom of the photographing optical system.

In the lens barrel 10C of the fourth embodiment, the on-axis position Pa to be defined as the retraction start position for the third lens group 13 (third lens retaining portion 93C) being the retractable lens is set to the position closer to the imaging plane side than the lowest end position (position closest to the imaging plane side) in the photographing state P where the third lens retaining frame 31C (third lens group 13) is located on the photographing optical axis OA. Therefore, it is possible to move the third lens group 13 (fourth lens retaining portion 93C) being the retractable lens from the on-axis position Pa to the off-axis parallel position Pp in the orthogonal direction, then from the off-axis parallel position Pp to the set-back position Pr in the inclined direction, and then from the set-back position Pr to the retracted position Ps in the orthogonal direction so as to house the third lens group 13 into the retractable lens housing 21Cb by using the cam structures having the simple configuration, and also to perform the positional control on the photographing optical axis OA.

The lens barrel 10C according to the fourth embodiment is configured to move the third lens group 13 from the on-axis position Pa to the off-axis parallel position Pp in the orthogonal direction, then from the off-axis parallel position Pp to the set-back position Pr in the inclined direction, and then from the set-back position Pr to the retracted position Ps in the inclined direction so as to house the third lens group 13 into the retractable lens housing 21Cb. Therefore, it is possible to start retraction of the third lens group 13 (third lens retaining portion 93C) being the retractable lens from the photographing optical axis OA in the position closer to the subject (object) than the retracted position Ps viewed in the photographing optical axis OA direction at the time of switching from the photographing state P to the collapsed stored state D.

In the lens barrel 10C of the fourth embodiment, when the third group female screw member 35 (contact portion 35a) is located in the storage position S, the retaining frame side second flat surface serving as the retaining frame side cam surface is detached from the base side second flat surface serving as the base side cam surface, i.e., the contact is released. Hence it is possible to locate the height position of the third lens group 13 (third lens retaining portion 93C) being the retractable lens inside the retractable lens housing 21Cb when viewed in the photographing optical axis OA direction to a preset position.

Therefore, according to the lens barrel 10C of the fourth embodiment, it is possible to reduce the thickness dimension of the retractable lens housing 21Cb provided on the outside of the inner diameter of the movable lens barrel by using the simple configuration.

Fifth Embodiment

Next, a lens barrel 10D according to a fifth embodiment of the present invention will be described as another example with reference to FIGS. 61 to 71. This fifth embodiment represents an example of a third lens retaining frame 31D serving as a retractable lens, which has a different movement from that of the lens barrel 10 of the first embodiment. Basic structures of the lens barrel 10D of this fifth embodiment are similar to those of the lens barrel 10 of the above-described first embodiment. Accordingly, the same constituents are denoted by the same reference numerals and detailed description thereof will be omitted. First, a concept of the movement of the third lens retaining frame 31D will be described with reference to FIG. 61.

As similar to the lens barrel 10 of the first embodiment, the lens barrel 10D of the fifth embodiment is also configured to locate a housing position of the third lens retaining frame 31D serving as the retractable lens retaining frame as close as possible to the lens barrel base 82 side (to the focal position (imaging plane) side) where the solid-state image sensing device 16 is provided in order to reduce the thickness dimension (length dimension in the photographing optical axis OA direction) of a retractable lens housing 21Db functioning as the retractable lens housing inside the fixation frame 21 and outside the fixed cylinder portion 21a. In other words, the space located in the direction orthogonal to the photographing optical axis OA relative to the fourth lens group 14 and the solid-state image sensing device 16 is utilized as the space for housing the third lens group 13 (third lens retaining portion 93D) being the retractable lens.

Figure 61:
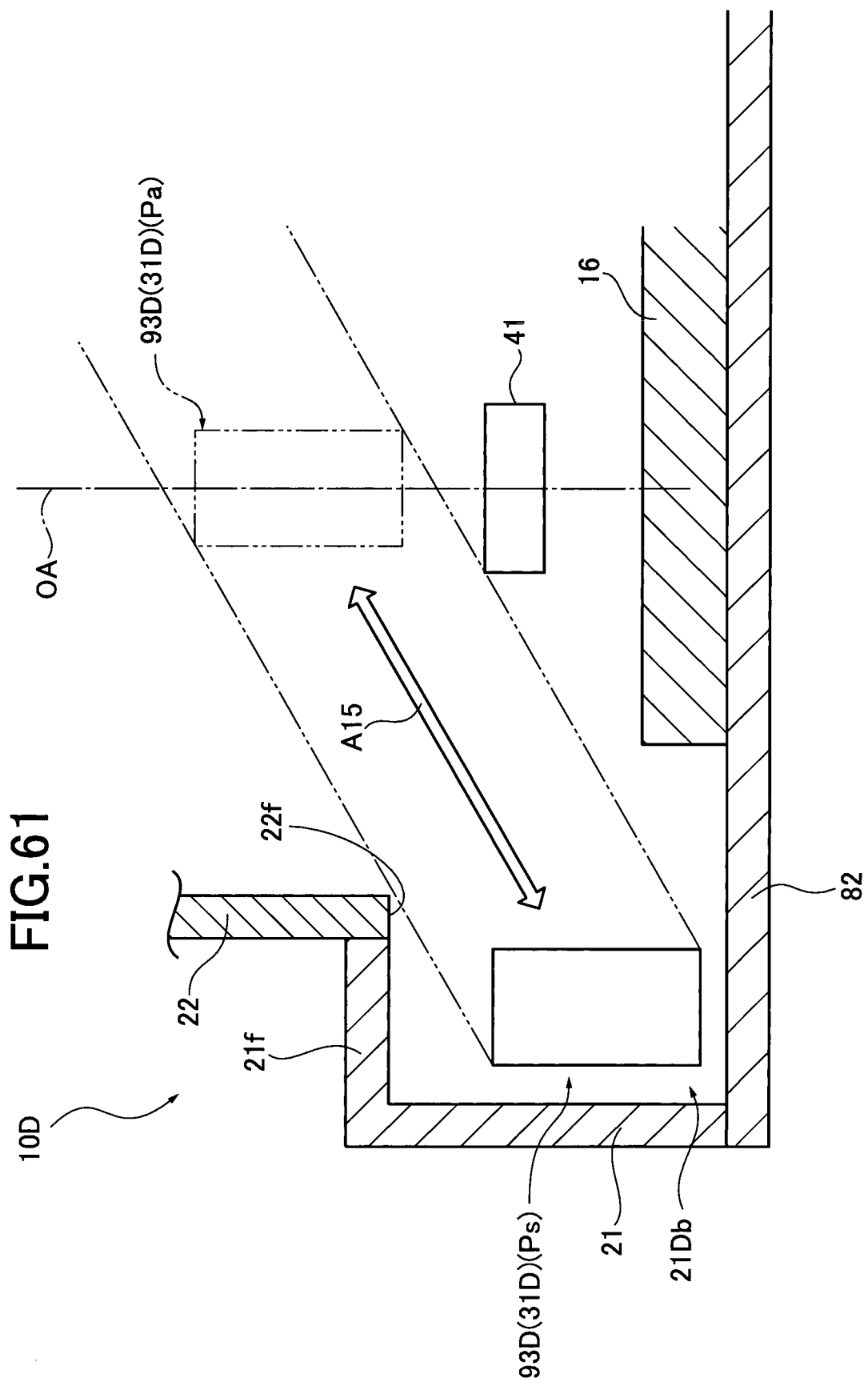
FIG. 61 is a schematic explanatory view similar to FIG. 22 showing a movement of a third lens retaining frame 31D in a lens barrel 10D according to a fifth embodiment.
Figure 62:
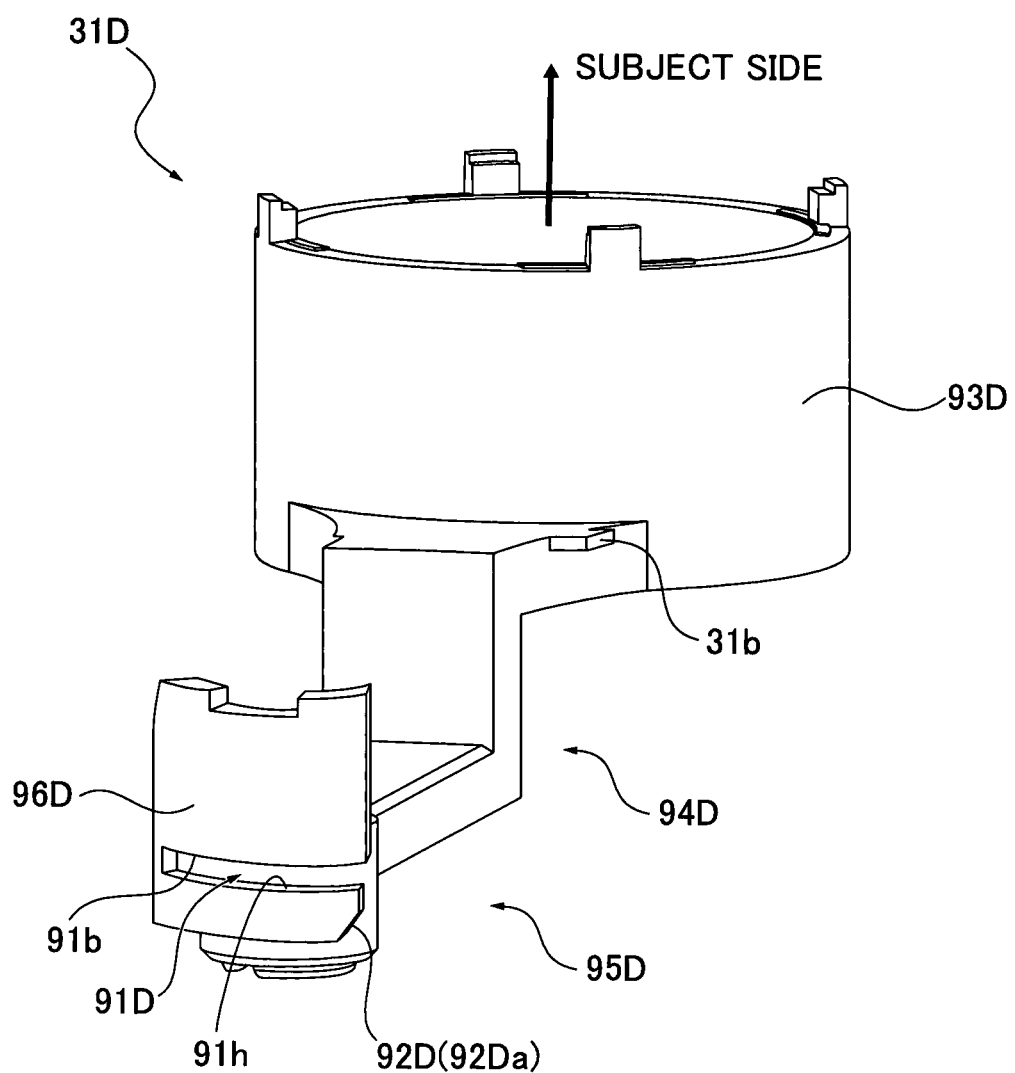
FIG. 62 is a schematic perspective view for explaining a configuration of the third lens retaining frame 31D.

As shown in FIG. 61, the lens barrel 10D of the fifth embodiment is configured to house the third lens retaining frame 31D in the preset housing position, by moving the third lens retaining frame 31D in the inclined direction relative to the photographing optical axis OA (see an arrow A15) from the on-axis position Pa to the retracted position Ps toward the lens barrel base 82. In short, in the lens barrel 10D, the third lens group 13 (third lens retaining portion 93D) is moved in the inclined direction (see the arrow A15) from the on-axis position Pa to the retracted position Ps.

According to this lens barrel 10D, in order to enable the above-described movement, the third lens retaining frame 31D (third lens retaining frame rotation base 95D thereof to be described later) is provided with a stepped portion 91D serving as a cam groove and beveled portions 92D for retained frame side cam surfaces (see FIG. 62 and the like), and the retainer plate 81 (base member) for supporting the third group main guide shaft 32 is provided with curved protrusions 83D (see FIG. 63 and the like) for base side cam surfaces, collectively as cam structures for connecting the third lens retaining frame 31D to the third group female screw member 35 (contact portion 35a).

The third lens retaining frame 31D has a similar configuration to that of the third lens retaining frame 31 of the first embodiment except for the structures of the stepped portion 91D and the beveled portions 92D. The stepped portion 91D is provided to be recessed from the outer peripheral surface of the cylinder of a curved wall portion 96D of the third lens retaining frame 31D. This stepped portion 91D is provided with a rear engagement surface 91h on its imaging plane side and the front engagement surface 91d on its subject side. The rear engagement surface 91h is a flat surface substantially perpendicularly intersecting the photographing optical axis OA, and the front engagement surface 91d is a flat surface substantially perpendicularly intersecting the photographing optical axis OA. In the fifth embodiment, the right side of the stepped portion 91D in FIG. 63 viewed from front is opened in order to facilitate an assembly work.

Moreover, the curved wall portion 96D is provided with a pair of beveled portions 92D (one of which is not shown). These two beveled portions 92D are formed by cutting corners on the lower end of the curved wall portion 96D. Hence the beveled portions 92D define flat retaining frame side inclined surfaces 92Da serving as the retaining frame side cam surfaces. The respective retaining frame side inclined surfaces 92Da of both of the beveled portions 92D are configured to be able to come into contact with base side inclined surfaces 83Da to be described below, which are defined by the curved protrusions 83D, as the third lens retaining frame 31D moves along the third group main guide shaft 32 (see FIG. 63). Specifically, the respective retaining frame side inclined surfaces 92Da of both of the beveled portions 92D are opposed to the base side inclined surfaces 83Da of the curved protrusions 83D from a viewpoint in the photographing optical axis OA direction when the third lens retaining frame 31D is located between the retraction start position B and the storage position S (see FIG. 14A).

Figure 63:
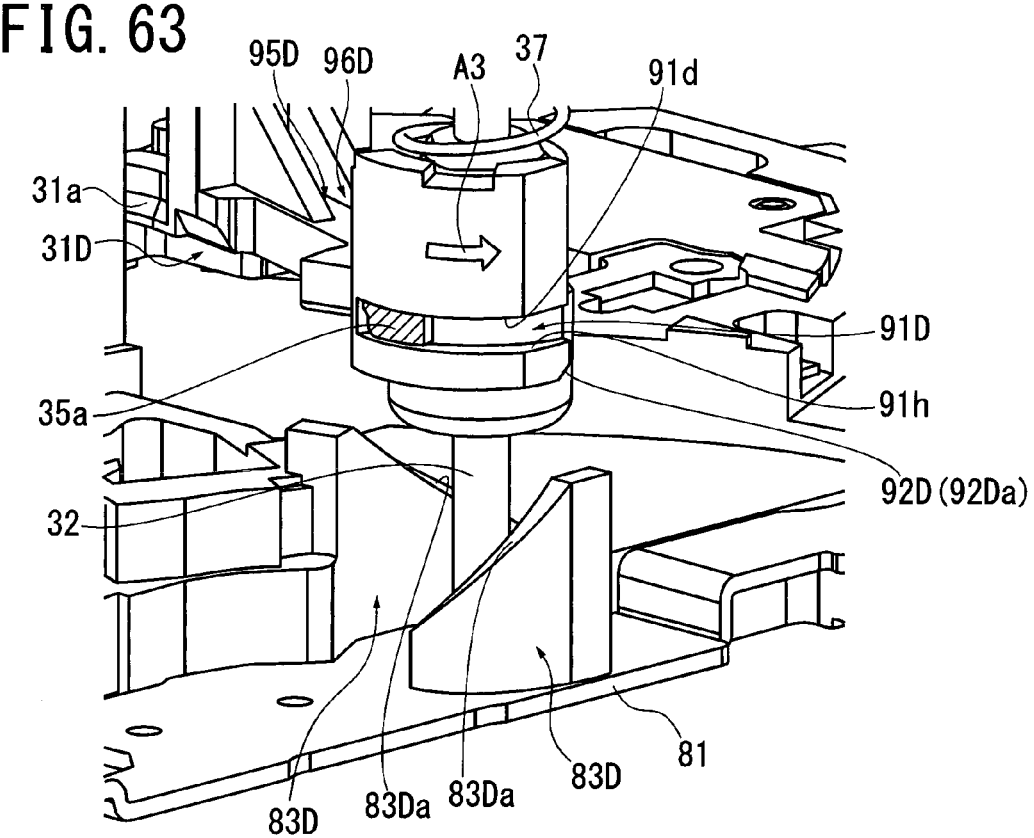
FIG. 63 is a schematic enlarged perspective view for explaining an operation of a cam mechanism of the third lens retaining frame 31D and shows a stepped portion 91D of a third lens retaining frame rotation base 95C of the third lens retaining frame 31D and its surroundings.
Figure 64:
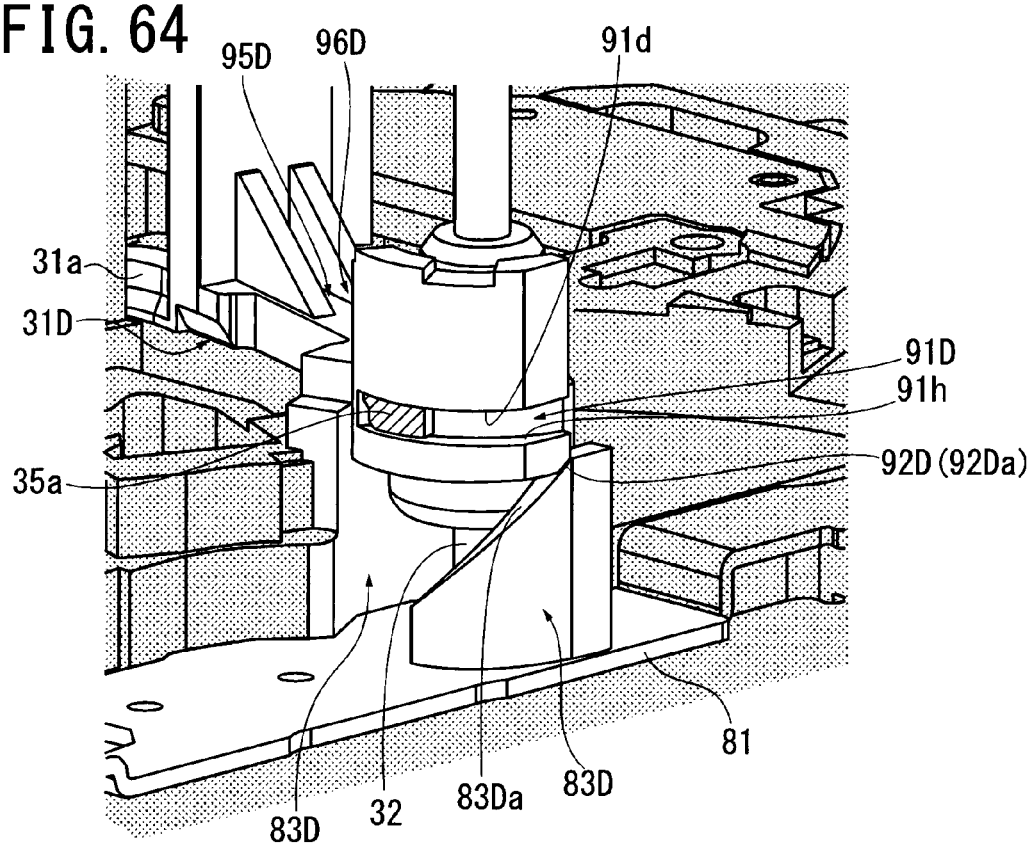
FIG. 64 is a perspective view similar to FIG. 63, and shows a state after FIG. 63 in the process of retracting the third lens retaining frame 31D.

As shown in FIG. 63, the curved protrusions 83D are provided so as to protrude from the retainer plate 81 which serves as the base member configured to support the base end of the third group main guide shaft 32. These curved protrusions 83D exhibit the cylindrical shape which is formed by curving the plate member around the axis line of the third group main guide shaft 32 as the center, and are formed as the pair provided with an interval with the third group main guide shaft 32 and disposed around the axis line thereof so as to be able to surround the third lens retaining frame rotation base 95D inserted to the third group main guide shaft 32. As similar to the curved protrusions 83 of the first embodiment, both of the curved protrusions 83D define the base side inclined surfaces 83Da serving as the cam surfaces by using the flat surfaces that are cut out. These base side inclined surfaces 83Da contain the radial direction of the rotating axis of the third lens retaining frame 31D, and are also inclined relative to the direction of the rotating axis (direction of extension of the third group main guide shaft 32 (photographing optical axis OA direction)) so as to set back to the negative side in the rotationally biased direction (see the arrow A3) as the base side inclined surfaces 83D come closer to the retainer plate 81 on the imaging plane side.

Next, actions when the third lens retaining frame 31D in the lens barrel 10D of the fifth embodiment of the present invention is rotated between the photographing position (photographing state P) where the third lens group 13 is inserted onto the photographing optical axis OA and the storage position (collapsed stored state D) where the third lens group 13 is housed into the retractable lens housing 21Db will be described with reference to FIGS. 61 and 63 to 71.

As similar to the first embodiment, the third lens retaining frame rotation base 95D is rotated upon receipt of the pressing force from the third group female screw member 35 which is moved straight in the photographing optical axis OA direction (front-back direction) due to the sliding action between the stepped portion 91D provided on the outer peripheral surface of the third lens retaining frame rotation base 95D and the contact portion 35a of the third group female screw member 35 accepted by the stepped portion 91D. Accordingly, the stepped portion 91D functions as the cam groove while the contact portion 35a of the third group female screw member 35 functions as the cam pin.

The third lens retaining frame rotation base 95D is moved vertically along the third group main guide shaft 32 or is rotated around the third group main guide shaft 32 by the contact portion 35a of the third group female screw member 35, which serves as the cam pin configured to be moved in the front-back direction inside the stepped portion 91D serving as the cam groove. An action of the third lens retaining frame rotation base 95D relative to the position of the contact portion 35a inside the stepped portion 91D being the cam groove in this case will now be explained.

As described previously, in the lens barrel 10D of the fifth embodiment, the third group female screw member 35 is moved on the third group lead screw 34 by rotation of the third group motor 52, thereby moving the third lens group 13 (third lens retaining portion 93D) between the storage position (retracted position Ps (collapsed stored state D)) in the retractable lens housing 21Db and the photographing position (on-axis position Pa (photographing state P)) on the photographing optical axis OA.

When the third group female screw member 35 is moved in front of the retraction start position B (on the object side and on the upper side when viewed from front) (see FIG. 14A), the contact portion 35a comes into contact with the front engagement surface 91d as shown in FIG. 63. The action when this contact portion 35a comes into contact with the front engagement surface 91d, i.e., when the third group female screw member 35 is moved in front of the retraction start position B (to the subject side) is similar to the first embodiment.

When the third group female screw member 35 is moved behind the retraction start position B (on the imaging plane side and on the lower side when viewed from front) (see FIG. 14A), the third lens retaining frame rotation base 95D (third lens retaining frame 31D) approaches the retainer plate 81 in accordance with the height position of the contact portion 35a (third group female screw member 35) contacting the front engagement surface 91d by the straight bias from the compression torsion spring 37. Upon retraction to a predetermined height position, the retained frame side inclined surfaces 92Da of the beveled portions 92D provided on the curved wall portion 96D come into contact with upper ends of the base side inclined surfaces 83Da of the curved protrusions 83D provided on the retainer plate 81.

Figure 65:
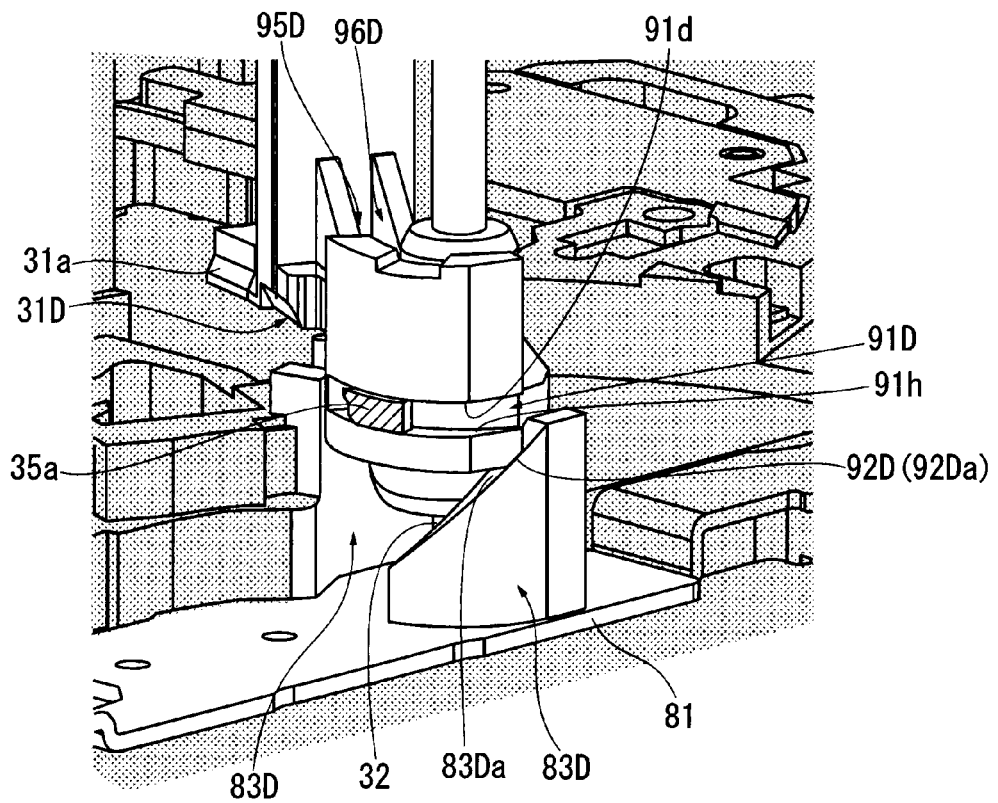
FIG. 65 is a perspective view similar to FIGS. 63 and 64, and shows a state after FIG. 64 in the process of retracting the third lens retaining frame 31D.
Figure 66:
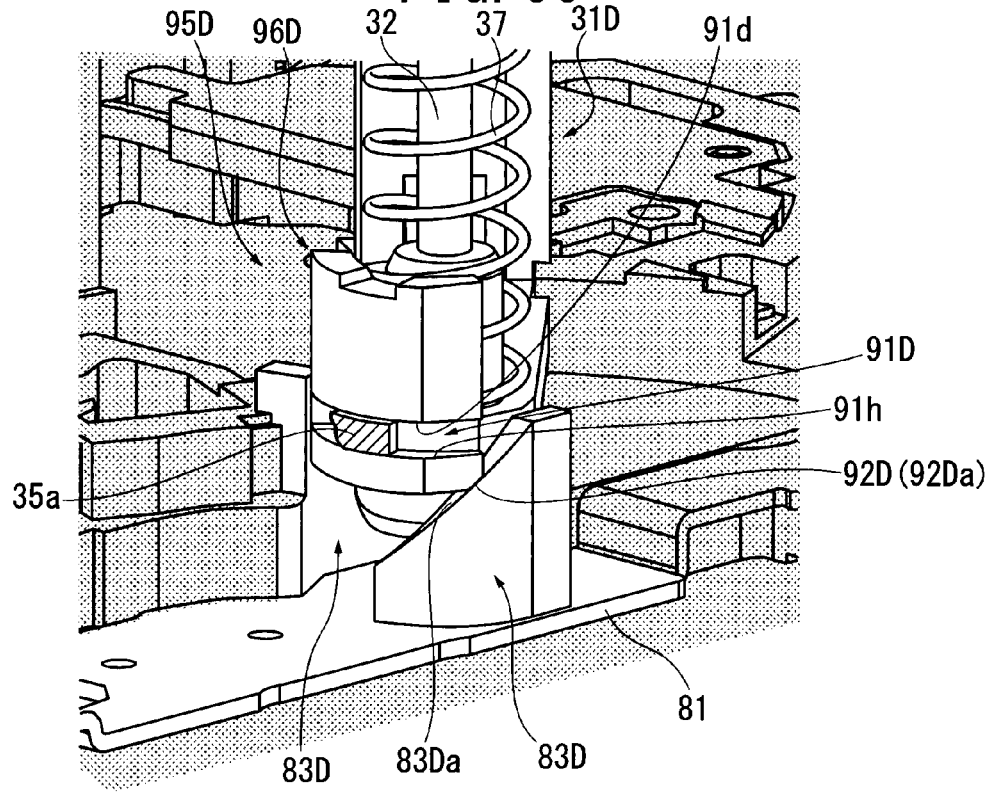
FIG. 66 is a perspective view similar to FIGS. 63 to 65, and shows a state after FIG. 65 in the process of retracting the third lens retaining frame 31D.
Figure 67:
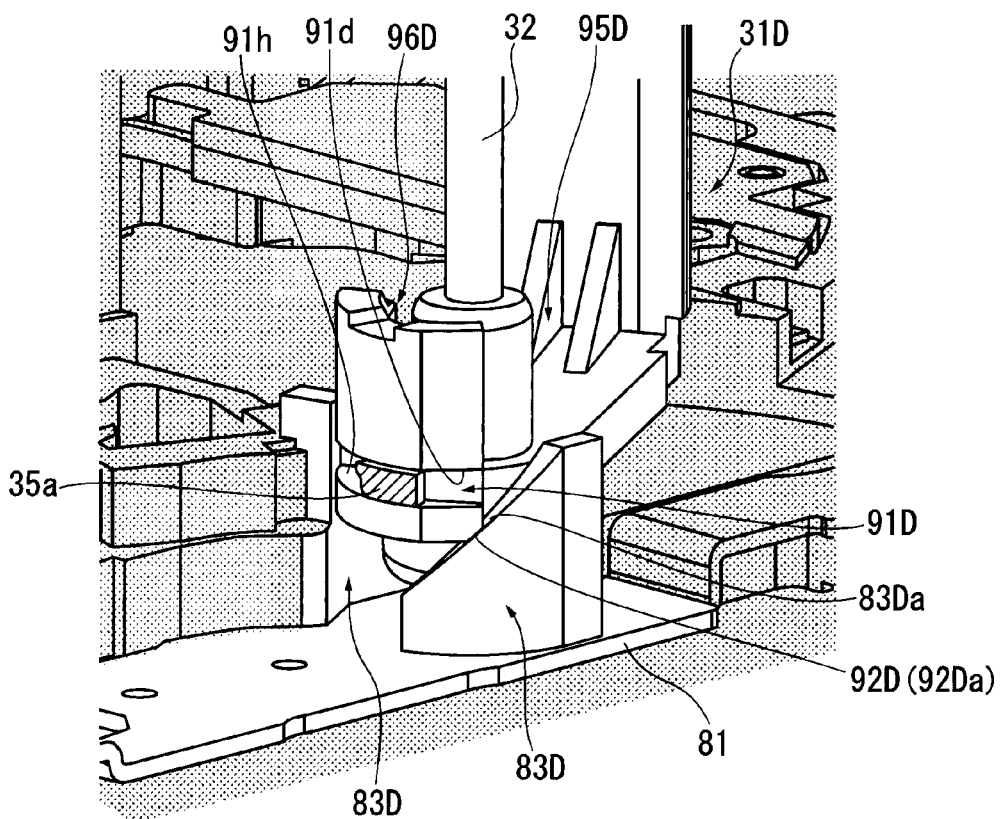
FIG. 67 is a perspective view similar to FIGS. 63 to 66, and shows a state after FIG. 66 in the process of retracting the third lens retaining frame 31D.
Figure 68:
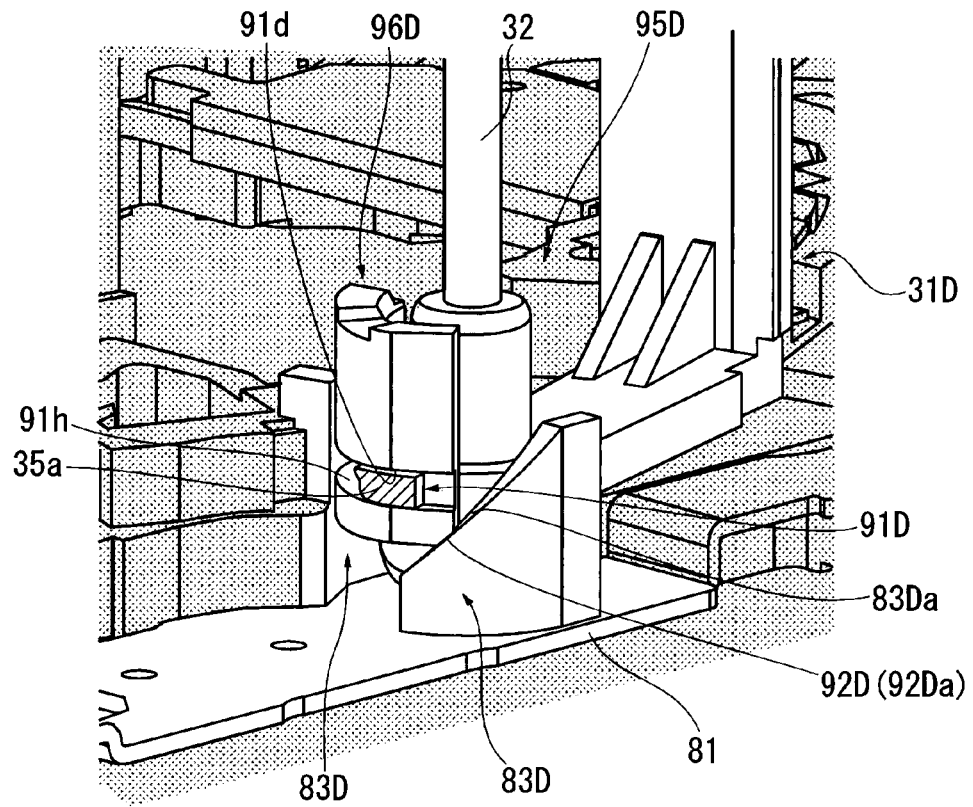
FIG. 68 is a perspective view similar to FIGS. 63 to 67, and shows a state after FIG. 67 in the process of retracting the third lens retaining frame 31D.
Figure 69:
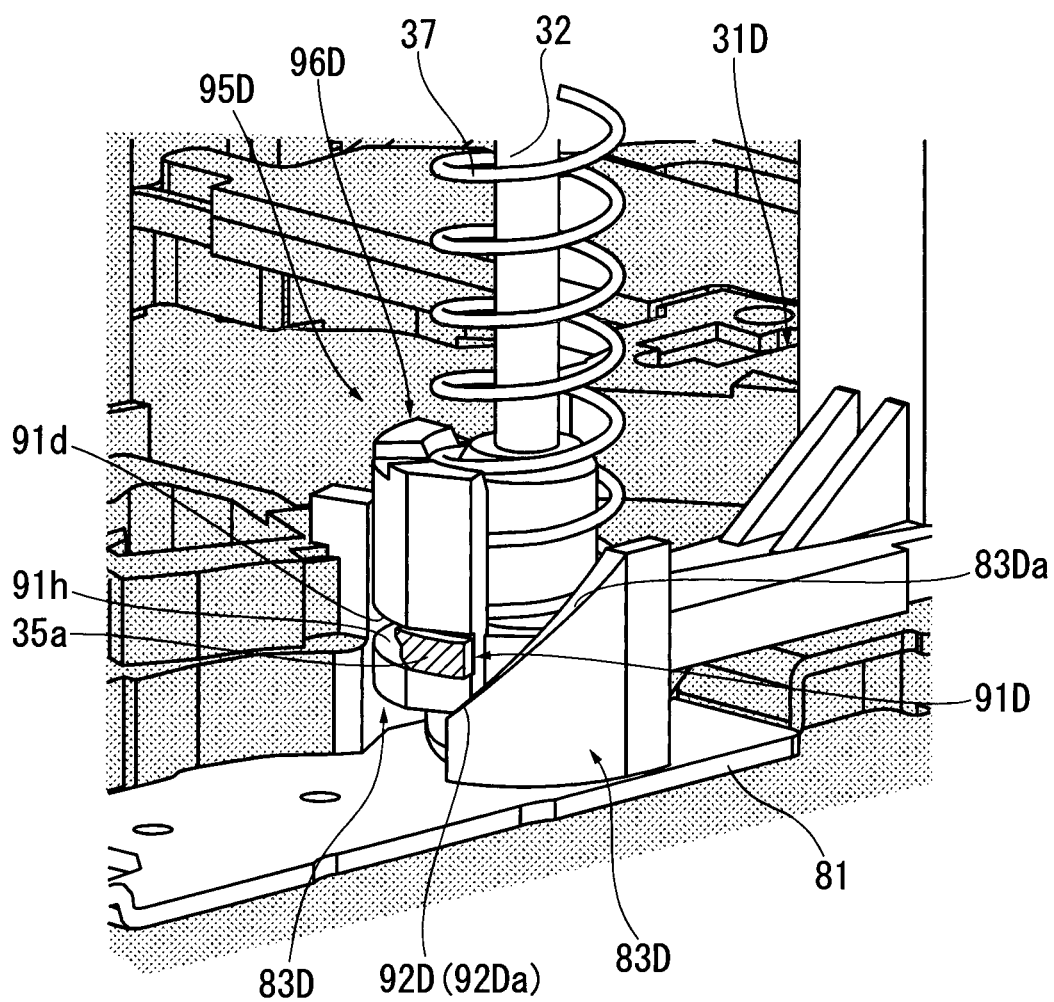
FIG. 69 is a perspective view similar to FIGS. 63 to 68, and shows a state after FIG. 68 in the process of retracting the third lens retaining frame 31D.
Figure 70:
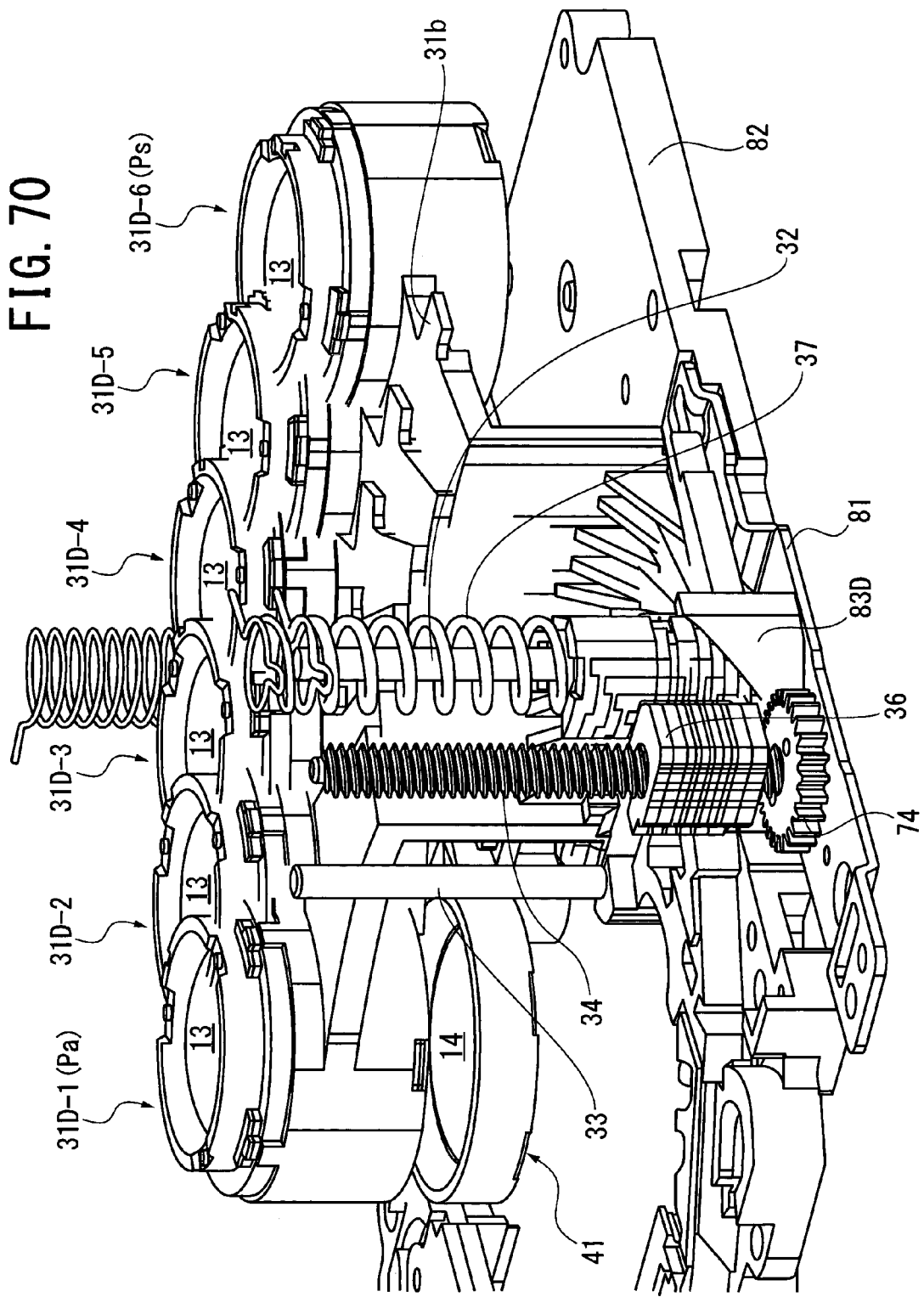
FIG. 70 is a schematic perspective view showing a movement of the third lens retaining frame 31D on the lens barrel base 82 (retainer plate 81).
Figure 71:
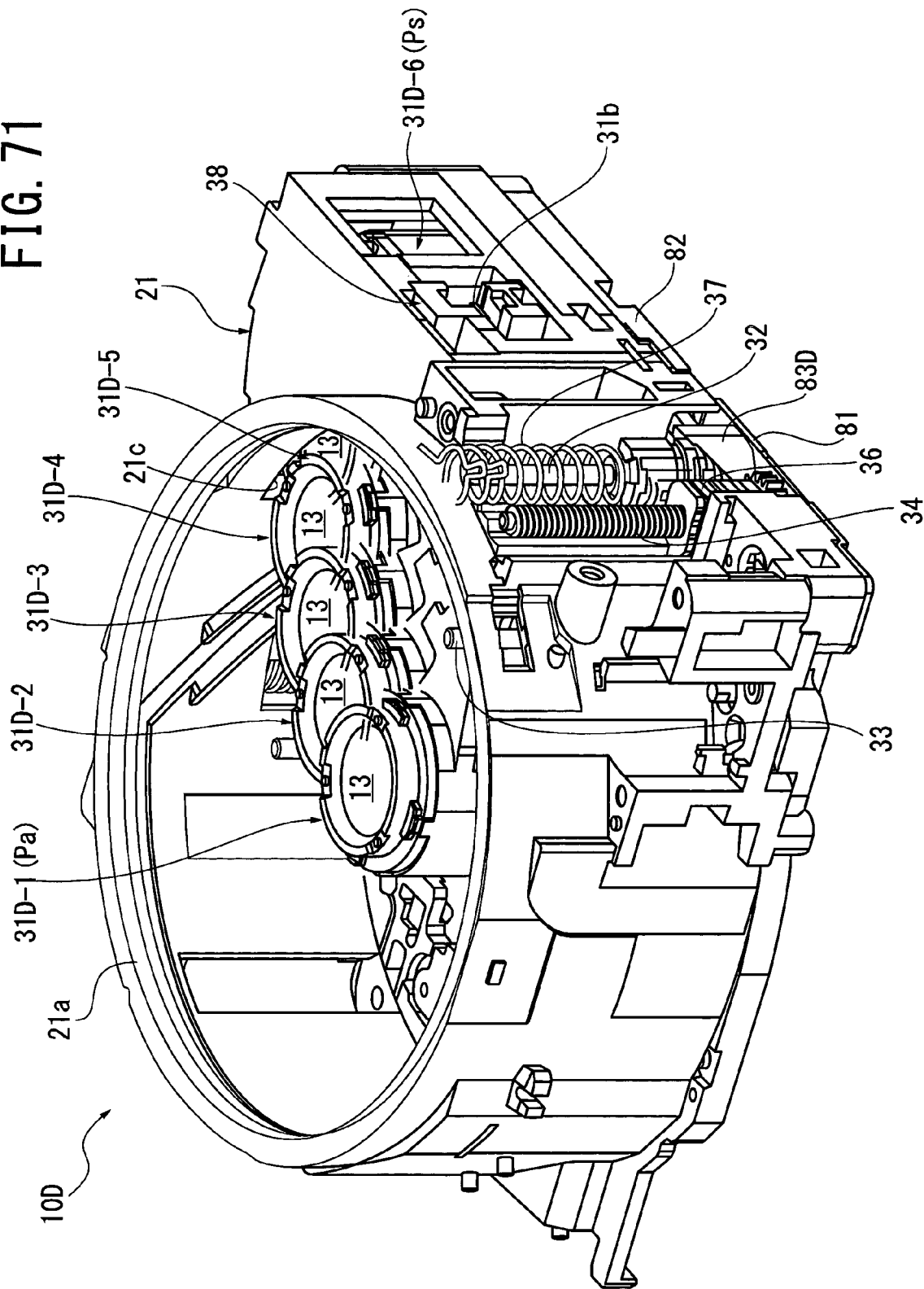
FIG. 71 is a schematic perspective view showing a movement of the third lens retaining frame 31A inside the fixation frame 21 (fixed cylinder portion 21a).

When the third group female screw member 35 is moved further backward from this position (to the imaging plane side), the upper surface of the contact portion 35a is detached from the front engagement surface 91d and the lower surface of the contact portion 35a comes into contact with the rear engagement surface 91h so as to press (push down) the rear engagement surface 91h (see FIG. 65). When the rear engagement surface 91h is pushed down due to the backward movement of this contact portion 35a, the third lens retaining frame rotation base 95 is rotated against the rotational biasing force and is pushed down so as to correspond to the height position of the contact portion 35a as shown in the order of FIGS. 64, 65, 66, 67, 68, and 69 attributable to the pressing force and guiding actions of the base side inclined surfaces 83Da of the curved protrusions 83D and the retaining frame side inclined surfaces 92Da of the beveled portions 92D. As the third lens retaining frame rotation base 95 is rotated and pushed down as described above, the third lens retaining frame 31 retracts the third lens group 13 from the position on the photographing optical axis OA toward the retracted position sequentially as indicated with reference numerals 31D-1, 31D-2, 31D-3, 31D-4, 31D-5, and 31D-6 in FIGS. 70 and 71 along the photographing optical axis OA while rotating the third lens group 13 around the third group main guide shaft 32. Accordingly, when the base side inclined surfaces 83Da are sliding on the retaining frame side inclined surfaces 92Da by this contact portion 35a pushing down the rear engagement surface 91h, the third lens retaining frame 31 is moved obliquely backward (to the imaging plane side) in the photographing optical axis OA direction and thereby moved from the on-axis position Pa to the retracted position Ps in the inclined direction (see the arrow A15 in FIG. 61). At this time, the third lens retaining frame rotation base 95 is rotated. Accordingly, the position of the contact portion 35a in the stepped portion 91 moves (slides) from an end on a left side in the drawings (see FIG. 64) on the rear engagement surface 91h to an end on a right side in the drawing (see FIG. 69) thereon.

When the third group female screw member 35 is moved further backward (to the imaging plane side) from this position, the base end surface 31f of the third lens retaining frame 31D (third lens retaining frame rotation base 95D) comes into contact with the retainer plate 81. As the third group female screw member 35 is retracted to the position where the base end surface 31f of the third lens retaining frame 31D (third lens retaining frame rotation base 95D) comes into contact with the retainer plate 81 as described above, the third lens retaining frame rotation base 95D cannot move downward whereby the position in the photographing optical axis OA direction of the third lens retaining frame 31D is fixed. At this time, the third lens retaining frame rotation base 95D is rotationally biased (see the arrow A3 in FIG. 63). Accordingly, the retaining frame side inclined surfaces 92Da of the beveled portions 92D provided on the curved wall portions 96D come into contact with the lower ends of the base side inclined surfaces 83Da and press (get engaged with) each other, thereby fixing the rotational posture of the third Lens retaining frame rotation base 95D. For this reason, when the third group female screw member 35 is retracted to the position where the base end surface 31f of the third lens retaining frame 31D (third lens retaining frame rotation base 95D) comes into contact with the retainer plate 81, the third lens retaining frame 31D is located in the retracted position Ps (storage position) and is set to the collapsed stored state D.

In the lens barrel 10D of the fifth embodiment, the retractable lens housing 21Db is designed to have the minimum requisite thickness dimension in order to house the third lens group 13 (third lens retaining portion 93D) serving as the retractable lens in the state close to the lens barrel base 82, and this retractable lens housing 21Db is provided inside the fixation frame 21 and outside the fixed cylinder portion 21a. Hence it is possible to set the thickness dimension on the outside smaller than the fixed cylinder portion 21a of the fixation frame 21. In other words, it is possible to utilize the space located in the direction orthogonal to the photographing optical axis OA relative to the fourth lens group 14 and the solid-state image sensing device 16 as the space for housing the third lens group 13 (third lens retaining portion 93D) being the retractable lens. Hence it is possible to reduce the thickness dimension on the outside smaller than the fixed cylinder portion 21a of the fixation frame 21.

Moreover, according to the lens barrel 10D of the fifth embodiment, the third lens retaining frame 31D being the retractable lens retaining frame is configured to move the third lens group 13 (third lens retaining portion 93D) being the retractable lens from the on-axis position Pa to the retracted position Ps in the inclined direction (arrow A15). Therefore, it is possible to house the third lens group 13 (third lens retaining portion 93D) into the retractable lens housing 21b having the minimum requisite thickness dimension so as to house the third lens group 13 in the state close to the lens barrel base 82 without causing any interferences with other members of the photographing optical system. Particularly, the thickness dimension based on the base member (lens barrel base 82) is increased when the solid-state image sensing device 16 is provided movably in the direction orthogonal to the photographing optical axis OA on the base member (lens barrel base 82) by way of the image stabilization mechanism of the photographing element drive type. In this case, the above-described movements can contribute significantly to reduction in the thickness dimension of the retractable lens housing 21Db.

Furthermore, the lens barrel 10D of the fifth embodiment is configured to be able to control the height position in the photographing optical axis OA direction of the contact portion 35a of the third group female screw member 35. Moreover, the cam structures configured to connect the third lens retaining frame 31D to the third group female screw member 35 are formed by providing the third lens retaining frame 31D with the stepped portion 91D and the beveled portions 92D while providing the retainer plate 81 with the curved protrusions 83D (see FIG. 63 and the like). Therefore, it is possible to move the third lens group 13 (third lens retaining portion 93D) serving as the retractable lens from the on-axis position Pa to the retracted position Ps in the inclined direction by using the simple configuration.

In the lens barrel 10D of the fifth embodiment, the retractable lens housing 21Db is provided inside the fixation frame 21 and outside the fixed cylinder portion 21a, or in other words, outside the movable lens barrel. Hence it is possible to reduce the outside diameter of the fixed cylinder portion 21a.

In the lens barrel 10D of the fifth embodiment, the curved protrusions 83D (base side inclined surfaces 83Da) for moving the third lens group 13 (third lens retaining portion 93D) being the retractable lens in the inclined direction are configured to be able to surround the third lens retaining frame rotation base 95 inserted to the third group main guide shaft 32. Hence it is possible to increase the degree of freedom of setting the amount of movement in the photographing optical axis OA direction associated with the movement in the inclined direction. This configuration enables to increase the degree of freedom of setting the retraction start position of the third lens group 13 (third lens retaining portion 93D) being the retractable lens from the photographing optical axis OA. Hence it is possible to improve the design freedom of the photographing optical system.

In the lens barrel 10D of the fifth embodiment, the on-axis position Pa being the retraction start position of the third lens group 13 (third lens retaining portion 93D) serving as the retractable lens is set closer to the imaging plane side than the lowest end position (closest position to the imaging surface side) in the photographing state P where the third lens retaining frame 31 (third lens group 13) is located on the photographing optical axis OA. Therefore, it is possible to move the third lens group 13 (third lens retaining portion 93D) being the retractable lens from the on-axis position Pa to the retracted position Ps in the inclined direction so as to house the third lens group 13 into the retractable lens housing 21Db by using the cam structures having the simple configuration, and also to perform positional control on the photographing optical axis OA.

The lens barrel 10D according to the fifth embodiment is configured to move the third lens group 13 from the on-axis position Pa to the retracted position Ps in the inclined direction so as to house the third lens group 13 into the retractable lens housing 21Db. Therefore, it is possible to start retraction of the third lens group 13 (third lens retaining portion 93D) being the retractable lens from the photographing optical axis OA in the position closer to the subject (object) than the retracted position Ps viewed in the photographing optical axis OA direction at the time of switching from the photographing state P to the collapsed stored state D.

Therefore, according to the lens barrel 10D of the fifth embodiment, by retracting the third lens group 13 being the retractable lens obliquely backward from the position on the photographing optical axis OA, it is possible to reduce the thickness dimension of the retractable lens housing 21Db provided on the outside of the inside diameter of the movable lens barrel while employing the simple configuration.

In the respective embodiments described above, the lens barrels 10, 10A, 10B, and 10C are explained as the examples of the lens barrel according to an embodiment of the present invention. However, the present invention is not limited to the aforementioned embodiments. The present invention is applicable to the following lens barrel, and also to an imaging apparatus, a digital camera, a personal digital assistant, or an image input device employing the lens barrel. To be more specific, the lens barrel includes: multiple lens retaining frames configured to respectively retain multiple lens groups; a movable lens barrel configured to retain all the lens retaining frames therein; and lens retaining frame driving means for driving the lens retaining frames via the movable lens barrel, the lens retaining frames, the movable lens barrel and the lens retaining frame driving unit configured to switch the multiple lens groups from a collapsed state, in which the lens groups are stored with at least part of the lens groups collapsed, to a photographing state by moving at least part of the lens groups relative to a base member toward an object, the base member provided with an image pickup device for capturing a subject image formed by a photographing optical system. The lens retaining frames includes a retractable lens retaining frame configured to movably retain at least one of the lens groups in order to locate all of the lens groups on a single photographing optical axis in the photographing state and to retract a retractable lens including at least one lens to a retractable lens housing located outside an inside diameter position of the movable lens barrel in the collapsed state. The retractable lens retaining frame is movable between a position on the photographing optical axis and a position inside the retractable lens housing at least by moving in a direction inclined relative to the photographing optical axis and moving in a direction orthogonal to the photographing optical axis.

Meanwhile, the third lens group 13 is set as the retractable lens group in the above-described first, second, fourth, and fifth embodiments. However, any of the lens groups may be defined as the retractable lens group. In this context, the present invention is not limited only to the above-described embodiments.

Meanwhile, the above-described embodiments respectively disclose the cam structures. However, the cam structures only need to be configured to convert the movement of the female screw member (such as 35) in the photographing optical axis OA direction into the back and forth movement and the straight movement along the main guide shaft (such as 32) of the retractable lens retaining frame in order to move the retractable lens group between the position on the photographing optical axis OA and the retractable lens housing (such as 21b). As long as the cam structures can achieve the aspects of the movements as described in the respective embodiments, the present invention is not limited only to the above-described embodiments.

The above-described first, second, fourth, and fifth embodiments are configured to retract only one lens group (third lens group 13). However, it is also possible to define two or more lens groups as the retractable lenses and to apply a configuration to move at least one of retractable lens frames retaining those lenses in the inclined direction relative to the photographing optical axis OA and in the direction orthogonal to the photographing optical axis. In this context, the present invention is not limited only to the above-described embodiments.

The respective embodiments described above are configured to achieve the movement explained therein. However, the movement only requires the movement in the inclined direction relative to the photographing optical axis OA direction and the movement in the direction orthogonal to the photographing axis OA. In this context, the present invention is not limited only to the above-described embodiments. Here, the movement in the inclined direction relative to the photographing optical axis OA direction is achieved by the sliding action between the retaining frame side cam surface and the base side cam surface. Therefore, it is possible to appropriately set a position for executing the movement in the inclined direction relative to the photographing optical axis OA direction in the movement between the position on the photographing optical axis OA and the retractable lens housing (such as 21b) by appropriately changing the position where the retaining frame side cam surface comes into contact with the base side cam surface when viewed in the rotating direction of the rotation base of the retractable lens retaining frame relative to the base member. In particular, when the retaining frame side stepped engagement surface 55 is provided at the lower end of the rotation base (87) of the retractable lens retaining frame (41B) while the base side stepped engagement surface 56 is provided on the base member (82B) so as to be opposed thereto as described in the third embodiment and the fourth embodiment, it is only necessary to provide both of the engagement surfaces with protruding shapes and recessed shapes. Hence it is possible to adjust the positions (set the positions) of the retaining frame side inclined surface 55*b* serving as the retaining frame side cam surface and of the base side inclined surface 56*b* serving as the base side cam surface easily.

In the imaging apparatus of an embodiment of the present invention, the retractable lens retaining frame is movable in the inclined direction and movable in the orthogonal direction between the position on the photographing optical axis and the position inside the retractable lens housing. Accordingly, even if the retractable lens housing is formed with a minimum thickness dimension required for housing the retractable lens located close to the base member, the retractable lens can be housed into the retractable lens housing without interfering with the other members of the photographing optical system.

Meanwhile, the retractable lens retaining frame is capable of housing the retractable lens into the retractable lens housing by the movement in the inclined direction and the movement in the orthogonal direction without causing any interfere with the other members of the photographing optical system. Accordingly, the retractable lens retaining frame can be made with a simple configuration.

In addition to the above-described configurations, the retractable lens retaining frame is configured to be housed into the retractable lens housing by being moved toward the base member in the direction inclined relative to the photographing optical axis and then by being moved in the direction orthogonal to the photographing optical axis when the retractable lens retaining frame is moved from the position on the photographing optical axis to the retractable lens housing. This configuration leads to a further reduction in the thickness dimension of the retractable lens housing.

In addition to the above-described configurations, further provided are the screw member movable in a photographing optical axis direction; and the cam structure connecting the retractable lens retaining frame and the screw member so as to convert a movement of the screw member in the photographing optical axis direction into a rotary motion of the retractable lens retaining frame around the photographing optical axis and a straight motion of the retractable lens retaining frame along the photographing optical axis. This simpler configuration is capable of moving the retractable lens retaining frame in the inclined direction and in the orthogonal direction.

In addition to the above-described configurations, the retractable lens retaining frame is supported by a main guide shaft to be movable in a longitudinal direction of the main guide shaft and rotatable about an axis line of the main guide shaft, the main guide shaft extending from the base member parallel to the photographing optical axis. Moreover, the cam structure includes the cam groove which is provided in the rotation base of the retractable lens retaining frame supported by the main guide shaft and is configured to receive the screw member in a slidable manner; the retaining frame side cam surface provided in the rotation base; and the a base side cam surface provided in the base member and configured to come into contact with the retaining frame side cam surface to rotate the retractable lens retaining frame about the axis line of the main guide shaft while moving the retractable lens retaining frame in the photographing optical axis direction. With the simpler configuration, the retractable lens retaining frame can be moved in the inclined direction and in the orthogonal direction.

In addition to the above-described configurations, the retaining frame side cam surface and the base side cam surface are out of contact with each other when the retractable lens is retracted in the retractable lens housing. This configuration allows the retractable lens to be positioned at the predetermined height position inside the retractable lens housing.

In addition to the above-described configurations, the lens group located at the object side of the focusing lens located closest to the image plane in the photographing state is set as the retractable lens. With this configuration, it is possible to retract the retractable lens into the retractable lens housing, which is formed with the minimum thickness dimension required for housing the retractable lens located close to the base member, while properly avoiding the interference with the image pickup device and the focusing lens located on the image plane side. This configuration is advantageous particularly for the case where the image pickup device is provided on the base member to be movable in a direction orthogonal to the photographing optical axis by an image stabilization mechanism of an image pickup device drive type. Since the provision of such mechanism increases a thickness dimension defined based on the base member, this configuration can contribute significantly to reduction in the thickness dimension of the retractable lens housing.

In addition to the above-described configurations, the lens group used as the focusing lens located closest to the image plane in the photographing state is set as the retractable lens. With this configuration, it is possible to retract the retractable lens into the retractable lens housing, which is formed with the minimum thickness dimension required for housing the retractable lens located close to the base member, while properly avoiding the interference with the image pickup device and the focusing lens located on the image plane side. This configuration is advantageous particularly for the case where the image pickup device is provided on the base member to be movable in a direction orthogonal to the photographing optical axis by an image stabilization mechanism of an image pickup device drive type. Since the provision of such mechanism increases a thickness dimension defined based on the base member, this configuration can contribute significantly to reduction in the thickness dimension of the retractable lens housing.

In addition to the above-described configurations, the lens group located between the object and the first retractable lens in the photographing state is used as the second retractable lens to be retracted into the retractable lens housing by being firstly moved to the position closest possible to the imaging plane on the photographing optical axis and then moved in the direction orthogonal to the photographing optical axis after the first retractable lens is retracted in the retractable lens housing. With this configuration, the second retractable lens can be retracted later by being moved to the position closest possible to the base member on the photographing optical axis by using a space on the photographing optical axis which is occupied by the first retractable lens retracted into the retractable lens housing earlier. In this way, the configuration to move the retractable lens retaining frame for retaining the retractable lens to be retracted later can be simplified.

In addition to the above-described configurations, when the retractable lens is retracted in the retractable lens housing, the retractable lens is located in a position overlapping any of the image pickup device and a member of the photographing optical system when viewed in the direction orthogonal to the photographing optical axis, the member located between the imaging plane and the retractable lens in the photographing state. This configuration leads to further downsize of the retractable lens housing.

An imaging apparatus employing the lens barrel having any of the above-described configurations leads to a reduction in the thickness dimension as compared to the related art.

A digital camera employing the lens barrel having any of the above-described configurations leads to a reduction in the thickness dimension as compared to the related art.

A personal digital assistant employing the lens barrel having any of the above-described configurations leads to a reduction in the thickness dimension as compared to the related art.

An image input device employing the lens barrel having any of the above-described configurations leads to a reduction in the thickness dimension as compared to the related art.

Although the present invention has been described above with reference to the first to fifth embodiments, the concrete configuration of the present invention will not be limited only to these embodiments and various design changes, additions, and the like are possible without departing from the scope of the present invention.

The invention claimed is:

1. A lens barrel comprising:
a plurality of lens groups including at least one retractable lens group;
a plurality of lens retaining frames configured to respectively retain the plurality of lens groups;
a movable lens barrel configured to retain the plurality of lens retaining frames therein; and
a lens retaining frame driving device configured to drive the lens retaining frames via the movable lens barrel,
wherein the lens retaining frames, the movable lens barrel, and the lens retaining frame driving device are configured to move the plurality of lens groups between a collapsed state, in which the plurality of lens groups are stored with at least part of the plurality of lens groups collapsed, and a photographing state in which at least part of the plurality of lens groups is positioned at an object side,
wherein the plurality of lens retaining frames includes a retractable lens retaining frame configured to movably retain the at least one retractable lens group so as to position the plurality of lens groups on a single photographing optical axis in the photographing state and to retract the at least one retractable lens group to a retractable lens housing located outside of an inside diameter position of the movable lens barrel in the collapsed state, and
wherein the retractable lens retaining frame is movable between a position on the photographing optical axis and a position inside the retractable lens housing at least by moving in a direction inclined relative to the photographing optical axis and moving in a direction orthogonal to the photographing optical axis.

2. The lens barrel according to claim 1, wherein when the retractable lens retaining frame is moved from the position on the photographing optical axis to the retractable lens housing, the retractable lens retaining frame is moved in the direction inclined relative to the photographing optical axis, and then is moved in the direction orthogonal to the photographing optical axis to be stored in the retractable lens housing.

3. The lens barrel according to claim 1, further comprising:
a screw member movable in a photographing optical axis direction; and
a cam structure configured to connect the retractable lens retaining frame and the screw member so as to convert a movement of the screw member in the photographing optical axis direction into a rotary motion of the retractable lens retaining frame around the photographing optical axis and a straight motion of the retractable lens retaining frame along the photographing optical axis.

4. The lens barrel according to claim 3, further comprising:
a base member that accommodates an image pickup device thereon, and
a main guide shaft extending from the base member parallel to the photographing optical axis and being configured to support the retractable lens retaining frame,
wherein the retractable lens retaining frame has a rotation base to be supported by the main guide shaft,
wherein the retractable lens retaining frame is supported by the main guide shaft to be movable in a longitudinal direction of the main guide shaft and rotatable about an axis line of the main guide shaft, and
wherein the cam structure includes:
a cam groove provided in the rotation base of the retractable lens retaining frame and configured to receive the screw member in a slidable manner;
a retaining frame side cam surface provided in the rotation base; and
a base side cam surface provided in the base member and configured to come into contact with the retaining frame side cam surface to rotate the retractable lens retaining frame about the axis line of the main guide shaft while moving the retractable lens retaining frame in the photographing optical axis direction.

5. The lens barrel according to claim 4, wherein the retaining frame side cam surface and the base side cam surface are out of contact with each other when the retractable lens group is retracted in the retractable lens housing.

6. The lens barrel according to claim 1, wherein the plurality of lens groups include a focusing lens located closest to an imaging plane, and
wherein the retractable lens group is a lens group located between the object and the focusing lens in the photographing state.

7. The lens barrel according to claim 1, wherein the retractable lens group is a lens group used as a focusing lens located closest to an imaging plane in the photographing state.

8. The lens barrel according to claim 7, wherein the plurality of lens group include a second retractable lens group located between the object and the retractable lens group in the photographing state, and
wherein the second retractable lens group is retracted into the retractable lens housing by being firstly moved to a position closest to the imaging plane on the photographing optical axis and then moved in the direction orthogonal to the photographing optical axis after the retractable lens is retracted in the retractable lens housing.

9. The lens barrel according to claim 1, wherein when the retractable lens group is retracted in the retractable lens housing, the retractable lens group is located in a position overlapping at least one part of an image pickup device and a member located between an imaging plane and the retractable lens group in the photographing state when viewed in the direction orthogonal to the photographing optical axis.

10. An imaging apparatus comprising the lens barrel according to claim 1.

11. A digital camera comprising the lens barrel according to claim 1.

12. A personal digital assistant comprising the lens barrel according to claim 1.

13. An image input device comprising the lens barrel according to claim 1.

14. The lens barrel according to claim 1, wherein the movable lens barrel includes a plurality of cylinders securing the respective lens retaining frames, and
wherein the at least one retractable lens group is positioned outside of the all of the cylinders when the at least one retractable lens group is retracted.

* * * * *